US 9,398,290 B2

(12) United States Patent
Hasegawa et al.

(10) Patent No.: US 9,398,290 B2
(45) Date of Patent: Jul. 19, 2016

(54) STEREOSCOPIC IMAGE DISPLAY DEVICE, IMAGE PROCESSING DEVICE, AND STEREOSCOPIC IMAGE PROCESSING METHOD

(71) Applicant: NLT Technologies, Ltd., Kanagawa (JP)

(72) Inventors: Takefumi Hasegawa, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 380 days.

(21) Appl. No.: 13/955,371

(22) Filed: Jul. 31, 2013

(65) Prior Publication Data

US 2014/0036046 A1 Feb. 6, 2014

(30) Foreign Application Priority Data

Jul. 31, 2012 (JP) ................................ 2012-170644
Apr. 22, 2013 (JP) ................................ 2013-089533

(51) Int. Cl.
*H04N 13/04* (2006.01)
*H04N 5/359* (2011.01)
*H04N 13/00* (2006.01)

(52) U.S. Cl.
CPC ....... *H04N 13/0409* (2013.01); *H04N 13/0022* (2013.01); *H04N 13/0404* (2013.01); *H04N 13/047* (2013.01); *H04N 2213/006* (2013.01)

(58) Field of Classification Search
CPC ........... G02B 27/2214; G02B 27/0093; H04N 13/0022; H04N 13/0402; H04N 13/0404; H04N 13/0409
See application file for complete search history.

(56) References Cited

U.S. PATENT DOCUMENTS 6,049,424 A * 4/2000 Hamagishi ......... G02B 27/2214
345/419
9,215,452 B2 12/2015 Watanabe
(Continued)

FOREIGN PATENT DOCUMENTS

CN 102449534 A 5/2012
CN 102611909 7/2012
(Continued)

OTHER PUBLICATIONS

Chang, YuCheng, Chih-Yao Ma, and YiPai Huang. "10.2: Crosstalk Suppression by Image Processing in 3D Display." SID Symposium Digest of Technical Papers. vol. 41. No. 1. Blackwell Publishing Ltd, 2010.*

(Continued)

*Primary Examiner* — Sath V Perungavoor
*Assistant Examiner* — Clifford Hilaire
(74) *Attorney, Agent, or Firm* — Young & Thompson

(57) ABSTRACT

Provided is a stereoscopic image display device and the like with which the issues of a CT-image and pseudoscopic view by the 3D crosstalk can be overcome so that a sense of discomfort is not felt by the observer even when the observing position of the observer is shifted without giving a sense of discomfort by a drastic change in the parallax value, in which an image processing unit includes: a relative position calculating unit which calculates a relative position of a stereoscopic display panel with respect to the measured observing position of the observer; a parallax adjustment amount calculating unit which calculates a parallax adjustment amount suited for stereoscopic image display according to the relative position; and a parallax adjustment processing unit which performs parallax adjustment processing on image data according to the parallax adjustment amount.

36 Claims, 97 Drawing Sheets

(56) References Cited

U.S. PATENT DOCUMENTS

| | | | | |
|---|---|---|---|---|
| 2004/0208357 | A1* | 10/2004 | Tokuhashi | G06K 9/209 382/154 |
| 2011/0080401 | A1* | 4/2011 | Tan | H04N 13/0018 345/419 |
| 2011/0316985 | A1 | 12/2011 | Ishikawa et al. | |
| 2012/0044330 | A1* | 2/2012 | Watanabe | G02B 27/2214 348/54 |
| 2012/0056885 | A1* | 3/2012 | Ishii | H04N 13/0018 345/419 |
| 2012/0105611 | A1* | 5/2012 | Godar | H04N 13/0003 348/54 |
| 2013/0093752 | A1* | 4/2013 | Yuan | G02B 27/225 345/419 |

FOREIGN PATENT DOCUMENTS

| | | |
|---|---|---|
| EP | 0 354 851 | 2/1990 |
| JP | 2000-152285 | 5/2000 |
| JP | 2003-107392 | 4/2003 |
| JP | 2007-052304 | 3/2007 |
| JP | 2007-318184 | 12/2007 |
| JP | 2010-014891 | 1/2010 |
| JP | 2010-200213 | 9/2010 |
| JP | 2012-010084 | 1/2012 |
| JP | 2012-039469 | 2/2012 |
| JP | 2012-039592 | 2/2012 |
| JP | 2012-044308 | 3/2012 |
| JP | 2012-060607 | 3/2012 |
| WO | WO 2010/061689 | 6/2010 |
| WO | 2011/068210 | 6/2011 |

OTHER PUBLICATIONS

Woodgate, Graham J., and Jonathan Harrold. "Key design issues for autostereoscopic 2-D/3-D displays." Journal of the Society for Information Display 14.5 (2006): 421-426.*
Extended European Search Report—EP 13 17 8706—Apr. 3, 2014.
European Search Report—EP 13 17 8706—Nov. 5, 2013.
Jung-Min Choi et al., "Autostereoscopic 3D with Wide Viewing Angle using Gyro-Sensor", IDWAA 3Dp-7, pp. 291-294.
Chinese Office Action dated Mar. 9, 2016; Appln. No. 201310325940.3.

* cited by examiner

FIG. 10

| 3D CROSSTALK AMOUNT | CT-IMAGE | INFLUENCE FOR STEREOSCOPIC IMAGE | VIEWING ANGLE RANGE | VIEWING SPACE NAME | PARALLAX ALLOWABLE VALUE $\gamma_{th}$ |
|---|---|---|---|---|---|
| $\beta_1$ OR LESS | NONE | HIGH-QUALITY STEREOSCOPIC IMAGE | $\theta_0 \sim \theta_1$ | PSEUDOSCOPIC VIEWING SPACE | $\gamma_1$ |
| $\beta_1 \sim \beta_2$ | SMALL | ACCEPTABLE QUALITY STEREOSCOPIC IMAGE | $\theta_1 \sim \theta_2$ | 3D-CROSSTALK VIEWING SPACE | $\gamma_1 \sim \gamma_2$ |
| $\beta_2$ OR MORE | LARGE | UNACCEPTABLE QUALITY STEREOSCOPIC IMAGE | $\theta_2 \sim \theta_3$ | 3D-CROSSTALK VIEWING SPACE | $0 \sim \gamma_3$ |
| $\beta_2$ OR MORE | LARGE | UNACCEPTABLE QUALITY STEREOSCOPIC IMAGE | $\theta_3 \sim \theta_4$ | 3D-CROSSTALK VIEWING SPACE | $0 \sim \gamma_3$ |
| $\beta_1 \sim \beta_2$ | SMALL | ACCEPTABLE QUALITY STEREOSCOPIC IMAGE | $\theta_4 \sim \theta_5$ | 3D-CROSSTALK VIEWING SPACE | $\gamma_2 \sim \gamma_1$ |
| $\beta_1$ OR LESS | NONE | HIGH-QUALITY STEREOSCOPIC IMAGE | $\theta_5 \sim \theta_6$ | STEREOSCOPIC VIEWING SPACE | $\gamma_1$ |

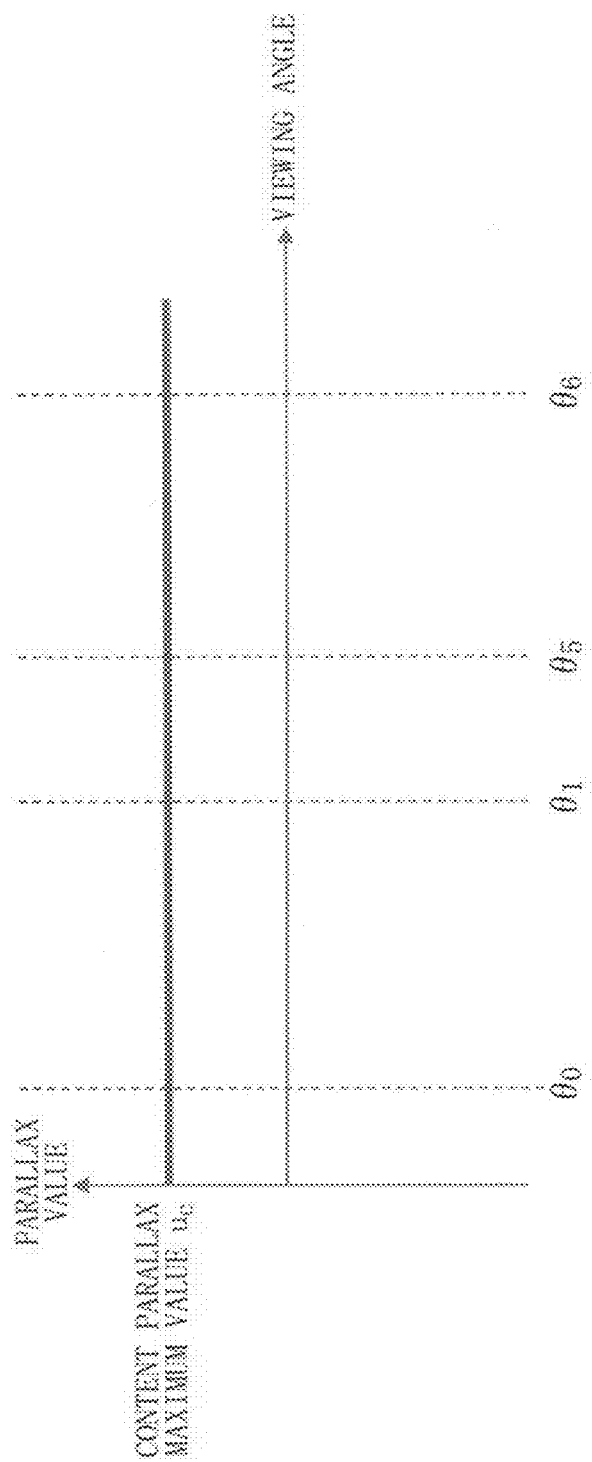

FIG. 32

| FIRST EXEMPLARY EMBODIMENT | | SECOND EXEMPLARY EMBODIMENT | | |
|---|---|---|---|---|
| VIEWING ANGLE RANGE | PARALLAX ALLOWABLE VALUE $d_{bh}$ | VIEWING ANGLE RANGE | PARALLAX ALLOWABLE VALUE $d_{bh}$ | SLOPE: $|d d_{bh}/d\theta|$ |
| $\theta_0 \sim \theta_1$ | $\gamma_1$ (CONSTANT VALUE) | $\theta_0 \sim \theta_{11}$ | CHANGE IN $\gamma_2 - \gamma_1$ | $d d_{bh}/d\theta <= u_b$ |
|  |  | $\theta_{11} \sim \theta_{12}$ | CONSTANT VALUE | $d d_{bh}/d\theta <= u_b$ |
|  |  | $\theta_{12} \sim \theta_1$ | CHANGE IN $\gamma_2 - \gamma_1$ | $d d_{bh}/d\theta <= u_b$ |
| $\theta_1 \sim \theta_2$ | CHANGE IN $\gamma_2 - \gamma_1$ | $\theta_1 \sim \theta_2$ | CHANGE IN $\gamma_2 - \gamma_1$ | $d d_{bh}/d\theta <= u_b$ |
| $\theta_2 \sim \theta_3$ | CHANGE IN $0 - \gamma_2$ | $\theta_2 \sim \theta_3$ | CHANGE IN $0 - \gamma_2$ | $d d_{bh}/d\theta <= u_b$ |
| $\theta_3 \sim \theta_4$ | CHANGE IN $0 - \gamma_2$ | $\theta_3 \sim \theta_4$ | CHANGE IN $0 - \gamma_2$ | $d d_{bh}/d\theta <= u_b$ |

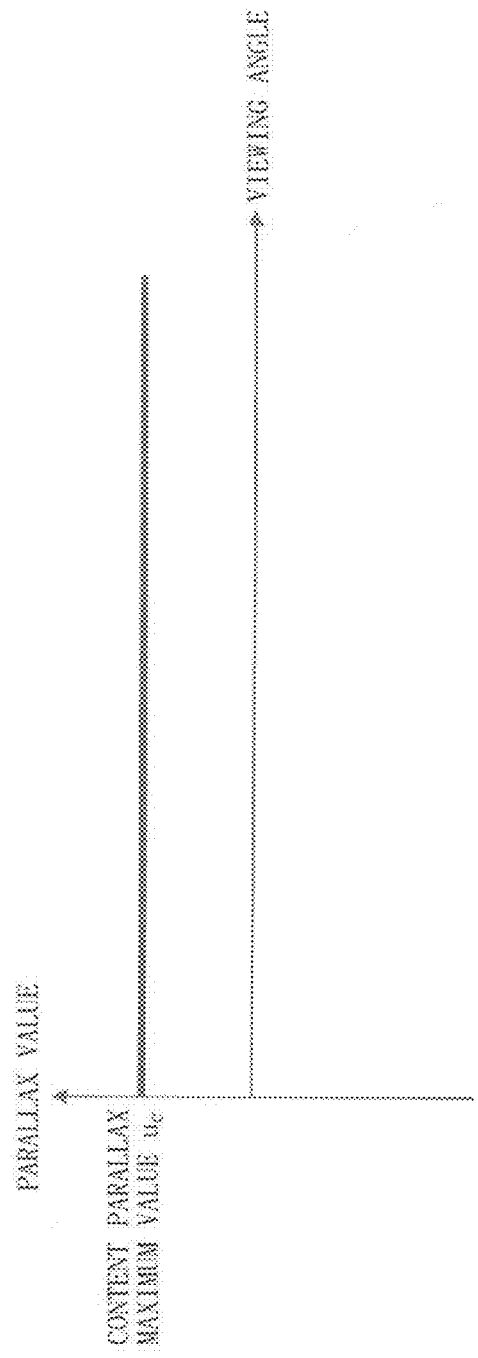

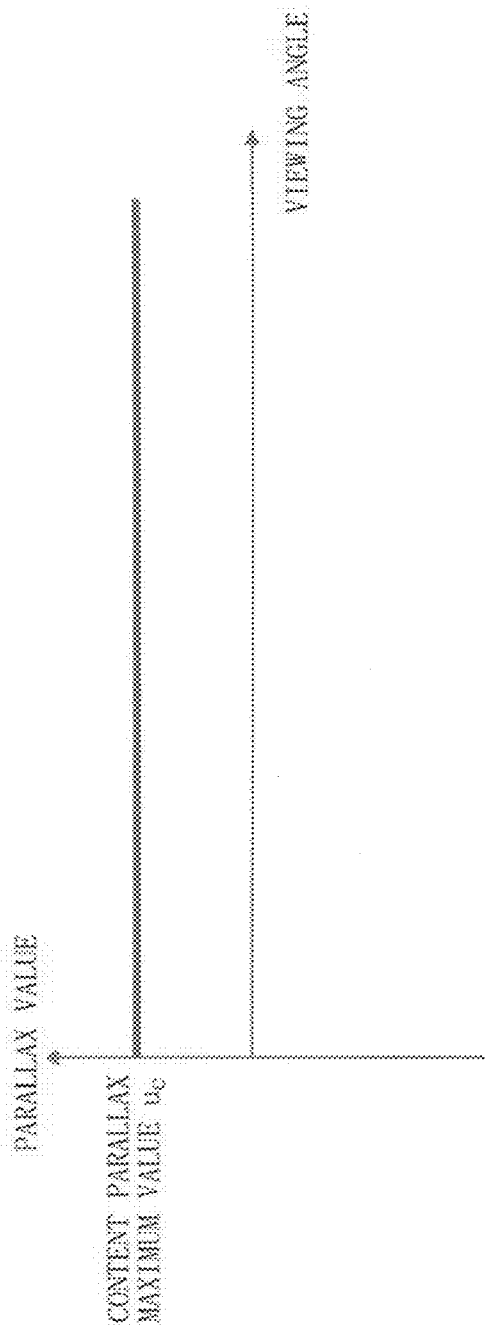

FIG. 42

| RIGHT EYE | LEFT EYE | PARALLAX ADJUSTMENT PROCESSING | DISPLAY STATE |
|---|---|---|---|
| R IMAGE | L IMAGE | UNEXECUTED | 3D |
| R IMAGE | CT IMAGE | EXECUTED | 3D → 2D |
| R IMAGE | R IMAGE | UNEXECUTED | 2D |
| L IMAGE | L IMAGE | UNEXECUTED | 2D |
| L IMAGE | CT IMAGE | EXECUTED | 3D → 2D |
| L IMAGE | R IMAGE | PARALLAX INVERTED | 3D |
| CT IMAGE | L IMAGE | EXECUTED | 3D → 2D |
| CT IMAGE | CT IMAGE | EXECUTED | 2D |
| CT IMAGE | R IMAGE | EXECUTED | 3D → 2D |

FIG. 45
CT IMAGE (RANGE OF GHOSTING IMAGE)
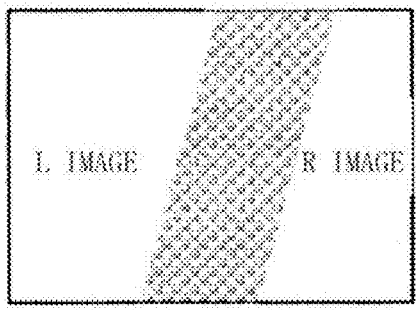
IMAGE PROJECTED TO LEFT EYE
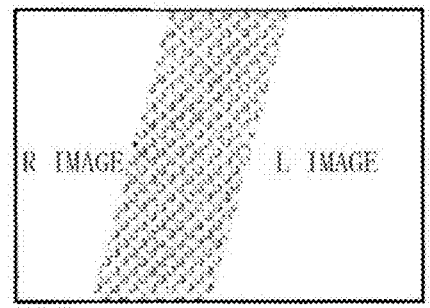
IMAGE PROJECTED TO RIGHT EYE

FIG. 71

| 3D CROSSTALK AMOUNT | CT-IMAGE | INFLUENCE FOR STEREOSCOPIC IMAGE | VIEWING ANGLE RANGE | VIEWING SPACE NAME | PARALLAX ALLOWABLE VALUE [μm] |
|---|---|---|---|---|---|
| $\beta_1$ OR LESS | NONE | HIGH-QUALITY STEREOSCOPIC IMAGE | $\theta_0 \sim \theta_1$ | PSEUDOSCOPIC VIEWING SPACE | $\gamma_1$ |
| $\beta_1 \sim \beta_2$ | SMALL | ACCEPTABLE QUALITY STEREOSCOPIC IMAGE | $\theta_1 \sim \theta_2$ | 3D-CROSSTALK VIEWING SPACE | $\gamma_1$ |
| $\beta_2$ OR MORE | LARGE | UNACCEPTABLE QUALITY STEREOSCOPIC IMAGE | $\theta_2 \sim \theta_3$ | 3D-CROSSTALK VIEWING SPACE | — |
| $\beta_2$ OR MORE | LARGE | UNACCEPTABLE QUALITY STEREOSCOPIC IMAGE | $\theta_3 \sim \theta_4$ | 3D-CROSSTALK VIEWING SPACE | — |
| $\beta_1 \sim \beta_2$ | SMALL | ACCEPTABLE QUALITY STEREOSCOPIC IMAGE | $\theta_4 \sim \theta_5$ | 3D-CROSSTALK VIEWING SPACE | $\gamma_1$ |
| $\beta_1$ OR LESS | NONE | HIGH-QUALITY STEREOSCOPIC IMAGE | $\theta_5 \sim \theta_6$ | STEREOSCOPIC VIEWING SPACE | $\gamma_1$ |

STEREOSCOPIC IMAGE DISPLAY DEVICE, IMAGE PROCESSING DEVICE, AND STEREOSCOPIC IMAGE PROCESSING METHOD

CROSS-REFERENCE TO RELATED APPLICATION

This application is based upon and claims the benefit of priority from Japanese patent application No. 2012-170644, filed on Jul. 31, 2012 and No. 2013-089533, filed on Apr. 22, 2013, the disclosure of which is incorporated herein in its entirety by reference.

BACKGROUND OF THE INVENTION

1. Field of the Invention

The present invention relates to a stereoscopic image display technique. More specifically, the present invention relates to a stereoscopic image display device and the like for converting an image to a stereoscopic image with which an observer does not feel a sense of discomfort even when the observer changes one's position.

2. Description of the Related Art

Recently, television sets capable of viewing stereoscopic images are on the general market. Accordingly, the amount of the stereoscopic image contents is increased, and the environments for viewing the stereoscopic images are coming to be in good condition. In general, the observer wears eyeglasses for stereoscopic image display to project images of different parallaxes on left and right eyes so that the observer can view the stereoscopic image on the stereoscopic image television set. However, there are many observers who feel a sense of displeasure to wear the eyeglasses for stereoscopic image display, and a stereoscopic image display device that requires no such eyeglasses is desired. Further, when the eyeglass-type stereoscopic image display device is utilized as a mobile device, it is inconvenient since the stereoscopic image display device and the eyeglasses for stereoscopic image display are required to be carried to the outside. Thus, such stereoscopic image display device that requires no eyeglasses is more strongly desired for mobile use.

As the stereoscopic image display that requires no eyeglasses for stereoscopic image display, generally used is a type which divides spatial areas for projecting a stereoscopic image, and projects images of different parallaxes to each of the divided spatial areas so as to project images of different parallaxes to the left and right eyes of the observer. Through providing a lenticular lens and a parallax barrier on a stereoscopic display panel of the stereoscopic display device, the images of different parallaxes are provided for each of the divided spatial areas.

With such-type of stereoscopic image display device, it is not necessary to wear the eyeglasses for stereoscopic image display. Thus, it is excellent in terms of avoiding such trouble of wearing eyeglasses and is expected to be utilized in mobile use in particular. However, images of different parallaxes are projected by being spatially isolated with such type, so that the spatial area where the observer can visually recognize the stereoscopic images properly becomes limited. The spatial area where the observer can visually recognize the stereoscopic images properly is limited to a case where the position of the left eye of the observer is within the spatial area where the left-eye image is projected and the position of the right eye of the observer is within the spatial area where the right-eye image is projected. When the positions of the left and right eyes of the observer are shifted from those spatial areas, the left-eye image and the right-eye images may be viewed by being overlapped on one another (viewed as a CT-image) or a video of inverted sense of depth (so-called pseudoscopic view) may be viewed by the observer.

Now, the spatial area divided by a stereoscopic panel will be described by referring to the accompanying drawings. First, the spatial area in a case where a parallax barrier is used as the stereoscopic display panel will be described.

FIG. 64 shows an example of an optical model in which images of different parallaxes are projected to the left and right eyes of an observer with the parallax-barrier type stereoscopic image display device. FIG. 64 is a sectional view observed from the above the head of the observer, in which the both eyes (right eye 55R and left eye 55L) of the observer are located on an observing plane 30 distant by an optimum observing distance OD from the display plane of the display device, and the center of the both eyes of the observer and the center of the display panel match with each other.

The image display panel (not shown) is constituted with a group of optical modulators that are pixels arranged in matrix (e.g., a liquid crystal panel). In FIG. 64, among the right-eye pixels 4R and the left-eye pixels 4L arranged alternately, only each of the pixels at both ends of the image display panel and in the center are illustrated. A parallax barrier 6 that functions as a means for dividing a spatial area and projecting images is disposed on the far side of the display panel from the observer. The parallax barrier 6 is a barrier (a light shielding plate) on which a great number of thin vertical striped slits 6a are formed, and it is disposed in such a manner that the longitudinal direction of the barrier itself becomes orthogonal to the direction along which the left-eye pixels 4L and the right-eye pixels 4R of the image display panel are arranged. In a still far side of the parallax barrier, a light source (not shown: so-called backlight) is placed. Light emitted from the light source transmits through the slits 6a and is projected towards the observer while the intensity thereof is being modulated in the pixels within the image display panel. The projecting directions of the right-eye pixel 4R and the left-eye pixel 4L are limited by the existence of the slits 6a.

When a locus of the light passing through the closest pixel among the light emitted from each of the slits 6a is illustrated as a light ray 20, a right-eye area 70R (a spatial area where the right-eye image is projected) where the projection images of all the right-eye pixels 4R are superimposed and a left-eye area 70L (a spatial area where the left-eye image is projected) where the projection images of all the left-eye pixels 4L are superimposed can be acquired. Only the projection images from the right-eye pixels 4R can be observed in the right-eye area 70R, and only the projection images from the left-eye pixels 4L can be observed in the left-eye area 70L. Therefore, when the parallax images are projected to the left and right eyes while the right eye 55R of the observer is located within the right-eye area 70R and the left eye 55L is located within the left-eye area 70L, the observer visually recognizes those as a stereoscopic image. In other words, the observer can observe a desired stereoscopic image when the right eye 55R is located within the right-eye area 70R and the left eye 55L is located within the left-eye area 70L. The display device shown in FIG. 64 is so designed that the projection images (width P') at the optimum observing distance OD of each of the right-eye pixel 4R and the left-eye pixel 4L (width P) all superimpose with each other so that the width of the right-eye area 70R and the left-eye area 70L becomes the maximum on the observing plane 30. The width P' of the projection image is mainly determined based on the distance h between the slit 6a and the pixel, the pixel pitch P, and the optimum observing distance OD. When the width P' is widened, the width of the right-eye pixel 70R and the left-eye pixel 70L is widened. However, it is impossible to locate each of the both eyes of the observer at arbitrary positions, so that the stereoscopic area where the stereoscopic images can be sighted cannot necessarily be expanded. Provided that the distance between both eyes is e, it is preferable to design the width P' to be equivalent to the space e between the both eyes. In a case where the width P' is smaller than the space e between the both eyes, the area of stereopsis is limited to the width P'. In the meantime, in a case where the width P' is larger than the space e between the both eyes, the area where the both eyes are located in the right-eye area 70R or the left-eye area 70L is simply increased. Note that a slit width S is written in FIG. 64.

Further, FIG. 65 shows an optical model of a case where the parallax barrier 6 is disposed on the front side of the display panel when viewed from the observer. As in the case where the barrier is disposed on the far side of the display panel when viewed from the observer, the observer is at the optimum observing distance OD, and the projection images (width P') of each of the left-eye and right-eye pixels (width P) are designed to superimpose with each other on the observing plane 30. When a locus of the light passing through the closest slit 6a among the light emitted from each of the pixels is illustrated as the light ray 20, the right-eye area 70R where the projection images of all the right-eye pixels 4R are superimposed and the left-eye area 70L where the projection images of all the left-eye pixels 4L are superimposed can be acquired.

Next, FIG. 66 shows spatial areas divided when a lenticular lens is used instead of the parallax barrier. In FIG. 66, the parallax barrier 6 of FIG. 65 is simply changed to the lenticular lens 3. Next, a case where the observer is located in a pseudoscopic viewing space away from an area (a stereoscopic viewing space) where the observer can visually recognize a stereoscopic image properly will be studied by using the lenticular-lens type optical model. FIG. 67 is a sectional view when observed from above the head of the observer in a case where the observer moves to the right side so that the right eye 55R moves out of the right-eye area 70R into the left-eye area 72L and the left eye 55L moves out of the left-eye area 70L into the right-eye area 70R.

In this case, the light rays 20 passing through the principal point (vertex) of the closest cylindrical lens 3a among the light emitted from the left-eye pixels 4L and the right-eye pixels 4R do not reach the position of the right eye 55R of the observer. However, when a light ray passing through the principal point (vertex) of the second closest cylindrical lens 3b among the light emitted from the left-eye pixels 4L is illustrated as a light ray 21, the second left-eye area 72L can be acquired. That is, in FIG. 67, the observer observes the projection image from the left-eye pixel 4L by the right eye 55R and observes the right-eye pixel 4R by the left eye 55L. Thus, when a stereoscopic image is observed, the popup image and the depth image are presented in an inverted manner (so-called pseudoscopic view). Therefore, a desired stereoscopic image cannot be sighted. Note here that the right-eye area 70R is the stereoscopic viewing space for the right eye 55R, and the left-eye areas 70L and 72L are the pseudoscopic viewing spaces. In the meantime, the left-eye areas 70L, 72L are the stereoscopic viewing spaces for the left eye 55L, and the right-eye area 70R is the pseudoscopic viewing space.

Next, a case where the observer is located in a 3D-crosstalk viewing space away from an area (a stereoscopic viewing space) where the observer can visually recognize a stereoscopic image properly will be studied by using the lenticular-lens type optical model. FIG. 68 is a sectional view when observed from above the head of the observer in a case where the observer moves to the right side so that the right eye 55R comes to be located at the boundary between the right-eye area 70R and the left-eye area 72L and the left eye 55L comes to be located at the boundary between the right-eye area 70R and the left-eye area 70L.

In this case, the light ray 20 passing through the principal point (vertex) of the closest cylindrical lens 3a among the light emitted from the right-eye pixels 4R and the light ray 21 passing through the principal point (vertex) of the second closest cylindrical lens 3b among the light emitted from the left-eye pixels 4L are both projected to the position of the right eye 55R of the observer. That is, in FIG. 68, the observer observes the projection images from both the right-eye pixels 4R and the left-eye pixels 4L with the right eye 55R. Thus, when a stereoscopic image is observed, the right-eye pixels 4R and the left-eye pixels 4L are superimposed to produce a CT-image (so-called 3D crosstalk). Therefore, a desired stereoscopic image cannot be sighted. Note here that the area of the boundary between the right-eye area 70R and the left-eye area 72L and the area of the boundary between the right-eye area 70R and the left-eye area 70L are the 3D-crosstalk viewing spaces.

As described above, with the stereoscopic image display device that requires no eyeglasses for stereoscopic image display, issues of having a CT-image and pseudoscopic view occur depending on the observing position of the observer. Therefore, the observer feels a sense of discomfort, which is a reason for preventing the stereoscopic image display devices from being spread.

In order to overcome such issues, there is proposed a method which detects the observing position of the observer, and switches and displays a stereoscopic image having parallax and a flat image having no parallax depending on the position (WO 2010/061689 (Patent Document 1) and Japanese Unexamined Patent Publication 2003-107392 (Patent Document 2)).

Further, also proposed is a method which detects the observing position of the observer, and performs parallax adjustment processing for entirely shifting the images of different parallaxes to display a stereoscopic image with which the load for the observer in a pseudoscopic viewing space is lightened (Japanese Unexamined Patent Publication 2012-010084 (Patent Document 3)). Further, also proposed are methods which detect the observing position of the observer and change the position of a parallax barrier for taking the countermeasure for the issues of CT-image by 3D crosstalk and pseudoscopic view (Japanese Unexamined Patent Publication 2000-152285 (Patent Document 4), Japanese Unexamined Patent Publication 2007-318184 (Patent Document 5), Japanese Unexamined Patent Publication 2010-014891 (Patent Document 6), Japanese Unexamined Patent Publication 2012-039469 (Patent Document 7), and Jung-Min Choi, et al "Autostereoscopic 3D with Wide Viewing Angle using Gyro-Sensor," IDW11 3Dp-7, pp. 291-294 (Non-Patent Document 1)). Among those, Patent Document 7 proposes a method which performs parallax adjustment processing on the images of different parallaxes to express motion parallax with which an object within a stereoscopic image moves in association with the move of the observer.

Further, there is proposed a method which expresses motion parallax even in a normal image display device by detecting the observing position of the observer, converting images to the image information of the viewpoint which corresponds to the observing position, and displaying it (Japanese Unexamined Patent Publication 2007-052304 (Patent Document 8)).

Further, there is also proposed a method which adjusts the parallax amount by shifting the right-eye image entirely so that the luminance difference between the left-eye image and the right-eye image becomes the minimum, and displays a stereoscopic image so as to reduce the influence of a CT-image by 3D crosstalk thereby (Japanese Unexamined Patent Publication 2010-200123 (Patent Document 9)).

Further, even when stereoscopic image contents of same parallax are displayed, the parallax of the stereoscopic image contents observed by the observer changes depending on the distance between the stereoscopic image display device and the observing position of the observer. There is also proposed a method which displays a stereoscopic image by adjusting the parallax of the stereoscopic image content according to the distance between the stereoscopic image display device and the observing position of the observer in order to overcome such an issue that the stereoscopic image cannot be sighted when the distance between the stereoscopic image display device and the observing position of the observer becomes too close so that the parallax of the stereoscopic image contents becomes too large (Japanese Unexamined Patent Publication 2012-044308 (Patent Document 10)).

Further, also proposed is a method which displays a high-quality stereoscopic image through detecting the observing position and observing angle of the observer with respect to the display unit and adjusting the parallax of the image data according to the observing angle while considering the crosstalk amount by the view-range angle, view-range width, and flank curvature of the stereoscopic image display device (Japanese Unexamined Patent Publication 2012-060607 (Patent Document 11)).

With the naked-eye stereoscopic image display device that requires no eyeglasses for stereoscopic image display, there are issues of a CT-image caused by 3D crosstalk and pseudoscopic view depending on the observing position of the observer. This gives not only a sense of discomfort to the observer but also is one of the factors for causing physiological instability such as feeling video sickness and eye fatigue in a case of a stereoscopic image display device with a low picture quality, which is a reason for preventing the naked-eye stereoscopic image display device from being spread.

As the methods for overcoming such issue, Patent Documents 1 and 2 are proposed. However, the methods of Patent Documents 1 and 2 give a sense of discomfort to the observer with a drastic change in the parallax value where a differential coefficient of the parallax value for the viewing angle becomes almost infinite when switching a stereoscopic image having parallax and a flat image having no parallax.

Patent Document 3 discloses a technique which makes it possible to display a stable stereoscopic image by suppressing a popup amount when the observer stands still, through shifting the parallax image entirely and performing parallax adjustment processing. However, the parallax adjustment processing method disclosed in patent Document 3 cannot overcome the issue of the CT-image by the 3D crosstalk and does not take the shift speed of the observing position of the observer into consideration, so that the observer still feels a sense of discomfort.

Patent Documents 4, 5, 6, 7 and Non-Patent Document 1 propose the techniques which can provide a countermeasure for the issues of the CT-image and the pseudoscopic view by the 3D crosstalk through changing the position of the parallax barrier. However, it is required to have a barrier driving device for changing the position of the barrier with all of the techniques depicted in those documents, so that the device cost is increased. Also, the power consumption is increased, since it can only be applied to the parallax barrier type. Further, while Patent Document 7 proposes a method which expresses motion parallax by performing the parallax adjustment processing, it is not possible with the method to overcome the issue of the CT-image by the 3D crosstalk.

Patent Document 8 proposes a technique which expresses motion parallax through displaying an image by converting it to the image information of the viewpoint according to the observing position. However, the image displaying method of Patent Document 8 does not take the method for displaying a stereoscopic image by binocular parallax into consideration, so that a stereoscopic image content having binocular parallax cannot be displayed (does not consider the issue of a CT-image by 3D crosstalk, either).

Patent Document 9 proposes a method which reduces the influence of a CT-image by the 3D crosstalk through displaying a stereoscopic image by adjusting the parallax amount through shifting the right-eye image entirely. However, when the stereoscopic image is displayed by shifting the right-eye image entirely, a parallax expression different from the original stereoscopic image content is displayed in a part of the image area (e.g., there is a possibility that the image area that is to be popup-displayed may be changed to be depth-displayed by the shift processing performed on the entire image). Further, the method of Patent Document 9 does not use the observing position of the observer and performs the parallax adjustment processing by shifting the image at all times. Therefore, even when the observing position of the observer is within a stereoscopic viewing space, an appealing stereoscopic image content cannot be displayed.

Patent Document 10 proposes a method which performs parallax adjustment processing on the stereoscopic image content according to the distance between the stereoscopic image display device and the observing position of the observer. However, the method of Patent Document 10 does not consider any method for calculating the parallax adjustment amount for lightening the influence of the CT-image by the 3D crosstalk generated in a naked-eye type stereoscopic image display device which spatially separates and projects the right-eye image and the left-eye image by using a lenticular lens or a parallax barrier, so that the issue of the CT-image by the 3D crosstalk cannot be overcome.

Patent Document 11 proposes a method for adjusting the visual field according to the changes in the view-area angle, the view-area width, and the crosstalk amount. However, as a specific processing method, depicted thereon is only the parallax adjustment method which is performed according to the change in the view-area angle and view-area width, and the parallax adjustment method which is performed according to the change in the crosstalk is not depicted. At the same time, the parallax adjustment method of Patent Document 11 does not consider the point regarding the stereoscopic viewing space, the pseudoscopic viewing space, and the 3D-crosstalk viewing space described above so that it is not possible to lighten the influence of the CT-image in the 3D-crosstalk viewing space appearing also in the area where the observing angle θ is sufficiently small and the flank curvature is not generated. Further, with the parallax adjustment processing depicted in Patent Document 11, the parallax value does not take a negative value. Therefore, it is not possible to take a countermeasure even when pseudoscopic view is generated. Furthermore, the parallax adjustment processing depicted in Patent Document 11 does not consider the shift speed of the observing position. Thus, the parallax value is changed drastically when the observing position is shifted at a fast speed, thereby giving a sense of discomfort to the observer.

None of the documents from Patent Documents 1 to 10 and Non-Patent Document 1 proposes a technique which overcomes the issues of the CT-image and the pseudoscopic view by the 3D crosstalk through performing the parallax adjustment processing on the stereoscopic image content by referring to the device characteristic data containing the display characteristic with respect to the viewing angle of the stereoscopic display panel of the stereoscopic image display device.

It is therefore an exemplary object of the present invention to overcome the above-described issues and to provide a stereoscopic image display device and the like with which the issues of the CT-image and pseudoscopic view caused by 3D crosstalk can be overcome without giving a sense of discomfort by the drastic change in the parallax value so that a sense of discomfort is not felt by the observer even when the observing position of the observer is shifted even with the stereoscopic image display device having no barrier driving device.

SUMMARY OF THE INVENTION

The stereoscopic image display device according to an exemplary aspect of the invention is a stereoscopic image display device which includes:
  a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction;
  an observer position measuring unit which measures an observing position of the observer;
  a relative position calculating unit which calculates a relative position of the stereoscopic display panel unit with respect to the observing position of the observer;
  a parallax adjustment amount calculating unit which calculates a parallax adjustment amount suited for stereoscopic image display according to the relative position; and
  a parallax adjustment processing unit which performs parallax adjustment processing on image data according to the parallax adjustment amount.

The image processing device according to another exemplary aspect of the invention is an image processing device which outputs an image data to a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, and the image processing device includes:
  a relative position calculating unit which calculates a relative position of the stereoscopic display panel unit with respect to a measured observing position of the observer;
  a parallax adjustment amount calculating unit which calculates a parallax adjustment amount suited for stereoscopic image display according to the relative position; and
  a parallax adjustment processing unit which performs parallax adjustment processing on image data according to the parallax adjustment amount.

The stereoscopic image processing method according to still another exemplary aspect of the invention is a stereoscopic image processing method using a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, and the method is characterized to include:
  measuring an observing position of the observer;
  calculating a relative position of the stereoscopic display panel unit with respect to the observing position of the observer;
  calculating a parallax adjustment amount suited for stereoscopic image display according to the relative position;
  performing parallax adjustment processing on image data according to the parallax adjustment amount; and
  outputting the image data on which the parallax adjustment processing is performed to the stereoscopic display panel unit.

BRIEF DESCRIPTION OF THE DRAWINGS

FIG. 10 is a chart showing a relational table regarding each kind of values with respect to 3D crosstalk amount;

FIG. 20B is a chart showing content parallax maximum values with respect to the viewing angles;

FIG. 32 is a comparison table regarding the parallax allowable values of the first exemplary embodiment and the second exemplary embodiment;

FIG. 34B is a chart showing content parallax maximum values with respect to the viewing angles;

FIG. 38B is a chart showing content parallax maximum values with respect to the viewing angles;

FIG. 42 is a chart showing a parallax adjustment processing execution judgment table;

FIG. 45 shows illustrations of image displayed states projected to the right eye and left eye of an observer;

FIG. 71 is a chart showing a relational table regarding each kind of values with respect to 3D crosstalk amount;

DETAILED DESCRIPTIONS OF THE PREFERRED EMBODIMENTS

Modes (referred to as "exemplary embodiments" hereinafter) for embodying the present invention will be described hereinafter by referring to the accompanying drawings.

First Exemplary Embodiment

Figure 1:
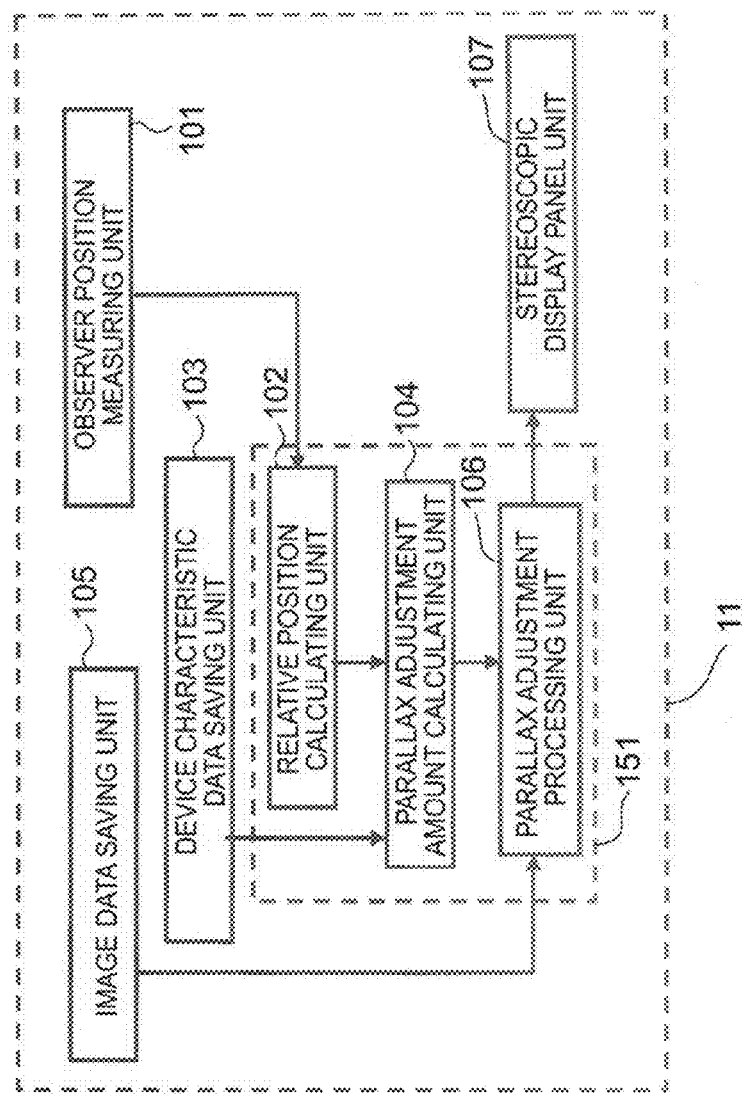
FIG. 1 is a block diagram showing a stereoscopic image display device according to a first exemplary embodiment.

The structure of a stereoscopic image display device according to a first exemplary embodiment will be described below. FIG. 1 is a block diagram of a stereoscopic image display device 11. The stereoscopic image display device 11 includes: an observer position measuring unit 101; a relative position calculating unit 102; a device characteristic data saving unit 103; a parallax adjustment amount calculating unit 104; an image data saving unit 105; a parallax adjustment processing unit 106; and a stereoscopic display panel unit 107. Further, a processing unit that is an integration of the relative position calculating unit 102, the parallax adjustment amount calculating unit 104, and the parallax adjustment processing unit 106 is referred to as an image processing unit 151.

Figure 2:
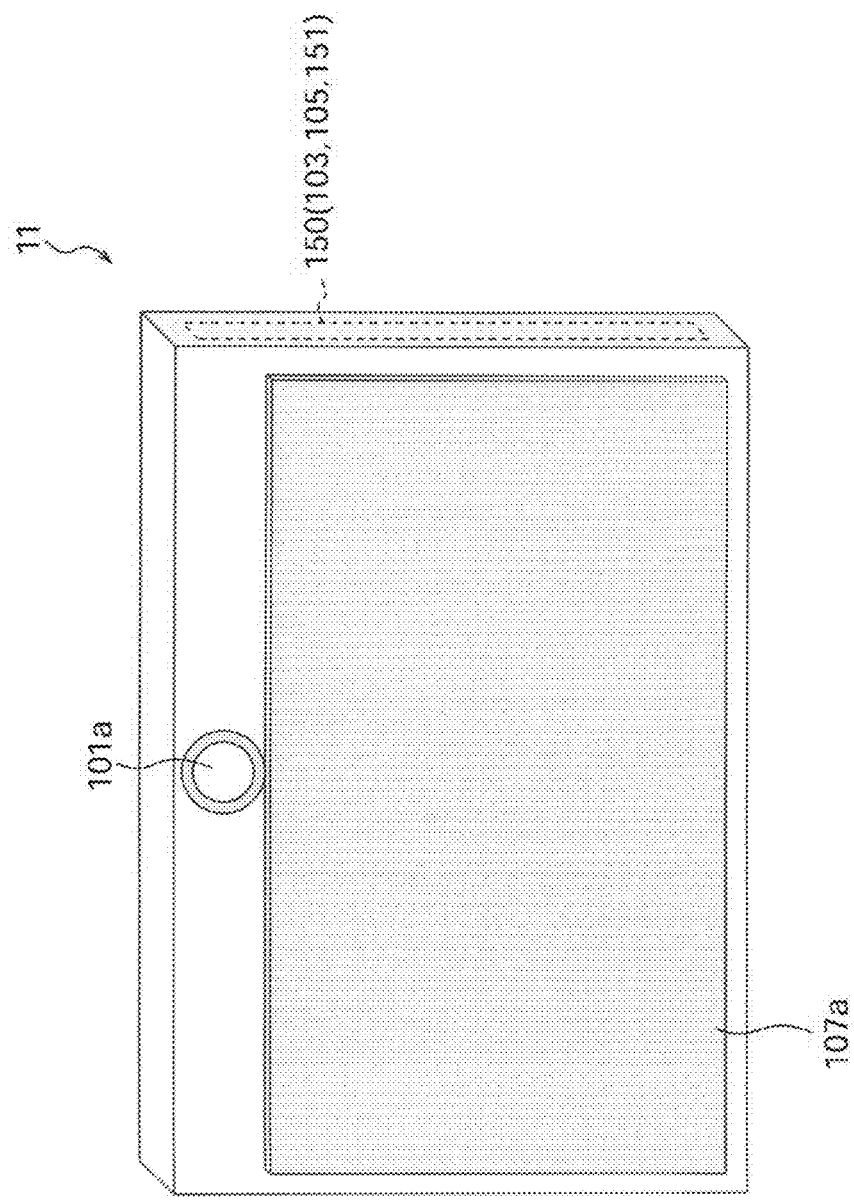
FIG. 2 is an external appearance of the stereoscopic image display device.
Figure 3:
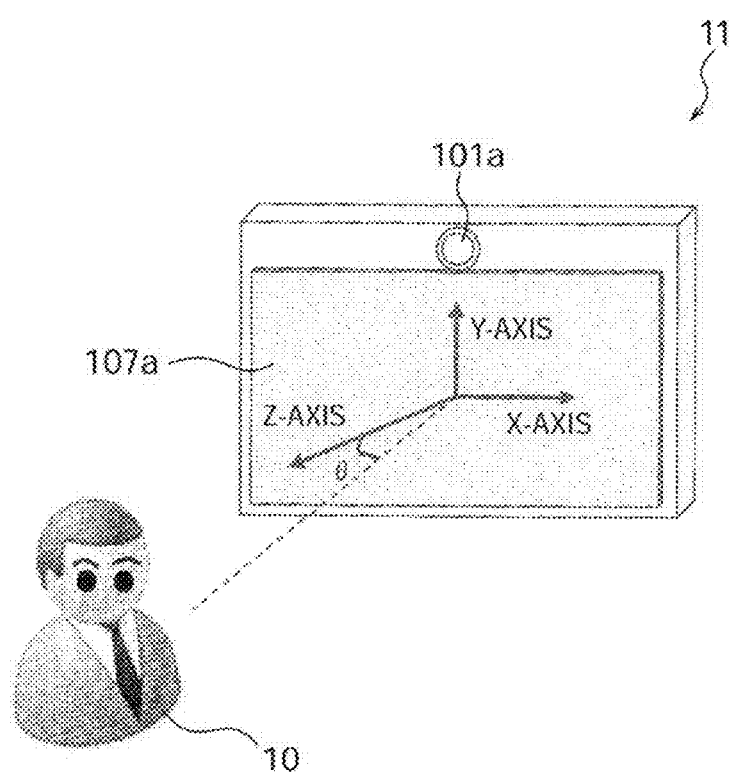
FIG. 3 is a chart showing a coordinate system of the relative positions regarding the observing position of an observer and the stereoscopic display panel.

FIG. 2 shows an external appearance of the stereoscopic image display device 11. FIG. 3 shows a coordinate system of the relative positions regarding the observing position of an observer 10 and a stereoscopic display panel 107a. FIG. 2 shows that the stereoscopic display panel 107a is a part of the stereoscopic display panel 107, and a camera 101a is a part of the observer position measuring unit 101. In the stereoscopic image display device 11, the camera 101a is placed on the upper side of the stereoscopic display panel 107a, and the observing position of the observer 10 is measured through capturing the observer 10 by the camera 101a. Further, the relative positions of the camera 101a and the stereoscopic display panel 107a are fixed, so that the relative position between the observing position of the observer 10 and the stereoscopic display panel 107a can be calculated through capturing the observer 10 by using the camera 101a.

The stereoscopic display panel 107a is constituted with: a display panel as an electro-optical module in which a plurality of pixels including at least sub-pixels for displaying images for a first viewpoint and sub-pixels for displaying images for a second viewpoint are arranged in matrix; and a lenticular lens as a light separating module which is capable of separating each of the images to prescribed different directions. Examples of the display panel that can be used as the electro-optic module are a liquid crystal type, an organic EL type, a plasma type, and the like. Examples of the light separating modules that can be used are a lenticular lens, a parallax barrier, a liquid crystal lens, and the like. This exemplary embodiment will be described by using a combination of a display panel 2 and a lenticular lens 3 (see FIG. 5). Note here that an example of "a first direction" depicted in the exemplary embodiment is the X-axis direction shown in FIG. 3, and an example of "an optical module" also depicted in the exemplary embodiment is the above-described light separating module.

Further, a calculator 150 which implements functions of the image processing unit 151, the device characteristic data saving unit 103, and the image data saving unit 105 is placed in a rear part of the stereoscopic display panel 107a. Hereinafter, functions of each unit included in the stereoscopic image display device 11 will be described.

The observer position measuring unit 101 has a function which measures the position of the observer 10 who is observing a stereoscopic image content displayed on the stereoscopic display panel 107a. For measuring the observer position, the positions of the right and the left eyes of the observer 10 are measured by capturing the observer 10 with the camera 101a placed at the upper side of the stereoscopic display panel 107a.

Not only the position in the horizontal direction (X axis, Y axis) of the capturing plane of the camera 101a but also the position in the depth direction (Z axis) with respect to the camera 101a is measured for measuring the observing position of the observer 10. Many methods are proposed for measuring the distance in the depth direction with respect to the camera 101a.

One of those is an optical pattern projection method with which an optical pattern of an infrared ray or the like is projected towards the observer from a viewpoint different from the camera and the depth distance is measured from the displacement amount based on the triangulation theory. Measurement equipment employing the optical pattern projection method has recently been put into products as home-use game machines and computer peripheral equipment.

The second method is a TOF (Time of Flight) method with which a near infrared sine wave light is irradiated to the observer from the camera, and the depth distance is measured from the time lag of the light flight until the sine wave light reflected from the observer reaches the camera. Recently, the improvement in the performance of the TOF sensor is remarkable, thereby making it almost possible to measure the depth distance with a small and cheap camera.

The third method is a multi-viewpoint camera method with which two or more cameras are placed at different viewpoints. For measuring the depth distance, the feature point of the observer is detected from images of arbitrary viewpoints, and the points corresponding to the feature point are searched from the images of different viewpoints to calculate the depth distance based on the triangulation theory.

The fourth method uses lens focus information, with which the depth distance of the observer is measured from a group of multi-focus-points images captured at various focal points by using optical-system lenses of different depths of fields.

The four methods for measuring the depth distance are described above. The first exemplary embodiment can employ any of those methods. Further, any other measuring methods can be employed. For example, the depth distance may be measured by saving the size of the face of the observer in advance and comparing it with the face image size of the observer captured by a camera.

With the processing for detecting the face of the observer from a captured image, template data is generated in advance from the feature amount (eyes, nose, mouth, chin, and the like) of the face image, and the face of the observer is detected by matching the captured image with the template data. The template data is generated by using mechanical learning methods such as a support vector machine (SVM) and a vector quantization from the face image of the observer. As the face detecting functions, it is also possible to use multi-purpose software. It is possible with the face detecting function software to achieve face detecting processing by considering the direction towards which the observer is facing through the use of depth information. Thus, the detection precision is improved further.

With the above-described processing, the positions of the right eye and the left eye are measured by detecting the face of the observer. As another example, it is also possible to use an acceleration sensor and a gyro sensor without using a camera. Various kinds of sensors are placed in the stereoscopic image display device in advance, and positional information acquired from the sensors is referred to measure the observing position of the observer.

The relative position calculating unit 102 has a function which calculates the relative position from the stereoscopic display panel 107a to the observing position of the observer 10. As shown in FIG. 3, the relative position to the observing position of the observer with respect to the center of the stereoscopic display panel 107a as the origin is calculated while assuming that the lateral direction with respect to the plane of the stereoscopic display panel 107a is the X-axis, the longitudinal direction with respect to the plane of the stereoscopic display panel 107a is the Y-axis, and the perpendicular direction with respect to the plane of the stereoscopic display panel 107a is the Z-axis. The relative position is calculated by subtracting the distance from the camera 101a to the stereoscopic display panel 107a from the positions of the right eye and the left eye of the observer measured by the observer position measuring unit 101. Further, the viewing angle θ is calculated from the relative position (coordinate value of X-axis, Y-axis, Z-axis). A relational expression between the viewing angle θ and the coordinate value of the X-axis, the Y-axis, and the Z-axis is as in Formula (1), so that the viewing angle θ can be calculated from Formula (2).

$$\tan\theta = X/Z \quad \text{Formula (1)}$$

$$\theta = \tan^{-1}(X/Z) \quad \text{Formula (2)}$$

Figure 4:
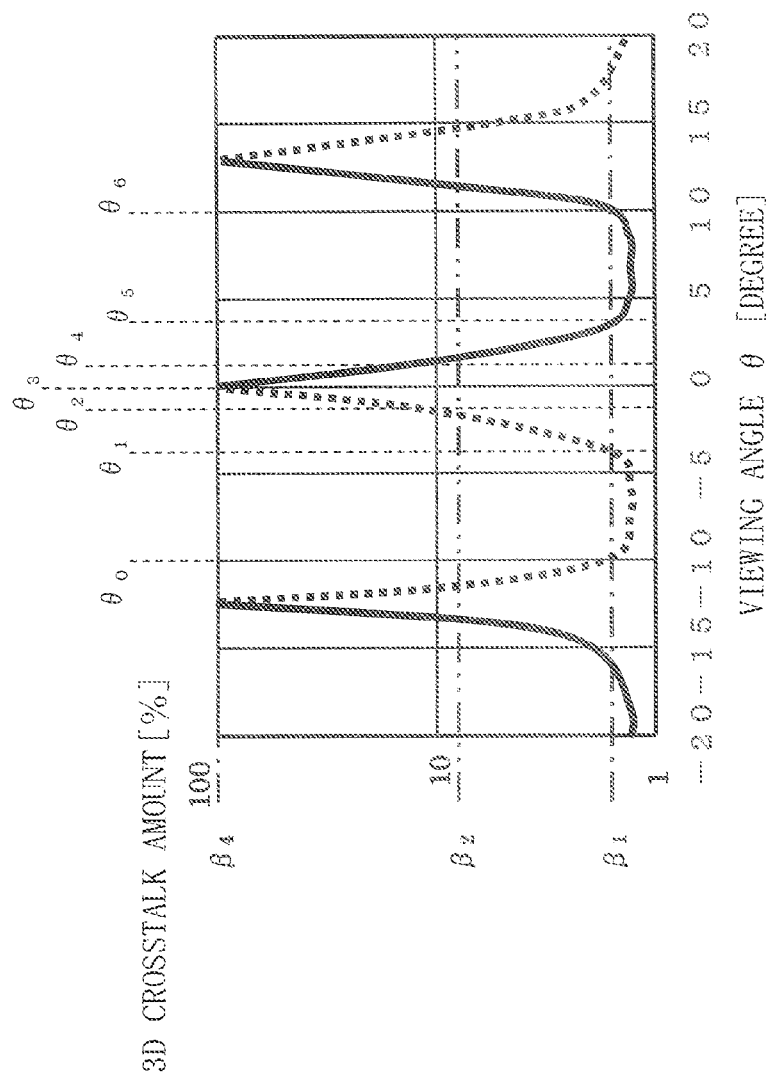
FIG. 4 is a chart showing 3D crosstalk characteristic data of the stereoscopic image display device.

The device characteristic data saving unit 103 has a function which saves 3D crosstalk characteristic data for the viewing angles of the stereoscopic display panel 107a. FIG. 4 shows an example of 3D crosstalk characteristic data. The lateral axis of the 3D crosstalk characteristic data shows the viewing angle θ, and the longitudinal axis shows the 3D crosstalk amount. The 3D crosstalk amount shows a proportion of mixing the left-eye image (L image) into the right-eye image (R image) (also shows the case of inverted mixture: a proportion of mixing the R image to the L image). The 3D crosstalk characteristic data takes different values depending on the device characteristic of the stereoscopic display panel 107a, and it can be calculated based on the design condition and manufacture condition of the stereoscopic display panel 107a. Further, it is also possible to acquire the 3D crosstalk characteristic data by measuring the stereoscopic display panel 107a with an evaluation device for 3D crosstalk. In this case, it is desirable to calculate or measure not only at the X-axis origin as the center of the stereoscopic display panel 107a (see the coordinate system of FIG. 3) but also at prescribed ±X points (distance WP of FIG. 5 to be described later) on the outside of the panel. Hereinafter, explanations will be provided in this. Specification by using the charts of the 3D crosstalk characteristic data. Note that the explanations will be provided by referring to the charts having the X-axis as the origin for convenience's sake.

With the stereoscopic image display device 11, the right-eye area, the left-eye area, and the 3D-crosstalk viewing space are determined depending on the 3D crosstalk characteristic data. Defining as a way of example that the threshold value of the 3D crosstalk amount with which the observer 10 can normally recognize the stereoscopic image is $\beta_2$ or smaller, the area of the viewing angles $\theta_0$ to $\theta_1$ is the right-eye area, the area of the viewing angles $\theta_2$ to $\theta_4$ is the 3D-crosstalk viewing space, and the area of the viewing angles $\theta_5$ to $\theta_6$ is the left-eye area.

Figure 5:
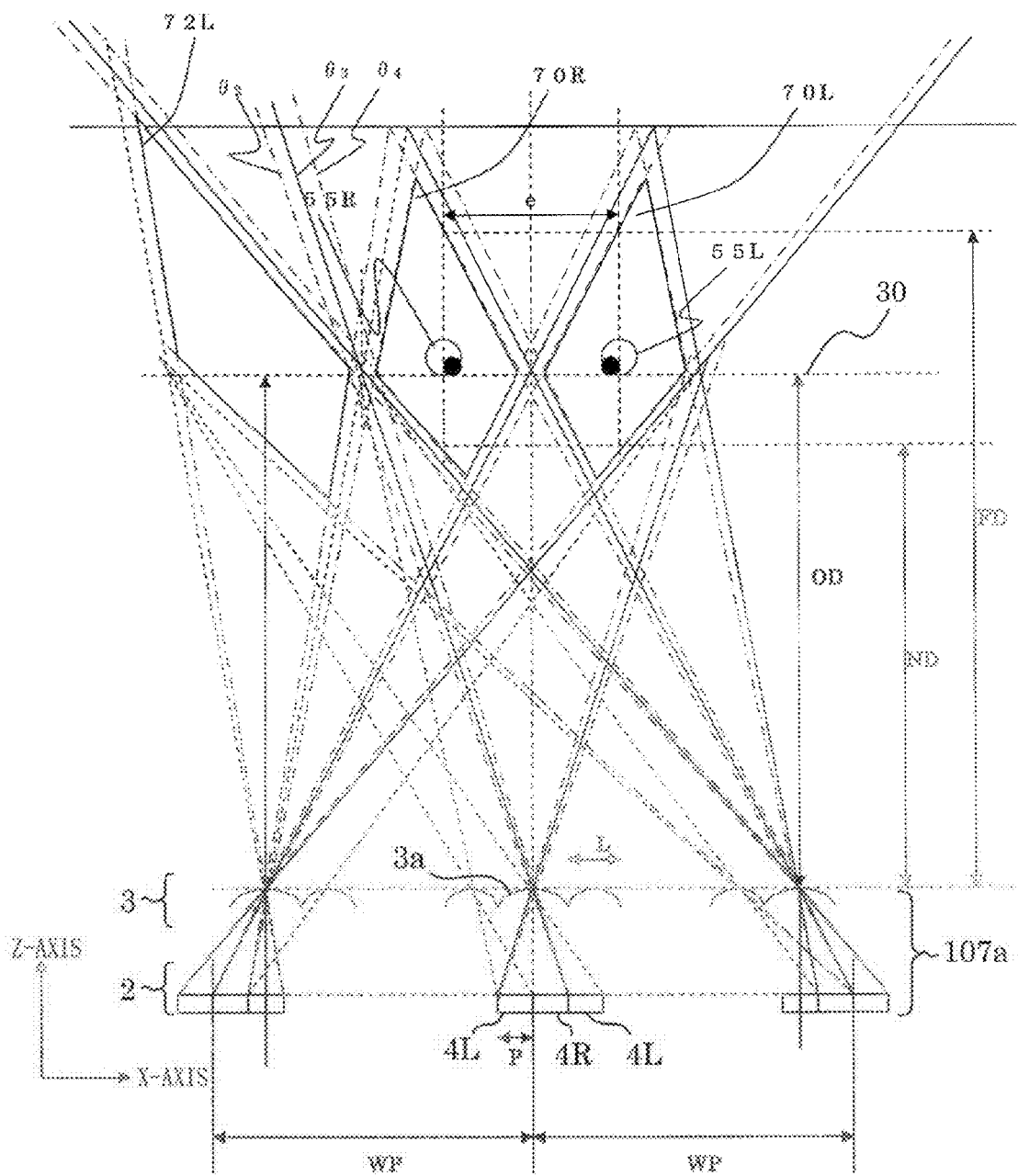
FIG. 5 is a relational chart showing the 3D crosstalk characteristic data and an optical model.
Figure 68:
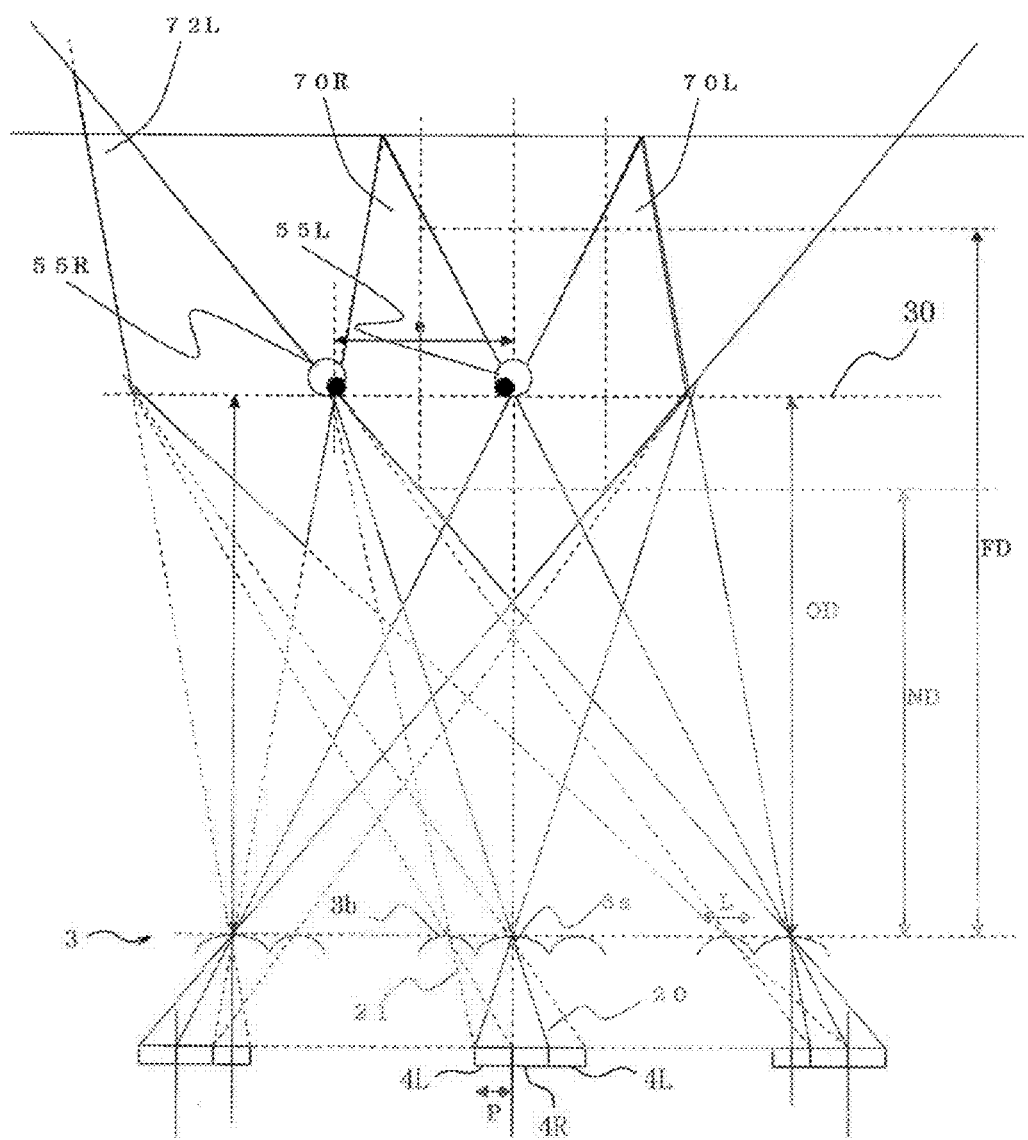
FIG. 68 is an optical model chart for describing a 3D-crosstalk viewing space.

FIG. 5 shows an optical model which projects the right-eye image and the left-eye image to both the right and left eyes of the observer 10 in the stereoscopic image display device 11 of this case. In FIG. 5, the section of the viewing angles $\theta_2$ to $\theta_4$ is the 3D-crosstalk viewing space, so that the right-eye area 70R and the left-eye area 70L are narrowed compared to those of FIG. 68. For the right-eye 55R, the right-eye area 70R is the stereoscopic viewing space, the left-eye areas 70L and 72L are pseudoscopic viewing spaces, and other areas are the 3D-crosstalk viewing spaces. In FIG. 5, the optimum observing distance OD, the far observing distance FD, the near observing distance ND, the cylindrical lens width L, the pixel width P, the width WP between the position of the center pixel of the stereoscopic display panel and the position of the pixels at both ends, and the like are written.

Figure 6:
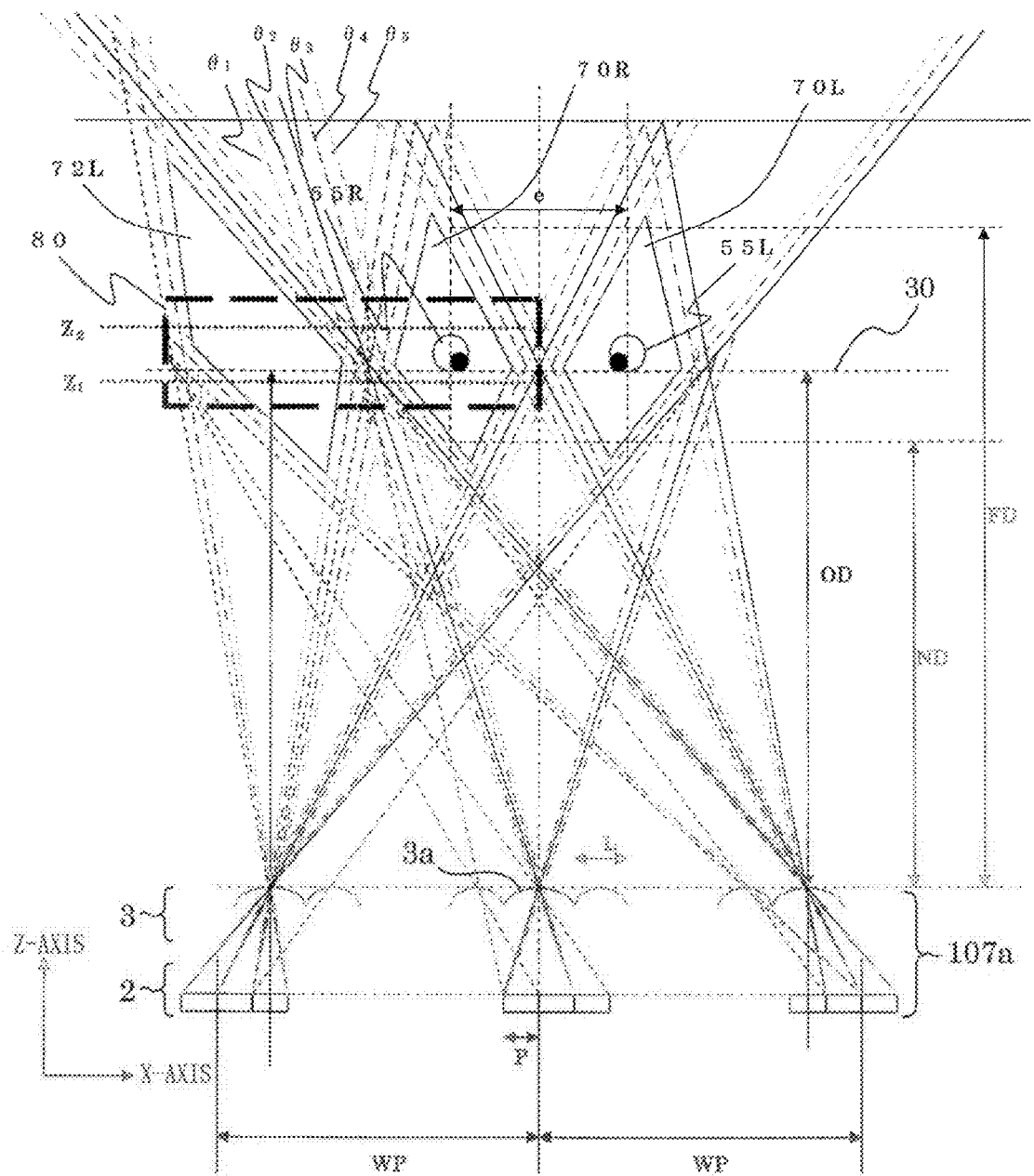
FIG. 6 is a relational chart showing the 3D crosstalk characteristic data and an optical model.

As another example, when it is assumed that the threshold value of the 3D crosstalk amount is $\beta_1$ or smaller, the area of the viewing angles $\theta_1$ to $\theta_5$ is the 3D-crosstalk viewing space and areas at other viewing angles are the right-eye area and the left-eye area based on FIG. 4. FIG. 6 shows an optical model of the stereoscopic image display device 11 of this case. In FIG. 6, the section of the viewing angles $\theta_1$ to $\theta_5$ is the 3D-crosstalk viewing space, so that the right-eye area 70R and the left-eye area 70L are narrowed further compared to those of FIG. 5. For the right-eye 55R, the right-eye area 70R is the stereoscopic viewing space, the left-eye areas 70L and 72L are pseudoscopic viewing spaces, and other areas are the 3D-crosstalk viewing spaces as in the case of FIG. 5. As described above, it is shown that the stereoscopic viewing space, the pseudoscopic viewing space, and the 3D-crosstalk viewing space are determined depending on the 3D crosstalk characteristic data.

The threshold value of the 3D crosstalk amount can be determined by the optical measurement of the stereoscopic image display device 11 and the subjective evaluation. As the devices that can optically measure the 3D crosstalk, there are various kinds such as a conoscope type, a goniometer type, and a Fourier type. It is possible to measure the luminance distribution with respect to the viewing angles by using the measuring device employing those types and to calculate the 3D crosstalk by following Formula (3).

$$3DCT(\theta)=(Y(LBRW)-Y(LBRB))/(Y(LWRB)-Y(LBRB)) \quad \text{Formula (3)}$$

Note here that Y(LBRW) is the luminance provided that the left-eye image is black and the right-eye image is white, Y(LBRB) is the luminance provided that the left-eye image is black and the right-eye image is black, and Y(LWRB) is the luminance provided that the left-eye image is white and the right-eye image is black.

There is no extensive difference in the qualitative results when measured by any of those measuring devices. However, the quantitative numerical values acquired thereby vary depending on the types of the measurement and the device specifications. Collating the typical measurement result with the subjective stereoscopic area evaluation result, it can be found that stereopsis can be achieved when the 3D crosstalk amount is roughly 10% or less. This value can be used as the threshold value of the 3D crosstalk amount described above.

Figure 7:
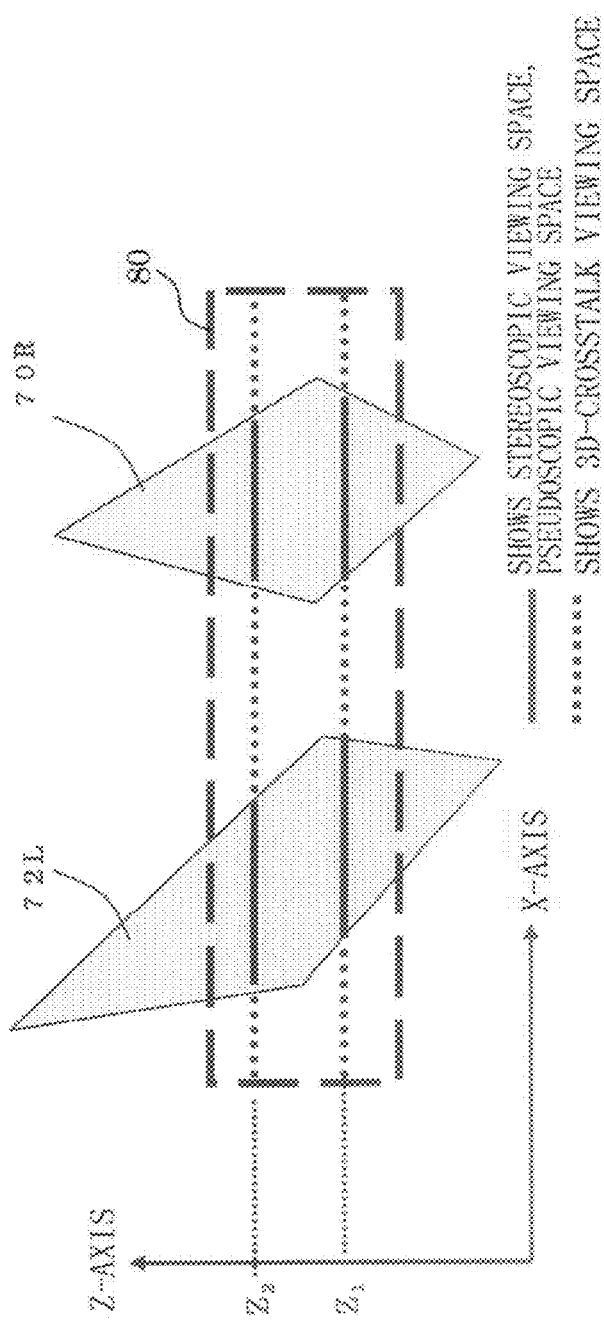
FIG. 7 is an enlarged diagram of the optical model.

FIG. 7 is an enlarged view of an area 80 shown in FIG. 6. The area widths of the right-eye area 70R, the left-eye area 72L, and the 3D-crosstalk viewing space at arbitrary values $Z_1$ and $Z_2$ on the Z-axis are different. The area widths of the stereoscopic viewing space, the pseudoscopic viewing space, and the 3D-crosstalk viewing space change depending on the positions on the Z-axis.

Figure 8:
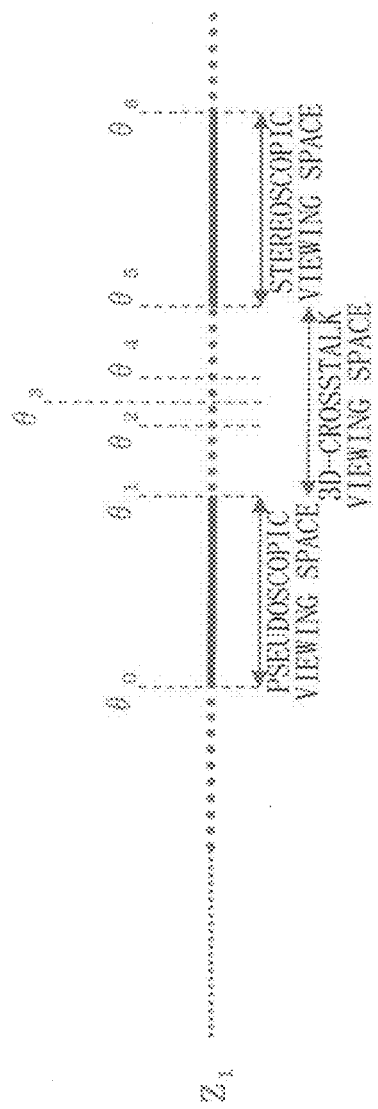
FIG. 8 is a relational chart regarding widths of a stereoscopic viewing space, a pseudoscopic viewing space, a 3D-crosstalk viewing space, and viewing angles.

Further, FIG. 8 shows the relational chart between the area widths of the stereoscopic viewing space, the pseudoscopic viewing space, and the 3D-crosstalk viewing space and the viewing angles at the arbitrary point $Z_1$ on the Z-axis. With respect to the right eye 55R as the reference, the area of the viewing angles $\theta_0$ to $\theta_1$ is the pseudoscopic viewing space, the area of the viewing angles $\theta_1$ to $\theta_5$ is the 3D-crosstalk viewing space, and the area of the viewing angles $\theta_5$ to $\theta_6$ is the stereoscopic viewing space. Further, the 3D crosstalk amount becomes the greatest at the position of viewing angle $\theta_3$, and the area of viewing angles $\theta_2$ to $\theta_4$ is the area where the 3D crosstalk amount is $\beta_2$ or more based on FIG. 4.

Figure 9:
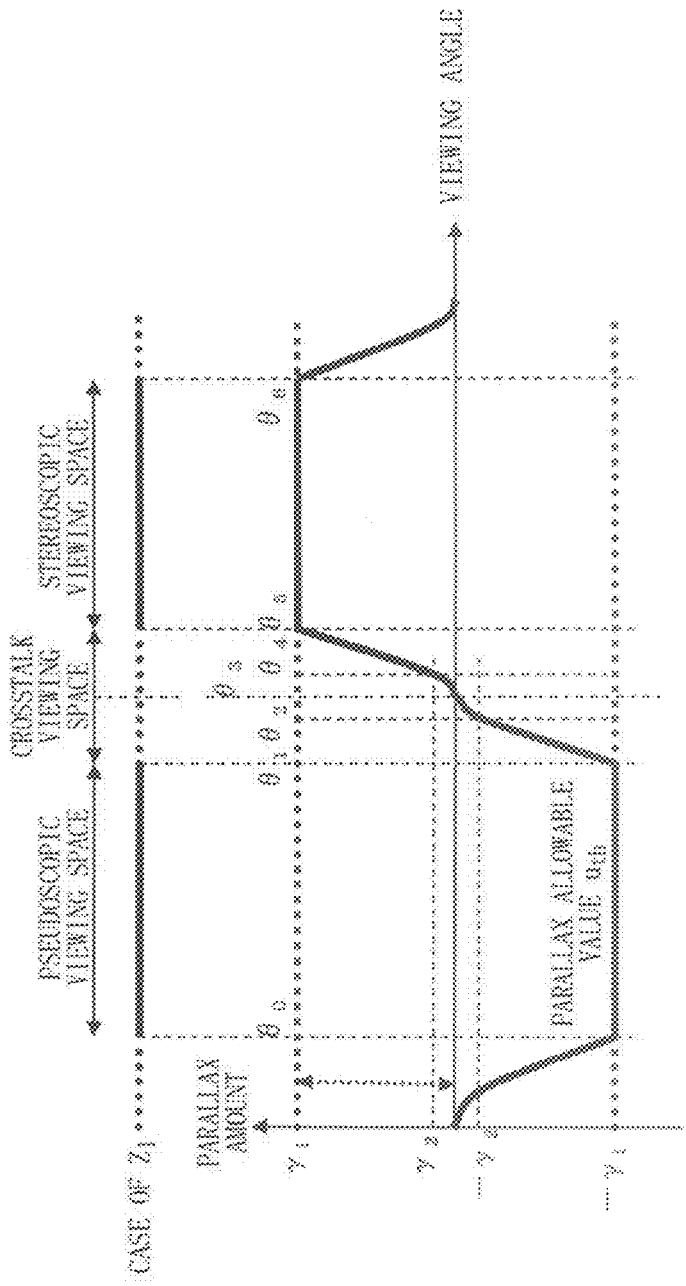
FIG. 9 is a chart showing parallax allowable values for the viewing angles.

The parallax adjustment amount calculating unit 104 has a function which calculates the optimum parallax adjustment amount for stereoscopic image display with respect to the viewing angle based on the device characteristic data. The parallax adjustment amount calculating unit 104 according to the first exemplary embodiment calculates a parallax limit value (parallax allowable value $u_{th}$) with which a stereoscopic image can be displayed. FIG. 9 shows the result acquired by calculating the parallax allowable value $u_{th}$ for the viewing angles θ in a case where the observing position of the observer 10 is on $Z_1$ based on the device characteristic data of the stereoscopic image display device 11 (see FIG. 4). Note here that "$u_{th}$" is a function $u_{th}$ (θ) of the viewing angles θ, however, it is written as $u_{th}$ for convenience' sake. FIG. 9 shows that the parallax allowable value $u_{th}$ takes different values for the pseudoscopic viewing space $\theta_0$ to $\theta_1$, the 3D-crosstalk viewing space $\theta_1$ to $\theta_5$, and the stereoscopic viewing space $\theta_5$ to $\theta_6$ in a case where the threshold value of the 3D crosstalk amount is $\beta_1$ (see FIG. 4)

FIG. 10 is a table which shows the relation regarding the 3D crosstalk amount, generation of a CT-image, the influence for the stereoscopic image, the viewing angle ranges, the viewing space names (pseudoscopic viewing space, 3D-crosstalk viewing space, stereoscopic viewing space), and the absolute value $|u_{th}|$ of the parallax allowable value. Hereinafter, the parallax allowable value $ut_h$ for each of the areas of the stereoscopic viewing space $\theta_5$ to $\theta_6$, the pseudoscopic viewing space $\theta_0$ to $\theta_1$, and the 3D-crosstalk viewing space $\theta_1$ to $\theta_5$ will be described by referring to FIG. 9 and FIG. 10.

For the parallax allowable value $u_{th}$ in the stereoscopic viewing space $\theta_5$ to $\theta_6$, set is the parallax maximum value $\gamma_1$ with which the observer can merge the L image and the R image (LR image) (can merge the LR images observed by the right eye and the left eye in the brain so as to recognize them as a single stereoscopic image) so that the safety level of not giving a sense of discomfort to the observer can be maintained in a case where the right-eye image (R image) to be projected to the right-eye area is projected to the right eye of the observer properly and the left-eye image (L image) to be projected to the left-eye area is projected to the left eye of the observer properly. Regarding the parallax maximum value $\gamma_1$, safety standard values are proposed by various organizations. As an example, the comfort parallax range maximum value depicted in the 3DC safety guideline of the 3D consortium may be substituted to the parallax allowable value $u_{th}$ in the stereoscopic viewing space as the parallax maximum value $\gamma_1$.

Regarding the parallax allowable value $u_{th}$ in the pseudoscopic viewing space $\theta_0$ to $\theta_1$, a value $-\gamma_1$ that is an inversion of the parallax allowable value $u_{th}$ in the stereoscopic viewing space is substituted to the parallax allowable value $u_{th}$ in the pseudoscopic viewing space in order to invert the parallax value as a countermeasure for the pseudoscopic view. In the 3D-crosstalk viewing space $\theta_1$ to $\theta_5$, the parallax allowable value $|u_{th}|$ is fractionated according to the 3D crosstalk amount. In the range where the 3D crosstalk amount is $\beta_1$ to $\beta_2$ (the viewing angle range of $\theta_1$ to $\theta_2$), a slight CT-image is generated. Thus, the stereoscopic image can be sighted even though the observer feels a sense of discomfort. In the meantime, in the range where the 3D crosstalk amount is $\beta_2$ or more (the viewing angle range of $\theta_2$ to $\theta_3$), the influence of the CT-image is increased. Thus, it becomes almost impossible for the observer to sight the stereoscopic image. Therefore, it is desirable to set the parallax allowable value in accordance with the extent of the influence of the CT-image.

Specifically, the 3D crosstalk amount is referred to from the device characteristic data of FIG. 4, and the parallax allowable value $u_{th}$ suited for that amount is set. The parallax allowable value $u_{th}$ shown in FIG. 9 and FIG. 10 is calculated under the condition where the absolute value of the parallax allowable value $|u_{th}|$ is defined to be equal to or less than $\gamma_1$ (the parallax allowable value $u_{th}$ in the stereoscopic viewing space) when the 3D crosstalk amount is equal to or larger than the threshold value $\beta_1$, and the absolute value of the parallax allowable value $|u_{th}|$ is defined to be equal to or less than an arbitrarily set parallax value $\gamma_2$ when the 3D crosstalk amount is equal to or larger than the threshold value $\beta_2$. The parallax value $\gamma_2$ as the condition of calculating the parallax allowable value $u_{th}$ can be set arbitrarily according to the preference of the observer or can be specified by the subjective evaluation for the observer. The experimental results of the subjective evaluation for the observers are shown in various documents, so that the parallax value $\gamma_2$ can also be specified from those documents.

It is common to specify the parallax value $\gamma_2$ as the calculation condition of the parallax allowable value $u_{th}$ by the subjective evaluation done for many observers. However, it is also possible to arbitrarily set the values according to the preference of the observer. For example, the stereoscopic image display device such as a mobile apparatus with which the observer is specified may be designed to be able to set the parallax value $\gamma_2$ according to the preference of the observer when the observer uses the mobile apparatus for the first time. When the parallax value $\gamma_2$ is small, the influence of the CT-image by 3D crosstalk is lightened but the stereoscopic effect of the stereoscopic image content is decreased. In the meantime, when parallax value $\gamma_2$ is large, the stereoscopic effect of the stereoscopic image content can be maintained but the influence of the CT-image by 3D crosstalk is not lightened. Therefore, with the subjective evaluation experiment for specifying the parallax value $\gamma_2$, it is desirable to present various kinds of stereoscopic image contents (stereoscopic image contents of different parallax values, contrast, brightness, and spatial frequencies of hue) to the evaluator and to totalize the results acquired by the subjective evaluation. Further, in order to increase the security of the stereoscopic image display, the parallax value $\gamma_2$ may be set to a value slightly larger than the totalized value of the subjective evaluation.

Regarding the parallax allowable value $u_{th}$ in the 3D-crosstalk viewing space, the point where the parallax value is $\gamma_1$ at the viewing angle $\theta_1$, the point where the parallax value is $\gamma_2$ at the viewing angle $\theta_2$, the point where the parallax value is 0 at the viewing angle $\theta_3$ as the center position of the 3D-crosstalk viewing space, the point where the parallax value is $-\gamma_2$ at the viewing angle $\theta_4$, and the point where the parallax value is $-\gamma_1$ at the viewing angle $\theta_5$ are connected with each other by interpolation via a line to calculate the parallax allowable value $u_{th}$ for each of the viewing angles. As the line for interpolating the group of points with each other, secondary interpolation (polynomial interpolation) as in FIG. 9 or linear interpolation as in FIG. 11 may be used.

Figure 11:
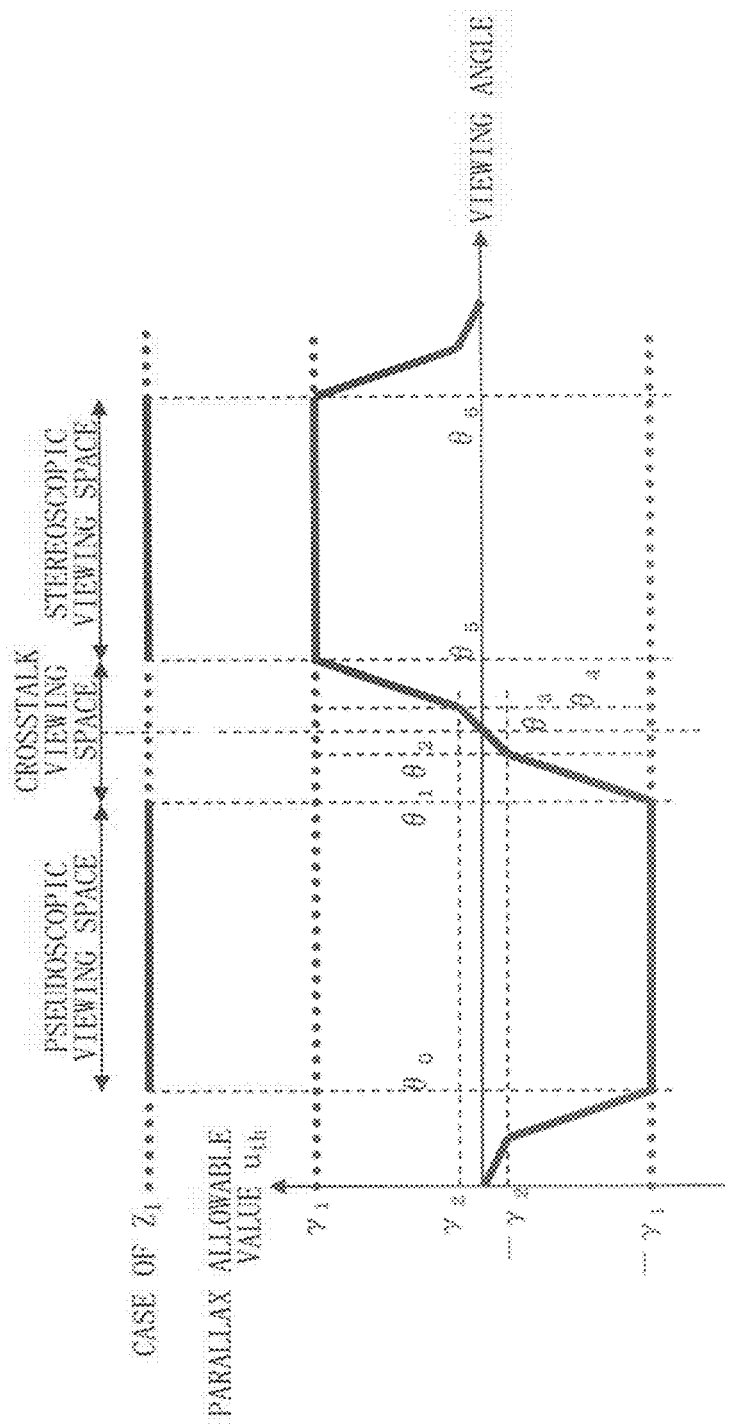
FIG. 11 is a chart showing parallax allowable values for the viewing angles.
Figure 12:
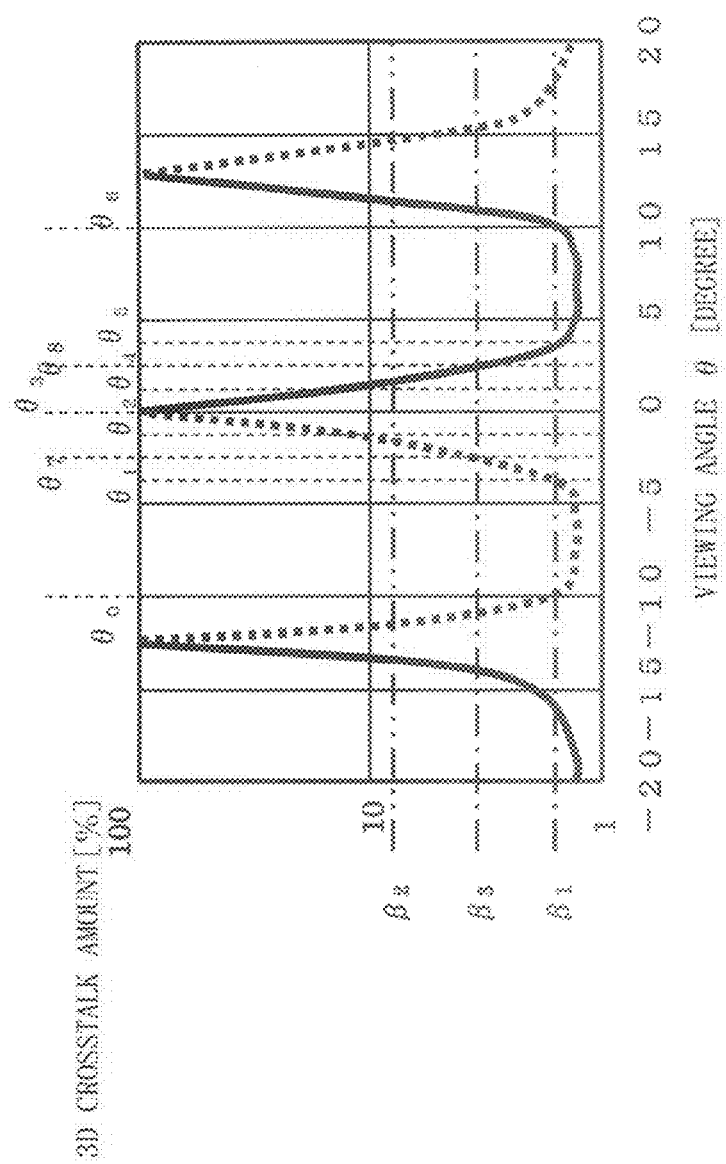
FIG. 12 is a chart showing 3D crosstalk characteristic data of the stereoscopic image display device.
Figure 13:
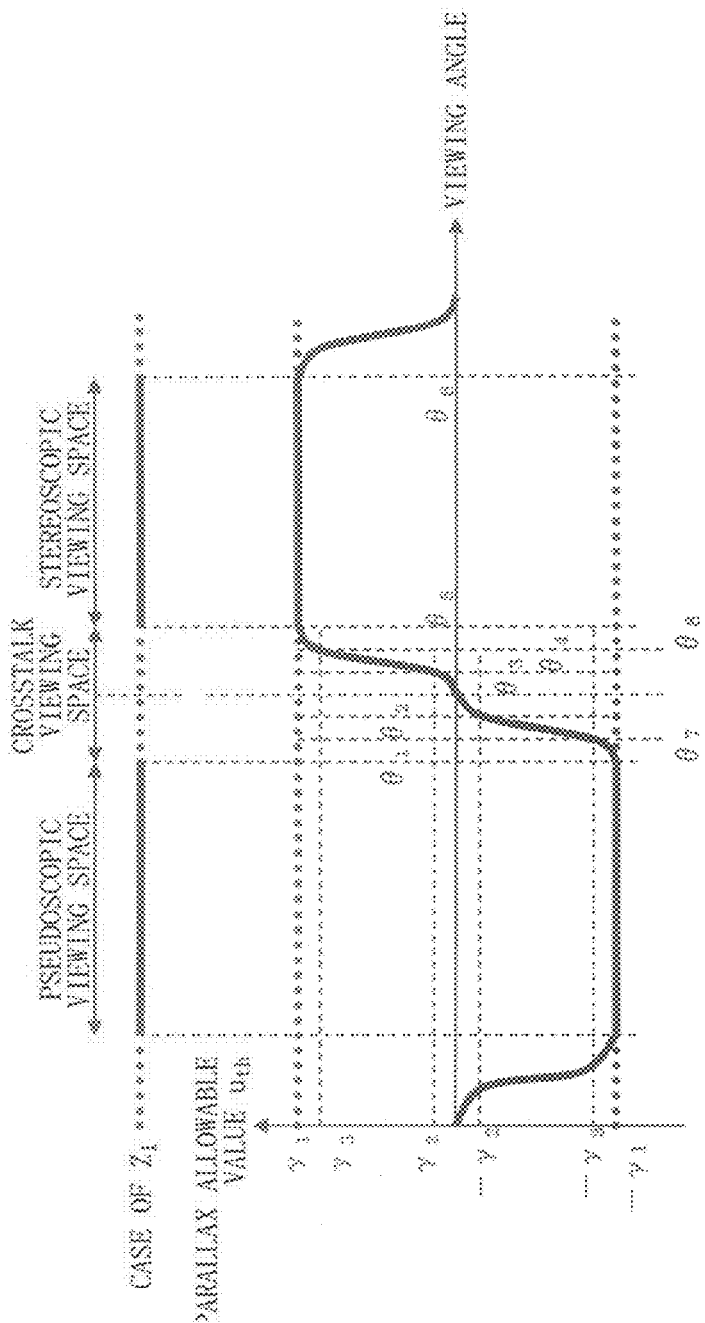
FIG. 13 is a chart showing parallax allowable values for the viewing angles.

While FIG. 9, FIG. 10, and FIG. 11 show the case where the threshold values $\beta_1$, $\beta_2$ of the 3D crosstalk amount are set as the calculation condition of the parallax allowable value $u_{th}$, the threshold values of the 3D crosstalk amount are not limited only to the two kinds. It is also possible to set a greater number of threshold values. FIG. 12 and FIG. 13 show a case where a new threshold value $\beta_3$ is added to the threshold values $\beta_1$ and $\beta_2$ of the 3D crosstalk amount. FIG. 12 shows 3D crosstalk characteristic data, in which the threshold value $\beta_3$ is added to the threshold values $\beta_1$ and $\beta_2$. Note here that the viewing angles of the 3D crosstalk characteristic data corresponding to the threshold value $\beta_3$ are $\theta_7$ and $\theta_8$. FIG. 13 shows the parallax allowable value $u_{th}$ for the viewing angles, in which a parallax value $\gamma_3$ at the viewing angles $\theta_7$ and $\theta_8$ is added to the calculation condition of the parallax allowable value $u_{th}$. The group of points including the newly added parallax value $\gamma_3$ are connected with each other by interpolation via a line to calculate the parallax allowable value $u_{th}$ for each of the viewing angles.

Figure 14:
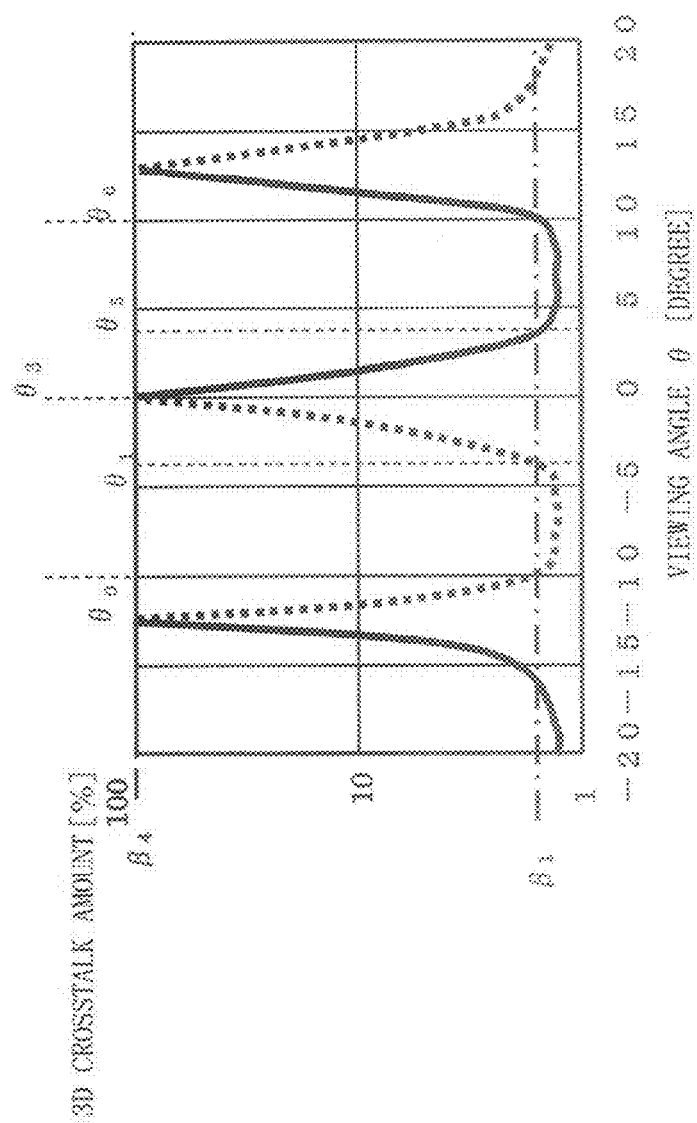
FIG. 14 is a chart showing 3D crosstalk characteristic data of the stereoscopic image display device.
Figure 15:
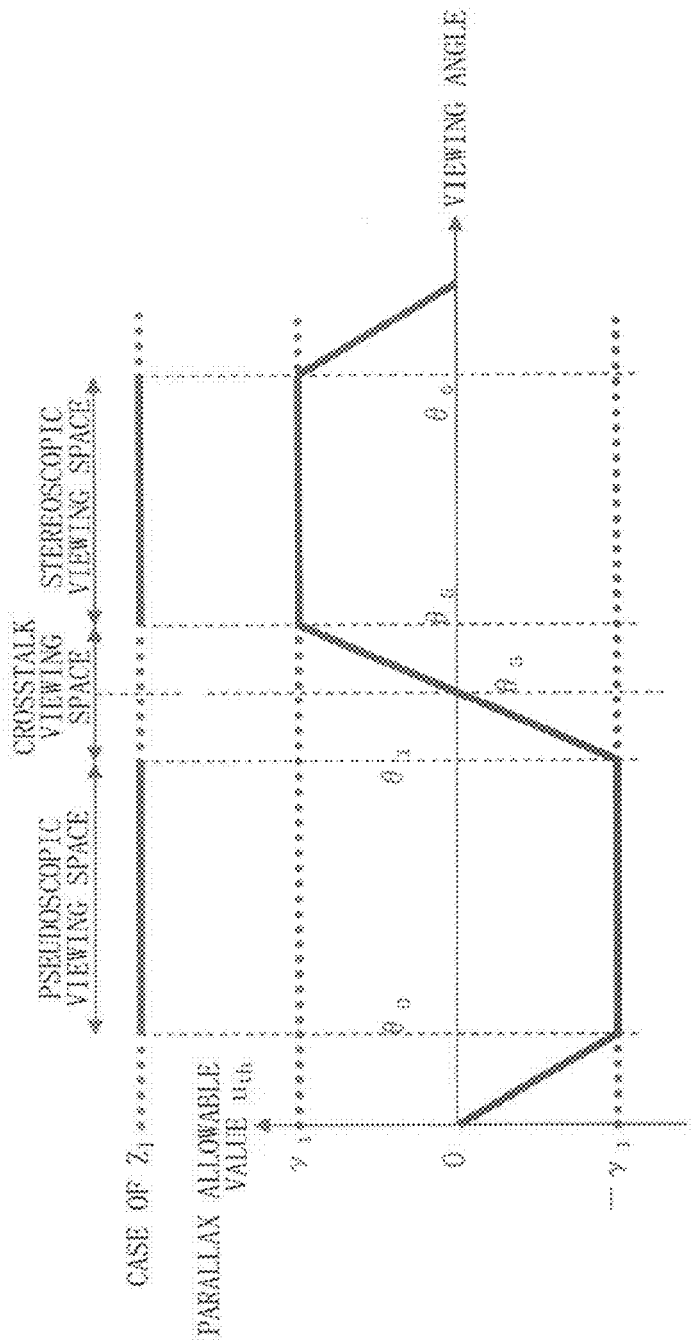
FIG. 15 is a chart showing parallax allowable values for the viewing angles.

As another example, FIG. 14 and FIG. 15 show a case where the threshold value of the 3D crosstalk amount shown in FIG. 4 is changed from the threshold value $\beta_2$ to the threshold value $\beta_4$. FIG. 14 shows 3D crosstalk characteristic data, in which the viewing angle of the 3D crosstalk characteristic data corresponding to the threshold value $\beta_4$ is $\theta_3$. FIG. 15 shows the parallax allowable value $u_{th}$ for the viewing angles, in which the calculation condition of the parallax allowable value $u_{th}$ at the viewing angle $\theta_3$ is 0. Thereby, the parallax allowable value $u_{th}$ forms a straight line as in FIG. 15 when the point where the parallax value is $\gamma_1$ at the viewing angle $\theta_1$, the point where the parallax value is 0 at the viewing angle $\theta_3$, the point where the parallax value is $-\gamma_1$ at the viewing angle $\theta_5$ are connected with each other by interpolation via a line.

The examples of the parallax allowable values for the viewing angles are shown in FIG. 9, FIG. 11, FIG. 13, and FIG. 15 as the first exemplary embodiment. The differential coefficient of the parallax allowable value for the viewing angles takes a finite value in all of those cases.

Further, while the method for calculating the parallax allowable value $u_{th}$ in the case where the observing position of the observer is at the position on $Z_1$ is described in the above-described cases, the calculation method described above is not limited only to the case where the observing position of the observer is at the position on $Z_1$. The same calculation method can be used also when the observing position of the observer is at other positions (e.g., position on $Z_2$). The parallax adjustment amount calculating unit 104 has a function which calculates the optimum parallax adjustment amount. Note here that the optimum parallax adjustment amount is a parallax adjustment amount which allows the parallax maximum value of the stereoscopic image content to match the parallax maximum value that satisfies the condition of the parallax allowable value $u_{th}$ and the condition of the parallax maximum value of the stereoscopic image content (see the explanation of the parallax adjustment processing unit 106 provided later).

Figure 16:
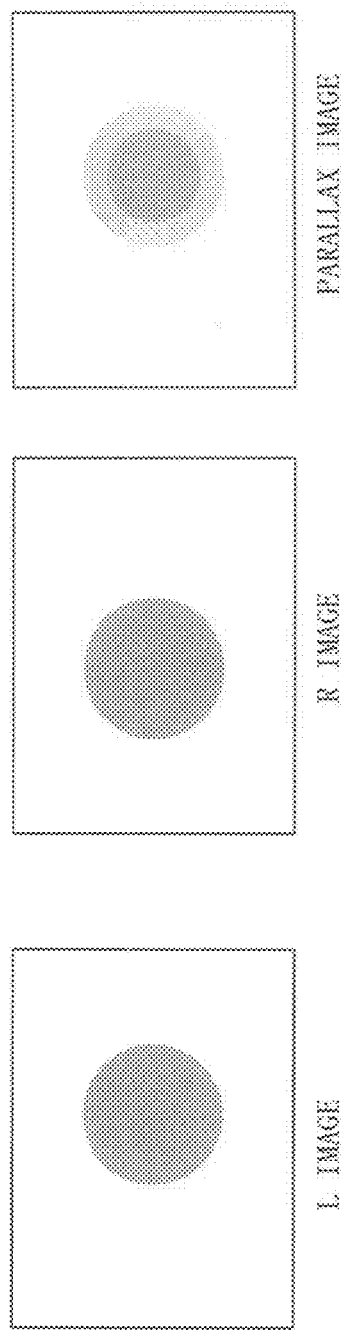
FIG. 16 is an illustration showing image data that is saved within an image data saving unit.

The image data saving unit 105 has a function which saves or receives the image data. FIG. 16 shows an example of the image data saved in the image data saving unit 105. In FIG. 16, an L image, an R image, and a parallax image are saved as the image data of the stereoscopic image content. The L image is a left-eye image projected to the left-eye area, and the R image is a right-eye image projected to the right-eye area. Each of the pixel values of the LR image (L image and R image) holds luminance values (RGB values), and the LR image is displayed on the stereoscopic display panel. A parallax image is an image in which the value of each pixel shows the parallax value between the LR images.

Figure 17:
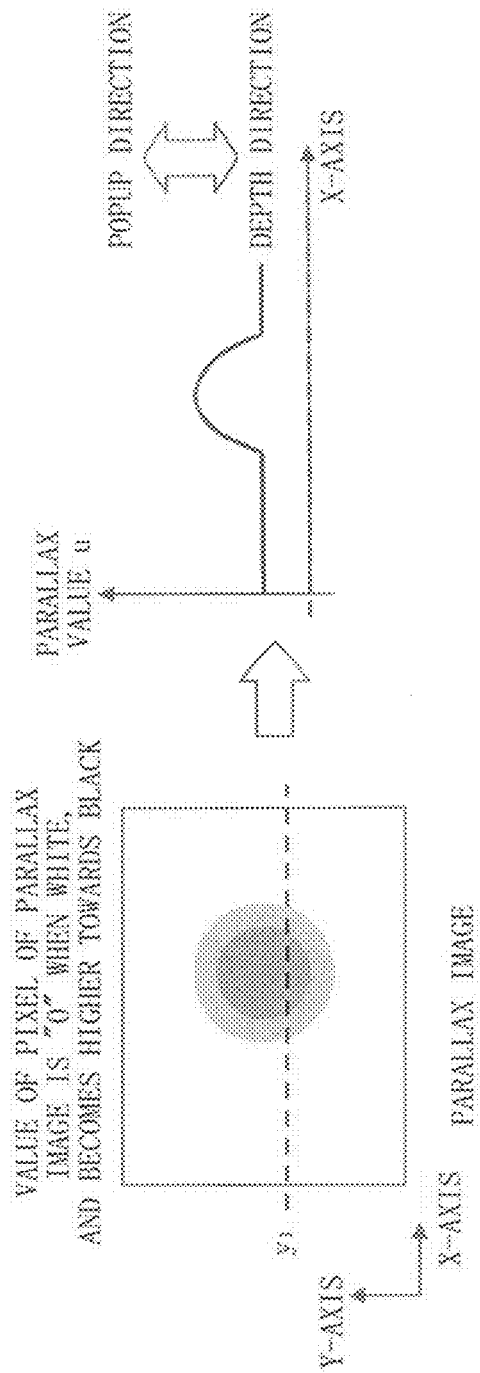
FIG. 17 is a chart showing the relation between a parallax image and a parallax value.

FIG. 17 shows a chart regarding the relation between the parallax image and the parallax value. The right side of FIG. 17 is a chart which shows the parallax value u for a pixel column which is at an arbitrary value $Y_1$ on the Y-axis taken out from the parallax image (left side of FIG. 17). Note here that the parallax value shows a position shift amount of the pixel value in the R image corresponding to the pixel value in the L image by having the L image as the reference. In FIG. 17, the value of pixel of the parallax image when white is "0", and the value becomes higher towards black.

Figure 18:
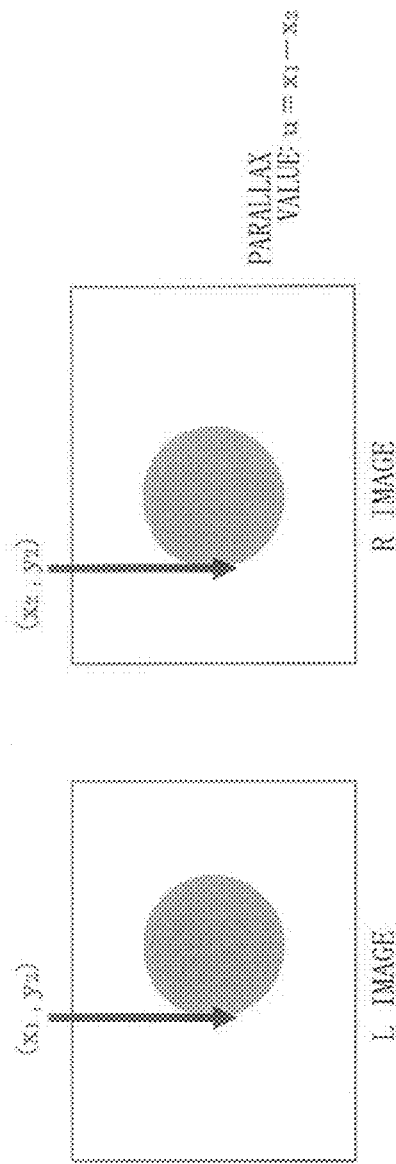
FIG. 18 is a chart showing the relation between a parallax value and an LR image.

As a specific example, FIG. 18 shows a relational chart between the parallax value and the LR image. The parallax value of the position $(x_1, y_2)$ in the parallax image is a difference value between the position $(x_1, y_2)$ of the L image and the position $(x_2, y_2)$ of the corresponding pixel value of the R image (Formula (4)).

$$\text{Parallax value } u = x_1 - x_2 \quad \text{Formula (4)}$$

In the above, the case of saving the L image, the R image, and the parallax image in the image data saving unit 105 is described. However, a Depth image may be saved instead of the parallax image. The Depth image is an image in which the value of each pixel shows a depth distance of the stereoscopic image content. Further, in a case where saved in the image data saving unit 105 are only the L image and the R image, a parallax image is generated by calculating the parallax value from the LR images. Further, a plurality of LR images having various kinds of parallax values may be saved in the image data saving unit 105 in advance.

Figure 19:
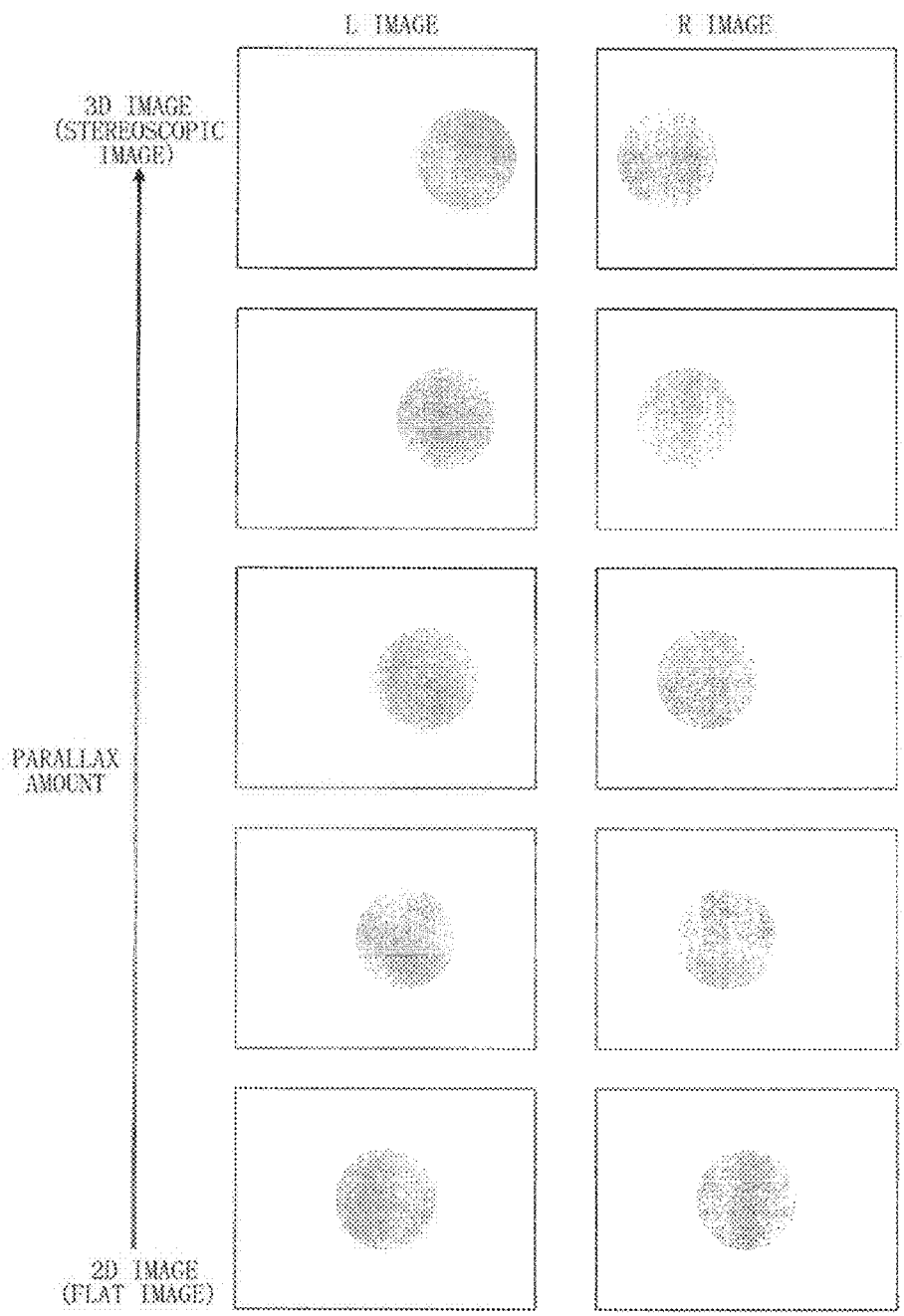
FIG. 19 is an illustration showing image data that is saved within an image data saving unit.

FIG. 19 shows an example of saving a group of LR images having various kinds of parallax values in the image data saving unit 105. The LR images on the uppermost section of FIG. 19 are the LR images having the parallax values originally held by the stereoscopic image content. The LR images in the lowermost section of FIG. 19 are the LR images where the parallax value is "0" (the L image and the R image are same images, thereby producing a flat image). The group of LR images in the middle section of FIG. 19 is a group of LR images adjusted to have an arbitrary parallax value. Through saving the group of LR images having various kinds of parallax values to the image data saving unit 105 in advance, the processing for generating the LR images having an arbitrary parallax value can be omitted when executing the parallax adjustment processing.

Figure 20A:
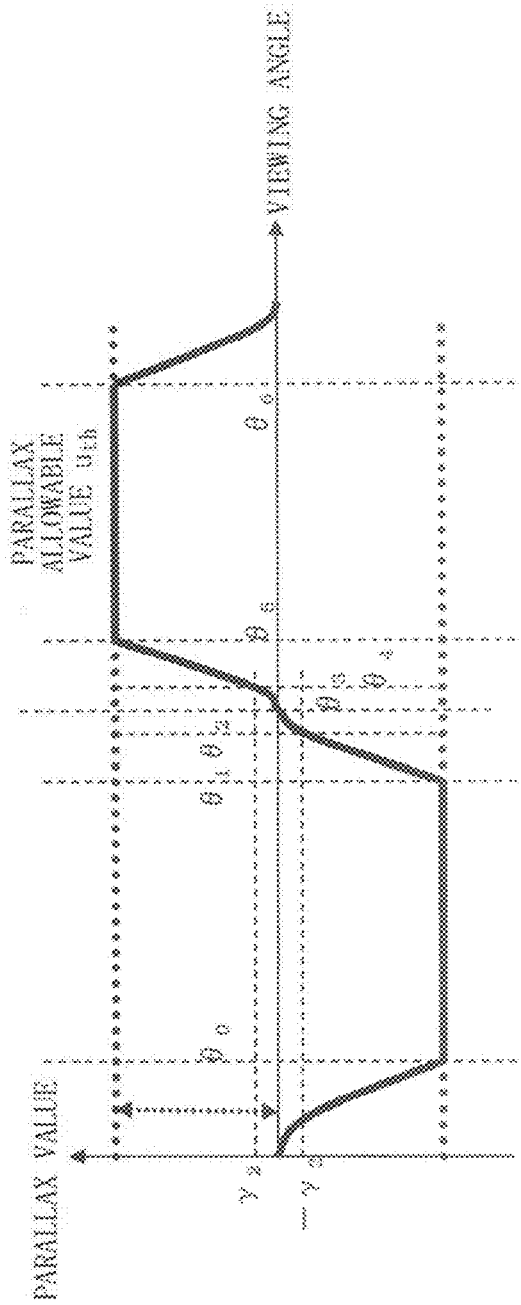
FIG. 20A is a chart showing parallax allowable values with respect to the viewing angles.
Figure 20C:
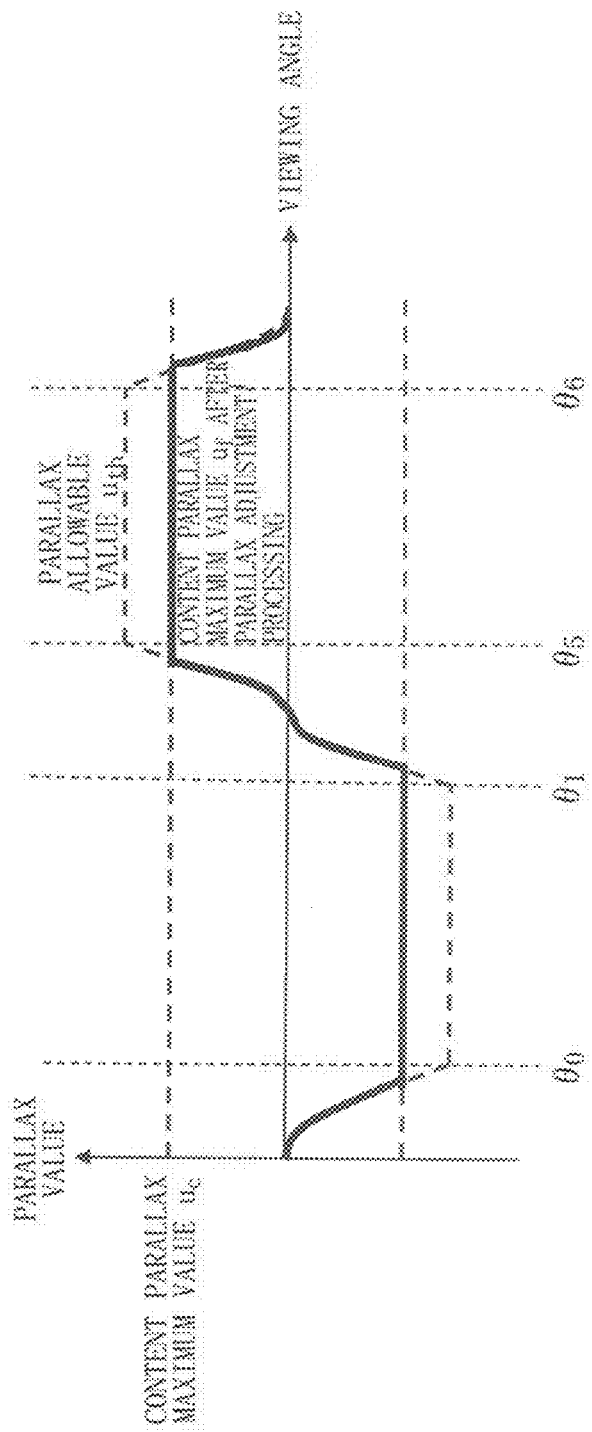
FIG. 20C is a chart showing parallax maximum values with respect to the viewing angles after performing parallax adjustment processing.

The parallax adjustment processing unit 106 has a function which performs the parallax adjustment processing of the image data according to the parallax allowable value $u_{th}$ calculated by the parallax adjustment amount calculating unit 104. FIG. 20 shows the result acquired by calculating the parallax maximum value $u_f$ of the stereoscopic image content for the viewing angle by executing the parallax adjustment processing. In the parallax adjustment processing, in order to calculate the parallax maximum value $u_f$ of the stereoscopic image content after the parallax adjustment processing, calculated is the parallax maximum value $u_f$ (FIG. 20C) which satisfies both conditions (Formula (5)), i.e., the condition (FIG. 20A) of the parallax allowable value $u_{th}$ calculated by the parallax adjustment amount calculating unit 104 and the condition (FIG. 20B) of the parallax maximum value $u_c$ of the stereoscopic image content saved in the image data saving unit.

$$(u_f \leq u_{th}) \text{AND} (u_f \leq u_c) \quad \text{Formula (5)}$$

In a case where the parallax maximum value $u_f$ after the parallax adjustment processing is larger than the parallax maximum value $u_c$ of the stereoscopic image content, the parallax value of the stereoscopic image content is not changed and the LR image in that state is transmitted to the stereoscopic display panel unit 107. In a case where the parallax maximum value $u_f$ after the parallax adjustment processing is smaller than the parallax maximum value $u_c$ of the stereoscopic image content, the parallax adjustment value κ (ratio between $u_f$ and $u_c$) is calculated by Formula (6), the parallax value of the stereoscopic image contents is changed, and then the LR images are transmitted to the stereoscopic display panel unit 107.

$$u_f = \kappa u_c \quad \text{Formula (6)}$$

In the above-described case, it is depicted that the parallax adjustment amount calculation processing is performed by the parallax adjustment processing unit 106. However, the parallax adjustment amount calculation processing may be performed by the parallax adjustment amount calculating unit 104. Note, however, that it is necessary for the parallax adjustment amount calculating unit 104 to acquire the parallax maximum value $u_c$ of the stereoscopic image content from the image data saving unit 105.

Figure 21:
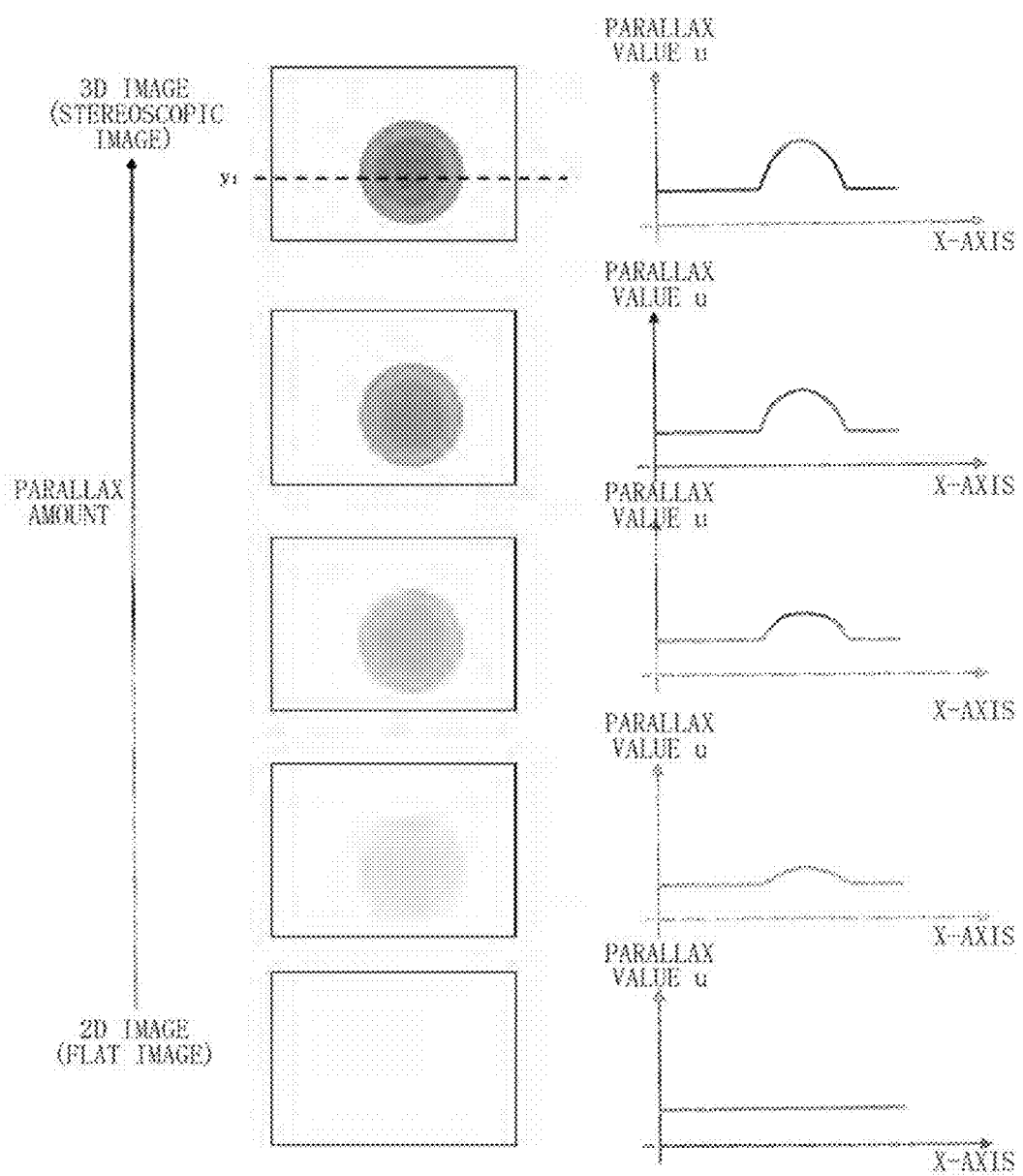
FIG. 21 is a chart of a group of parallax image data changed with a parallax adjustment amount.

An example of the processing for changing the parallax value of the stereoscopic image content by the calculated parallax adjustment amount κ will be described. In the parallax value changing processing, first, the parallax image is changed by multiplying the parallax adjustment amount κ to the parallax value of the parallax image of the stereoscopic image content. FIG. 21 shows a group of parallax images changed by the parallax adjustment amount κ. The parallax image in the uppermost section of FIG. 21 shows the parallax image having the parallax values originally held by the stereoscopic image content, while the parallax image in the lowermost section of FIG. 21 shows the parallax image in which all the parallax values are "0". The group of parallax images in the middle section of FIG. 21 are the parallax images acquired by changing the parallax values through multiplying the parallax adjustment amount κ to the parallax value of the parallax image on the uppermost section. The parallax adjustment amount κ of the parallax image on the second section from the top is set as 0.75, the parallax adjustment amount κ of the parallax image on the third section from the top is set as 0.50, the parallax adjustment amount κ of the parallax image on the fourth section from the top is set as 0.25, and the parallax adjustment amount κ of the parallax image on the lowermost section is set as 0. Provided that the parallax values originally held by the stereoscopic image content are $u_c(x, y)$, the parallax values $u_f(x, y)$ of the stereoscopic image content after the parallax value adjustment processing can be expressed as in Formula (7).

$$u_f(x,y) = \kappa u_c(x,y) \quad \text{Formula (7)}$$

Figure 22:
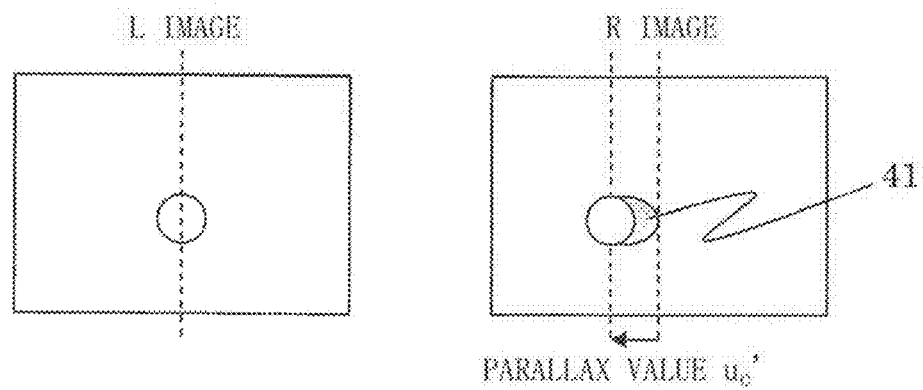
FIG. 22 is an illustration of an R' image generated by shift of pixels.

Note here that $u_c(x, y)$ shows the parallax value at the pixel position (x, y) of the parallax image. Then, an $LR_f$ image on which the parallax adjustment processing is performed is generated from the LR image of the stereoscopic image content by referring to the changed parallax image. In the $LR_f$ image generating processing, an $R_f$ image is generated by shifting each pixel of the L image to the X-axis direction in accordance with the parallax value of the parallax image by having the L image as the reference. FIG. 22 shows the $R_f$ image is generated by shifting the pixels. When shifting the pixels, a blank section 41 having no luminance value (RGB values) of the pixels appears in the $R_f$ image due to the difference in the parallax values at the positions of each of the pixels. In order to fill the blank section 41, the image interpolation processing is executed with the luminance values of the pixels in the vicinity of the blank section 41.

As an image interpolation processing method, it is possible to use linear interpolation or average-value interpolation. In a case where the range of the blank section is wide, various kinds of image restoration (Inpainting) may be employed in order to perform high-quality image interpolation processing. As the Inpainting method, there are a method which restores the image in the blank region by searching the luminance value pattern similar to the luminance value pattern in the vicinity of the blank section from the image information through executing pattern matching, a Shift-Map method, and the like. Further, in the image interpolation processing performed in the blank section, not only the luminance values of the L image but also the luminance values of the R image may be referred. Through generating the $LR_f$ image on which the parallax adjustment processing is performed by referring to the parallax adjustment amount κ in the manner described above, the parallax values of the stereoscopic image content can be changed.

The stereoscopic display panel unit 107 has a function which projects the image data on which the parallax adjustment processing is performed to the right eye and the left eye according to the relative position. The stereoscopic display panel unit 107 receives the $LR_f$ images transmitted from the parallax adjustment processing unit 106, and projects the $LR_f$ images by the stereoscopic display panel to display the stereoscopic image content.

Figure 23:
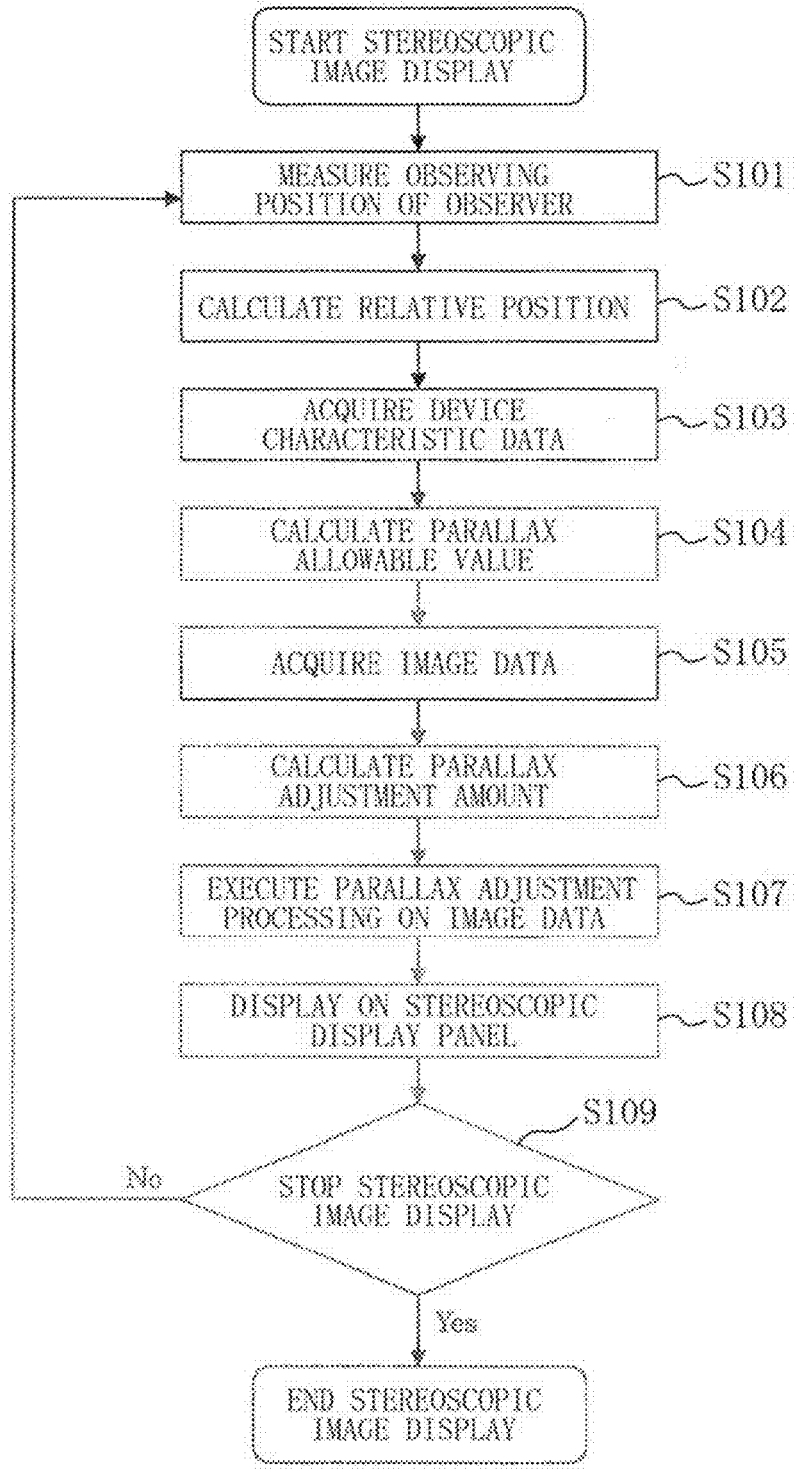
FIG. 23 is a flowchart of a stereoscopic image processing method.

A flowchart of the stereoscopic image processing method used in the stereoscopic image display device according to the first exemplary embodiment will be described by referring to FIG. 23.

In step S101, the observing position of the observer is measured by using the observer position measuring unit 101.

In step S102, the relative position of the observing position of the observer 10 and the stereoscopic display panel 107a is calculated by using the relative position calculating unit 102. In step S102, the observing position (distance $Z_1$ in the Z-axis direction and the viewing angle θp) of the observer 10 by having the center position of the stereoscopic display panel 107a as the origin is calculated as the relative position.

In step S103, the 3D crosstalk characteristic data corresponding to the distance $Z_1$ and the viewing angle θp calculated in step S102 and the threshold values $β_1$, $β_2$ of the 3D crosstalk characteristic data are acquired from the device data saving unit 103 (see FIG. 4 as an example). Further, the parallax maximum value $γ_1$ corresponding to the threshold value $β_1$ of the 3D crosstalk characteristic data and the parallax maximum value $γ_2$ corresponding to the threshold value $β_2$ are acquired (see FIG. 10 as an example).

In step S104, the parallax allowable value $u_{th}$ for the viewing angle θp as the relative position calculated in step S102 is calculated by using the parallax adjustment amount calculating unit 104 from the 3D crosstalk characteristic data acquired in step S103. As an example, the calculation method will be described by referring to FIG. 9. First, the viewing angle range $θ_5$ to $θ_6$ of the stereoscopic viewing space, the viewing angle range $θ_0$ to $θ_1$ of the pseudoscopic viewing space, and the viewing angle range $θ_1$ to $θ_5$ of the 3D-crosstalk viewing space are specified from the threshold values $β_1$ and $β_2$ of the 3D crosstalk characteristic data acquired in step S103. Then, the parallax allowable value $u_{th}$ in the viewing angle range $θ_5$ to $θ_6$ of the stereoscopic viewing space and the viewing angle range $θ_0$ to $θ_1$ of the pseudoscopic viewing space is defined as the parallax maximum value $γ_1$ of the threshold value $β_1$. Then, the parallax allowable value $u_{th}$ in the viewing angle range $θ_1$ to $θ_5$ of the 3D-crosstalk viewing space is determined. Specifically, the parallax allowable value $u_{th}$ in the viewing angle range $θ_1$ to $θ_5$ is determined through connecting the point where the parallax maximum value (the absolute value of the parallax is the maximum) at the viewing angle $θ_1$ is $-γ_1$, the point where parallax maximum value at the viewing angle $θ_2$ is $-γ_2$, the point where parallax maximum value at the viewing angle $θ_4$ is $γ_2$, and the point where parallax maximum value at the viewing angle $θ_5$ is $γ_1$ by interpolation via a line. As described above, the parallax allowable value $u_{th}$ for the viewing angle θp as the relative position calculated in step S102 is calculated by finding the parallax allowable value $u_{th}(θ)$ in the viewing angle range $θ_0$ to $θ_6$ in advance.

In step S105, the image data as the stereoscopic image content is acquired from the image data saving unit 105. In step S105, the parallax maximum value $u_c$ of the stereoscopic image content is acquired from the image data (see FIG. 20B as an example).

In step S106, the parallax adjustment amount κ is calculated from the parallax allowable value $u_{th}$ calculated in step S104 and the parallax maximum value $u_c$ of the image data acquired in step S105 by using the parallax adjustment amount calculating unit 104 and the parallax adjustment processing unit 106. In step S106, the parallax allowable value $u_{th}$ and the parallax maximum value $u_c$ of the image data are compared. The parallax adjustment amount κ is defined as 1 when the parallax allowable value $u_{th}$ is larger, and the parallax adjustment amount κ is calculated from Formula (4) when the parallax maximum value $u_c$ is larger.

In step S107, the parallax adjustment processing of the image data acquired in step S105 is performed by using the parallax adjustment processing unit 106 by referring to the parallax adjustment amount κ calculated in step S106. In step S107, in a case where the parallax adjustment amount κ calculated in step S106 is 1, the parallax value $u_c$ of the image data acquired in step S105 is changed to the parallax value $u_f$ of the image data on which the parallax adjustment processing is performed (see FIG. 20C as an example). In a case where the parallax adjustment amount κ takes the value other than 1, the parallax value $u_f$ of the image data on which the parallax adjustment processing is performed is calculated by multiplying the parallax adjustment amount κ to the parallax value $u_c$ of the image data. The image data on which the parallax adjustment processing is performed is generated from the image data acquired in step S105 by referring to the parallax value $u_f$ of the image data on which the parallax adjustment processing is performed.

In step S108, the image data on which the parallax adjustment processing is performed in step S107 is displayed on the stereoscopic display panel by using the stereoscopic display panel unit 107.

In step S109, whether to stop or to continuously execute the stereoscopic image display processing is set. When the power of the stereoscopic image display device 11 is turned off or interruption of the stereoscopic image display is designated by the observer 10, the stereoscopic image display processing is stopped. When there is no event for stopping the stereoscopic image display processing, the stereoscopic image display processing is continuously executed. When the stereoscopic image display processing is stopped in step S109, the stereoscopic image display processing is ended. When the stereoscopic image display processing is executed continuously in step S109, the procedure is returned to the processing of step S101 to repeatedly execute the processing from step S101 to step S109.

As described above, it is possible to provide the stereoscopic image display device and the stereoscopic image processing method with which the issues of the CT-image and the pseudoscopic view by the 3D crosstalk are overcome so that a sense of discomfort is not felt by the observer even when the observing position of the observer is shifted, through performing the parallax adjustment processing on the image data according to the parallax adjustment amount calculated based on the observing position of the observer and the device characteristic data.

In the flowchart, described is the case of calculating the relative position between the observing position of the observer and the stereoscopic display panel, i.e., the observing position (distance $Z_1$ in the Z-axis direction and the viewing angle θp) of the observer by having the center position of the stereoscopic display panel as the origin at the time of executing the stereoscopic image display processing, and calculating the parallax adjustment amount κ of the image data with respect to the viewing angle θp to perform the parallax adjustment processing on the image data. However, it is possible to shorten the calculation time when executing the stereoscopic image display processing through preparing in advance a group of image data on which the parallax adjustment processing is performed with the parallax adjustment amount κ. It is also possible to prepare in advance a group of image data on which the image filtering processing is performed by using a plurality of parallax adjustment amounts κ. In this case, the processing of step S103 to step S107 is performed in advance prior to the stereoscopic image display processing, and the image data group in the viewing angle range $\theta_0$ to $\theta_6$ on which the parallax adjustment processing is performed is saved in the image data saving unit 105 in advance. At the time of the stereoscopic image display processing, after calculating the viewing angle θp as the relative position in step S102, the image data related to the relative position viewing angle θp is acquired from the image data group in the viewing angle range $\theta_0$ to $\theta_6$ saved in the image data saving unit 105. Then, the acquired image data is displayed as a stereoscopic image on the stereoscopic display panel 107a as in step S108. This makes it possible to greatly shorten the calculation time used for the parallax adjustment amount calculation processing and the parallax adjustment processing performed on the image data, which is preferable for the case where the observing position of the observer 10 changes frequently. However, in order to achieve the stereoscopic image display processing, it is the necessary condition that the image data can be acquired before execution of the stereoscopic image display processing and the recording capacity of the image data saving unit 105 is large. Thus, the stereoscopic image display processing method may be selected depending on the use condition of the stereoscopic image display device 11.

In the external appearance of the first exemplary embodiment (FIG. 2), the case where the image processing unit 151, the observer position measuring unit 101, the device characteristic data saving unit 103, the image data saving unit 105, and the stereoscopic display panel unit 107 exist within a single stereoscopic image display device 11 is illustrated. However, the functions of the stereoscopic image display device 11 may be achieved by separating those units according to the application thereof and integrating each of the separated devices.

Figure 24:
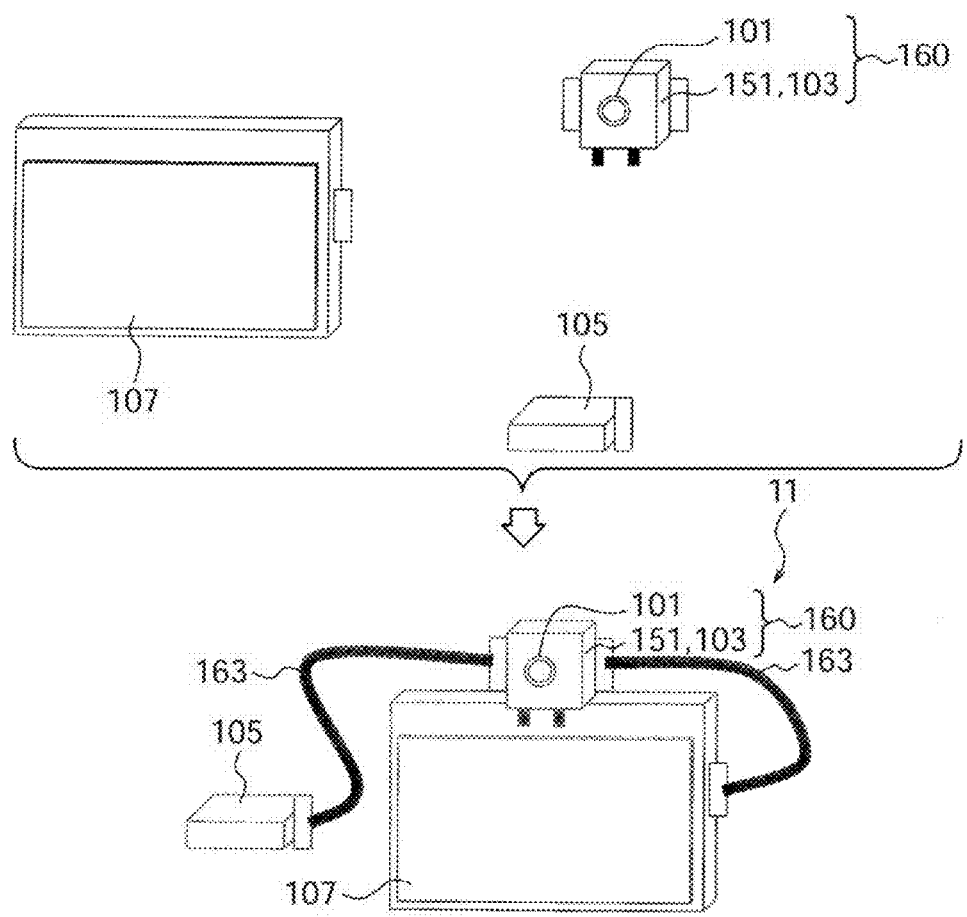
FIG. 24 is an external appearance of the stereoscopic image display device.

FIG. 24 shows a case where the stereoscopic image display device 11 is separated into three devices. The first one is the stereoscopic display panel unit 107, the second one is an image processing device 160 acquired by integrating the observer position measuring unit 101, the image processing unit 151, and the device characteristic data saving unit 103, and the third one is the device of the image data saving unit 105. The functions of the stereoscopic image display device 11 can be achieved through connecting the three devices via an image input/output cable 163 such as HDMI (registered trademark) or DVI, a data communication cable such as USB or LAN (or via radio communication such as W-LAN) and transmitting/receiving various kinds of data.

Figure 25:
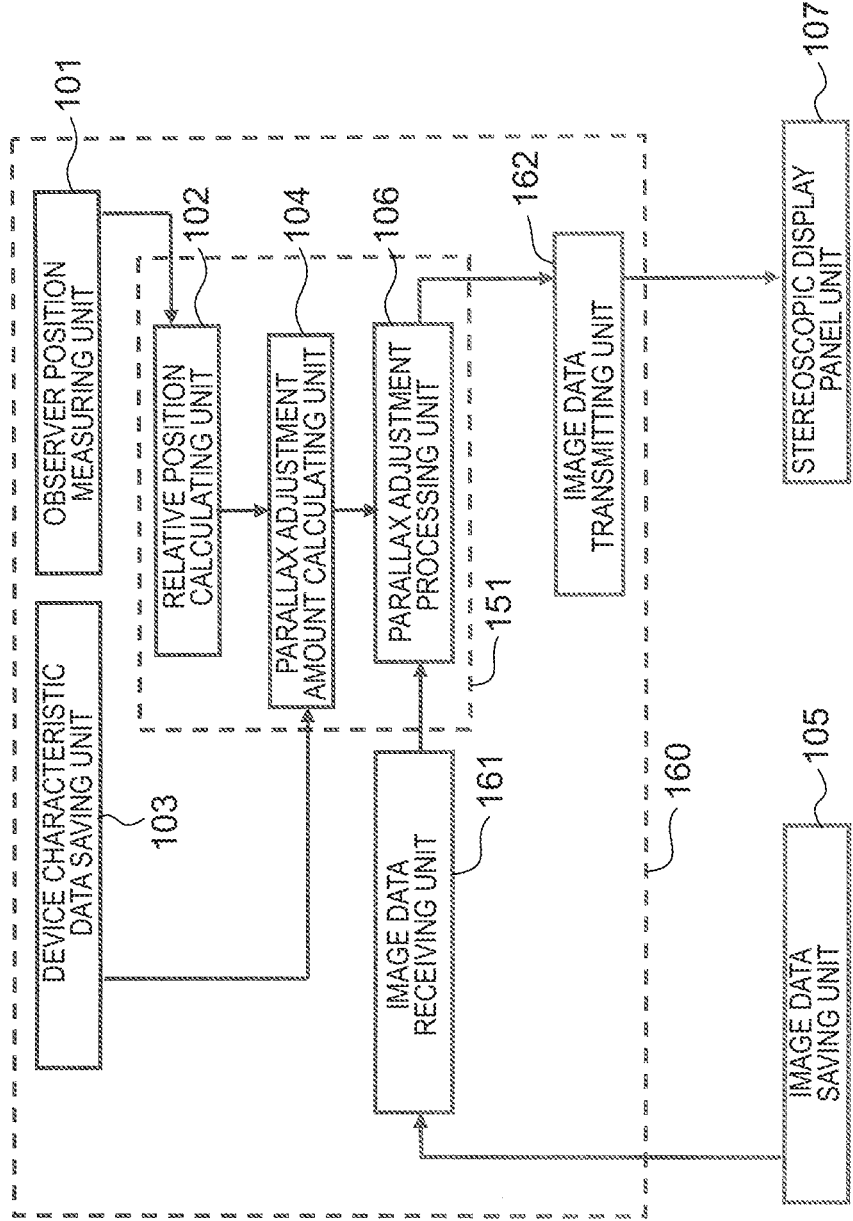
FIG. 25 is a block diagram of an image processing device.

FIG. 25 shows a block diagram of the image processing device 160. The image processing device 160 includes: the observer position measuring unit 101, the relative position calculating unit 102, the device characteristic data saving unit 103, the parallax adjustment amount calculating unit 104, the parallax adjustment processing unit 106, an image data receiving unit 161, and an image data transmitting unit 162. Note here that the observer position measuring unit 101, the relative position calculating unit 102, the device characteristic data saving unit 103, the parallax adjustment amount calculating unit 104, and the parallax adjustment processing unit 106 have the same functions as each of the structural elements of the stereoscopic image processing device 11 described above.

The image data receiving unit 161 has a function which receives the image data transmitted from the image data saving unit 105 provided outside the image processing device 160 and transmits it to the parallax adjustment processing unit 106. Further, the image data transmitting unit 162 has a function which transmits the image data transmitted from the parallax adjustment processing unit 106 to the stereoscopic display panel unit 107. Examples of the image data receiving unit 161 and the image data transmitting unit 162 are a connection terminal and a data transfer device used for transmitting/receiving the image data to/from the image processing device 160 via HDMI, a DVI cable, or the like.

While the case of separating the image display device into the three devices is described in the above, the form of separation is not limited only to that case. The feature of the first exemplary embodiment is the image processing unit 151 which lightens the influence of the CT-image generated by the 3D crosstalk and the pseudoscopic view. Thus, it is possible to combine the image processing unit 151 and the observer position measuring unit 101 and provide it as the single image processing device 160 described above.

The optical model chart of the stereoscopic image display device 11 according to the first exemplary embodiment (FIG. 5) shows a case of projecting images of two different viewpoints (L image, R image) from the stereoscopic display panel. However, the number of viewpoints is not limited to two. Images of multi-viewpoints may be projected from the stereoscopic display panel. In a case of projecting the images of multi-viewpoints, the parallax adjustment processing may be performed on all the images of the neighboring viewpoints observed by the observer with both eyes or the parallax adjustment processing may be performed by selecting only the images between which pseudoscopic view is generated. For selecting the parallax adjustment processing from those types, it is possible to select the type according to the number of viewpoints of the stereoscopic image display device or the extent of the parallax amount between the images of the neighboring viewpoints.

Figure 26:
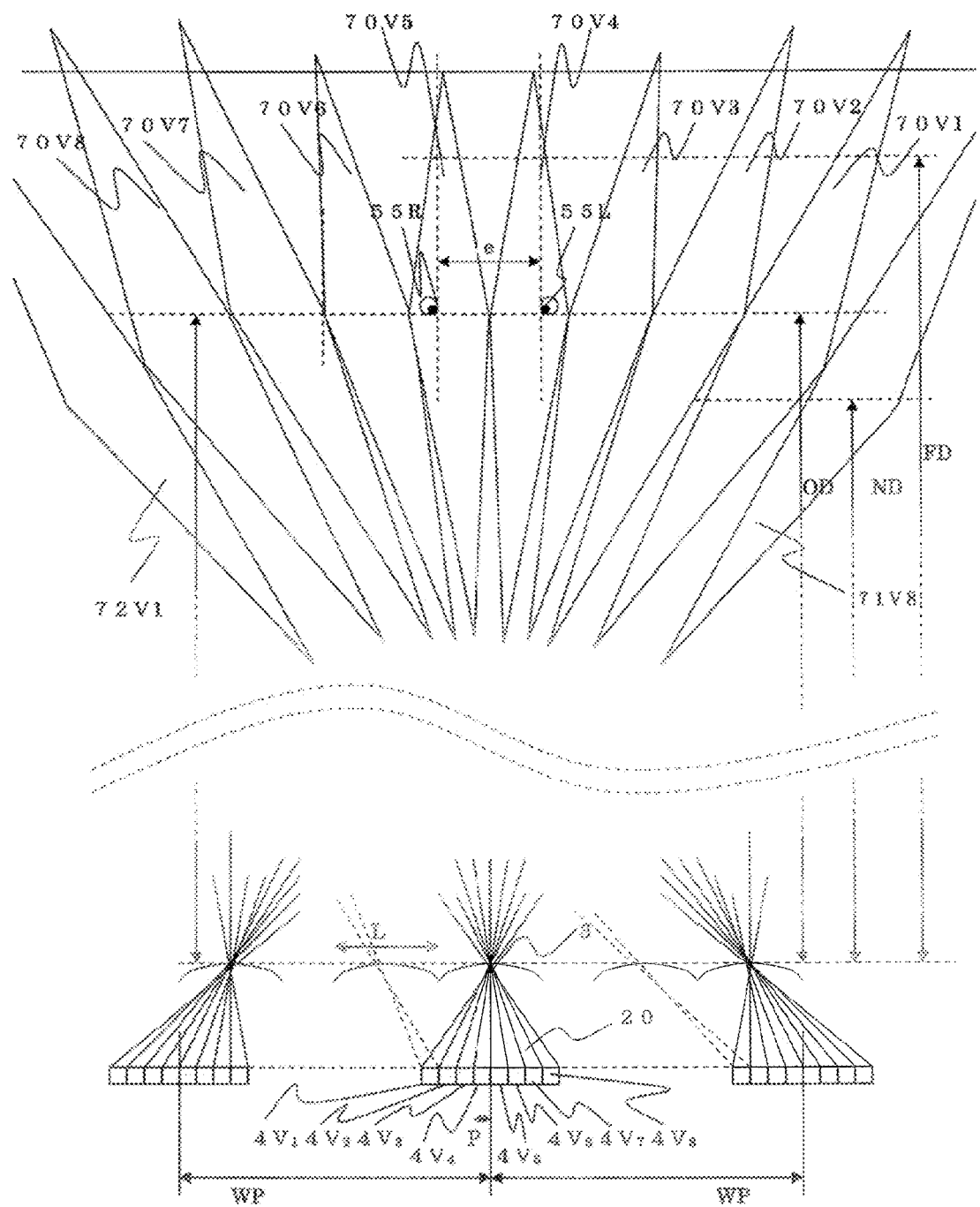
FIG. 26 is an illustration showing an optical model with eight viewpoints.

FIG. 26 shows an eight-viewpoint stereoscopic image display device as an example of multi-viewpoints. The 3D crosstalk is generated in seven sets of images between 70V1 image and 70V2 image, between 70V2 image and 70V3 image, between 70V3 image and 70V4 image, - - - , between 70V7 image and 70V8 image within a stereoscopic viewing space and two sets of images between 72V1 image and 70V8 image and between 71V8 image and 70V1 image as the pseudoscopic viewing space. In general, images used in eight viewpoints are the contents having small parallax amount between the images of neighboring viewpoints by taking some extent of motion parallax into consideration. Therefore, in such case, it is desirable to perform the parallax adjustment processing only when the left eye or the right eye of the observer is within the above-described two sets of the pseudoscopic viewing space and not to perform the parallax adjustment processing on the seven sets within the stereoscopic viewing space.

However, even with eight viewpoints, it is desirable to perform the parallax adjustment processing between the images of the neighboring viewpoints depending on the observing position of the observer even in a case of observing the content in which the parallax amount between the images of the neighboring viewpoints within the stereoscopic viewing space is large or a case of observing content in which the parallax amount between the images of the neighboring viewpoints is not so large. Particularly, depending on the observing distance of the observer, following circumstances occur: the observer observes not the images of the first neighboring viewpoints such as the 70V4 image by the left eye and the 70V5 image by the right eye, but observes the images of the second neighboring viewpoints such as the 70V4 image by the left eye and the 70V6 image by the right eye, the images of the third neighboring viewpoints or the images of the fourth neighboring viewpoints. In such state, as the order becomes larger as the second neighboring viewpoints, the third neighboring viewpoints, and the fourth neighboring viewpoints, the parallax amount of the images inputted to the both eyes becomes larger. Therefore, the influence for the 3D crosstalk is changed. As described, it is possible to detect which viewpoint image is located at the left eye position or the right eye position of the observer through measuring the observing position of the observer. Thus, the parallax adjustment processing may be performed only on the images of the viewpoints of the target order.

Figure 27:
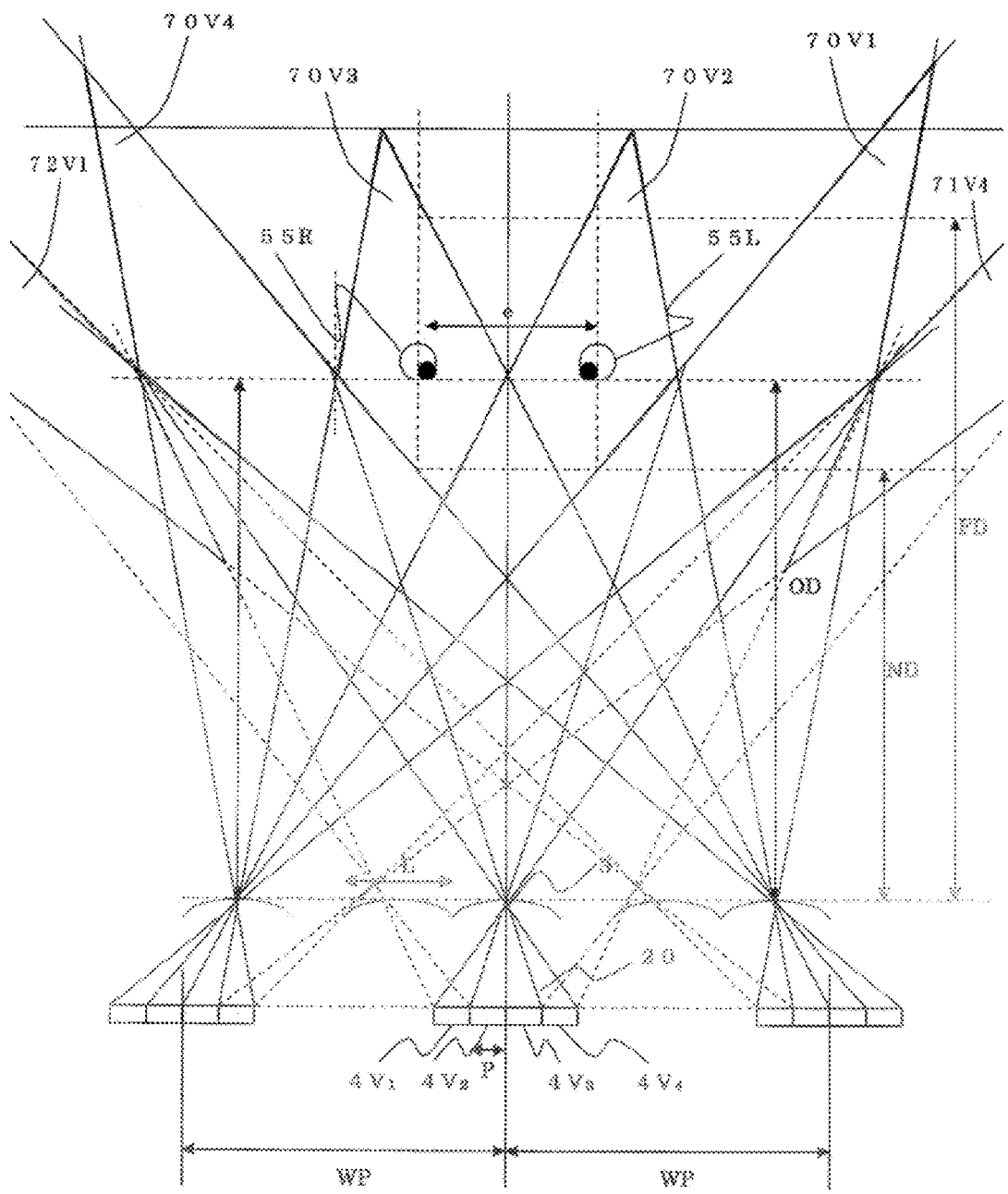
FIG. 27 is an illustration showing an optical model with four viewpoints.

FIG. 27 shows a four-viewpoint stereoscopic image display device as another example of multi-viewpoints. The 3D crosstalk is generated in three sets of images between 70V1 image and 70V2 image, between 70V2 image and 70V3 image, between 70V3 image and 70V4 image within a stereoscopic viewing space and two sets of images between 72V1 image and 70V4 image and between 71V4 image and 70V1 image as the pseudoscopic viewing space. In general, there are few contents of large parallax amount between the viewpoints regarding the images of four viewpoints, and the so-called flipping effect occurs at the time of shift between the viewpoints. Thus, in such case, it is desirable to perform the parallax adjustment processing on all the images of neighboring viewpoints when the left eye or the right eye of the observer is within the 3D-crosstalk viewing space of the three sets in the stereoscopic viewing space and the two sets in the pseudoscopic viewing space partly for the sake of the flipping effect. However, this does not apply even in a case of four viewpoints when the contents thereof are of small parallax amount. It is needless to say that the parallax adjustment processing may be performed only on the pseudoscopic viewing space in that case.

As another example, in a case where the left eye of the observer is in the 3D-crosstalk viewing space between the 70V1 image and the 70V2 image and the right eye is in the stereoscopic viewing space of the 70V3 image, the parallax adjustment processing is performed only on the 70V1 image and the 70V2 image to decrease the parallax value between the images so as to lighten the influence of the CT-image by the 3D crosstalk. Even when this parallax adjustment processing is performed, the parallax-adjusted 70V1 image and 70V2 image projected to the left eye of the observer and the 70V3 image projected to the right eye of the observer are images of different parallax values. Therefore, the observer can observe the stereoscopic image.

Note that the area 70V1 of the viewpoint 1, the area 70V2 of the viewpoint 2, the area 70V3 of the viewpoint 3, the area 70V4 of the viewpoint 4, the area 70V5 of the viewpoint 5, the area 70V6 of the viewpoint 6, the area 70V7 of the viewpoint 7, the area 70V8 of the viewpoint 8, the area 72V1 of the viewpoint 1, the area 71V8 of the viewpoint 8, the area 71V4 of the viewpoint 4, the pixel $4V_1$ for the viewpoint 1, the pixel $4V_2$ for the viewpoint 2, the pixel $4V_3$ for the viewpoint 3, the pixel $4V_4$ for the viewpoint 4, the pixel $4V_5$ for the viewpoint 5, the pixel $4V_6$ for the viewpoint 6, the pixel $4V_7$ for the viewpoint 7, and the pixel $4V_8$ for the viewpoint 8 are illustrated in both or one of the drawings FIG. 26 and FIG. 27.

Further, it is needless to mention that the above-described parallax adjustment processing can be applied not only to the multi-viewpoint type but also to various naked-eye stereoscopic types such as the integral type and the super multi-viewpoint type. Note here that there is no pseudoscopic viewing space with an ideal integral type. However, even in that case, it is effective to perform the parallax adjustment processing between the images of neighboring viewpoints within the stereoscopic viewing space when the parallax amount between the neighboring viewpoints is larger than a prescribed value.

In other words, the stereoscopic image display device according to the first exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the viewing angles of the stereoscopic display panel; the parallax adjustment amount calculating unit which calculates the optimum parallax adjustment amount suited for stereoscopic image display for the viewing angle based on the device characteristic data; the image data saving unit which saves or receives the image data; the parallax adjustment processing unit which performs the parallax adjustment processing on the image data according to the parallax adjustment amount; and the stereoscopic display panel unit which projects the image data on which the parallax adjustment processing is performed to the right eye and the left eye according to the relative position.

The first exemplary embodiment can overcome the issues by providing the stereoscopic image display device and the stereoscopic image processing method with which the issues of the CT-image and the pseudoscopic view by the 3D crosstalk are overcome so that a sense of discomfort is not felt by the observer even when the observing position of the observer is shifted, through performing the parallax adjustment processing on the image data according to the parallax adjustment amount calculated based on the observing position of the observer and the device characteristic data.

As an exemplary advantage according to the invention, the present invention exhibits the effect of providing the stereoscopic image display device and the like with which the issues of the CT-image and pseudoscopic view caused by 3D crosstalk can be overcome without giving a sense of discomfort by the drastic change in the parallax value so that a sense of discomfort is not felt even when the observing position of the observer is shifted.

Second Exemplary Embodiment

It is an exemplary object of a second exemplary embodiment to provide a stereoscopic image display device and a stereoscopic image processing method with which the issues of the CT-image and the pseudoscopic view by the 3D crosstalk are overcome so that a sense of discomfort is not felt by the observer even when the relative position between the observing position of the observer and the stereoscopic display panel is shifted at a fast speed, through achieving parallax adjustment processing smoothly without giving a sense of discomfort to the observer.

Figure 28:
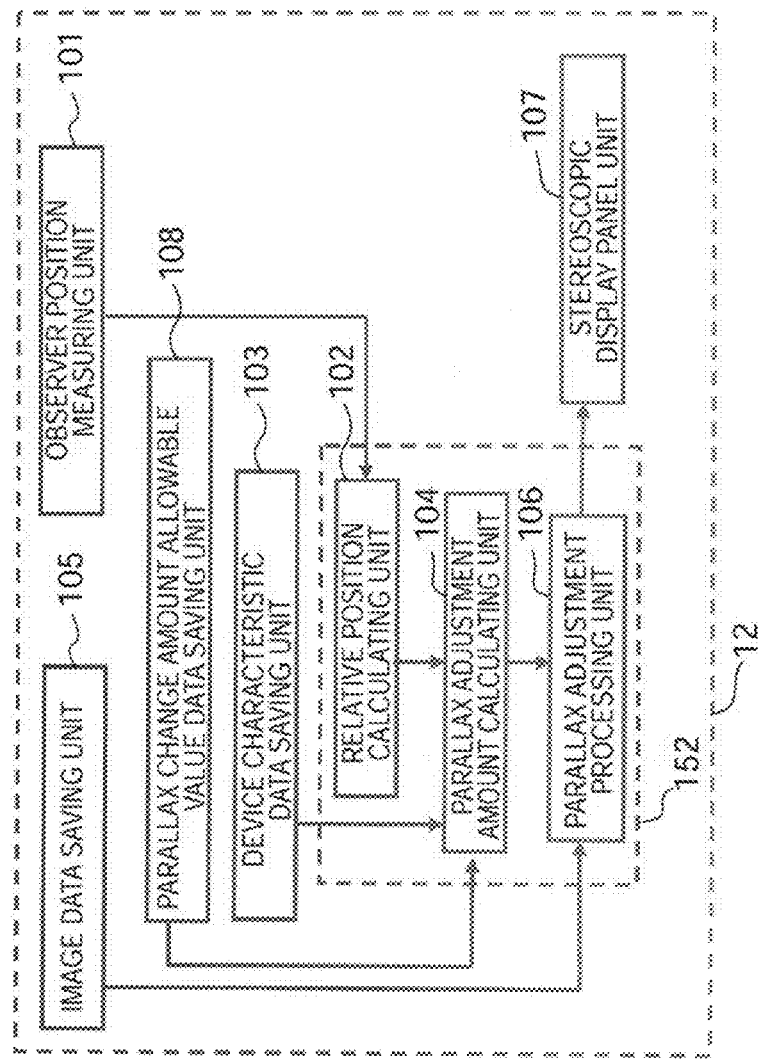
FIG. 28 is a block diagram of a stereoscopic image display device according to a second exemplary embodiment.

FIG. 28 shows a block diagram of a stereoscopic image display device 12. The stereoscopic image display device 12 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; and a parallax change amount allowable value data saving unit 108. Further, a processing unit that is an integration of the relative position calculating unit 102, the parallax adjustment amount calculating unit 104, and the parallax adjustment processing unit 106 is referred to as an image processing unit 152.

Hereinafter, functions of each unit included in the stereoscopic image display device 12 will be described. The functions of the observer position measuring unit 101, the device characteristic data saving unit 103, the image data saving unit 105, the parallax adjustment processing unit 106, and the stereoscopic display panel unit 107 are the same as those of the first exemplary embodiment.

The relative position calculating unit 102 has a function which calculates not only the relative position between the observing position of the observer and the position of the stereoscopic display panel but also the changing speed of the relative position (amount of chronical change in the relative position). The shift speed is calculated by recording the relative position for every 0.03 seconds (in the case of using a camera of 30 fps), for example, and acquiring the difference between the relative position of the past and the current relative position. Provided that the shift speed is the amount of chronical change in the viewing angle $\theta$, the shift speed v can be expressed as in Formula (11) (t is the time).

$$\text{Shift speed:} v = d\theta/dt \qquad \text{Formula (11)}$$

Figure 29:
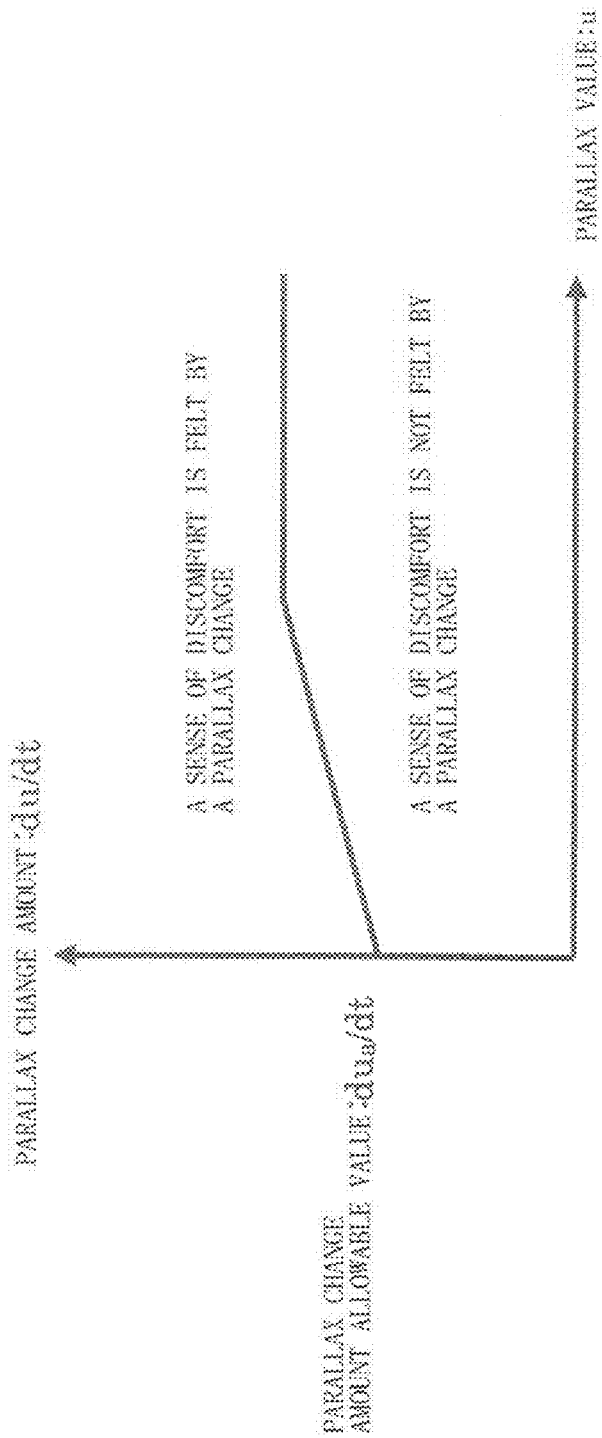
FIG. 29 is a chart showing allowable values of the parallax change amount.

The parallax change amount allowable value data saving unit 108 saves the parallax change amount allowable value $du_a/dt$ with which a sense of discomfort is not felt by the observer. Note here that the parallax change amount is the chronical change amount of the parallax value u, so that the parallax change amount is expressed as du/dt. The parallax change amount allowable value $du_a/dt$ may be set arbitrarily according to the preference of the observer or may be determined by the subjective evaluation and the like of the observers. In the subjective evaluation experiment, the LR images in which the parallax values are changed gradually are presented to the observer, and the maximum value of the parallax change amount with which a sense of discomfort is not felt by the observer is evaluated to be defined as the parallax change amount allowable value $du_a/dt$. When the parallax change amount is equal to or larger than the allowable value $du_a/dt$, the parallax value becomes changed drastically. Thus, even when the observer is viewing same stereoscopic image contents, the observer recognizes the images to be switched. Therefore, the observer feels a sense of discomfort. In the meantime, when the parallax change amount is within the allowable value $du_a/dt$, the images are recognized in a continuously linked manner even when the parallax value is changed although the stereoscopic image contents are viewed to be shifted on the Z-axis. Therefore, there is no sense of discomfort felt by the observer. FIG. 29 shows the parallax change amount allowable value $du_a/dt$ specified by the subjective evaluation experiment done by the inventors of the present invention. There is a tendency that the parallax change amount allowable value $du_a/dt$ is increased according to the parallax value u.

The parallax adjustment amount calculating unit 104 calculates the parallax limit value (the parallax allowable value $u_{th}$) with which a stereoscopic image can be displayed based on the device characteristic data, the parallax change amount allowable value, and the changing speed of the relative position. In the calculation processing of the parallax allowable value $u_{th}$ according to the second exemplary embodiment, first, the parallax change amount allowable value $u'_a (du_a/d\theta)$ for the viewing angle $\theta$ is calculated from the parallax change amount allowable value $du_a/dt$ and the relative position changing speed $d\theta/dt$. Note here that the parallax adjustment change amount allowable value $u'_a$ depends on the relative position changing speed. Thus, when the changing speed of the relative position changes, the parallax change amount allowable value $u'_a$ is recalculated.

Figure 30:
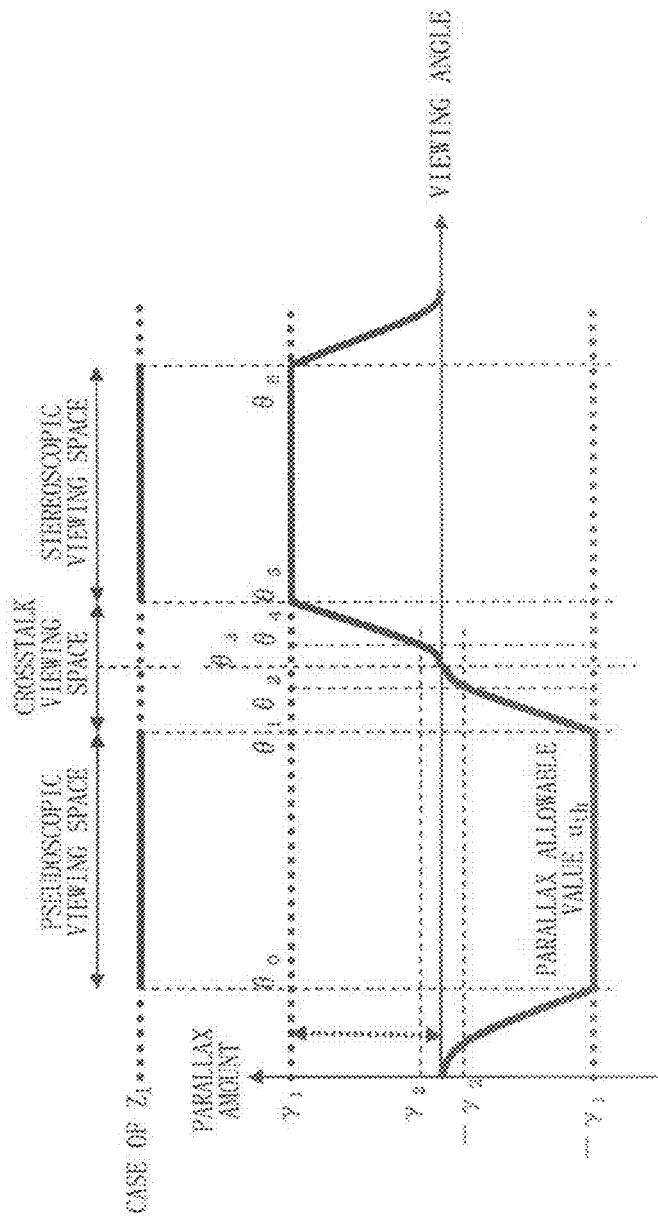
FIG. 30 is a chart showing parallax allowable values with respect to the viewing angles.

FIG. 30 shows the result acquired by calculating the parallax allowable value $u_{th}$ based on the device characteristic data of the stereoscopic image display device as in the case of the first exemplary embodiment. Then, the change amount $du_{th}/d\theta$ of the parallax allowable value $u_{th}$ with respect to the viewing angle $\theta$ is calculated from the parallax allowable value $u_{th}$ and compared with the parallax change amount allowable value $u'_a$, and the parallax allowable value $u_{th}$ is changed to satisfy Formula (12).

$$du_{th}/d\theta <= u'_a \qquad \text{Formula (12)}$$

Figure 31:
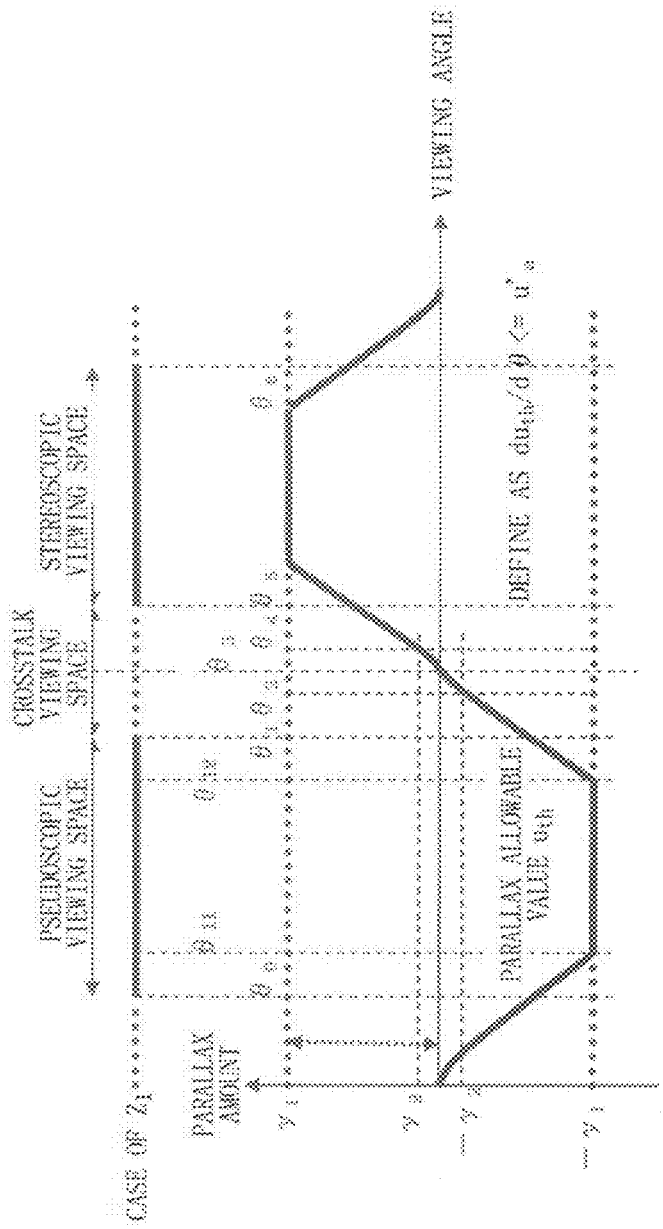
FIG. 31 is a chart showing parallax allowable values with respect to the viewing angles.

FIG. 31 shows the parallax allowable value $u_{th}$ with respect to the viewing angle $\theta$ in a case where the changing speed of the relative position is fast. When the changing speed of the relative position is fast, the parallax change amount allowable value $u'_a$ is decreased. Thus, the change amount $du_{th}/d\theta$ of the parallax allowable value is decreased, so that the slope of the line of the parallax allowable value $u_{th}$ with respect to the viewing angle $\theta$ becomes gradual.

FIG. 32 shows a comparison table regarding the parallax allowable value of the first exemplary embodiment (FIG. 9) and the parallax allowable value of the second exemplary embodiment (FIG. 31). The parallax allowable value $u_{th}$ of the second exemplary embodiment is required to satisfy the condition of Formula (12). Thus, when the changing speed of the relative position is fast, the viewing angle range where the parallax allowable value $u_{th}$ takes a constant value for the viewing angles $\theta$ is narrowed. From FIG. 32, the viewing angle range $\theta_0$ to $\theta_1$ is narrowed to the viewing angle range $\theta_{11}$ to $\theta_{12}$.

Figure 33:
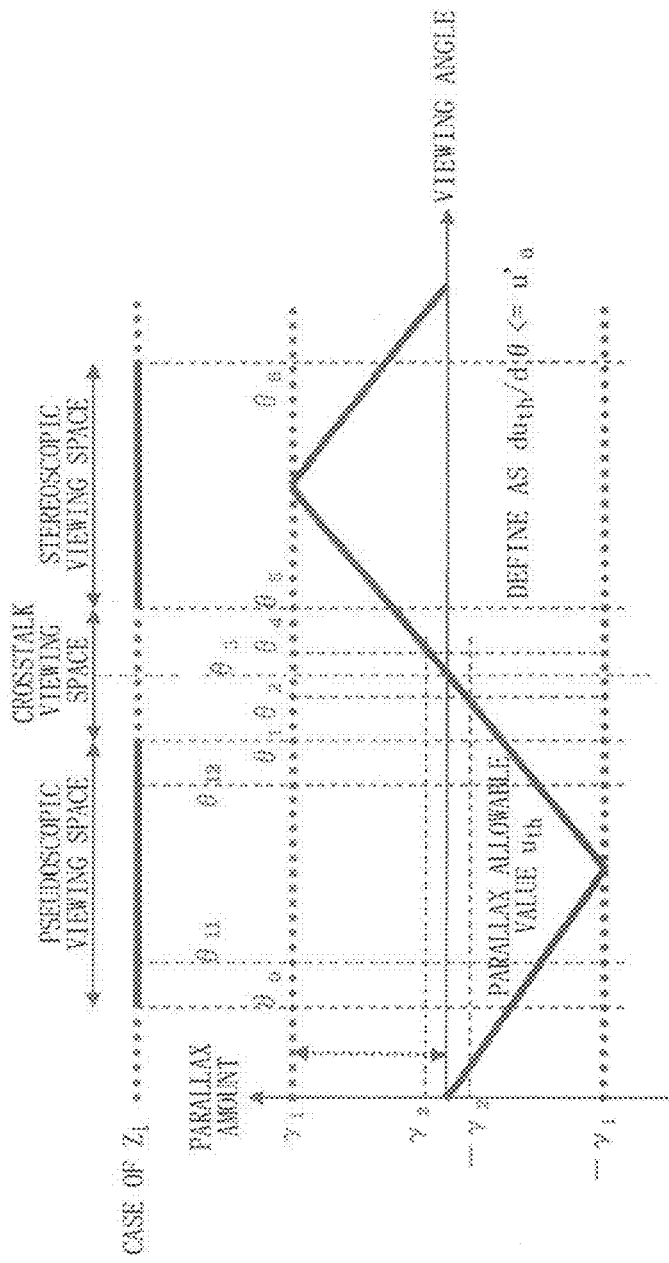
FIG. 33 is a chart showing parallax allowable values with respect to the viewing angles.

Further, FIG. 33 shows parallax allowable value $u_{th}$ with respect to the viewing angle $\theta$ in a case where the changing speed of the relative position is still faster. When the changing speed of the relative position is still faster, the slope of the line of the parallax allowable value $u_{th}$ becomes more gradual and the viewing angle range where parallax allowable value $u_{th}$ takes a constant value for the viewing angles $\theta$ disappears. Note here that "the gradual slope of line" means that the slope of the line $(du_{th}/d\theta)$ takes a value smaller than the parallax change amount allowable value $u'_a$ and the parallax change amount with respect to the change amount of the viewing angle is small.

Figure 34A:
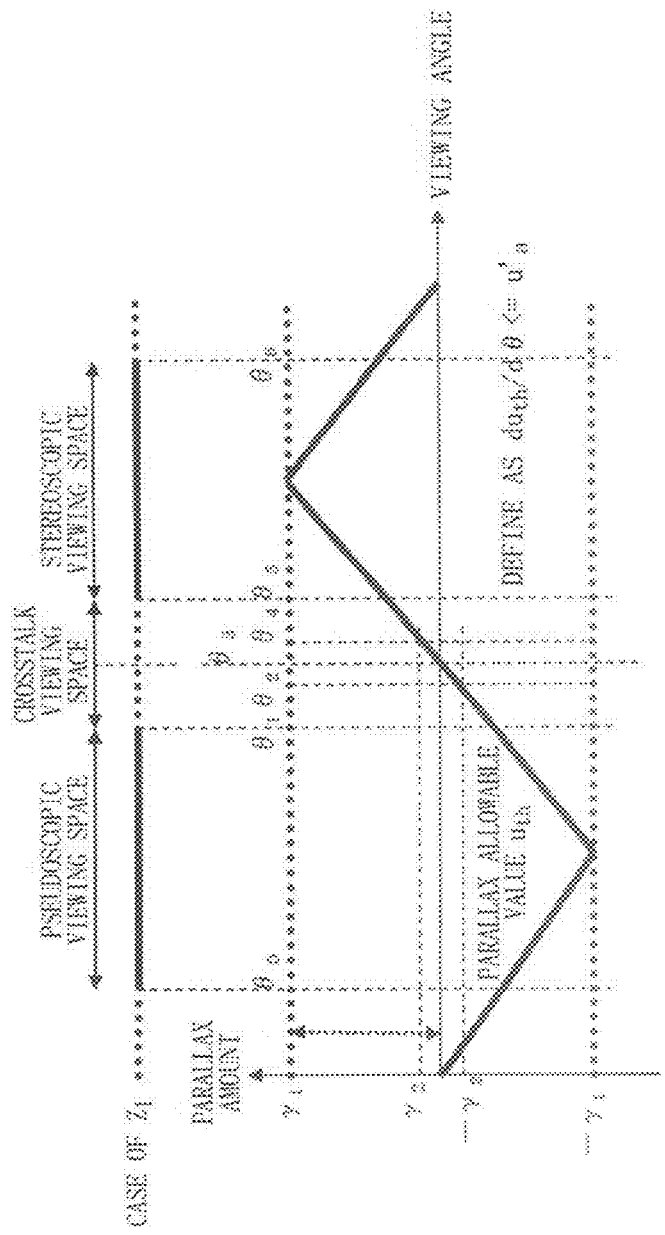
FIG. 34A is a chart showing parallax allowable values with respect to the viewing angles.
Figure 34C:
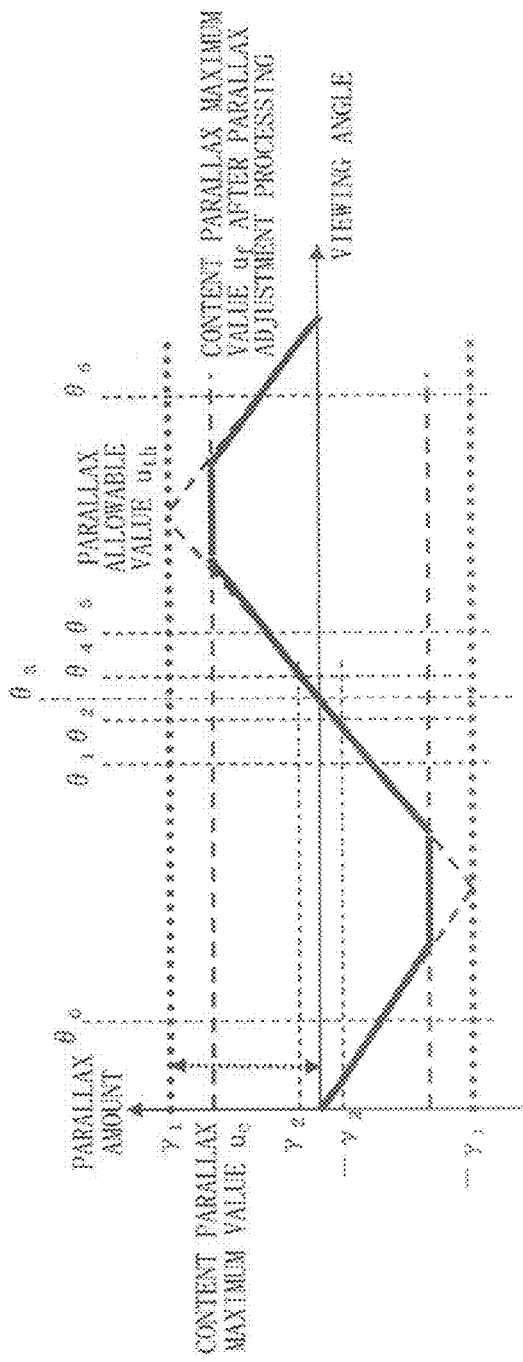
FIG. 34C is a chart showing parallax maximum values with respect to the viewing angles after performing parallax adjustment processing.

The parallax adjustment processing unit 106 has a function which performs the parallax adjustment processing on the image data according to the parallax allowable value $u_{th}$ calculated by the parallax adjustment amount calculating unit 104. FIG. 34 shows the result acquired by calculating the parallax maximum value $u_f$ of the stereoscopic image content for the viewing angles acquired by executing the parallax adjustment processing. As in the case of the first exemplary embodiment, in the parallax adjustment processing, in order to calculate the parallax maximum value $u_f$ of the stereoscopic image content after the parallax adjustment processing, calculated is the parallax maximum value $u_f$ (FIG. 34C) which satisfies both conditions (Formula (4)), i.e., the condition (FIG. 34A) of the parallax allowable value $u_{th}$ calculated by the parallax adjustment amount calculating unit 104 and the condition (FIG. 34B) of the parallax maximum value $u_c$ of the stereoscopic image content saved in the image data saving unit 105.

In a case where the parallax maximum value $u_f$ after the parallax adjustment processing is larger than the parallax maximum value $u_c$ of the stereoscopic image content, the parallax value of the stereoscopic image content is not changed and the LR image in that state is transmitted to the stereoscopic display panel unit 107. In a case where the parallax maximum value $u_f$ after the parallax adjustment processing is smaller than the parallax maximum value $u_c$ of the stereoscopic image content, the parallax adjustment value κ (ratio between $u_f$ and $u_c$) is calculated by Formula (5) of the first exemplary embodiment, the parallax value of the stereoscopic image content is changed, and then the LR images are transmitted to the stereoscopic display panel unit 107.

As described above, through calculating the parallax adjustment amount by considering the shift speed of the observing position of the observer (the relative position between the observing position of the observer and the position of the stereoscopic display panel) and the parallax change amount allowable value with respect to the time in addition to the observing position of the observer and the device characteristic data, it is possible to perform the parallax adjustment processing without giving a sense of discomfort to the observer by changing the parallax of the image data gradually even when the observing position of the observer is shifted at a fast speed. As in the case of the first exemplary embodiment, the second exemplary embodiment can be applied to various kinds of naked-eye type stereoscopic image display devices such as the multi-viewpoint type and the integral type. Naturally, it is possible to provide the image processing unit 152 of the second exemplary embodiment as an individual image processing unit, and to achieve the function of the stereoscopic image display device 12 in combination with the stereoscopic display panel unit 107.

Figure 35:
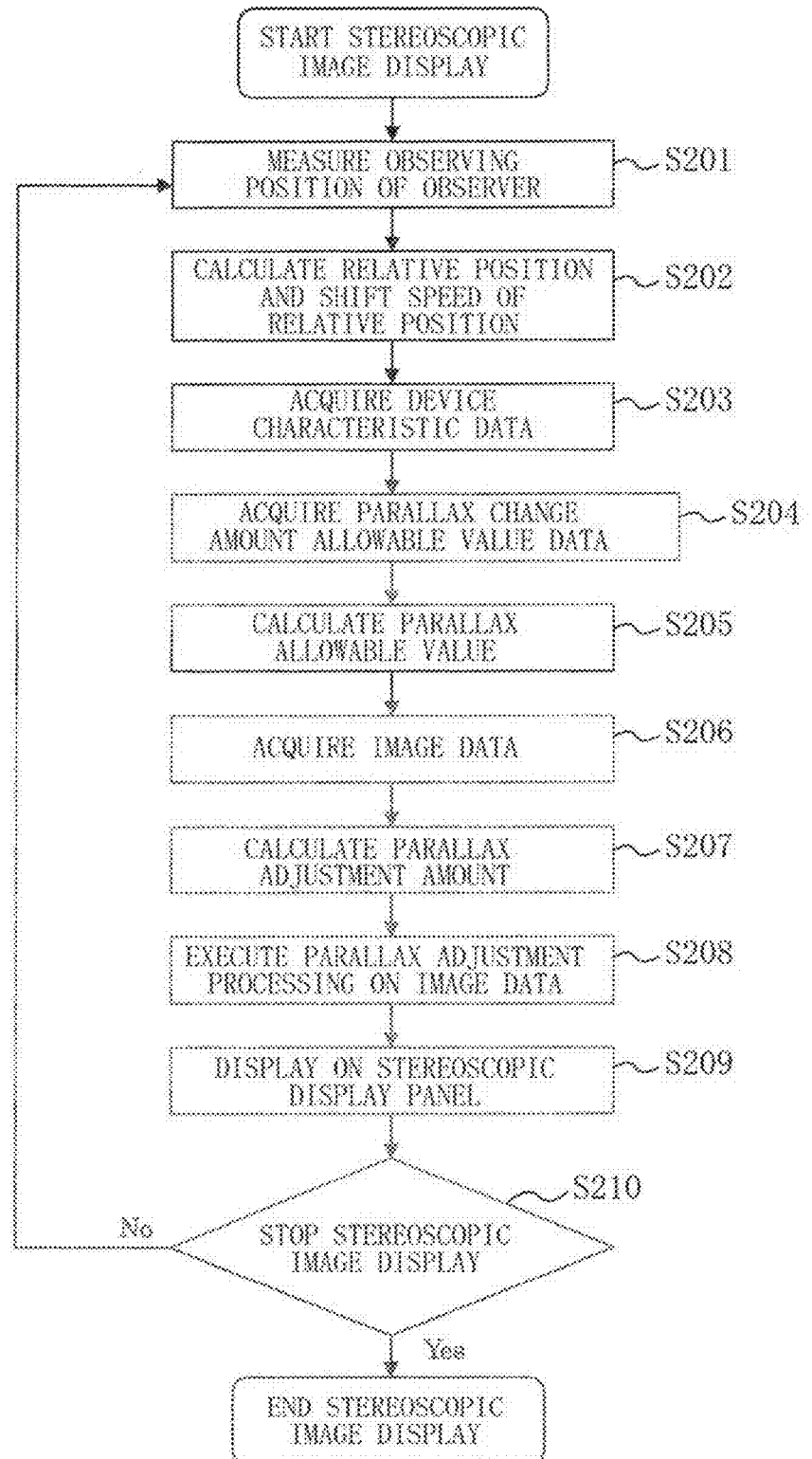
FIG. 35 is a flowchart of a stereoscopic image processing method.

A flowchart of the stereoscopic image processing method used in the stereoscopic image display device according to the second exemplary embodiment will be described by referring to FIG. 35. In step S201, the observing position of the observer is measured by using the observer position measuring unit 101.

In step S202, the relative position between the observing position of the observer and the stereoscopic display panel and the relative position changing speed are calculated by using the relative position calculating unit 102. In step S202, the observing position (distance $Z_1$ in the Z-axis direction and the viewing angle θp) of the observer when the center position of the stereoscopic display panel is taken as the origin is calculated as the relative position. Further, as the relative position changing speed, the change amount of the viewing angle θp is detected by every arbitrary time, and the viewing angle changing speed dθp/dt is calculated.

In step S203, the 3D crosstalk characteristic data corresponding to the distance $Z_1$ and the viewing angle θp calculated in step S202 and the threshold values $\beta_1$, $\beta_2$ of the 3D crosstalk characteristic data are acquired from the device data saving unit 103 (see FIG. 4 as an example). Further, the parallax amount maximum value $\gamma_1$ corresponding to the threshold value $\beta_1$ of the 3D crosstalk characteristic data and the parallax amount maximum value $\gamma_2$ corresponding to the threshold value $\beta_2$ are acquired (see FIG. 10 as an example).

In step S204, the parallax change amount allowable value data $du_a/dt$ is acquired from the parallax change amount allowable value data saving unit 108.

In step S205, the parallax allowable value $u_{th}$ with respect to the viewing angle θp as the relative position between the observer and the stereoscopic display panel is calculated from the relative position changing speed dθp/dt acquired in step S202, the parallax change amount allowable value data $du_a/dt$ acquired in step S204, and the 3D crosstalk characteristic data acquired in step S203. As an example, a calculation method is described by referring to FIG. 30 and FIG. 31. First, the parallax change amount allowable value $u'_a(du_a/d\theta p)$ for the viewing angle θ is calculated from the relative position changing speed dθp/dt acquired in step S202 and the parallax change amount allowable value data $du_a/dt$ acquired in step S204. Then, by the same processing as that of step S204 in the first exemplary embodiment, the parallax allowable value $u_{th}(\theta)$ in the viewing angle range $\theta_0$ to $\theta_6$ is calculated from the threshold values $\beta_1$, $\beta_2$ of the 3D crosstalk characteristic data acquired in step S203 (see FIG. 30 as an example). Then, the parallax change amount allowable value $du_{th}/d\theta p$ for the viewing angle θp is calculated form the parallax allowable value $u_{th}$ and compared with the parallax change amount allowable value $u'_a(du_a/d\theta p)$, and the parallax allowable value $u_{th}(\theta)$ in the viewing angle range $\theta_0$ to $\theta_6$ is changed to satisfy Formula (12) (see FIG. 31 as an example). As described, the parallax allowable value $u_{th}$ for the viewing angle θp as the relative position calculated in step S202 is calculated after acquiring the parallax allowable value $u_{th}(\theta)$ in the viewing angle range $\theta_0$ to $\theta_6$.

In step S206, the image data as the stereoscopic image content is acquired from the image data saving unit 105. In step S206, the parallax maximum value $u_c$ of the stereoscopic image content is acquired from the image data (see FIG. 34B as an example).

In step S207, the parallax adjustment amount κ is calculated from the parallax allowable value $u_{th}$ calculated in step S205 and the parallax maximum value $u_c$ of the image data acquired in step S206 by using the parallax adjustment amount calculating unit 104 and the parallax adjustment processing unit 106. In step S207, the parallax allowable value $u_{th}$ and the parallax maximum value $u_c$ of the image data are compared. The parallax adjustment amount κ is defined as 1 when the parallax allowable value $u_{th}$ is larger, and the parallax adjustment amount κ is calculated from Formula (4) when the parallax maximum value $u_c$ is larger.

In step S208, the parallax adjustment processing of the image data acquired in step S206 is performed by using the parallax adjustment processing unit 106 by referring to the parallax adjustment amount κ calculated in step S207. In step S208, in a case where the parallax adjustment amount κ calculated in step S207 is 1, the parallax value $u_c$ of the image data acquired in step S206 is changed to the parallax value $u_f$ of the image data on which the parallax adjustment processing is performed (see FIG. 34C as an example). In a case where the parallax adjustment amount κ takes the value other than 1, the parallax value $u_f$ of the image data on which the parallax adjustment processing is performed is calculated by multiplying the parallax adjustment amount κ to the parallax value $u_f$ of the image data. The image data on which the parallax adjustment processing is performed is generated from the image data acquired in step S206 by referring to the parallax value $u_f$ of the image data on which the parallax adjustment processing is performed.

In step S209, the image data on which the parallax adjustment processing is performed in step S207 is displayed on the stereoscopic display panel by using the stereoscopic display panel unit 107.

In step S210, whether to stop or to continuously execute the stereoscopic image display processing is set. When the power of the stereoscopic image display device 12 is turned off or interruption of the stereoscopic image display is designated by the observer, the stereoscopic image display processing is stopped. When there is no event for stopping the stereoscopic image display processing, the stereoscopic image display processing is continuously executed. When the stereoscopic image display processing is stopped in step S210, the stereoscopic image display processing is ended. When the stereoscopic image display processing is executed continuously in step S210, the procedure is returned to the processing of step S201 to repeatedly execute the processing from step S201 to step S210.

As described above, it is possible to provide the stereoscopic image display device and the stereoscopic image processing method with which the issues of the CT-image and the pseudoscopic view by the 3D crosstalk are overcome so that a sense of discomfort is not felt by the observer even when the relative position between the observing position of the observer and the stereoscopic display panel is shifted at a fast speed, through performing the parallax adjustment processing gradually.

As in the case of the first exemplary embodiment, it is naturally possible with the stereoscopic image processing method of the second exemplary embodiment to shorten the calculation time of the stereoscopic image display processing greatly through saving the group of image data on which the parallax adjustment processing is performed with the parallax adjustment amount κ in advance in the image data saving unit 105.

In other words, the stereoscopic image display device according to the second exemplary embodiment includes: the observer position measuring unit which measures the observing position of the observer; the relative position calculating unit which calculates the relative position between the observing position of the observer and the position of the stereoscopic display panel and the relative position changing speed (the change amount of the relative position with respect to the time); the device characteristic data saving unit which saves the device characteristic data for the viewing angles of the stereoscopic display panel; the parallax change amount allowable value saving unit which saves the parallax change amount allowable value with respect to the time (the parallax change amount with which a sense of discomfort is not felt by the observer); the parallax adjustment amount calculating unit which calculates the optimum parallax adjustment amount suited for stereoscopic image display for the viewing angle based on the device characteristic data, the parallax change amount allowable value, and the relative position change amount; the image data saving unit which saves or receives the image data; the parallax adjustment processing unit which performs the parallax adjustment processing on the image data according to the parallax adjustment amount; and the stereoscopic display panel unit which projects the image data on which the parallax adjustment processing is performed to the right eye and the left eye according to the relative position.

With the second exemplary embodiment, it is possible to perform the parallax adjustment processing without giving a sense of discomfort to the observer by changing the parallax of the image data gradually even when the observing position of the observer is shifted at a fast speed through calculating the parallax adjustment amount by considering the shift speed of the observing position of the observer (the relative position between the observing position of the observer and the position of the stereoscopic display panel) and the parallax change amount allowable value with respect to the time in addition to the observing position of the observer and the device characteristic data. This makes it possible to overcome the issues by providing the stereoscopic image display device and the stereoscopic image processing method with which the issues of the CT-image and the pseudoscopic view by the 3D crosstalk are overcome so that a sense of discomfort is not felt by the observer even when the observing position of the observer is shifted at a fast speed, through performing the parallax adjustment processing gradually.

Third Exemplary Embodiment

It is an exemplary object of a third exemplary embodiment to provide a stereoscopic image display device and a stereoscopic image processing method with which the issues of the CT-image and the pseudoscopic view by the 3D crosstalk are overcome so that a sense of discomfort is not felt by the observer even when the relative position between the observing position of the observer and the stereoscopic display panel is shifted at a still faster speed, through achieving parallax adjustment processing of a constant parallax value in an arbitrary area of a stereoscopic viewing space and a pseudoscopic viewing space and achieving the parallax adjustment processing smoothly in other area.

Figure 36:
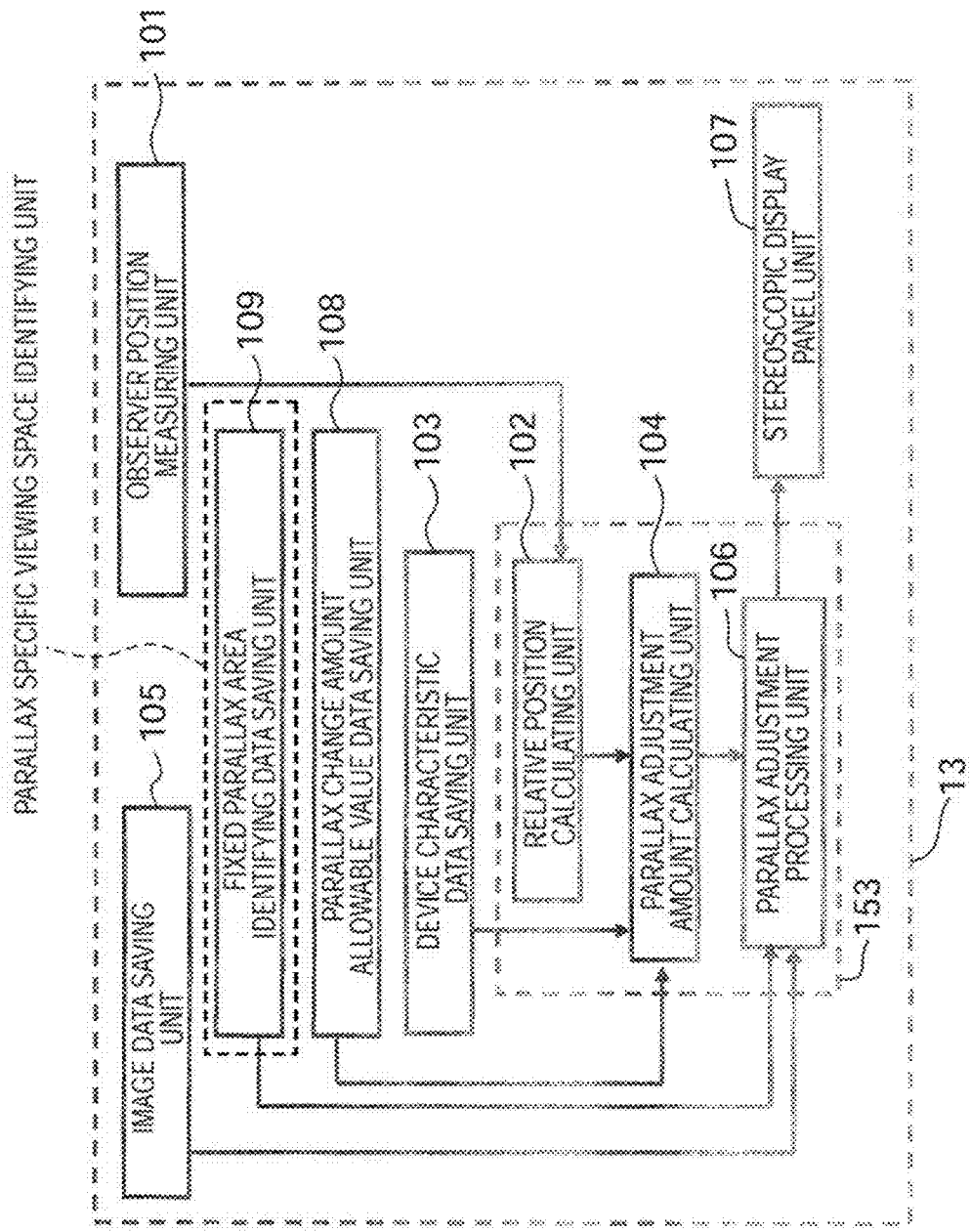
FIG. 36 is a block diagram of a stereoscopic image display device according to a third exemplary embodiment.

FIG. 36 shows a block diagram of a stereoscopic image display device 13. The stereoscopic image display device 13 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; a parallax change amount allowable value data saving unit 108; and a parallax specific area identifying data saving unit 109. Further, a processing unit that is an integration of the relative position calculating unit 102, the parallax adjustment amount calculating unit 104, and the parallax adjustment processing unit 106 is referred to as an image processing unit 153. Hereinafter, functions of each unit included in the stereoscopic image display device 13 will be described. The functions of the observer position measuring unit 101, the relative position calculating unit 102, the device characteristic data saving unit 103, the parallax adjustment amount calculating unit 104, the image data saving unit 105, and the stereoscopic display panel unit 107, and the parallax change amount allowable value data saving unit 108 are the same as those of the second exemplary embodiment.

Figure 37:
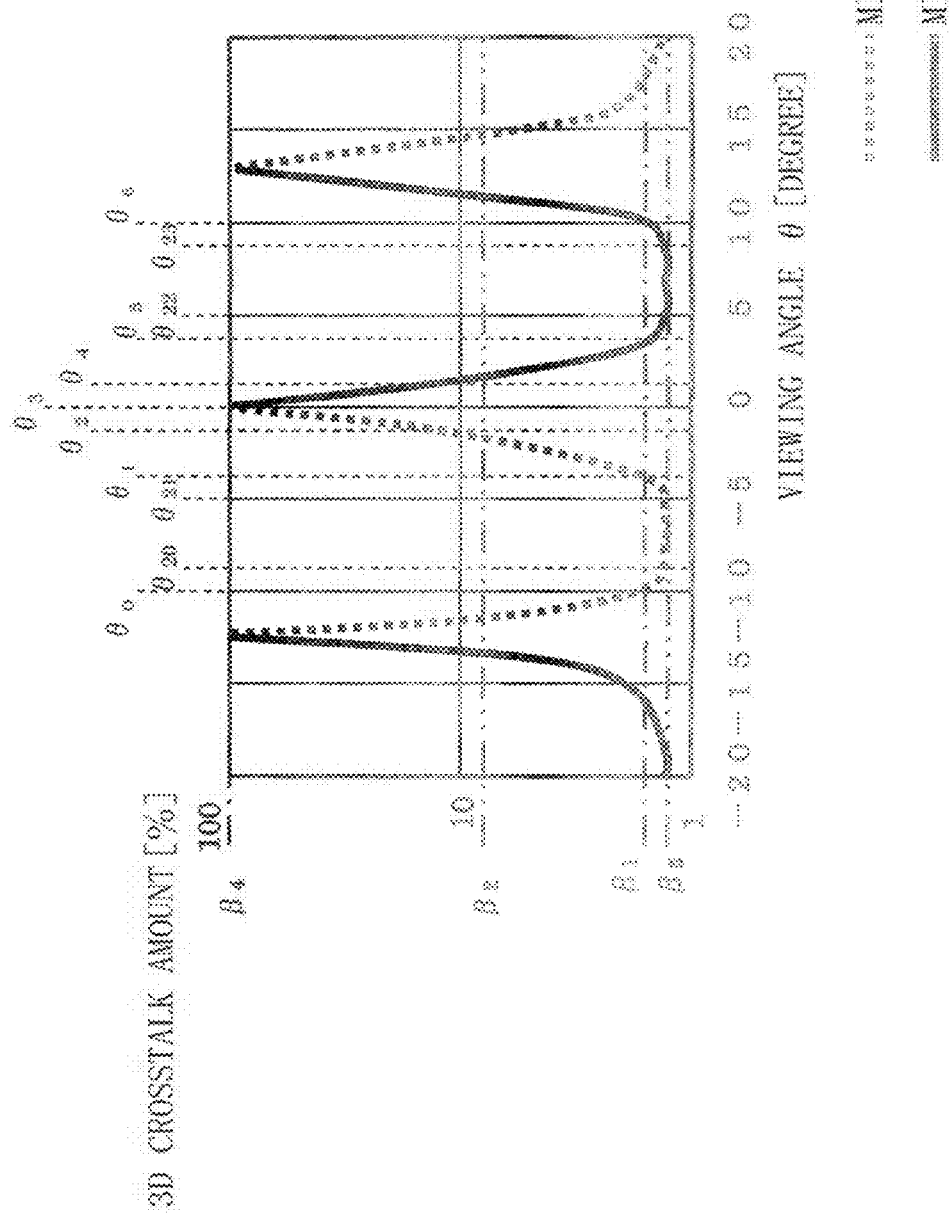
FIG. 37 is a relational chart showing the 3D crosstalk characteristic data of the stereoscopic image display device.

The parallax specific area identifying data saving unit 109 has a function which saves the data for identifying the area where the parallax value of the stereoscopic image content is not changed for the viewing angles θ but set as constant. As can be seen from FIG. 33 of the second exemplary embodiment, the parallax value of the stereoscopic image content is changed depending on the viewing angles θ even in the stereoscopic viewing space and the pseudoscopic viewing space when the shift speed of the relative position is fast. In the third exemplary embodiment, a specific space where the parallax value of the stereoscopic image content does not change but keeps a constant value even when the relative position is shifted is set in an arbitrary space within the stereoscopic viewing space and the pseudoscopic viewing space in order to display a stable stereoscopic image content even when the observer shifts the position. As an example for setting the specific space, 50% of the stereoscopic viewing space may be set as the specific space or the space equal to or less than the 3D crosstalk amount threshold value $\beta_5$ may be set as the specific space. FIG. 37 shows an example of the 3D crosstalk characteristic data. The viewing angle ranges of equal to or less than the 3D crosstalk amount threshold value $\beta_5$ are $\theta_{20}$ to $\theta_{21}$ and $\theta_{22}$ to $\theta_{23}$ from FIG. 37, and the viewing angle ranges are defined as the specific space.

The parallax adjustment processing unit 106 has a function which performs the parallax adjustment processing on the image data according to the parallax specific area identifying data acquired from the parallax specific area identifying data saving unit 109 and the parallax allowable value $u_{th}$ calculated by the parallax adjustment amount calculating unit 104. Note here that the parallax specific area identifying data is expressed as the viewing angle range $\theta_{20}$ to $\theta_{21}$. In this processing, the parallax adjustment maximum value $u_f$ of the stereoscopic image content is calculated after the parallax adjustment processing. In the first and second exemplary embodiments, the maximum value which satisfies the condition of the parallax allowable value $u_{th}$ and the condition of the content parallax maximum value $u_c$ is calculated as the parallax maximum value $u_f$ after the parallax adjustment processing. However, in the third exemplary embodiment, the parallax maximum value $u_f$ is calculated by adding the condition of the parallax specific area identifying data. As the condition of the parallax specific area identifying data, the following is added: the parallax allowable value $u_{th}$ at the viewing angle $\theta_{20}$ and the content parallax maximum value $u_c$ are compared; when the parallax allowable value $u_{th}$ is smaller, the parallax adjustment amount maximum value $\kappa_{th}$ is calculated from Formula (21); and the parallax adjustment amount is defined as equal to or less than the maximum value $\kappa_{th}$.

$$u_{th}(\theta_{20}) = \kappa_{th} u_c(\theta_{20}) \quad \text{Formula (21)}$$

Note here that $u_{th}(\theta_{20})$ shows the parallax allowable value $u_{th}$ when the viewing angle is $\theta_{20}$, and $u_c(\theta_{20})$ shows the content parallax maximum value $u_c$ of the content when the viewing angle is $\theta_{20}$.

Figure 38A:
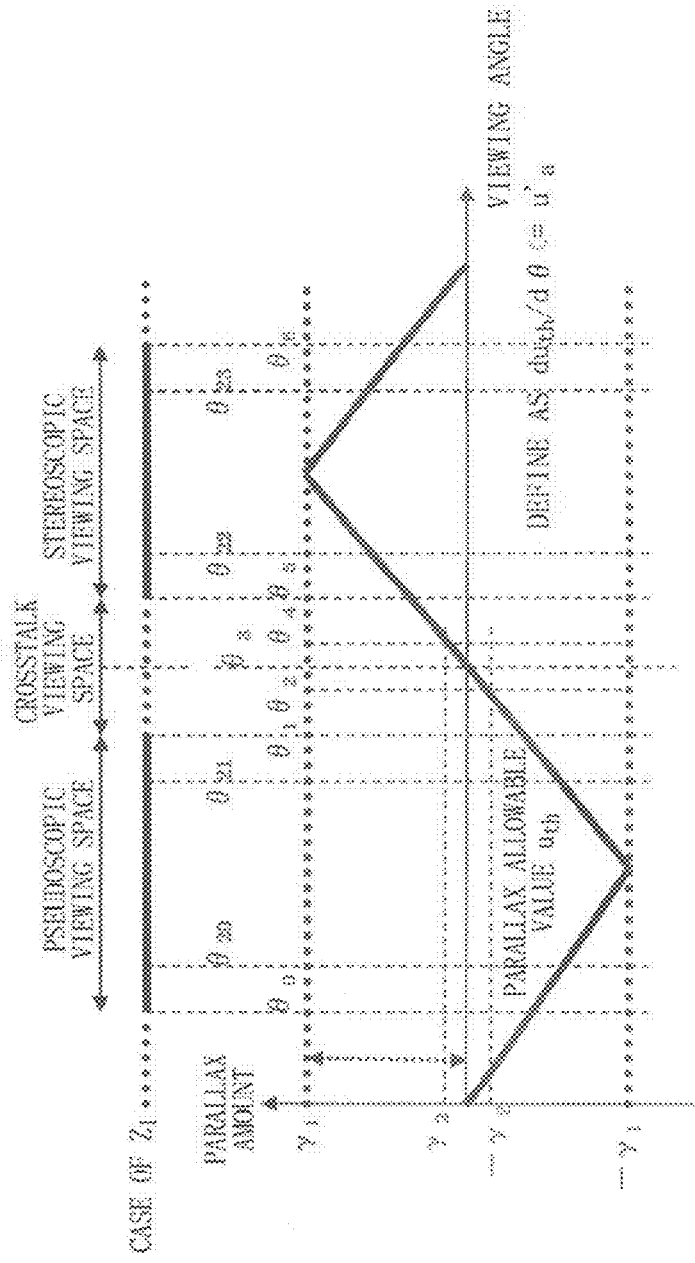
FIG. 38A is a chart showing parallax allowable values with respect to the viewing angles.
Figure 38C:
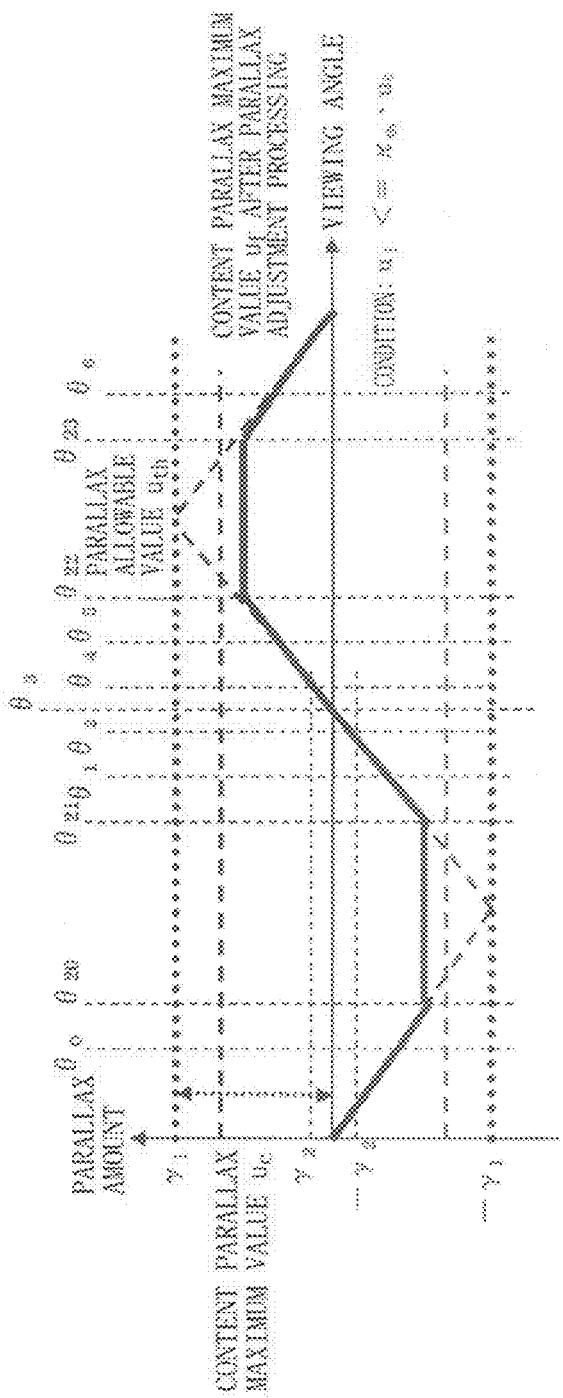
FIG. 38C is a chart showing parallax maximum values with respect to the viewing angles after performing parallax adjustment processing.

FIG. 38 shows the result acquired by calculating the parallax maximum value $u_f$ for the viewing angles after the parallax adjustment processing by adding the condition of the parallax specific area identifying data in a case where the relative position between the observing position of the observer and the stereoscopic display panel is shifted at a still faster speed. FIG. 38A shows the parallax allowable value $u_{th}$ with respect to the viewing angles, which is the same as FIG. 33 of the second exemplary embodiment. FIG. 38B shows the content parallax maximum value $u_c$ of the content. FIG. 38C shows the parallax maximum value $u_f$ after the parallax adjustment processing. Since the condition formula (22) where the parallax adjustment amount $\kappa$ is equal to or less than the parallax adjustment amount maximum value $\kappa_{th}$ is satisfied, the parallax maximum value $u_f$ after the parallax adjustment processing takes a constant parallax value in the viewing angle range $\theta_{20}$ to $\theta_{21}$ and the viewing angle range $\theta_{22}$ to $\theta_{23}$.

$$\kappa <= \kappa_{th} \quad \text{Formula (22)}$$

After calculating the parallax adjustment amount $\kappa$, the parallax adjustment processing of the LR image of the stereoscopic image content is performed by referring to the parallax adjustment amount $\kappa$ as in the case of the second exemplary embodiment.

As described above, the parallax value of the stereoscopic image content is decreased entirely since the parallax adjustment amount $\kappa$ is equal to or less than the parallax adjustment amount maximum value $\kappa_{th}$, so that the parallax adjustment processing can be performed in such a manner that the parallax value of the specific area identified by the parallax specific area identifying unit becomes constant. As in the case of the first exemplary embodiment, the third exemplary embodiment can naturally be applied to various kinds of naked-eye type stereoscopic image display devices such as the multi-viewpoint type and the integral type.

Figure 39:
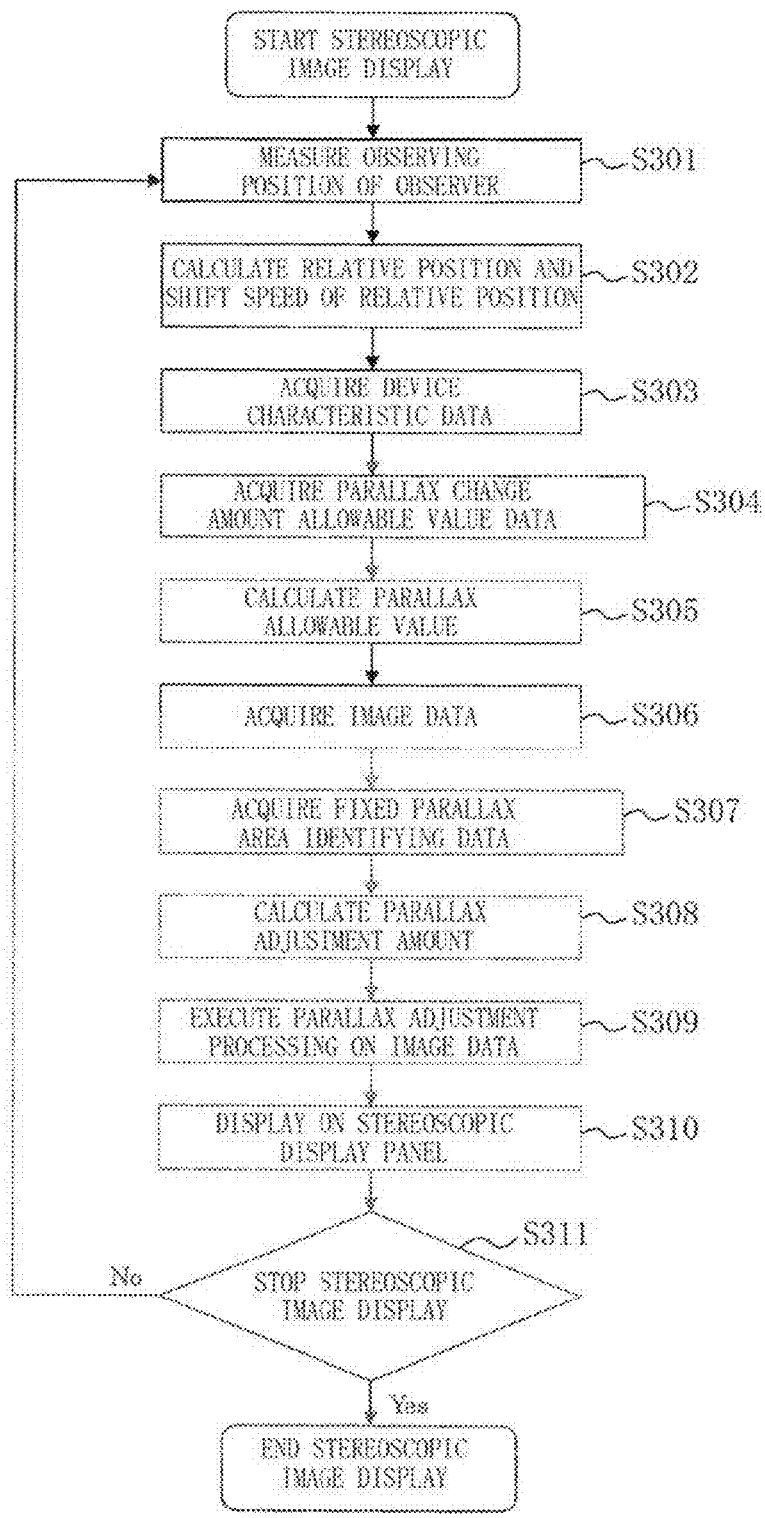
FIG. 39 is a flowchart of a stereoscopic image processing method.

A flowchart of the stereoscopic image processing method used in the stereoscopic image display device according to the third exemplary embodiment will be described by referring to FIG. 39.

Step S301 to step S306 are the same as those of the second exemplary embodiment.

In step S307, the parallax specific area identifying data is acquired from the parallax specific area identifying data saving unit 109. In step S307, as the parallax specific area characteristic data, the viewing angle range $\theta_{20}$ to $\theta_{21}$ and the viewing angle range $\theta_{22}$ to $\theta_{23}$ are identified as the parallax specific area.

In step S308, the parallax adjustment amount $\kappa$ is calculated from the parallax allowable value $u_{th}$ calculated in step S305, the parallax maximum value $u_c$ of the image data acquired in step S306, and the parallax specific area identifying data (the viewing angle range $\theta_{20}$ to $\theta_{21}$ and $\theta_{22}$ to $\theta_{23}$) acquired in step S307 by using the parallax adjustment amount calculating unit 104 and the parallax adjustment processing unit 106. First, the parallax adjustment amount maximum value $\kappa_{th}$ is calculated by using Formula (21) from the parallax allowable value $u_{th}(\theta_{20})$ at the viewing angle $\theta_{20}$ of the parallax specific area and the parallax maximum value $u_c$ of the image data. Then, the parallax allowable value $u_{th}$ and the parallax maximum value $u_c$ of the image data are compared. The parallax adjustment amount $\kappa$ is defined as 1 when the parallax allowable value $u_{th}$ is larger, and the parallax adjustment amount $\kappa$ is calculated from Formula (4) when the parallax maximum value $u_c$ is larger. At last, the parallax adjustment amount $\kappa$ is changed so that the parallax adjustment amount $\kappa$ becomes equal to or less than the parallax adjustment amount maximum value $\kappa_{th}$. In the manner described above, the parallax adjustment amount $\kappa$ is calculated.

In step S309, the parallax adjustment processing of the image data acquired in step S306 is performed by using the parallax adjustment processing unit 106 by referring to the parallax adjustment amount $\kappa$ calculated in step S308. In step S309, in a case where the parallax adjustment amount $\kappa$ calculated in step S308 is 1, the parallax value $u_c$ of the image data acquired in step S306 is changed to the parallax value $u_f$ of the image data on which the parallax adjustment processing is performed. In a case where the parallax adjustment amount $\kappa$ takes the value other than 1, the parallax value $u_f$ of the image data on which the parallax adjustment processing is performed is calculated by multiplying the parallax adjustment amount $\kappa$ to the parallax value $u_c$ of the image data (see FIG. 38C as an example). The image data on which the parallax adjustment processing is performed is generated from the image data acquired in step S306 by referring to the parallax value $u_f$ of the image data on which the parallax adjustment processing is performed.

In step S310, the image data on which the parallax adjustment processing is performed in step S309 is displayed on the stereoscopic display panel by using the stereoscopic display panel unit 107.

In step S311, whether to stop or to continuously execute the stereoscopic image display processing is set. When the power of the stereoscopic image display device is turned off or interruption of the stereoscopic image display is designated by the observer, the stereoscopic image display processing is stopped. When there is no event for stopping the stereoscopic image display processing, the stereoscopic image display processing is continuously executed. When the stereoscopic image display processing is stopped in step S311, the stereoscopic image display processing is ended. When the stereoscopic image display processing is executed continuously in step S311, the procedure is returned to the processing of step S301 to repeatedly execute the processing from step S301 to step S311.

As described above, it is possible to provide the stereoscopic image display device and the stereoscopic image processing method with which the issues of the CT-image and the pseudoscopic view by the 3D crosstalk are overcome so that a sense of discomfort is not felt by the observer even when the relative position between the observing position of the observer and the stereoscopic display panel is shifted at a still faster speed, through achieving parallax adjustment processing of a constant parallax value in an arbitrary area of a stereoscopic viewing space and a pseudoscopic viewing space and achieving the parallax adjustment processing smoothly in other spaces.

As in the case of the first exemplary embodiment, it is naturally possible with the stereoscopic image processing method of the third exemplary embodiment to shorten the calculation time of the stereoscopic image display processing greatly through saving the group of image data on which the parallax adjustment processing is performed with the parallax adjustment amount κ to the image data saving unit 105 in advance. Further, as in the case of the first exemplary embodiment, the third exemplary embodiment can be applied to various kinds of naked-eye type stereoscopic image display devices such as the multi-viewpoint type and the integral type. Naturally, it is possible to provide the image processing unit of the third exemplary embodiment as an individual image processing unit, and to achieve the function of the stereoscopic image display device in combination with the stereoscopic display panel unit.

In other words, the stereoscopic image display device according to the third exemplary embodiment includes: the observer position measuring unit which measures the observing position of the observer; the relative position calculating unit which calculates the relative position between the observing position of the observer and the position of the stereoscopic display panel and the relative position changing speed (the change amount of the relative position with respect to the time); the device characteristic data saving unit which saves the device characteristic data for the viewing angles of the stereoscopic display panel; the parallax change amount allowable value saving unit which saves the parallax change amount allowable value with respect to the time (the parallax change amount with which a sense of discomfort is not felt by the observer); the parallax adjustment amount calculating unit which calculates the optimum parallax adjustment amount suited for stereoscopic image display for the viewing angle based on the device characteristic data, the parallax change amount allowable value, and the relative position change amount; the parallax specific area identifying unit which identifies the spatial area where the parallax value is not changed but set as a constant value; the image data saving unit which saves or receives the image data; the parallax adjustment processing unit which performs the parallax adjustment processing on the image data according to the parallax adjustment amount and the parallax specific area information; and the stereoscopic display panel unit which projects the image data on which the parallax adjustment processing is performed to the right eye and the left eye according to the relative position.

According to the second exemplary embodiment, the parallax adjustment processing is performed gradually when the observing position of the observer is shifted at a fast speed. Thus, when the observing position of the observer is shifted at a still faster speed, the parallax value does not take a constant value but changes at all times. In order to overcome such issue, with the third embodiment, the parallax value held by the stereoscopic image content is decreased entirely in advance to perform the parallax adjustment processing to have the constant parallax value in the spatial area identified by the parallax specific area identifying unit. Thereby, the issues can be overcome through providing a stereoscopic image display device and a stereoscopic image processing method with which the issues of the CT-image and the pseudoscopic view by the 3D crosstalk are overcome so that a sense of discomfort is not felt by the observer even when the observing position of the observer is shifted at a still faster speed, through achieving parallax adjustment processing of a constant parallax value in the stereoscopic viewing space and performing the parallax adjustment processing smoothly.

Fourth Exemplary Embodiment

It is an exemplary object of a fourth exemplary embodiment to provide a stereoscopic image display device and a stereoscopic image processing method with which the influence of the CT-image and the pseudoscopic view by the 3D crosstalk is overcome so that a sense of discomfort is not felt by the observer, through performing parallax adjustment processing only on the image area where the influence of the CT-image by the 3D crosstalk appears and displaying a stereoscopic image by keeping the parallax value in the other image area.

Figure 40:
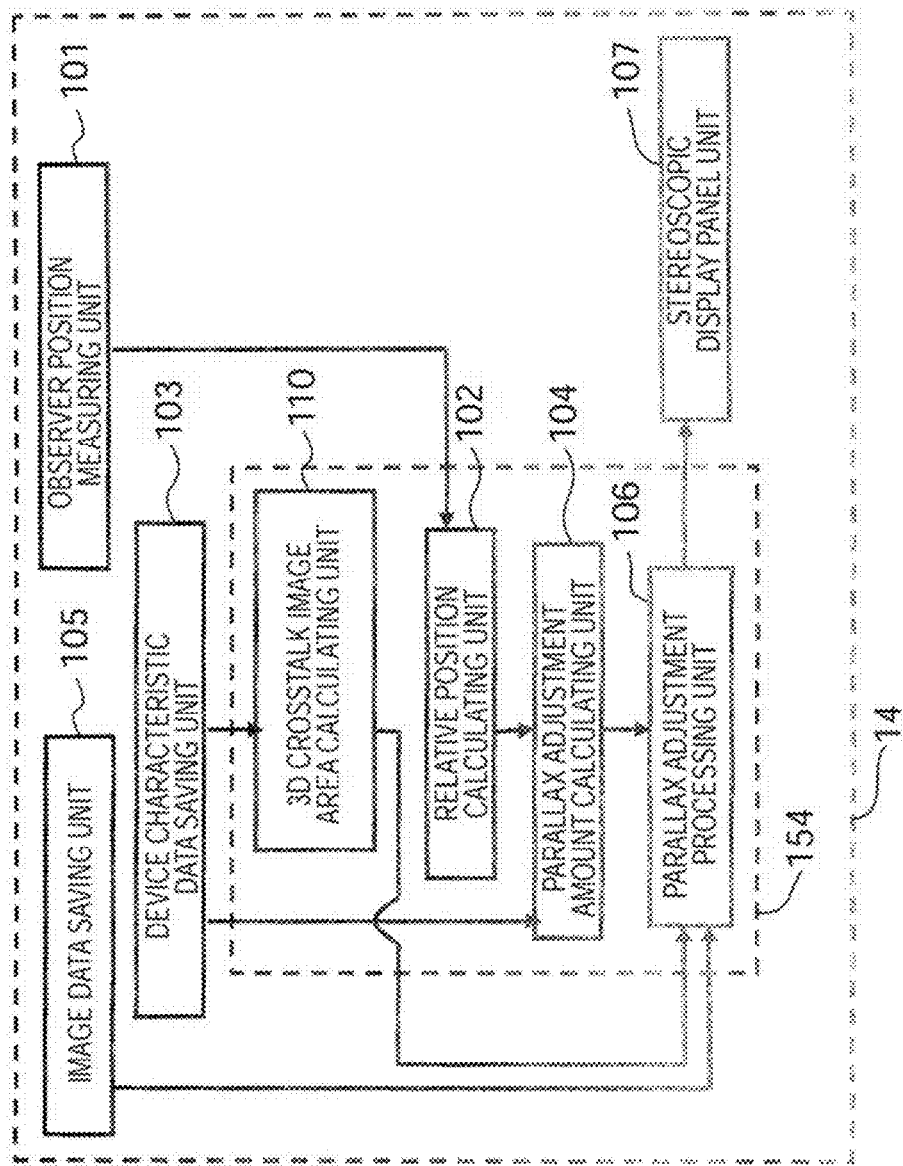
FIG. 40 is a block diagram of a stereoscopic image display device according to a fourth exemplary embodiment.

FIG. 40 shows a block diagram of a stereoscopic image display device 14. The stereoscopic image display device 14 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; and a 3D crosstalk image area calculating unit 110. Further, a processing unit that is an integration of the relative position calculating unit 102, the parallax adjustment amount calculating unit 104, the parallax adjustment processing unit 106, and the 3D crosstalk image area calculating unit 110 is referred to as an image processing unit 154. Hereinafter, functions of each unit included in the stereoscopic image display device 14 will be described. The functions of the observer position measuring unit 101, the relative position calculating unit 102, the device characteristic data saving unit 103, the parallax adjustment amount calculating unit 104, the image data saving unit 105, and the stereoscopic display panel unit 107 are the same as those of the first exemplary embodiment.

The 3D crosstalk image area calculating unit 110 has a function which calculates the image area where the CT-image by the 3D crosstalk appears. The image area where the CT-image by the 3D crosstalk appears changes depending on the relative position between the observing position of the observer and the stereoscopic display panel. The image area where the CT-image appears at an arbitrary relative position is determined based on the 3D crosstalk characteristic data that is saved in the device characteristic data saving unit 103 and an optical model.

Figure 41:
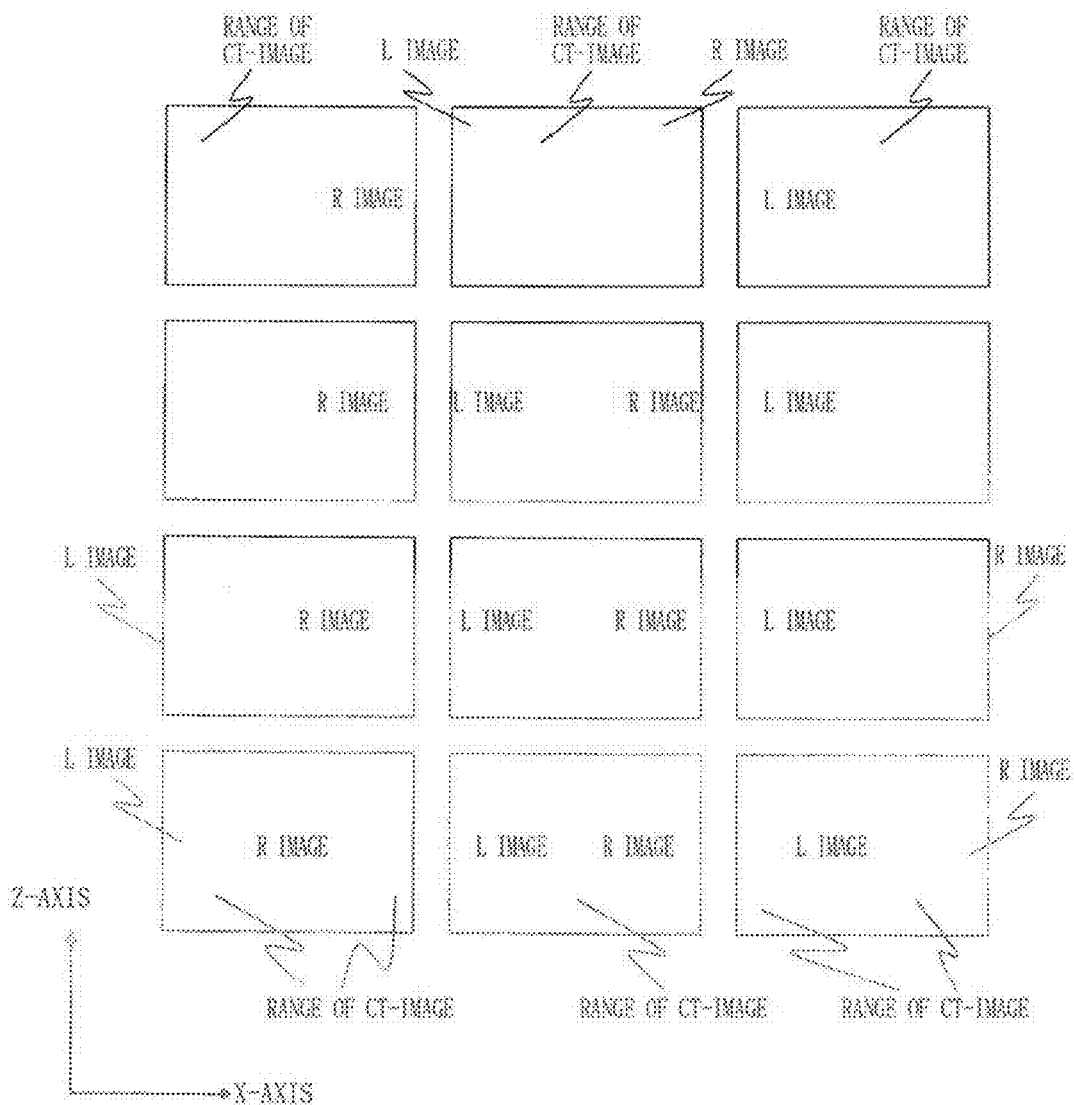
FIG. 41 shows illustrations of image areas where a CT-image appears at relative positions.

FIG. 41 shows examples of the image area where the CT-image appears at an arbitrary relative position. FIG. 41 shows the image information projected to the relative position when the relative position is shifted in the X-axis direction (see FIG. 3) and in the Z-axis direction within the 3D-crosstalk viewing space. When the relative position is shifted to the X-axis direction, the image area where the CT-image appears is also shifted to the X-axis direction accordingly. Further, when the relative position is shifted to the Z-axis direction, the image area where the CT-image appears is expanded accordingly.

The parallax adjustment processing unit 106 performs the parallax adjustment processing according to the image area calculated by the 3D crosstalk image area calculating unit 110. It is judged whether the R image, the L image, or a CT-image (CT-image) is projected to an arbitrary image area of the image information projected to the right eye and the left eye of the observer based on the positional information of the right eye and the left eye of the observer acquired from the relative position calculating unit 102 and the image area information calculated by the 3D crosstalk image area calculating unit 110. As a result of judgment, in the image area where the L image is projected to the left eye and the R image is projected to the right eye, the parallax values thereof are maintained.

In the image area where the CT-image is projected either to the right eye or the left eye, the parallax adjustment processing is performed as in the case of the first exemplary embodiment. In the image area where the R image is projected to the left eye and the L image is projected to the right eye, the parallax values are inverted. In the case where the R image or the L image is projected to both the right eye and the left eye, the parallax values are remained.

FIG. 42 shows an execution judgment table regarding the parallax adjustment processing corresponding to the types of the images (L image, R image, CT-image) projected to the right eye and the left eye of the observer. Regarding the display state of the stereoscopic image content, in the image area where the L image is projected to the left eye and the R image is projected to the right eye and the image area where the L image is projected to the right eye and the R image is projected to the left eye, the image can be displayed as a stereoscopic image. In the image area where a same image is projected to the left eye and the right eye, the image is displayed as a flat image. The other image areas are in an intermediate display state between the stereoscopic image and the flat image. The image area with a higher 3D crosstalk amount comes to be closer to a display state of a flat image, since the parallax value of the stereoscopic image content is decreased.

Figure 43:
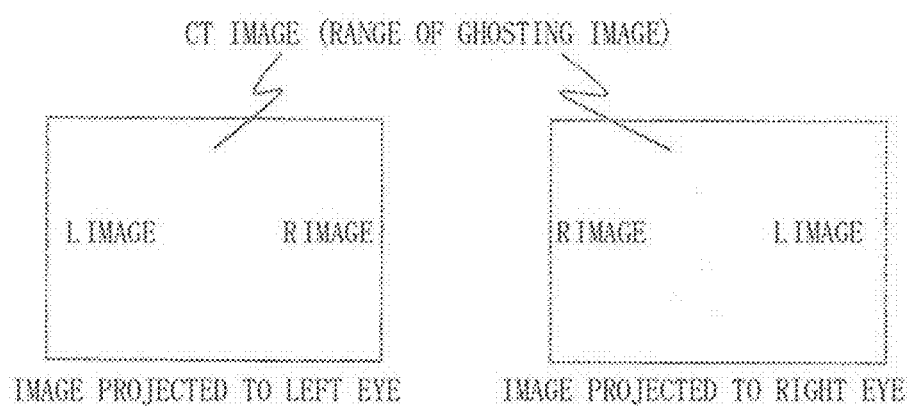
FIG. 43 shows illustrations of image displayed states projected to the right eye and left eye of an observer.

FIG. 43 shows examples of the image information projected to the right eye and the left eye of the observer. In FIG. 43, projected to the left eye of the observer is the L image in the left-side range of the image, the CT-image in the middle range, and the R image in the right-side range. Meanwhile, projected to the right eye of the observer is the R image in the right-side range of the image, the CT-image in the middle range, and the L image in the left-side range.

Figure 44:
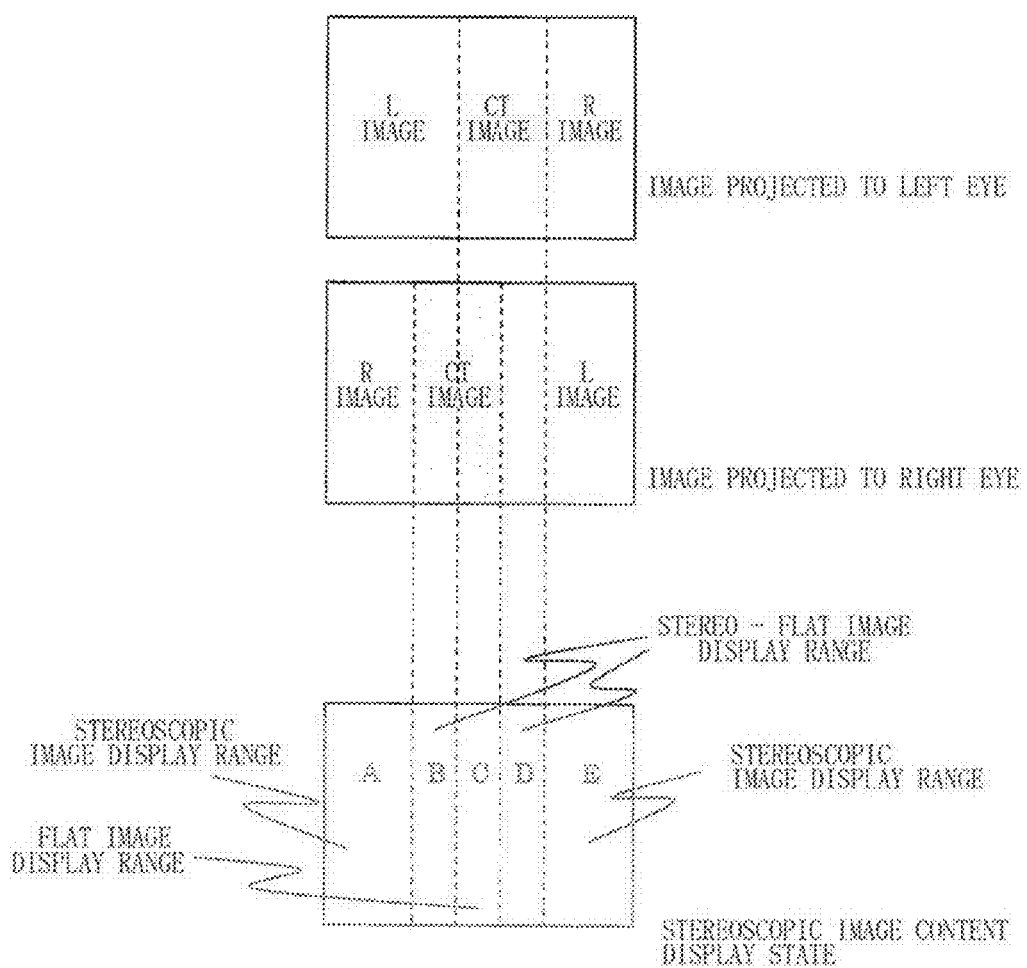
FIG. 44 shows image displayed states of stereoscopic image contents.

FIG. 44 shows image display states of a stereoscopic image content presented to the observer as a result of performing the parallax adjustment processing on the images projected in FIG. 43. In the left-side range (A of FIG. 44) of the image, the L image is projected to the left eye and the R image is projected to the right eye of the observer. Thus, the stereoscopic image is displayed without performing the parallax adjustment processing. In the left-side center range (B of FIG. 44) of the image, the L image is projected to the left eye and the CT-image is projected to the right eye of the observer. Thus, the parallax adjustment processing is performed, and the intermediate image between the stereoscopic image and the flat image is displayed. In the center range (C of FIG. 44) of the image, the CT-image is projected to the right eye and the left eye of the observer. Thus, the parallax adjustment processing is performed, so that a flat image is displayed. The display state of the right-side center range (D of FIG. 44) of the image is the same as that of the left-side center range (B of FIG. 44), and the right-side range (E of FIG. 44) of the image is the same as that of the left-side range (A of FIG. 44) of the image.

As described above, it is possible to overcome the issues of the CT-image and the pseudoscopic view by the 3D crosstalk through performing the parallax adjustment processing only on the image area where the influence of the CT-image and the pseudoscopic view by the 3D crosstalk appears and keeping the parallax value of the other image areas to display a stereoscopic image. As in the case of the first exemplary embodiment, the fourth exemplary embodiment can be applied to various kinds of naked-eye type stereoscopic image display devices such as the multi-viewpoint type and the integral type. Naturally, it is possible to provide the image processing unit of the fourth exemplary embodiment as an individual image processing unit, and to achieve the function of the stereoscopic image display device in combination with the stereoscopic display panel unit.

Further, in the actual stereoscopic display panel 107a, position shift within a prescribed precision is generated in the positional relation between a display panel 2 as the electro-optic module and a lenticular lens 3 as a light separating module (see FIG. 5, for example). In such case, a 3D crosstalk image area that is an oblique component as shown in FIG. 45 appears.

Figure 46A:
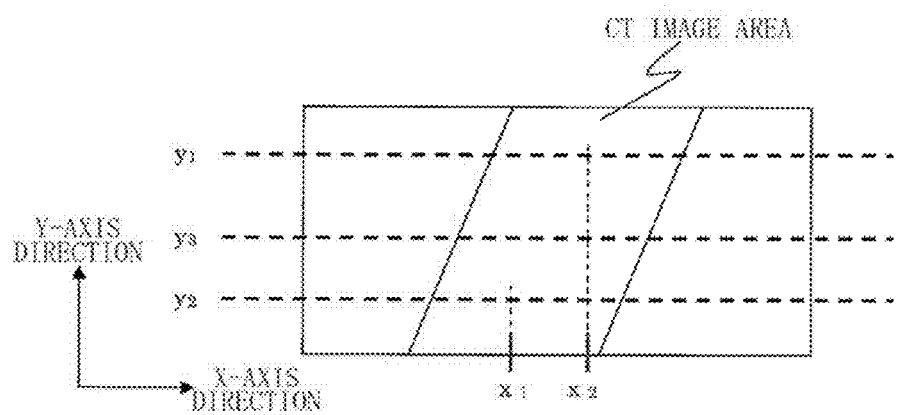
FIG. 46 is a relational chart of the image display states and the 3D crosstalk characteristic data, with FIG. 46A illustrating CT image area, FIG. 46B and FIG. 46C illustrating crosstalk amount for position $X_1$ and $X_2$.
Figure 46B:
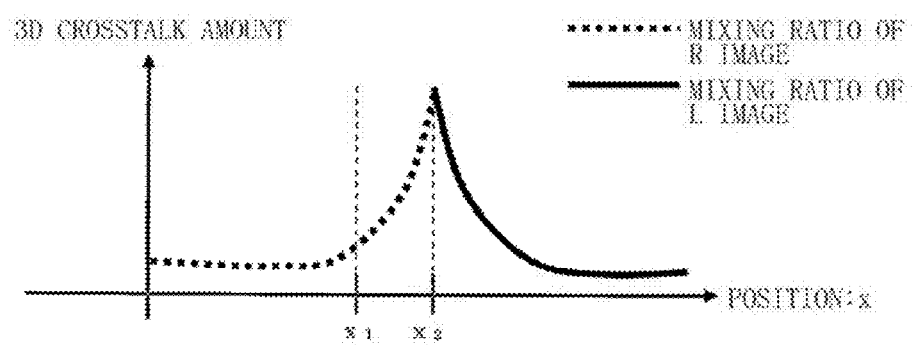
Figure 46C:
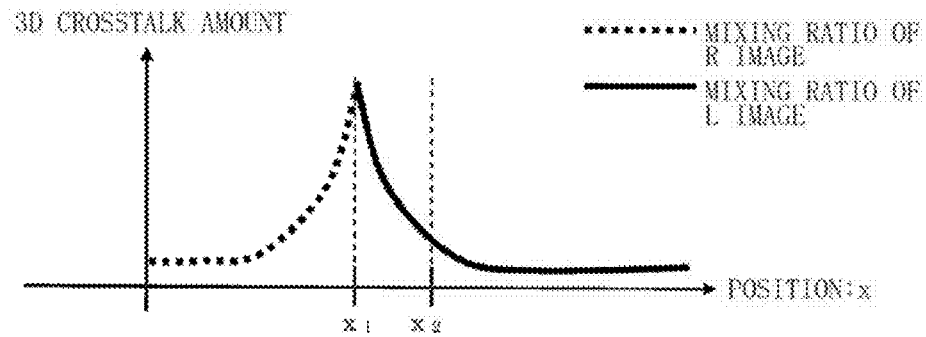

FIG. 46 shows relational charts between the image display state and the 3D crosstalk characteristic data of a case where rotary shift is generated between the electro-optic module and the light separating module. FIG. 46A shows the image display state where the 3D crosstalk image area of the oblique component appeared. FIG. 46B shows the 3D crosstalk characteristic data for the positions in the X-axis direction at the positions on $y_1$ line of FIG. 46A. FIG. 46C shows the 3D crosstalk characteristic data for the positions in the X-axis direction at the positions on $y_2$ line of FIG. 46A. From FIG. 46B and FIG. 46C, it can be seen that the 3D crosstalk characteristic data changes depending also on the positions in the Y-axis direction.

For calculating the parallax adjustment amount, the following first to third processing is executed. As the first processing, the positions in the X-axis direction at which the 3D crosstalk amount becomes the maximum on the three lines of the upper end (on the $y_1$ line of FIG. 46A), the center (on the $y_3$ line of FIG. 46A), and the lower end (on the $y_2$ line of FIG. 46A) of the stereoscopic display panel are detected (the position at $x_2$ when it is on the $y_1$ line of FIG. 46A, the position at $x_1$ when it is on the $y_2$ line of FIG. 46A), the slope of the 3D crosstalk image area of the oblique component is calculated from the detected positions in the X-axis direction.

As the second processing, the parallax adjustment amount for the position in the X-axis direction is calculated by the calculation method same as that of the first exemplary embodiment from the 3D crosstalk characteristic data in the center (on the $y_3$ line of FIG. 46A) of the stereoscopic display panel. While the parallax adjustment amount with respect to the viewing angle is calculated in the first exemplary embodiment, the parallax adjustment amount with respect to the position in the X-axis direction is calculated in the second processing instead of the viewing angle.

As the third processing, the parallax adjustment amount for the area other than the center of the stereoscopic display panel (other than the positions on the $y_3$ line of FIG. 46A) is calculated through shifting the parallax adjustment amount calculated by the second processing to the X-axis direction by referring to the slope of the 3D crosstalk image area calculated by the first processing. Through the above-described processing, it is possible to apply the proper parallax adjustment processing to the 3D crosstalk image area by calculating the parallax adjustment amount for all the positions on the stereoscopic display panel even when there is position shift generated between the display panel and the lenticular lens.

Figure 47:
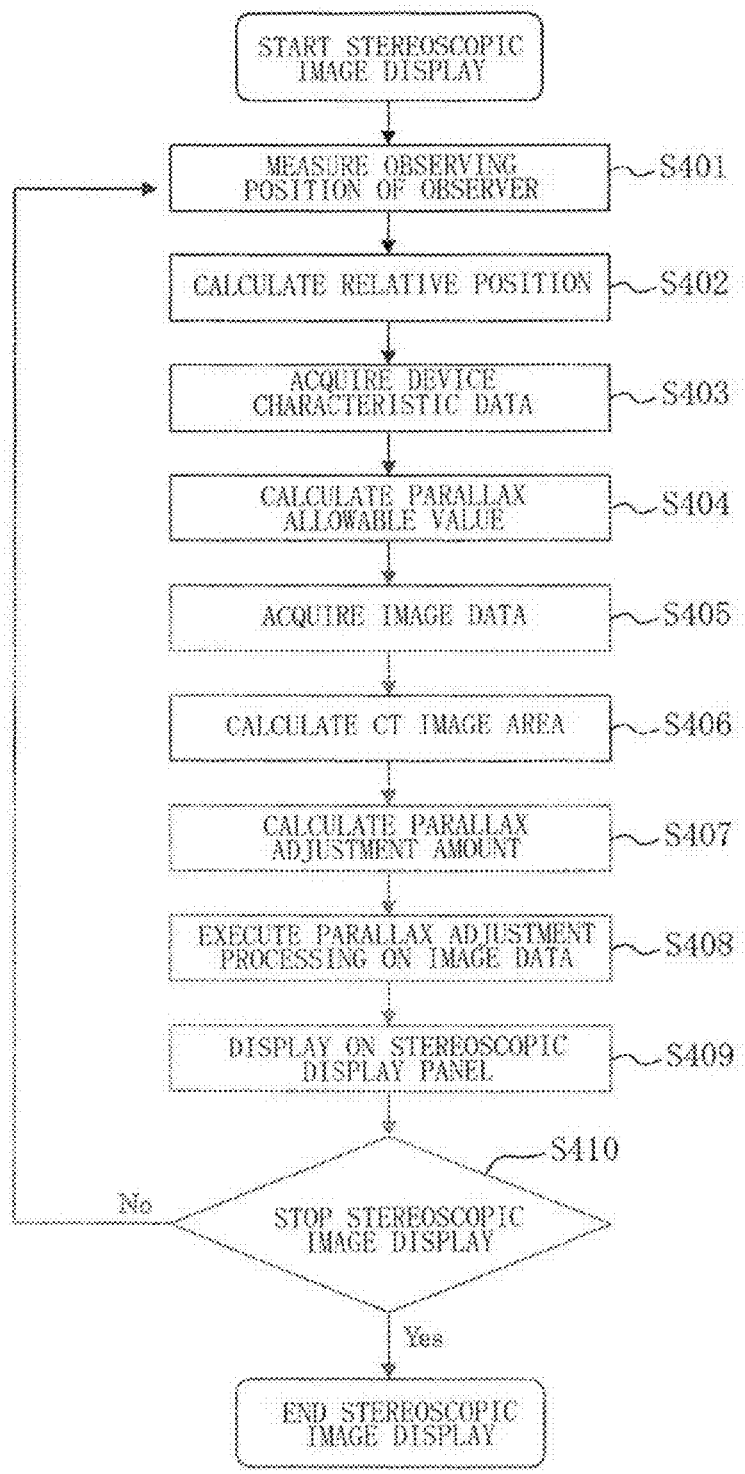
FIG. 47 is a flowchart of a stereoscopic image processing method.

A flowchart of the stereoscopic image processing method used in the stereoscopic image display device according to the fourth exemplary embodiment will be described by referring to FIG. 47. Step S401 to step S405 are the same as those of the first exemplary embodiment.

In step S406, the image area where the CT-image is projected to the right eye and the left eye of the observer is calculated by the relative position between the observer and the stereoscopic display panel (distance information $Z_1$ and the viewing angle information $\theta p$) calculated in step S402 from the device characteristic data acquired in step S403.

In step S407, the parallax adjustment amount κ of the image area calculated in step S406 is calculated from the parallax allowable value $u_{th}$ calculated in step S404 and the parallax maximum value $u_c$ of the image data acquired in step S405 by using the parallax adjustment amount calculating unit 104 and the parallax adjustment processing unit 106 as in the case of the first exemplary embodiment. Note here that the parallax maximum value $u_c$ of the image data used for calculating the parallax adjustment amount κ is the parallax maximum value of the image data within the image area calculated in step S406.

In step S408, the parallax adjustment processing of the image data acquired in step S405 is performed by using the parallax adjustment processing unit 106 by referring to the parallax adjustment amount κ calculated in step S407. In step S408, in a case where the parallax adjustment amount κ calculated in step S407 is 1, the parallax value $u_c$ of the image data acquired in step S405 is changed to the parallax value $u_f$ of the image data on which the parallax adjustment processing is performed. In a case where the parallax adjustment amount κ takes the value other than 1, the parallax value $u_f$ of the image data on which the parallax adjustment processing is performed is calculated by multiplying the parallax adjustment amount κ to the parallax value $u_c$ of the image data within the image area calculated in step S406. The image data on which the parallax adjustment processing is performed is generated from the image data acquired in step S405 by referring to the parallax value $u_f$ of the image data on which the parallax adjustment processing is performed.

In step S409, the image data on which the parallax adjustment processing is performed in step S408 is displayed on the stereoscopic display panel by using the stereoscopic display panel unit 107.

In step S410, whether to stop or to continuously execute the stereoscopic image display processing is set. When the power of the stereoscopic image display device 14 is turned off or interruption of the stereoscopic image display is designated by the observer, the stereoscopic image display processing is stopped. When there is no event for stopping the stereoscopic image display processing, the stereoscopic image display processing is continuously executed. When the stereoscopic image display processing is stopped in step S410, the stereoscopic image display processing is ended. When the stereoscopic image display processing is executed continuously in step S410, the procedure is returned to the processing of step S401 to repeatedly execute the processing from step S401 to step S410.

Through employing the above-described processing, it is possible to provide the stereoscopic image display device and the stereoscopic image processing method with which the issues of the CT-image and the pseudoscopic view by the 3D crosstalk are overcome so that a sense of discomfort is not felt by the observer, through performing parallax adjustment processing only on the image area where the influence of the CT-image and the pseudoscopic view by the 3D crosstalk appears and displaying a stereoscopic image by keeping the parallax value in the other image area.

As in the case of the first exemplary embodiment, it is naturally possible with the stereoscopic image processing method of the fourth exemplary embodiment to shorten the calculation time of the stereoscopic image display processing greatly through saving the group of image data on which the parallax adjustment processing is performed with the parallax adjustment amount κ in advance in the image data saving unit 105.

In other words, the stereoscopic image display device according to the fourth exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the viewing angles of the stereoscopic display panel; the 3D crosstalk image area calculating unit which calculates the image area where a CT-image by the 3D crosstalk appears from the device characteristic data; the parallax adjustment amount calculating unit which calculates the optimum parallax adjustment amount suited for stereoscopic image display for the viewing angle based on the device characteristic data; the image data saving unit which saves or receives the image data; the parallax adjustment processing unit which performs the parallax adjustment processing on the image data according to the parallax adjustment amount and the image area of the 3D crosstalk; and the stereoscopic display panel unit which projects the image data on which the parallax adjustment processing is performed to the right eye and the left eye according to the relative position.

The fourth exemplary embodiment makes it possible to overcome the issues by providing the stereoscopic image display device and the stereoscopic image processing method with which the issues of the CT-image and the pseudoscopic view by the 3D crosstalk are overcome so that a sense of discomfort is not felt by the observer, through performing parallax adjustment processing only on the image area where the influence of the CT-image and the pseudoscopic view by the 3D crosstalk appears and displaying a stereoscopic image by keeping the parallax value in the other image area.

Fifth Exemplary Embodiment

It is an exemplary object of a fifth exemplary embodiment to provide a stereoscopic image display device and a stereoscopic image processing method with which the issues of the CT-image and the pseudoscopic view by the 3D crosstalk are overcome so that a sense of discomfort is not felt by the observer, through performing parallax adjustment processing without giving a sense of discomfort to the observer even when the observer gives a command for adjusting the parallax manually.

Figure 48:
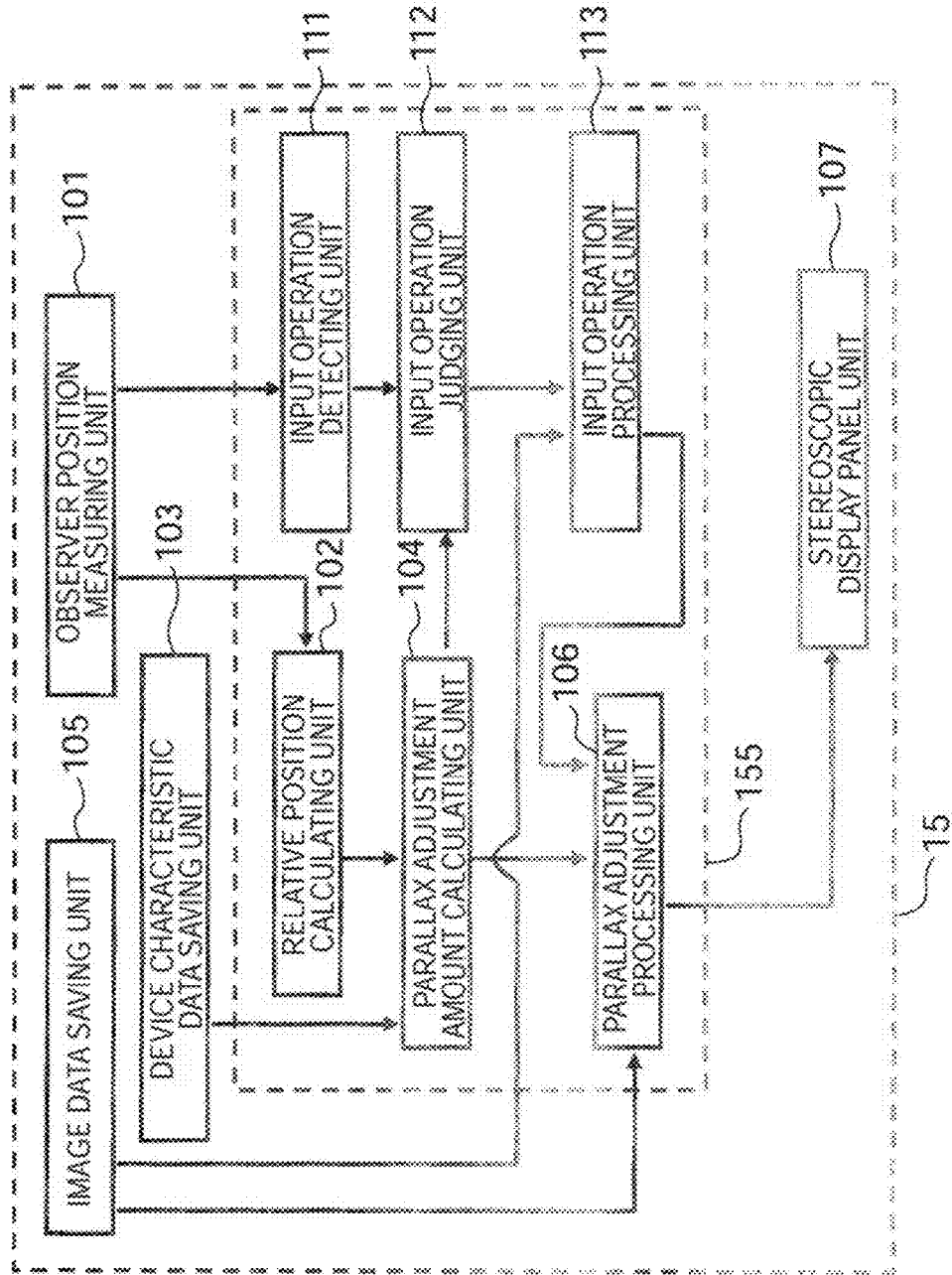
FIG. 48 is a block diagram of a stereoscopic image display device according to a fifth exemplary embodiment.

FIG. 48 shows a block diagram of a stereoscopic image display device 15. The stereoscopic image display device 15 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; a parallax change amount allowable value data saving unit 108; an input operation detecting unit 111; an input operation judging unit 112; and an input operation processing unit 113. Further, a processing unit that is an integration of the relative position calculating unit 102, the parallax adjustment amount calculating unit 104, the parallax adjustment processing unit 106, the input operation detecting unit 111, the input operation judging unit 112, and the input operation processing unit 113 is referred to as an image processing unit 155.

Hereinafter, functions of each unit included in the stereoscopic image display device 15 will be described. The functions of the observer position measuring unit 101, the relative position calculating unit 102, the device characteristic data saving unit 103, the parallax adjustment amount calculating unit 104, the image data saving unit 105, the parallax adjustment processing unit 106, and the stereoscopic display panel unit 107 are the same as those of the first exemplary embodiment.

The input operation detecting unit 111 has a function which detects input operations of the observer. Examples of the input operations are a button operation, a touch panel operation, a gesture operation, and the like. With the button operation, the observer operates a button or a dial placed on the stereoscopic image display device 15 to give an input command. With the touch panel operation, the observer touches a selected button area displayed on the screen of the stereoscopic display panel to give an input command.

Figure 49:
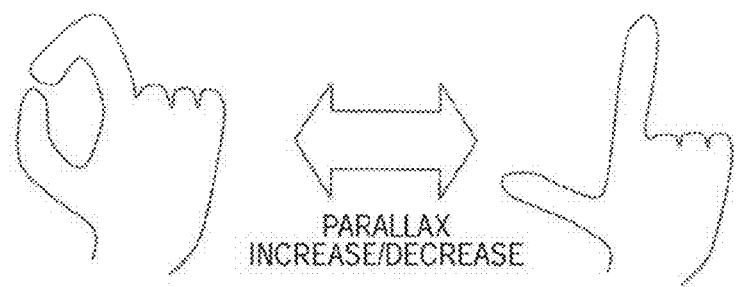
FIG. 49 shows an illustration showing a gesture operation which increases the parallax by spreading hand fingers.

With the gesture operation, the observer gives an input command by using an arbitrary gesture in front of a camera of the observer position measuring unit 101. When detecting the input operation of the gesture operation, contour information of the observer is searched first from the image of the observer captured by the camera. When searching the contour information, edge information is extracted from the luminance value of the image, and the contour information is searched from the edge information (the edge information may be extracted from the distance value (Z value)). The parts of hands, face, and body are detected from the contour information of the observer, and it is detected that the observer has given a command of an input operation when the shift of the hands and the positional information of the hands, the face, and the body satisfy an arbitrary condition. An example of the arbitrary condition may be defined as follows: when the observer spreads up or tightens the fingers of the hands at a distance within 50 cm from the stereoscopic display panel, it is detected as an input command for the parallax adjustment (FIG. 49). The parallax maximum value $u_{cj}$ set to the stereoscopic image content is inputted according to the amount the observer spreads the finger.

As a method for detecting the parts of the hands, the face, and the body from the contour information, there is a method which saves the contour shapes as the parts of the hands, the face, the body in advance as template data, and compares the contour shape searched from the image with the template data to detect the parts of the hands, the face, and the body from the image. Further, it is also possible to verify whether or not the detected part is a mis-detection by comparing the positional relation of the detected parts with the human body structure. A detecting function of such gesture operations can be easily mounted by using an open source library, namely OpenNI, for example.

With the gesture operation, the input can be detected by using the camera of the observer position measuring unit 101. Thus, compared with the button operation and the touch panel operation, the cost thereof can be suppressed low since it is unnecessary to add the components. The input operation judging unit 112 has a function which judges the input operation of the observer. With an input operation judgment, it is judged whether or not the parallax maximum value $u_{cj}$ set to the stereoscopic image content input-operated by the observer by the input operation detecting unit 111 is within the range of the parallax allowable value $u_{th}$ calculated by the parallax adjustment amount calculating unit 104 (Formula (30)).

$$u_c <= u_{th}$$ Formula (30)

Figure 50:
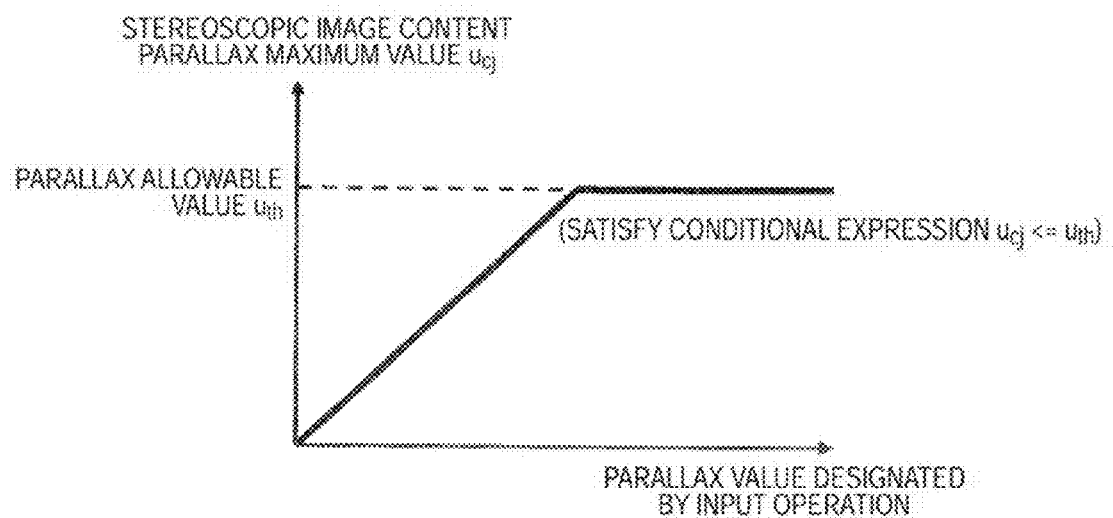
FIG. 50 is a chart showing parallax maximum values of a stereoscopic image content according to input operations.

When the input-operated parallax maximum value $u_{cj}$ satisfies Formula (30), the parallax maximum value $u_{cj}$ is maintained. When the parallax maximum value $u_{cj}$ does not satisfy Formula (30), it is so set that the parallax maximum value $u_{cj}$ becomes equivalent to the parallax allowable value $u_{th}$ (FIG. 50).

The input operation processing unit 113 has a function which performs processing of the input operation done by the observer. With the input operation processing, the parallax maximum value $u_c$ of the stereoscopic image content is changed so that the parallax maximum value $u_c$ of the stereoscopic image content acquired from the image data saving unit 105 becomes equivalent to the parallax maximum value $u_{cj}$ that is input-operation-judged by the input operation judging unit 112. Through transmitting the changed parallax maximum value $u_c$ of the stereoscopic image content to the parallax adjustment processing unit 106, the parallax adjustment processing of the image data is performed.

Figure 51A:
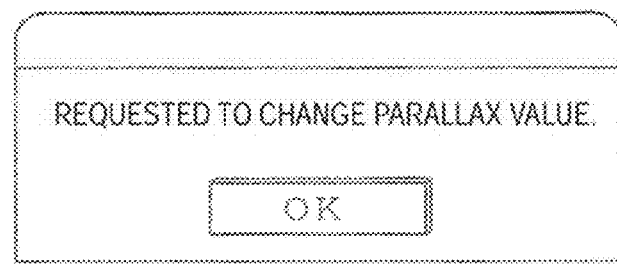
FIG. 51 is an illustration showing a notification screen of an input operation, with FIG. 51A illustrating a screen indicating a request to change parallax value, and FIG. 51B illustrating a screen illustrating that parallax value cannot increase.
Figure 51B:
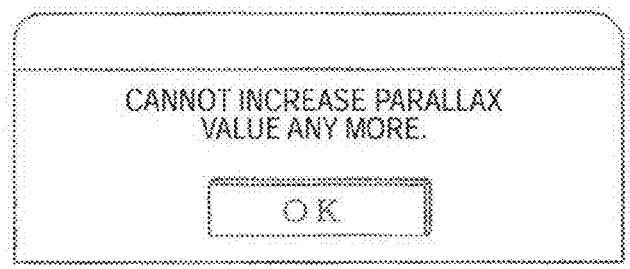

The input operation processing unit 113 may display on the stereoscopic display panel the fact that the input operation of the observer is detected in order to improve the usability. FIG. 51 shows an example of a notification screen to be displayed. FIG. 51A is an example of a notification screen displayed when the parallax value is changed by the input operation of the observer. FIG. 51B shows an example of a notification screen displayed when the parallax value indicated by the input operation of the observer is equal to or larger than the parallax allowable value.

Figure 52:
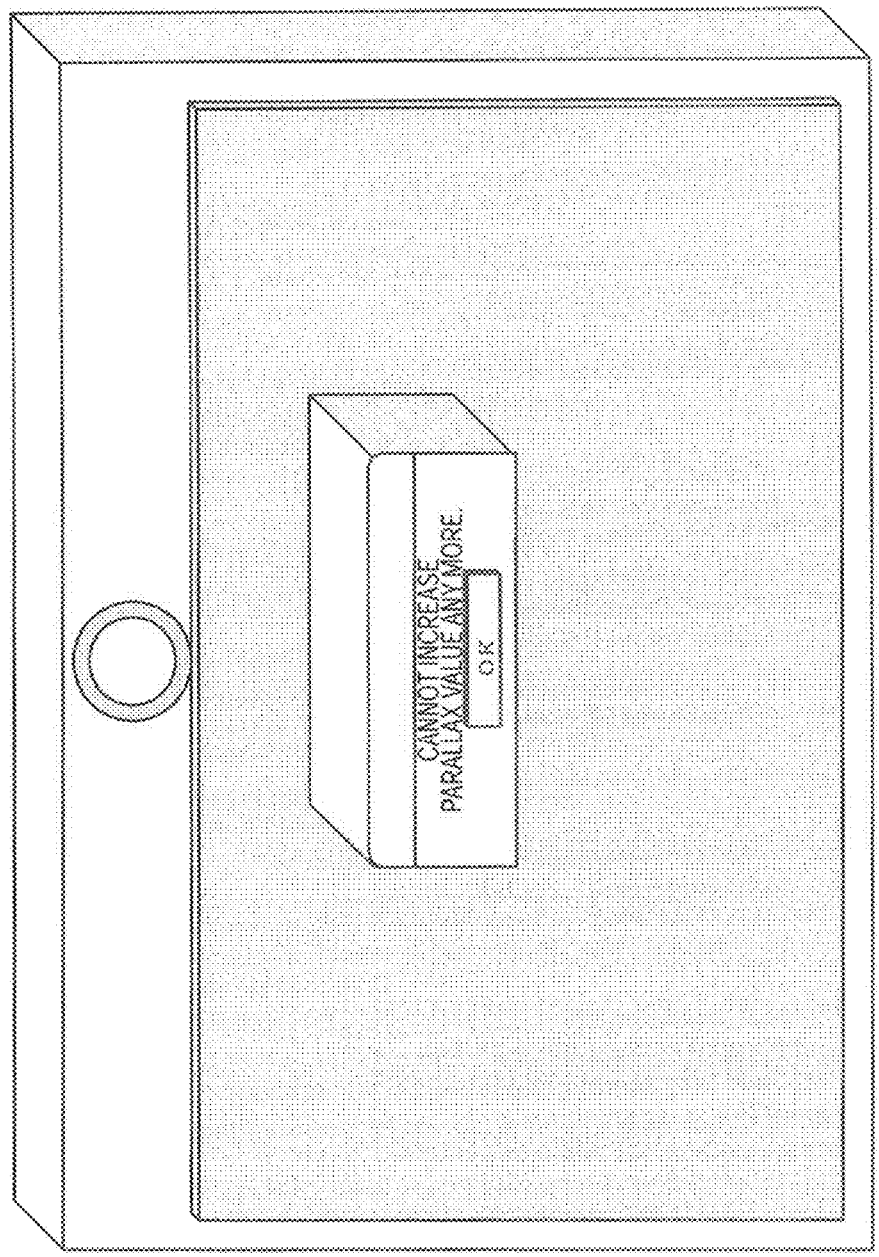
FIG. 52 is an illustration showing a notification screen displayed on a stereoscopic display panel.
Figure 53:
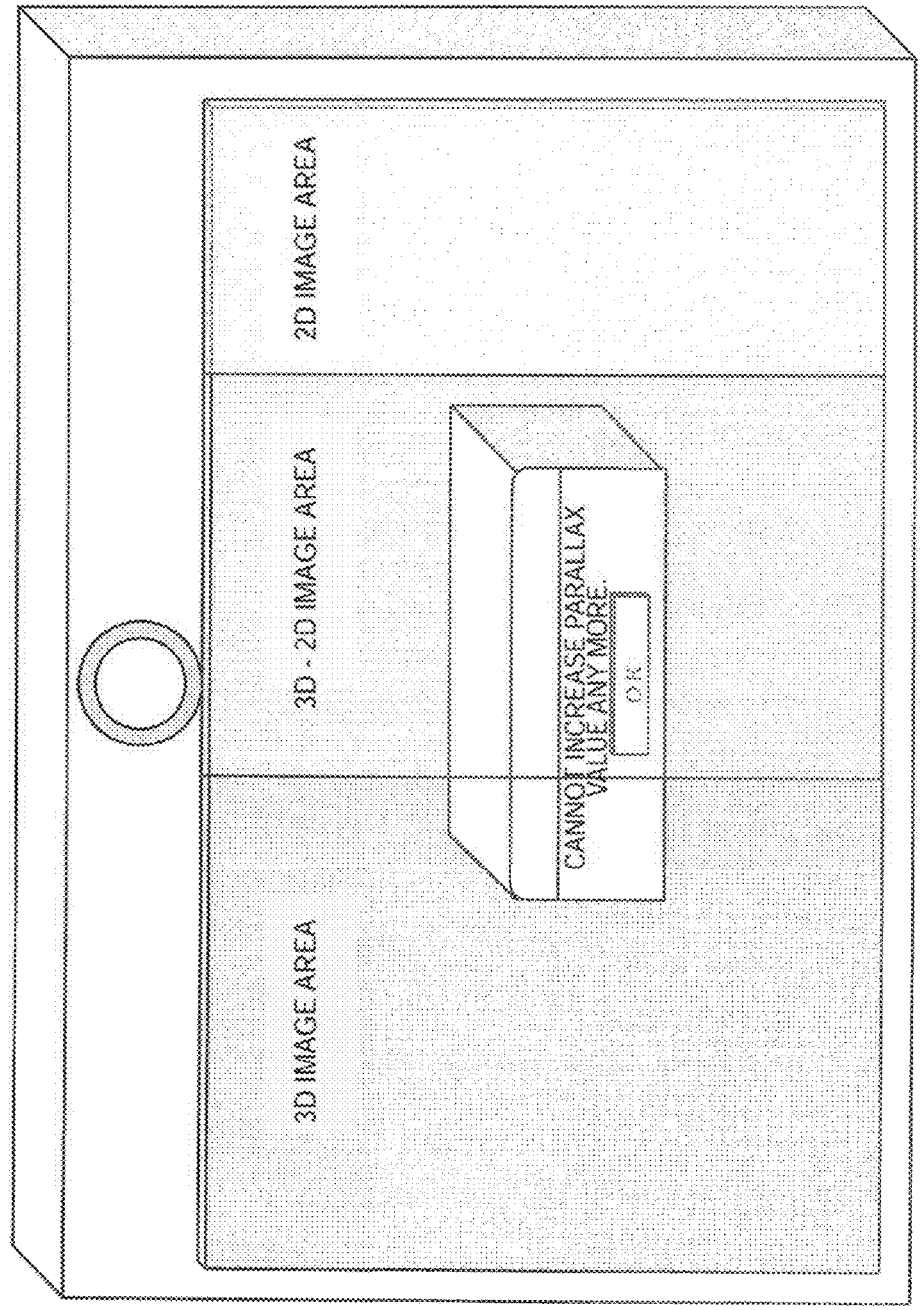
FIG. 53 is an illustration showing a notification screen displayed on a stereoscopic display panel.
Figure 54:
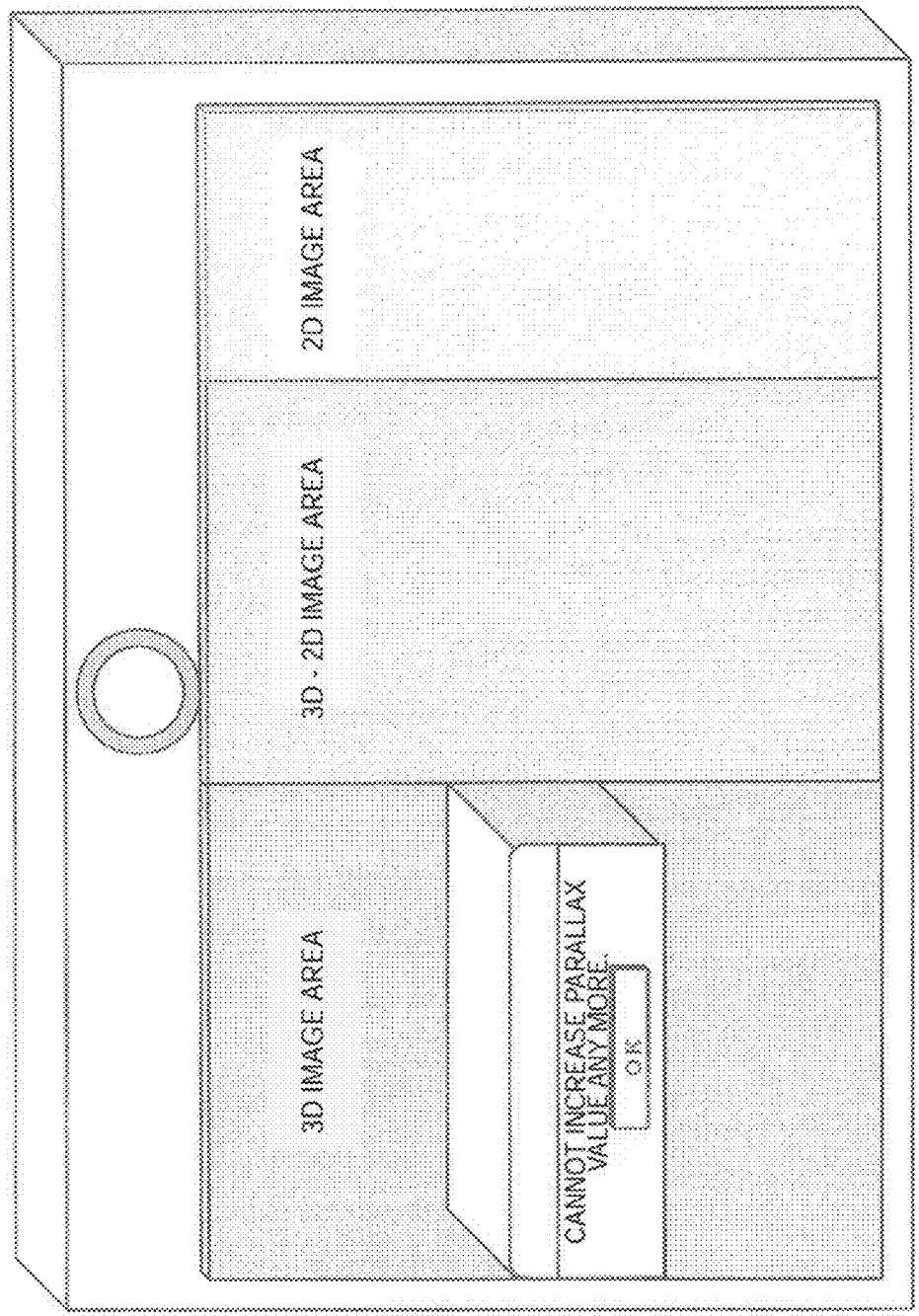
FIG. 54 is an illustration showing a notification screen displayed on a stereoscopic display panel.

When displaying the notification screen on the stereoscopic display panel in general, the parallax value of the notification screen is increased so that the notification screen is displayed by being popped up from the stereoscopic display panel in order for the notification screen to be conspicuous (FIG. 52). However, when the parallax adjustment processing according to the fourth exemplary embodiment is performed, the parallax value is decreased by the parallax adjustment processing depending on the area of the screen. Thus, there is an area of the screen where the notification screen cannot be popup-displayed. Therefore, regarding the display position of the notification screen, it is desirable to display it by avoiding the image area where the parallax is decreased by the parallax adjustment processing. FIG. 53 and FIG. 54 show examples of the display position of the notification screen. FIG. 53 is an example where the notification screen is displayed in the center as in the case of FIG. 52. In FIG. 53, the right side of the notification screen is displayed in the image area where the parallax is decreased by the parallax adjustment processing (display range from stereoscopic image to flat image). Thus, the popup amount of the notification screen is decreased, so that the notification screen becomes inconspicuous. Therefore, in FIG. 54, the display position of the notification screen is shifted to the left side to display the notification screen in the area where the stereoscopic image can be displayed so as to popup-display the notification screen to be conspicuous.

As described above, it is possible to provide the stereoscopic image display device and the stereoscopic image processing method with which the issues of the CT-image and the pseudoscopic view by the 3D crosstalk are overcome so that a sense of discomfort is not felt by the observer, through making it possible to perform parallax adjustment of the stereoscopic image content according to the input operation of the observer and setting the parallax value to be equal to or less than the parallax allowable value $u_c$ when the parallax value of equal to or larger than the parallax allowable value $u_c$ is inputted.

As in the case of the first exemplary embodiment, the fifth exemplary embodiment can be applied to various kinds of naked-eye type stereoscopic image display devices such as the multi-viewpoint type and the integral type. Naturally, it is possible to provide the image processing unit of the fifth exemplary embodiment as an individual image processing unit, and to achieve the function of the stereoscopic image display device in combination with the stereoscopic display panel unit.

Figure 55:
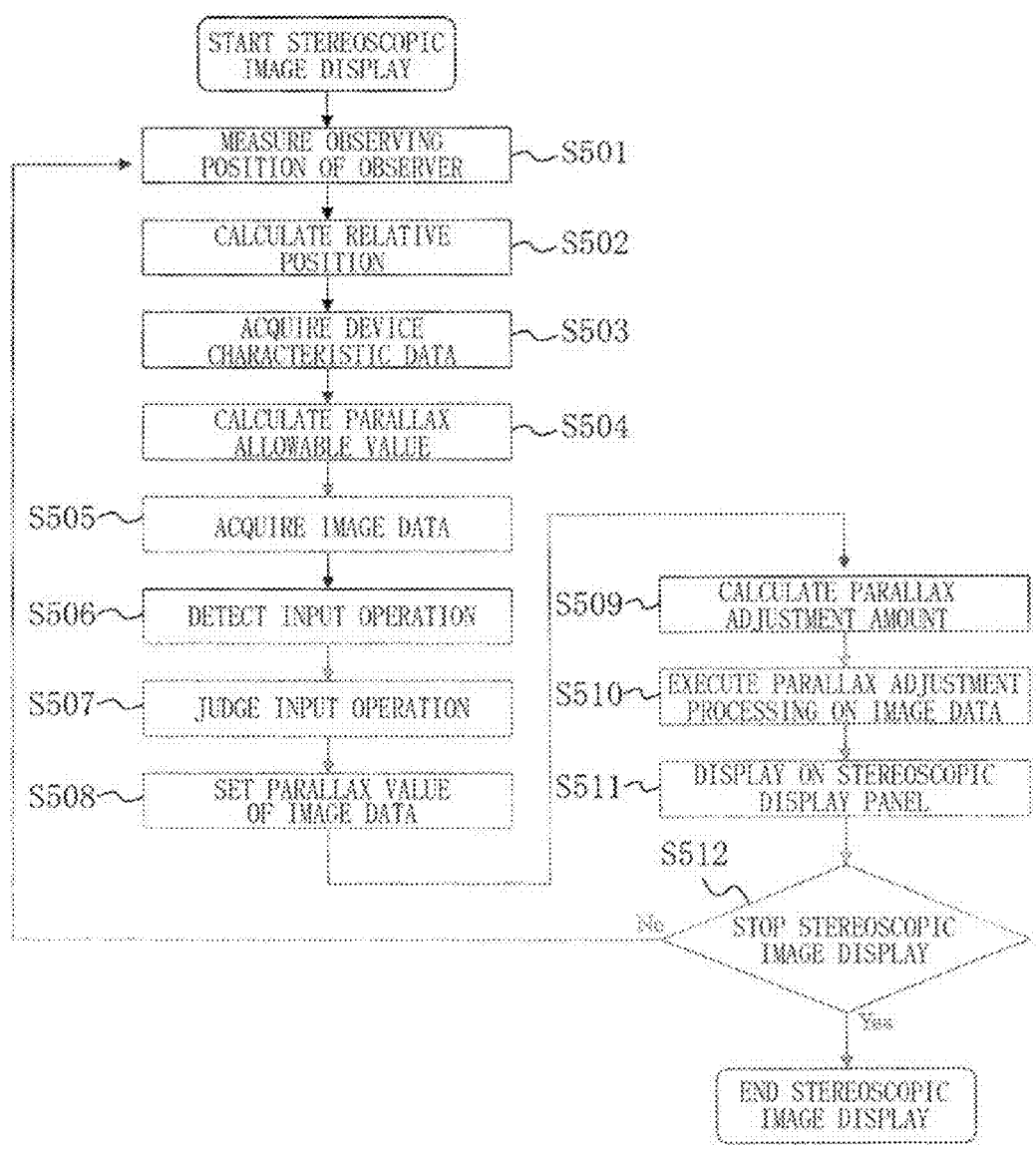
FIG. 55 is a flowchart of a stereoscopic image processing method.

A flowchart of the stereoscopic image processing method used in the stereoscopic image display device according to the fifth exemplary embodiment will be described by referring to FIG. 55. In step S501 to step S505, the same processing as that of the first exemplary embodiment is performed.

In step S506, the gesture of the observer is detected by using the input operation detecting unit 111 from the image captured in step S501, and the parallax maximum value $u_{cj}$ indicated by the observer is inputted.

In step S507, it is judged by using the input operation judging unit 112 whether the parallax maximum value $u_{cj}$ inputted in step S506 is equal to or smaller than the parallax allowable value $u_{th}$ calculated in step S504. When the parallax maximum value $u_{cj}$ inputted in step S506 is equal to or larger than the parallax allowable value $u_{th}$, the parallax maximum value $u_{cj}$ is changed to the value equivalent to the parallax allowable value $u_{th}$.

In step S508, the parallax maximum value $u_{cj}$ judged in step S507 is substituted to the parallax maximum value $u_c$ of the image data acquired in step S505.

In step S509, the parallax adjustment amount is calculated by using the parallax adjustment amount calculating unit 104 from the parallax allowable value calculated in step S504 and the parallax maximum value of the image data substituted in step S508. For example, in step S509, the parallax adjustment amount κ is calculated from the parallax allowable value $u_{th}$ calculated in step S504 and the parallax maximum value $u_c$ of the image data acquired in step S508 by using the parallax adjustment amount calculating unit 104 and the parallax adjustment processing unit 106. In step S509, the parallax allowable value $u_{th}$ and the parallax maximum value $u_c$ of the image data are compared. The parallax adjustment amount κ is defined as 1 when the parallax allowable value $u_{th}$ is larger, and the parallax adjustment amount κ is calculated from Formula (4) when the parallax maximum value $u_c$ is larger.

In step S510, the parallax adjustment processing of the image data acquired in step S505 is performed by using the parallax adjustment processing unit 106 by referring to the parallax adjustment amount calculated in step S509. For example, in step S510, the parallax adjustment processing of the image data acquired in step S505 is performed by using the parallax adjustment processing unit 106 by referring to the parallax adjustment amount κ calculated in step S509. In step S510, the parallax value $u_f$ of the image data on which the parallax adjustment processing is performed is calculated by multiplying the parallax adjustment amount κ to the parallax value $u_c$ of the image data. The image data on which the parallax adjustment processing is performed is generated from the image data acquired in step S505 by referring to the parallax value $u_f$ of the image data on which the parallax adjustment processing is performed.

In step S511, the image data on which the parallax adjustment processing is performed in step S510 is displayed on the stereoscopic display panel by using the stereoscopic display panel unit 107.

In step S512, whether to stop or to continuously execute the stereoscopic image display processing is set. When the power of the stereoscopic image display device 15 is turned off or interruption of the stereoscopic image display is designated by the observer, the stereoscopic image display processing is stopped. When there is no event for stopping the stereoscopic image display processing, the stereoscopic image display processing is continuously executed. When the stereoscopic image display processing is stopped in step S512, the stereoscopic image display processing is ended. When the stereoscopic image display processing is executed continuously in step S512, the procedure is returned to the processing of step S501 to repeatedly execute the processing from step S501 to step S512.

As described above, it is possible to provide the stereoscopic image display device and the stereoscopic image processing method with which the observer can adjust the parallax of the stereoscopic image content so that the issues of the CT-image and the pseudoscopic view by the 3D crosstalk are overcome and a sense of discomfort is not felt by the observer even when the observer gives a command for adjusting the parallax manually.

As in the case of the first exemplary embodiment, it is naturally possible with the stereoscopic image processing method of the fifth exemplary embodiment to shorten the calculation time of the stereoscopic image display processing greatly through saving the group of image data on which the parallax adjustment processing is performed with the parallax adjustment amount κ in advance in the image data saving unit 105.

In other words, the stereoscopic image display device according to the fifth exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the viewing angles of the stereoscopic display panel; the parallax adjustment amount calculating unit which calculates the optimum parallax adjustment amount suited for stereoscopic image display for the viewing angle based on the device characteristic data; the image data saving unit which saves or receives the image data; the parallax adjustment processing unit which performs the parallax adjustment processing on the image data according to the parallax adjustment amount; the stereoscopic display panel unit which projects the image data on which the parallax adjustment processing is performed to the right eye and the left eye according to the relative position; the input operation detecting unit which detects the input operation of the observer; the input operation judging unit which judges the input operation of the observer; and the input operation processing unit which performs the processing of the input operation done by the observer (e.g., setting the parallax adjustment of the stereoscopic image content manually).

The fifth exemplary embodiment makes it possible to overcome the issues by providing the stereoscopic image display device and the stereoscopic image processing method with which the issues of the CT-image and the pseudoscopic view by the 3D crosstalk are overcome so that a sense of discomfort is not felt by the observer even when the observer gives a command for adjusting the parallax manually.

Sixth Exemplary Embodiment

It is an exemplary object of a sixth exemplary embodiment to provide a stereoscopic image display device and a stereoscopic image processing method with which the issues of the CT-image and the pseudoscopic view by the 3D crosstalk are overcome so that a sense of discomfort is not felt by the observer even when the environmental temperature under which the stereoscopic image display device is used changes, through performing parallax adjustment processing appropriate for the temperatures.

Figure 56:
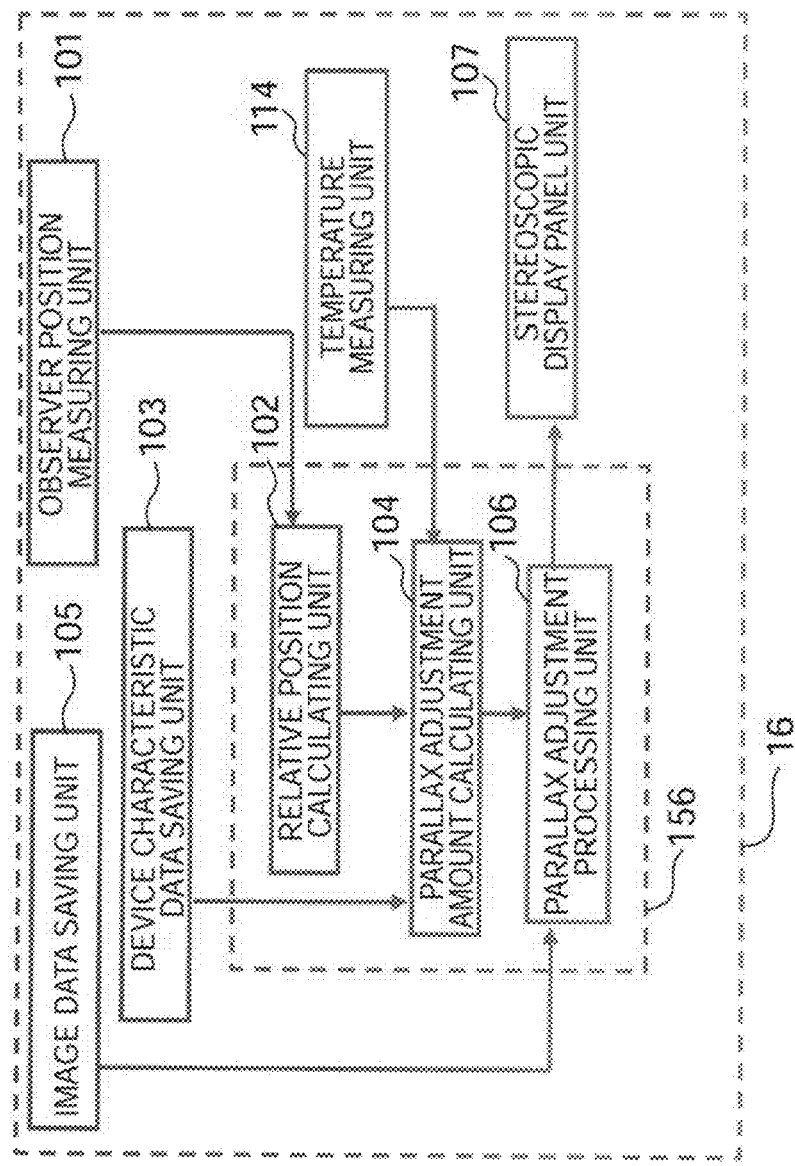
FIG. 56 is a block diagram of a stereoscopic image display device according to a sixth exemplary embodiment.

FIG. 56 shows a block diagram of a stereoscopic image display device 16. The stereoscopic image display device 16 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; and a temperature measuring unit 114. Further, a processing unit that is an integration of the relative position calculating unit 102, the parallax adjustment amount calculating unit 104, and the parallax adjustment processing unit 106 is referred to as an image processing unit 156.

Hereinafter, functions of each unit included in the stereoscopic image display device 16 will be described. The functions of the observer position measuring unit 101, the relative position calculating unit 102, the image data saving unit 105, the parallax adjustment processing unit 106, and the stereoscopic display panel unit 107 are the same as those of the first exemplary embodiment.

The temperature measuring unit 114 has a function which measures the temperature of the stereoscopic image display device 16. A lenticular lens can be made with an inorganic material such as glass. However, it is often made with an organic material such as engineering plastic, typically polymethyl methacrylate (PMMA), cyclopoly olefin (COP), and polycarbonate (PC), because of the production cost. Therefore, when the environmental temperature under which the stereoscopic image display device 16 is used changes, the positional relation between the lenticular lens and the display panel fluctuates due to the difference between the material of the lenticular lens made with a plastic material and the material of the display panel that normally uses a glass substrate, i.e., difference between the thermal expansion coefficients of a plastic material and a glass material.

Figure 57:
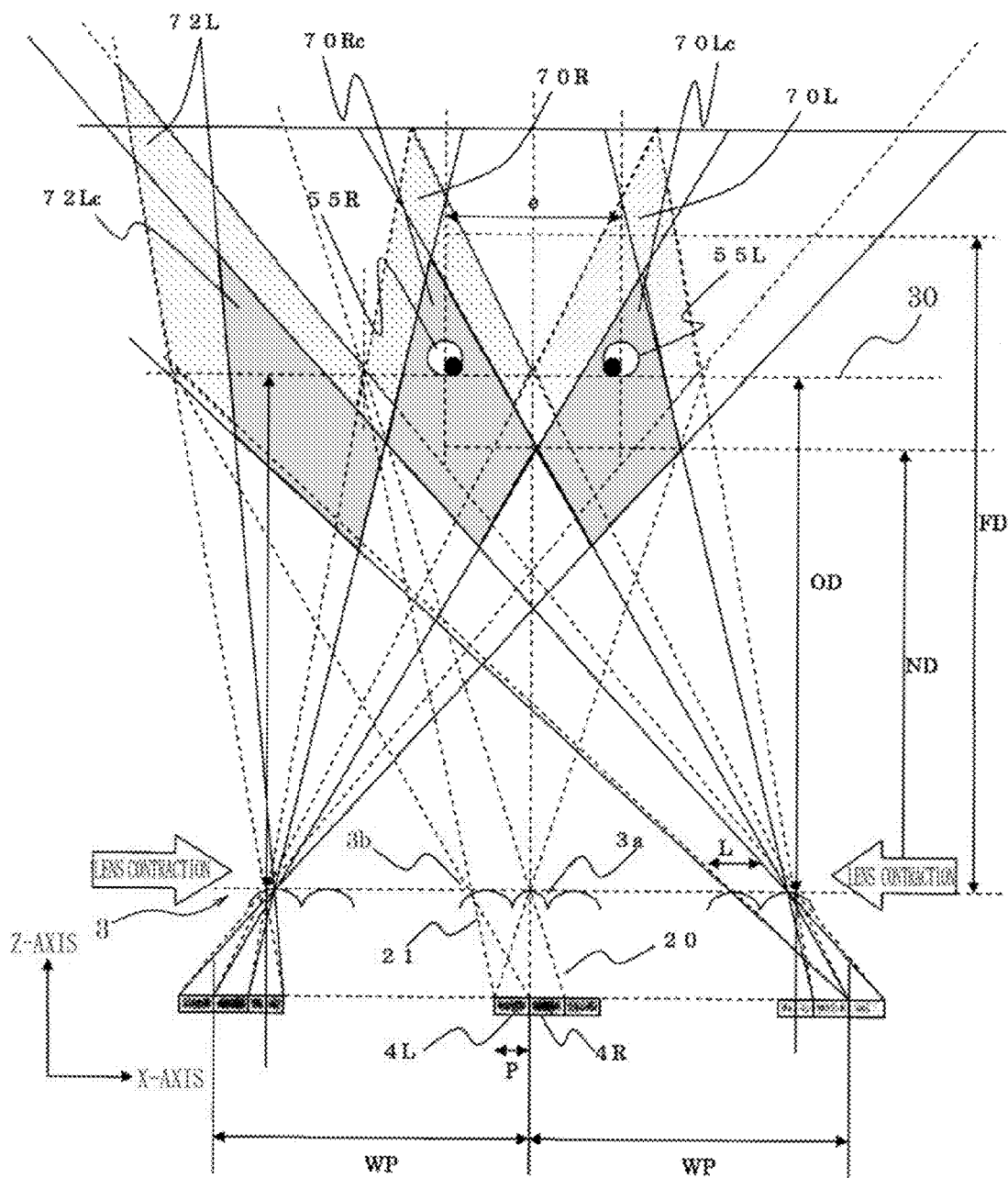
FIG. 57 is a chart showing changes in an optical model due to a decrease in the temperature.

FIG. 57 shows a chart in which the lenticular lens is shifted as the temperature drops, and the optical model of the stereoscopic display panel is changed. When the environmental temperature drops, the lenticular lens is contracted towards the center part of the display panel. Thus, the slope of light rays 20, 21 projected from the left-eye pixel 4L and the right-eye pixel 4R of FIG. 57 to the observer via the lenticular lens 3 (cylindrical lens 3a) is decreased than the case of a normal temperature. When the positions of a right-eye area 70R and a left-eye area 70L of a case where the environmental temperature is a normal temperature are compared with the positions of the space of a right-eye area $70R_c$ and a left-eye area $70L_c$ of a case where the temperature drops in the optical model chart of FIG. 57, it can be confirmed that the right-eye area and the left-eye area move closer to the stereoscopic display panel as the environmental temperature drops.

Figure 58:
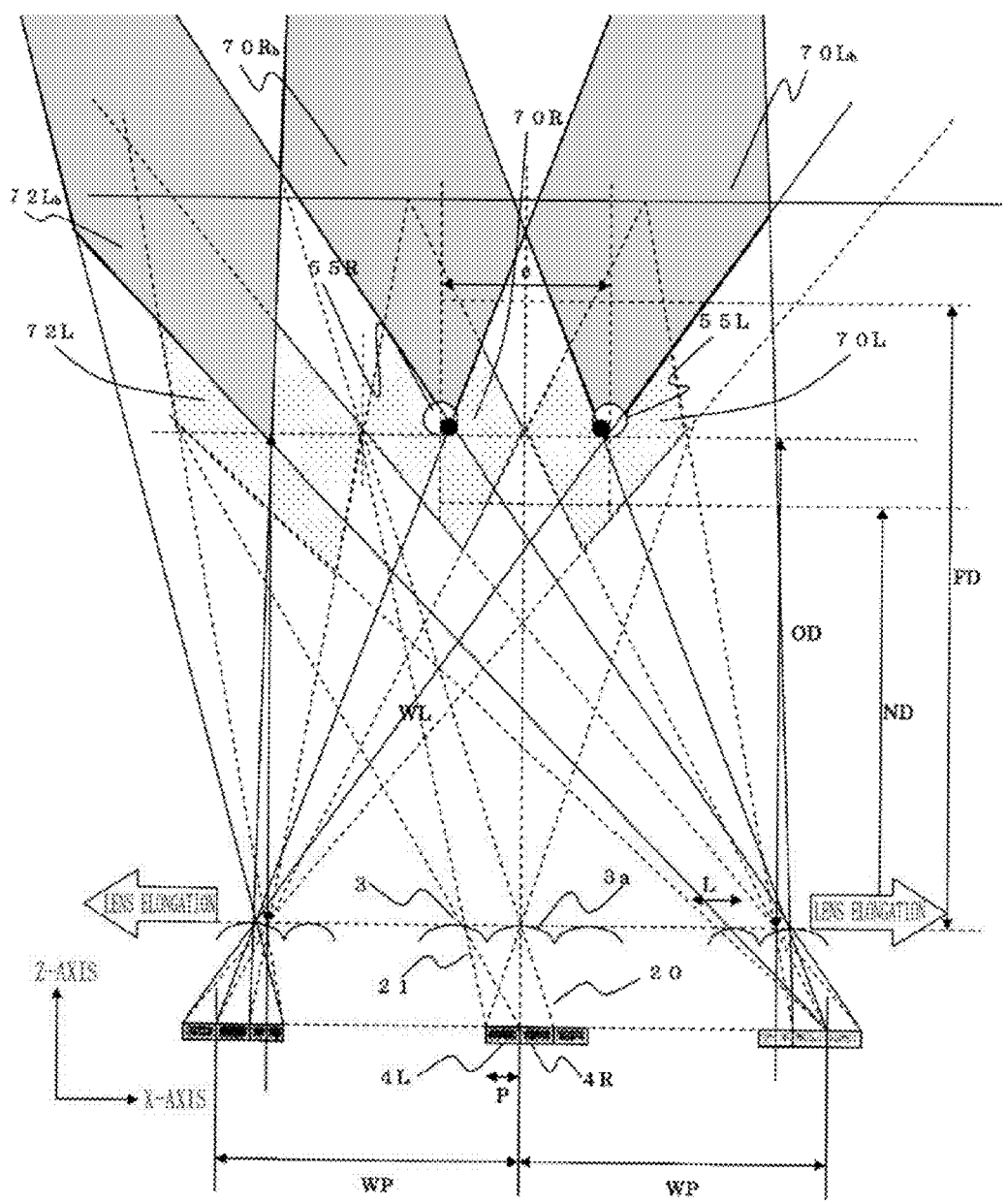
FIG. 58 is a chart showing changes in an optical model due to an increase in the temperature.

FIG. 58 shows a chart in which the lenticular lens is shifted as the temperature increases, and the optical model of the stereoscopic display panel is changed. When the temperature increases, the lenticular lens is expanded towards the both ends of the display panel. Thus, the slope of the light rays 20, 21 projected from the left-eye pixel 4L and the right-eye pixel 4R of FIG. 58 to the observer via the lenticular lens 3 (cylindrical lens 3a) is increased than the case of a normal temperature. When the positions of the right-eye area 70R and the left-eye area 70L of a case where the environmental temperature is a normal temperature are compared with the positions of the space of a right-eye area $70R_h$ and a left-eye area $70L_h$ of a case where the temperature increases in the optical model chart of FIG. 58, it can be confirmed that the right-eye area and the left-eye area move away from the stereoscopic display panel as the environmental temperature increases.

In the sixth exemplary embodiment, the parallax adjustment processing is performed by considering the influence of the changes in the optical model of the display panel caused in accordance with the changes in the environmental temperature. The temperature measuring unit 114 grasps the state of the optical model of the stereoscopic display panel in accordance with the temperature changes by measuring the temperatures in the vicinity of the stereoscopic display panel. For measuring the temperatures, a widely-used thermometer or the like can be used. Through providing the thermometer to the stereoscopic image display device, the environmental temperature of the stereoscopic display panel can be measured.

The device characteristic data saving unit 103 shown in FIG. 56 saves in advance the 3D crosstalk characteristic data corresponding to the environmental temperatures under which the stereoscopic image display device is used. The characteristic data corresponding to the environmental temperature will be described hereinafter.

Figure 59:
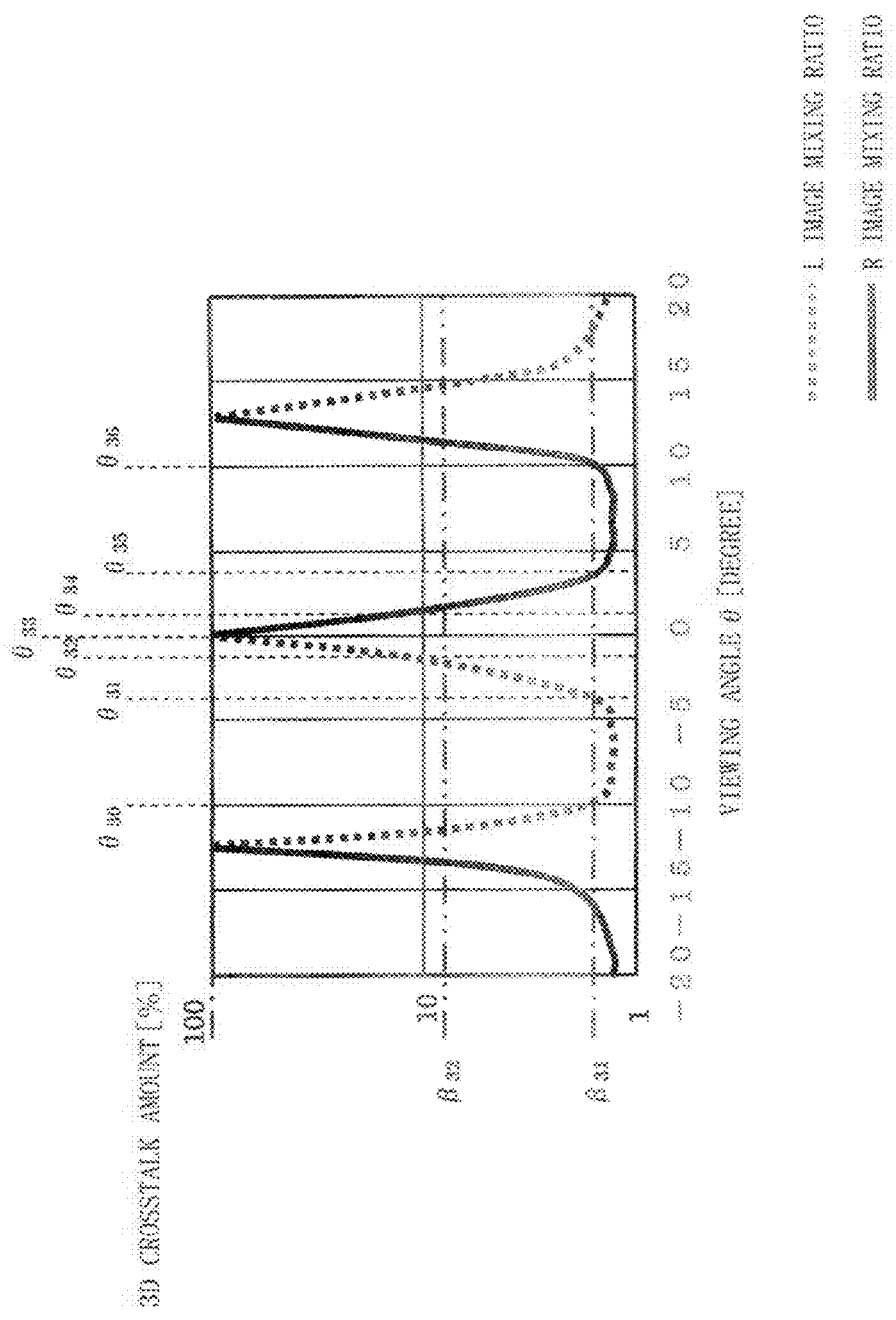
FIG. 59 is a chart showing 3D crosstalk characteristic data at a low temperature.

FIG. 59 shows an example of the 3D crosstalk characteristic data of a case where the environmental temperature is low. With the stereoscopic image display device 16, the right-eye area, the left-eye area, and the 3D-crosstalk viewing space are determined depending on the 3D crosstalk characteristic data. As an example, assuming that the stereoscopic area is $\beta_{31}$ or less of the 3D crosstalk amount, the area of the viewing angles $\theta_{31}$ to $\theta_{35}$ is the 3D-crosstalk viewing space, and the areas of other viewing angles are the right-eye area and the left-eye area.

Figure 60:
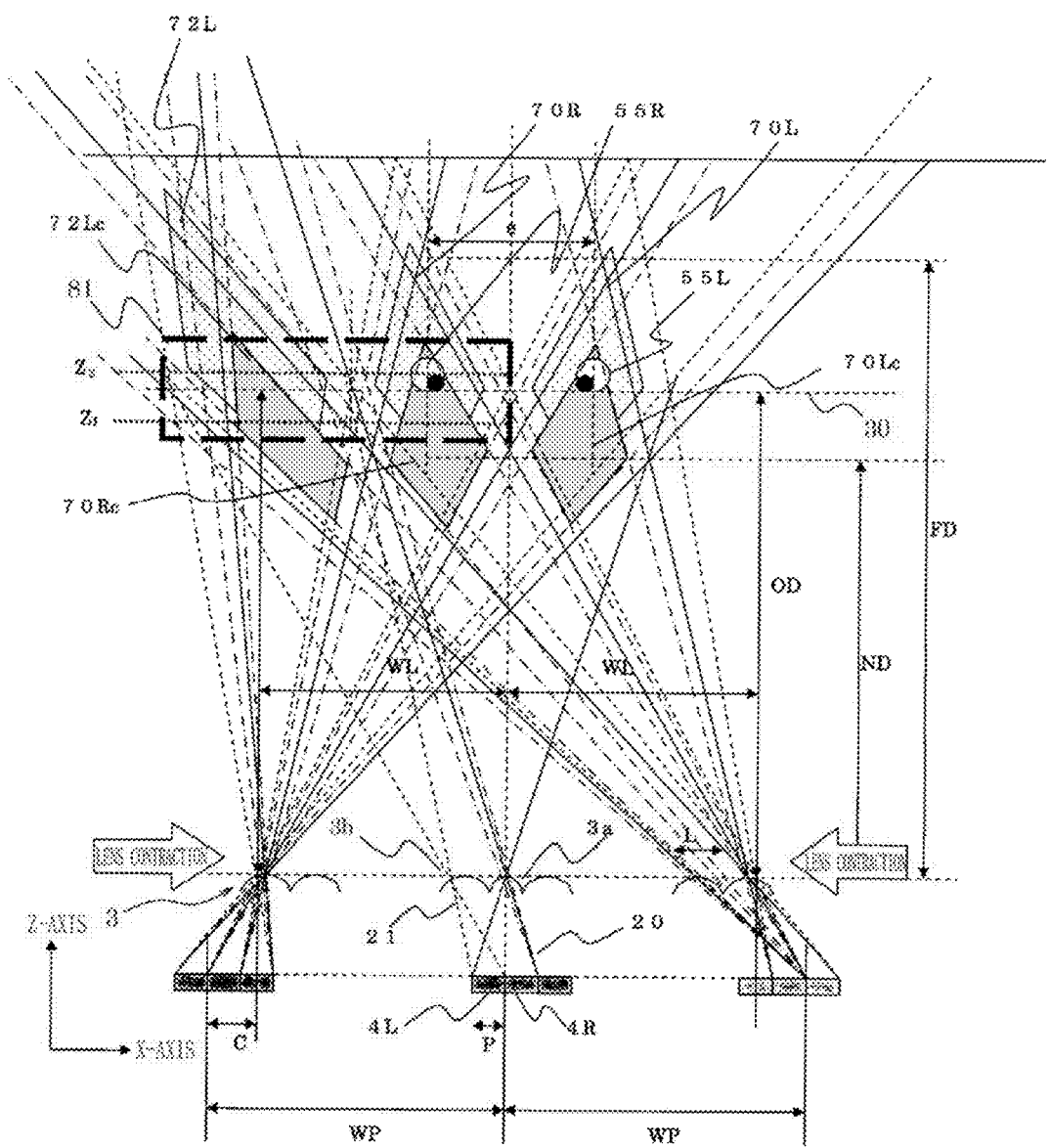
FIG. 60 is a chart showing changes in an optical model due to a decrease in the temperature.

FIG. 60 shows the optical model of the stereoscopic image display device 16 of such case. The section of the viewing angles $\theta_{31}$ to $\theta_{35}$ is the 3D-crosstalk viewing space in FIG. 60, so that the areas of the right-eye area 70R, and the left-eye area 70L, are narrowed further than the case of FIG. 57. For the right eye 55R, the right-eye area 70R, is the stereoscopic viewing space, the left-eye areas $70L_c$, $72L_c$ are the pseudoscopic viewing spaces, and the other area is the 3D-crosstalk viewing space as in the case of FIG. 57.

Figure 61:
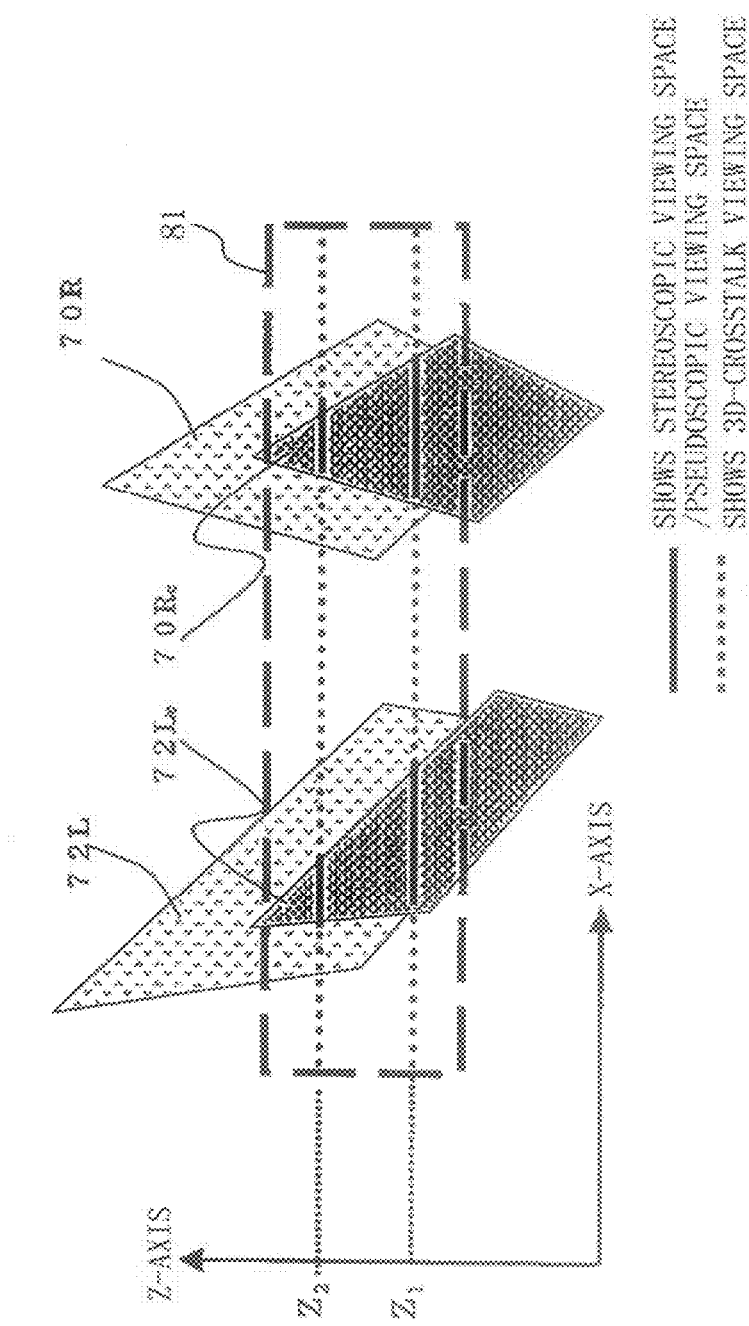
FIG. 61 is an enlarged view of the optical model at a low temperature.

FIG. 61 shows an enlarged view of an area 81 shown in FIG. 60. The area widths of the right-eye area 70R, the left-eye area 72L, and the 3D-crosstalk viewing space at $Z_1$ and $Z_2$ which are arbitrary values on the Z-axis are different. Further, it can be seen that the widths of the stereoscopic viewing space, the pseudoscopic viewing space, and the 3D-crosstalk viewing space change depending on the positions on the Z-axis.

Figure 62:
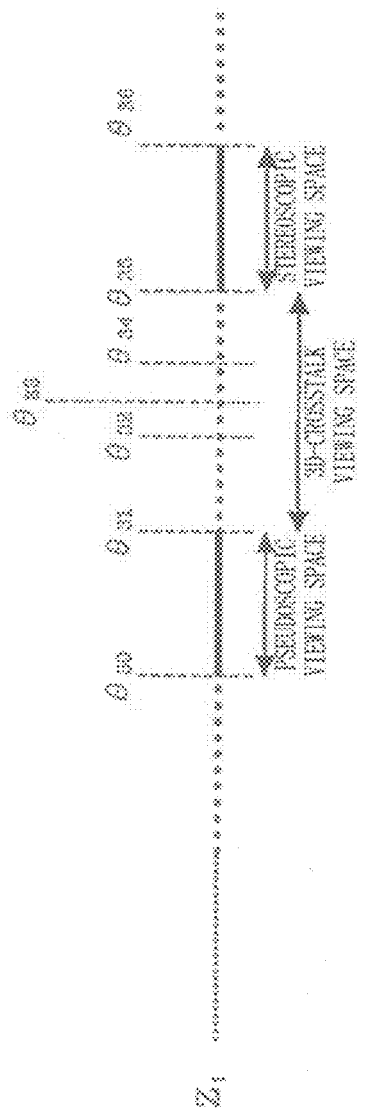
FIG. 62 is a relational chart regarding widths of a stereoscopic viewing space, a pseudoscopic viewing space, a 3D-crosstalk viewing space, and viewing angles at a low temperature.

Further, FIG. 62 shows a relational chart regarding the stereoscopic viewing space, the pseudoscopic viewing space, and the 3D-crosstalk viewing space at the arbitrary value $Z_1$ on the Z-axis and the viewing angles shown in FIG. 59. When the right eye 55R is taken as the reference, the area of the viewing angles $\theta_{30}$ to $\theta_{31}$ is the pseudoscopic viewing space, the area of the viewing angles $\theta_{31}$ to $\theta_{35}$ is the 3D-crosstalk viewing space, and the area of the viewing angles $\theta_{35}$ to $\theta_{36}$ is the stereoscopic viewing space. Further, the 3D crosstalk amount becomes the maximum at the position of the viewing angle $\theta_{33}$, and the area of the viewing angles $\theta_{32}$ to $\theta_{34}$ is the area having the 3D crosstalk amount of $\beta_{32}$ or more from FIG. 59.

While the characteristic data corresponding to the environmental temperature has been described above, it is possible to employ arbitrary content for the data depending on the specification of the stereoscopic image display device 16, e.g., the 3D crosstalk characteristic data regarding the environmental temperatures of every 5 degrees in a range of −20 degrees to 60 degrees as an example of the data. Further, it is also possible to provide a program which saves in advance necessary parameters for calculating the 3D crosstalk characteristic data and finds the 3D crosstalk characteristic data according to the environmental temperature. As examples of the parameter, it is possible to use the effective linear expansion coefficient of the lenticular lens provided to the display panel, the panel size, the panel resolution, and the like.

The parallax adjustment amount calculating unit 104 shown in FIG. 56 acquires the 3D crosstalk characteristic data corresponding to the temperature measured by the temperature measuring unit 114 from the above-described device characteristic data saving unit 103, and calculates the parallax adjustment amount suited for the stereoscopic image display with respect to the viewing angle based on the 3D crosstalk characteristic data. The parallax adjustment amount calculation processing and the parallax adjustment processing thereafter are performed in the same manner as in the case of the first exemplary embodiment. Thereby, the parallax adjustment processing appropriate for the environmental temperature under which the stereoscopic image display device 16 is used can be performed.

Further, as in the case of the first exemplary embodiment, the sixth exemplary embodiment can be applied to stereoscopic image display devices of various naked-eye stereoscopic types such as a multi-viewpoint type and an integral type. Naturally, it is possible to provide the image processing unit of the sixth exemplary embodiment as an independent image processing device, and to achieve the stereoscopic image display device by combining it with the stereoscopic display panel unit.

Figure 63:
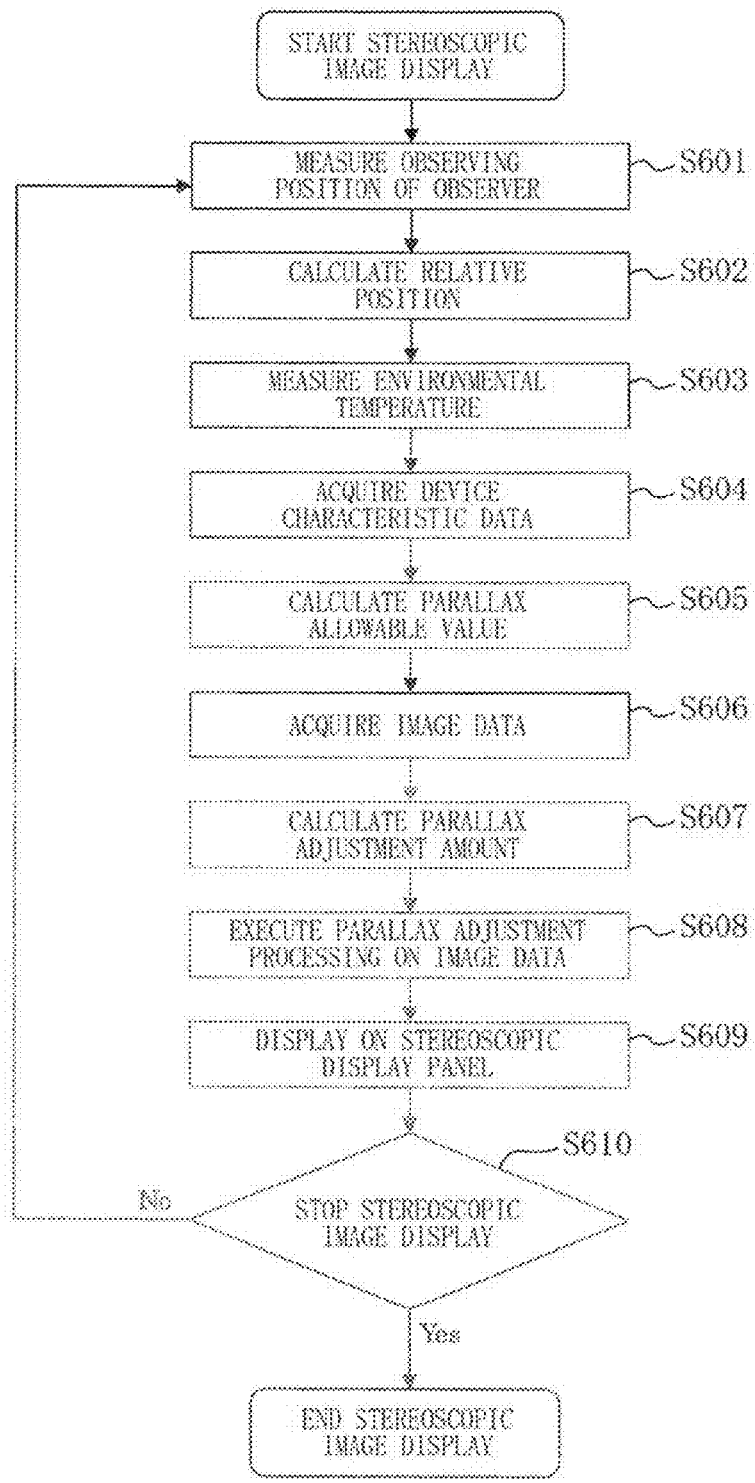
FIG. 63 is a flowchart of a stereoscopic image processing method.
Figure 64:
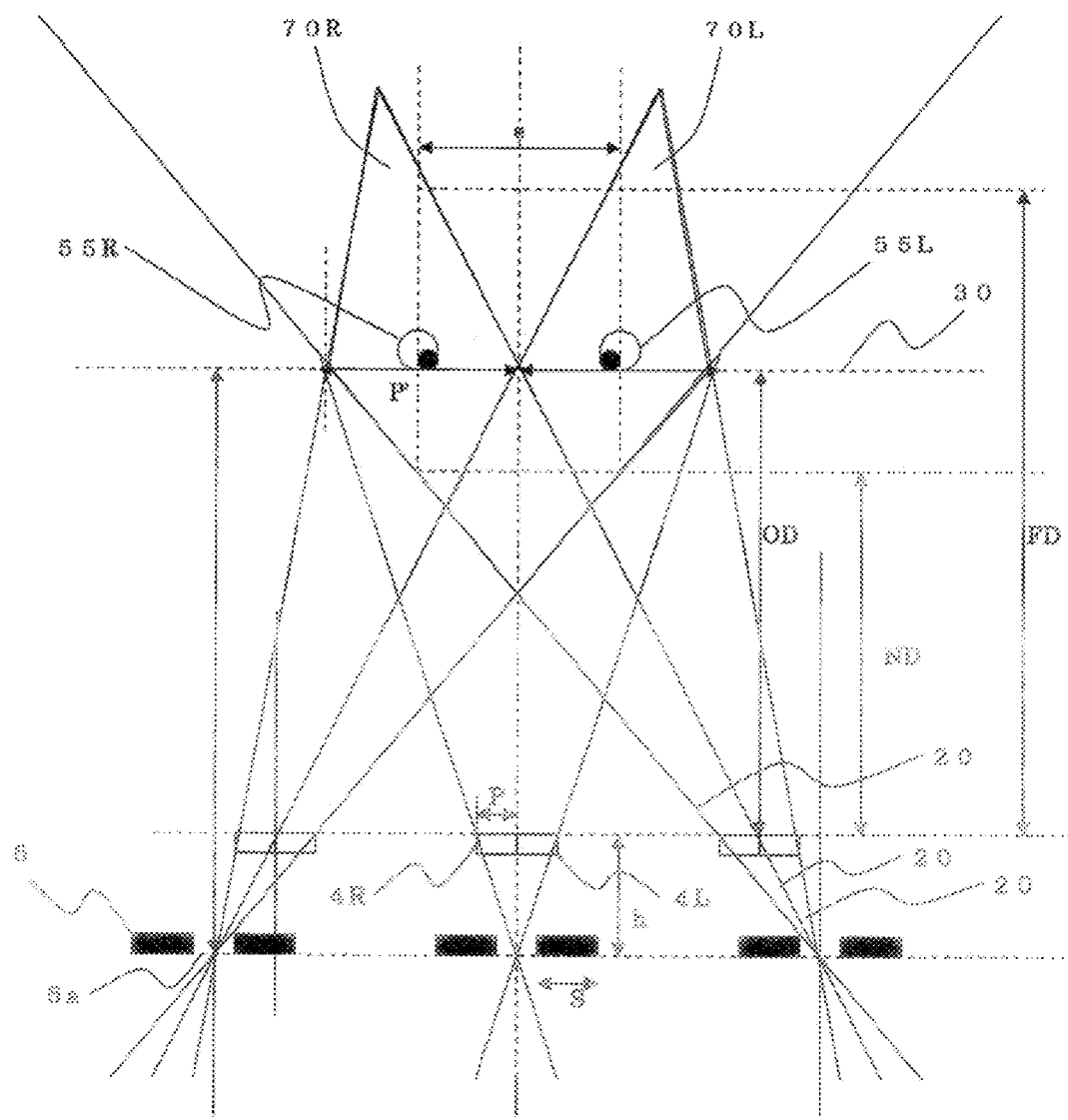
FIG. 64 is an optical model chart of a parallax barrier.
Figure 65:
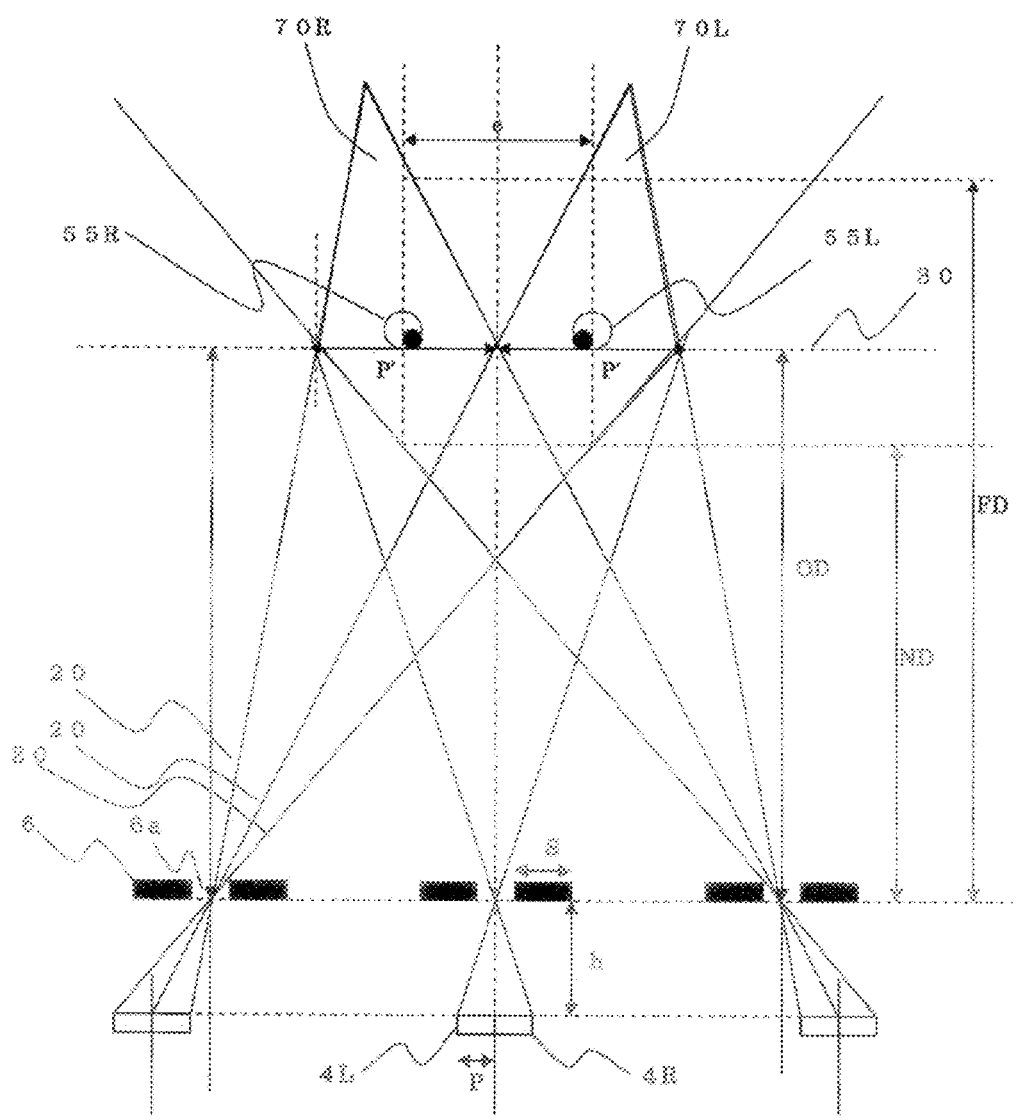
FIG. 65 is an optical model chart of a parallax barrier.
Figure 66:
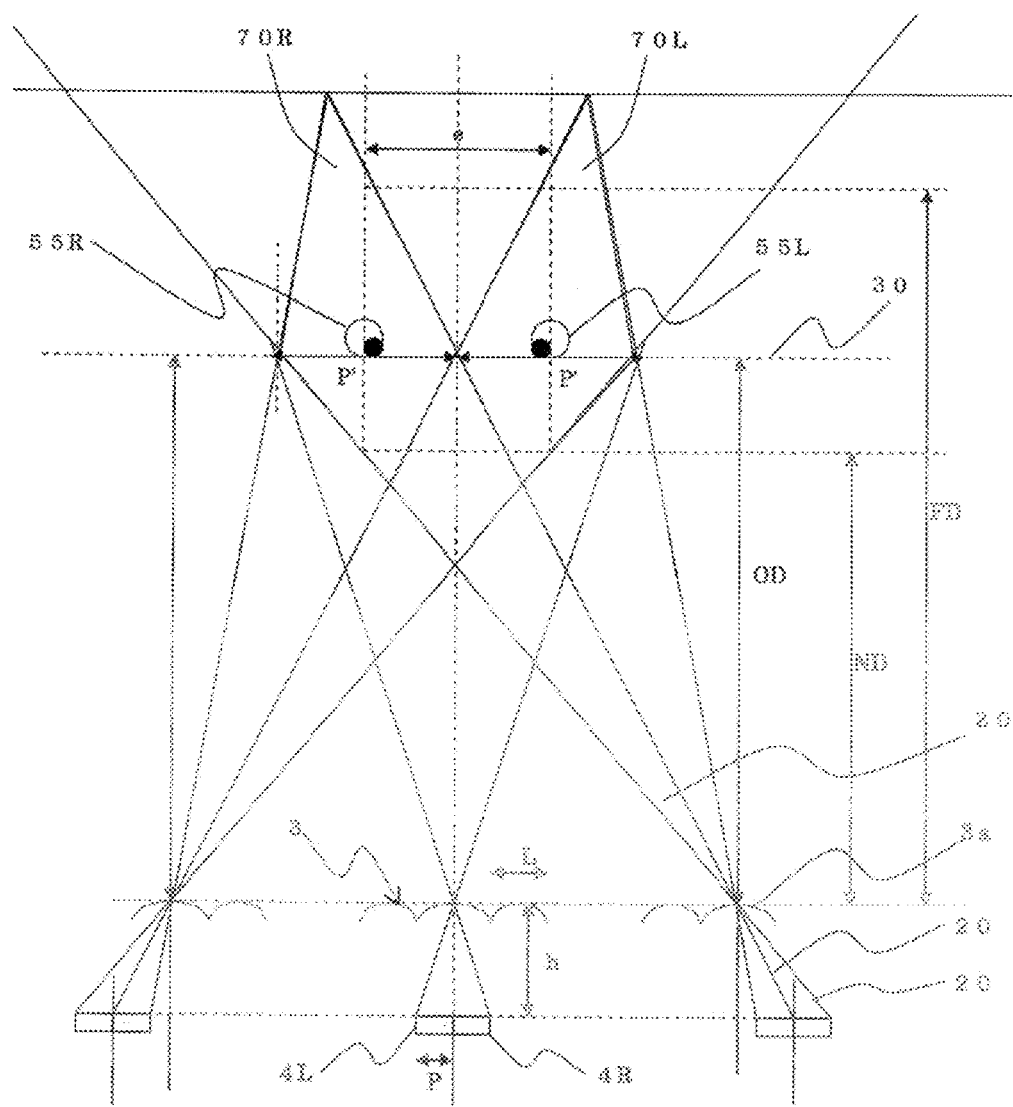
FIG. 66 is an optical model chart of a lenticular lens.
Figure 67:
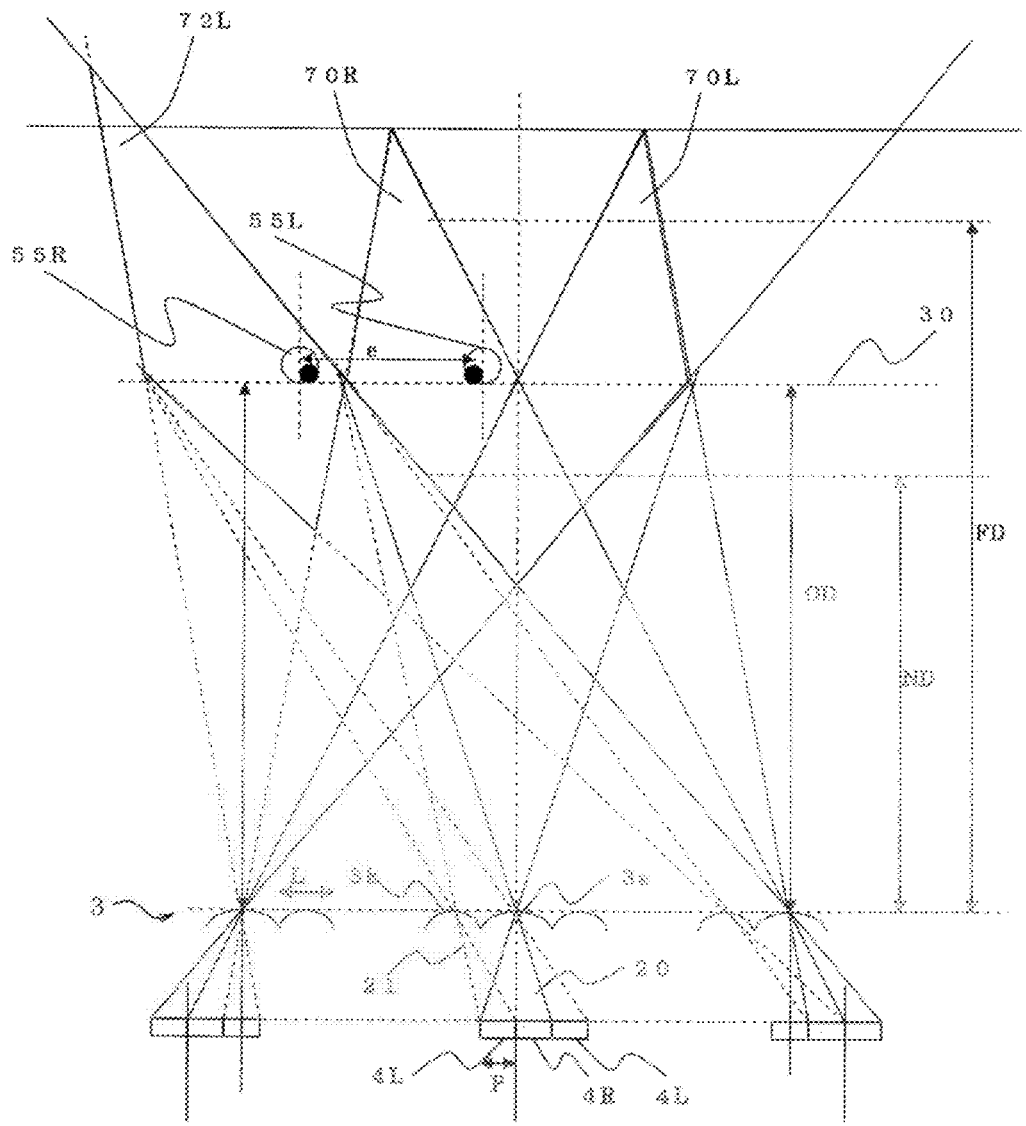
FIG. 67 is an optical model chart for describing a pseudoscopic viewing space.

A flowchart of the stereoscopic image processing method used in the stereoscopic image display device 16 according to the sixth exemplary embodiment will be described by referring to FIG. 63.

In step S601 to step S602, the same processing as that of the first exemplary embodiment is performed.

In step S603, the temperature in the vicinity of the stereoscopic display panel is measured by the temperature measuring unit 114.

In step S604, the device characteristic data corresponding to the temperature measured in step S603 is acquired from the device characteristic data saving unit 103.

In step S605 to step S610, the processing same as the processing of step S104 to step S109 of the first exemplary embodiment is performed.

As described above, it is possible to provide the stereoscopic image display device and the stereoscopic image processing method with which the issues of the CT-image and the pseudoscopic view by the 3D crosstalk are overcome so that a sense of discomfort is not felt by the observer, through performing the parallax adjustment processing appropriate for the temperatures even when the environmental temperature under which the stereoscopic image display device 16 is used changes.

As in the case of the first exemplary embodiment, it is naturally possible with the stereoscopic image processing method of the sixth exemplary embodiment to shorten the calculation time of the stereoscopic image display processing greatly through saving the group of image data on which the parallax adjustment processing is performed with the parallax adjustment amount κ in advance in the image data saving unit 105.

In other words, the stereoscopic image display device according to the sixth exemplary embodiment includes: the observer position measuring unit which measures the observing position of the observer; the relative position calculating unit which calculates the relative positions between the observing position of the observer and the position of the stereoscopic display panel; the device characteristic data saving unit which saves the device characteristic data for the viewing angles of the stereoscopic display panel; the parallax adjustment amount calculating unit which calculates the parallax adjustment amount suited for stereoscopic image display for the viewing angle based on the device characteristic data; the image data saving unit which saves or receives the image data; the parallax adjustment processing unit which performs the parallax adjustment processing on the image data according to the parallax adjustment amount; the stereoscopic display panel unit which projects the image data on which the parallax adjustment processing is performed to the right eye and the left eye according to the relative position; and the temperature measuring unit which measures the use environmental temperature. The sixth exemplary embodiment achieves the parallax adjustment processing appropriate for the environmental temperature under which the stereoscopic image display device is used by calculating the parallax adjustment amount by considering the use environmental temperature and the temperature characteristic data of the stereoscopic display panel in addition to the observing position of the observer and the device characteristic data. Thereby, it is possible to overcome the issues by providing the stereoscopic image display device and the stereoscopic image processing method with which a sense of discomfort is not felt by the observer by overcoming the issues of the CT-image and the pseudoscopic view by the 3D crosstalk, through performing the parallax adjustment processing appropriate for the temperatures even when the environmental temperature under which the stereoscopic image display device is used changes.

Seventh Exemplary Embodiment

It is an exemplary object of a seventh exemplary embodiment to provide a stereoscopic image display device which switches modes of the parallax allowable value for the viewing angles according to the observing state of the observer for the stereoscopic display panel and displays a stereoscopic image with ambience by keeping the parallax value of a 3D content to the maximum when it is in a fine observing condition.

Figure 69:
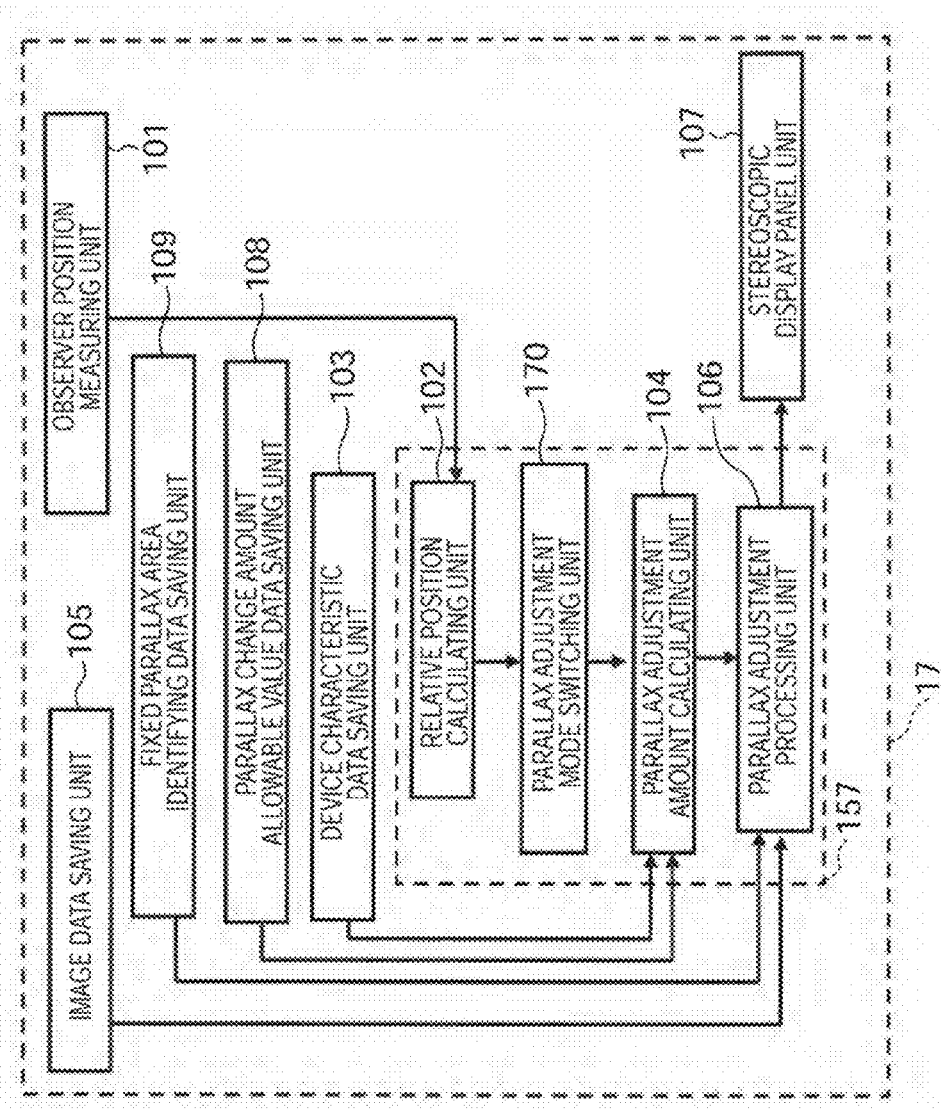
FIG. 69 is a block diagram showing a stereoscopic image display device according to a seventh exemplary embodiment.

FIG. 69 shows a block diagram of a stereoscopic image display device 17. The stereoscopic image display device 17 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; a parallax change amount allowable value data saving unit 108; a parallax specific area identifying data saving unit 109 as a parallax specific area identifying unit; and a parallax adjustment mode switching unit 170. Further, a processing unit that is an integration of the relative position calculating unit 102, the parallax adjustment amount calculating unit 104, the parallax adjustment processing unit 106, and the parallax adjustment mode switching unit 170 is referred to as an image processing unit 157.

Hereinafter, functions of each unit included in the stereoscopic image display device 17 will be described. The functions of the observer position measuring unit 101, the relative position calculating unit 102, the device characteristic data saving unit 103, the parallax adjustment amount calculating unit 104, the image data saving unit 105, the parallax adjustment processing unit 106, and the stereoscopic display panel unit 107, the parallax change amount allowable value data saving unit 108, and the parallax specific area identifying data saving unit 109 are the same as those of the third exemplary embodiment.

The parallax adjustment mode switching unit 170 has a function which switches the modes of the parallax allowable values for the viewing angles according to the observing state such as the positional relation of the observer and the stereoscopic display panel, the changes in the position in terms of time, and the like. As examples of the parallax adjustment modes, provided depending on the observing state are a parallax adjustment mode A which keeps the parallax value of the 3D content to the maximum and a parallax adjustment mode B having the same parallax value as that of the third exemplary embodiment.

Regarding the judgment processing for switching the parallax adjustment modes, it is judged from the relative position between the observer and the stereoscopic display panel and the shift speed thereof. As an example, under a state where the shift speed is less than a prescribed value so that the observer is almost standing still and it is judged as a static observing condition at a preferable position, e.g., the relative position stays within a stereoscopic viewing space or a pseudoscopic viewing space (observing areas where the 3D crosstalk amount is low so that a fine stereoscopic image can be viewed) for a prescribed length of time or more, the normal parallax adjustment mode B shown in the third exemplary embodiment is switched to the above-described parallax adjustment mode A. From this state, when it is judged as a dynamic observing state at an improper position, e.g., a state where the shift speed of the observer is equal to or higher than a prescribed value or a state where the relative position is within a range of viewing angles $\theta_2$ to $\theta_4$ that is the 3D-crosstalk viewing space, the parallax adjustment mode A is switched to the parallax adjustment mode B.

Figure 70:
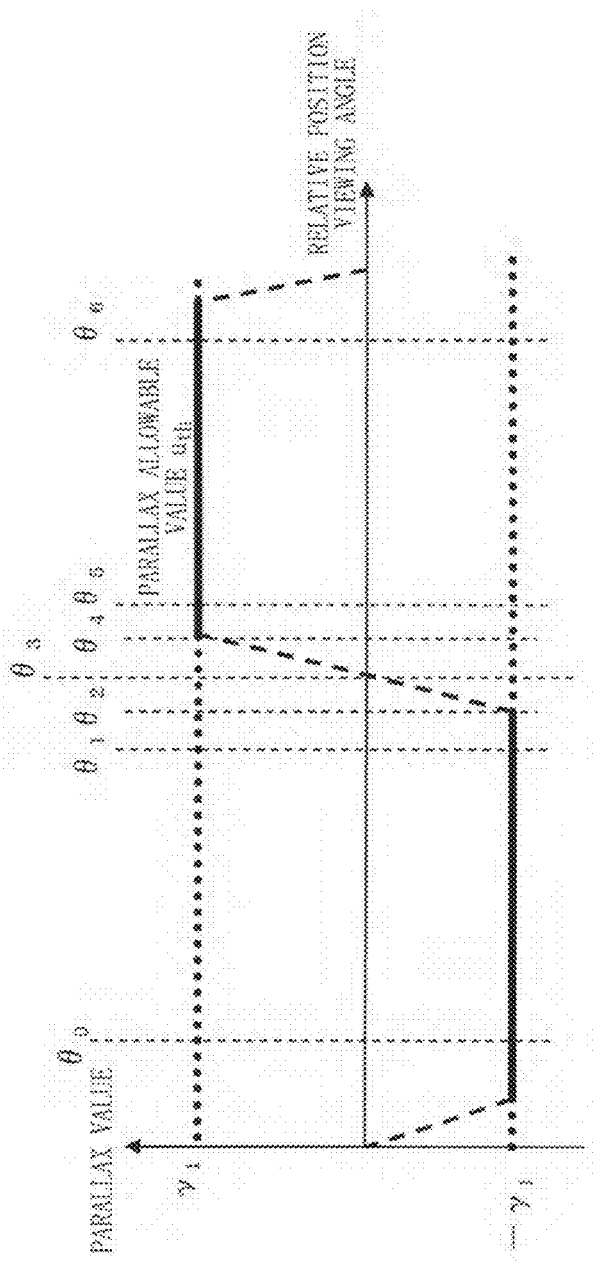
FIG. 70 is a chart showing parallax allowable values for the viewing angles.

FIG. 70 shows an example of the parallax allowable value with respect to the viewing angles of the relative position in the parallax adjustment mode A. FIG. 71 shows the relation regarding generation of a CT-image with respect to the 3D crosstalk amount, the influence for the stereoscopic image, the viewing angle ranges, the viewing space names, and the absolute values of the parallax allowable values. From FIG. 70 and FIG. 71, the absolute value of the parallax allowable value for the viewing angle takes the parallax maximum value $\gamma_1$ except for the viewing angle range $\theta_2$ to $\theta_4$ where the 3D crosstalk amount becomes equal to or more than $\beta_2$ so that it is hard to recognize a stereoscopic image. Therefore, the parallax value of the 3D content is kept to the maximum not only in the viewing angle ranges $\theta_0$ to $\theta_1$ and $\theta_5$ to $\theta_6$ where a high-quality stereoscopic image can be sighted but also in the viewing angle ranges $\theta_1$ to $\theta_2$ and $\theta_4$ to $\theta_5$ where a stereoscopic image can be recognized.

Figure 72:
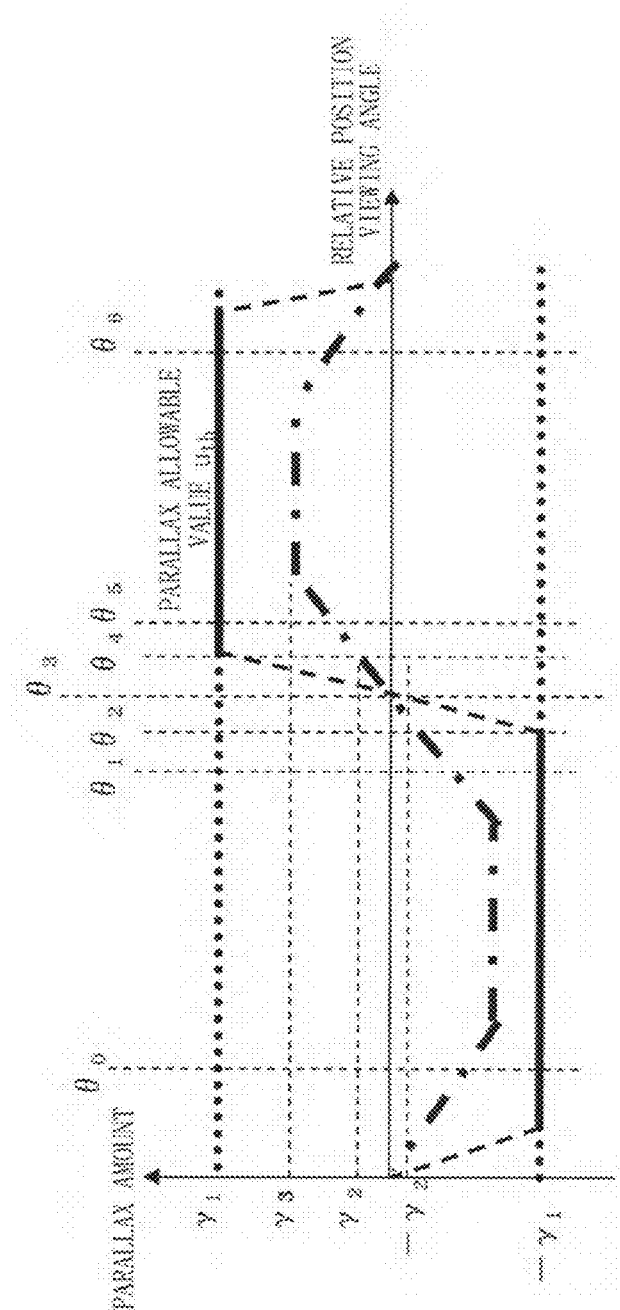
FIG. 72 is a chart showing parallax allowable values for the viewing angles.

Further, in a case where the parallax value of the image data is changed drastically in accordance with a large change in the parallax allowable value when switching the parallax adjustment mode, there may be a limit set on the chronical change amount of the parallax value. FIG. 72 shows an example where the parallax allowable value is changed largely when switching from the parallax adjustment mode A with a large parallax allowable value to the parallax adjustment mode B with a small parallax allowable value. Note here that a solid line in FIG. 72 shows the parallax allowable value of the parallax adjustment mode A, and an alternate long and short dash line shows the parallax allowable value of the parallax adjustment mode B, respectively. Note that the parallax allowable value of the parallax adjustment mode B is the same as the parallax allowable value depicted in the third exemplary embodiment.

The parallax allowable value is changed from the solid line of FIG. 72 to the alternate long and short dash line when switching the parallax adjustment mode. At this time, the change amount of the parallax value of the image data depends largely on the viewing angle. For example, when the observer is located at a position at the viewing angles $\theta_5$ to $\theta_6$, the parallax amount $\gamma_1$ of the parallax adjustment mode A is changed to the parallax amount $\gamma_3$ of the parallax adjustment mode B. However, when the observer is located at a position at the viewing angle $\theta_4$, the parallax amount $\gamma_1$ of the parallax adjustment mode A is changed to the parallax amount $\gamma_2$ of the parallax adjustment mode B, and this change amount is larger than the case of the viewing angles $\theta_5$ to $\theta_6$. Such parallax change amount at the viewing angle $\theta_4$ is highly probable to give a sense of discomfort to the observer. Thus, when the parallax change amount exceeds an arbitrary threshold value, a limit may be set on the chronical change amount of the parallax value.

Specifically, when the change amount of the parallax value in the image data in accordance with the large change in the parallax allowable value exceeds the parallax change amount allowable value $du_a/dt$ depicted in the second exemplary embodiment, the change amount of the parallax value is limited to be equal to or less than the parallax change amount allowable value $du_a/dt$. In the parallax limit processing, the change amount of the parallax value in the image data at the time of switching the parallax adjustment mode is calculated first, and it is compared with the parallax change amount allowable value $du_a/dt$. Assuming that the image frame rate with which the observer can recognize the change in the parallax of the image data is 10 fps to 20 fps, the time interval with which the observer can recognize the change in the parallax is 0.05 seconds to 0.1 seconds.

Figure 73A:
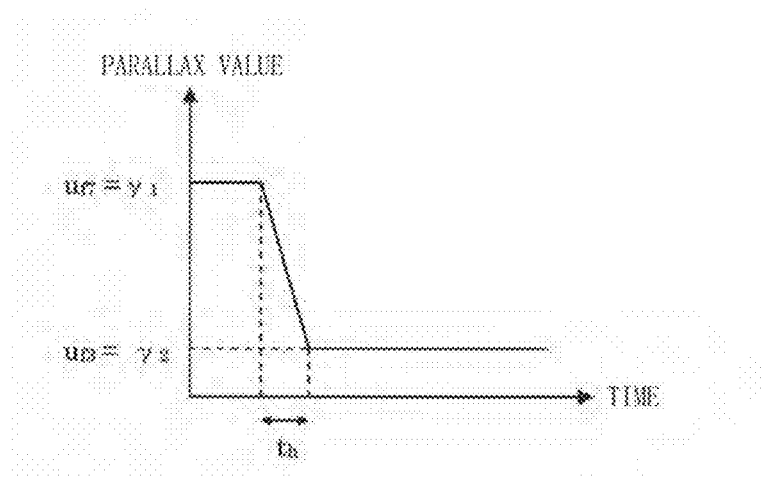
FIG. 73 is a chart showing the time passages of the changes in the parallax value, with FIG. 73A illustrating a first condition and FIG. 73B illustrating a second condition.

As in an example shown in FIG. 73A, the change amount of the parallax value in the image data at the time of switching the parallax adjustment mode is calculated by dividing value acquired by subtracting the parallax value of the image data of the parallax adjustment mode B from the parallax value of the image data of the parallax adjustment mode A by the time interval with which the observer can recognize the change in the parallax. This mathematical formula is shown as Formula (80).

$$du/dt = (u_{f7} - u_{f3})/dt_h \qquad \text{Formula (80)}$$

Note here that du/dt shows the chronical change amount of the parallax value, $u_{f7}(x, y)$ shows the parallax value of the image data in the parallax adjustment mode A, $u_{f3}(x, y)$ shows the parallax value of the image data in the parallax adjustment mode B, and $dt_h$ shows the time interval with which the observer can recognize the change in the parallax.

Then, the calculated chronical change amount of the parallax value du/dt is compared with the parallax chronical change amount allowable value $du_a/dt$, and the parallax adjustment processing is performed in such a manner that du/dt becomes equal to or less than $du_a/dt$. When du/dt exceeds $du_a/dt$, the parallax value chronical change by the parallax adjustment processing is set to be small, and the parallax value of the image data is changed gradually to be fitted from the parallax allowable value of the parallax adjustment mode A to the parallax allowable value of the parallax adjustment mode B.

Figure 73B:
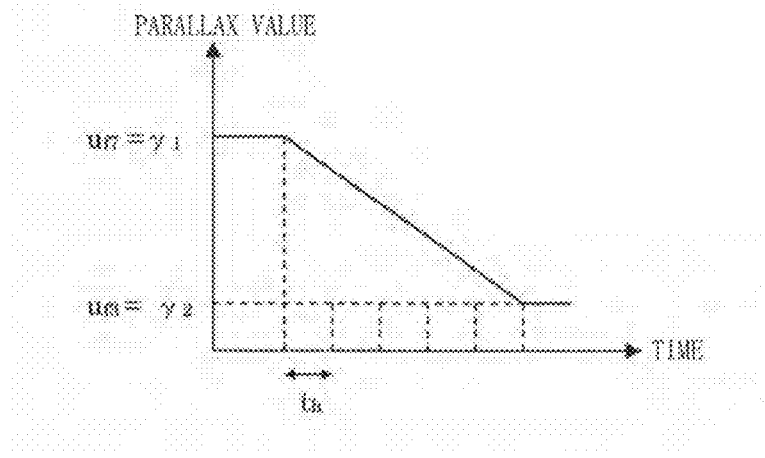

FIG. 73A and FIG. 73B show changes in the parallax value with respect to the observing time generated by the parallax adjustment mode switching processing. FIG. 73A shows the change in the parallax visually recognized by the observer at the time of switching the parallax adjustment mode in a case where there is no limit set on the parallax value chronical change amount, and FIG. 73B shows a case where there is a limit set on the parallax value chronical change amount, respectively. Note here that the parallax value chronical change amount allowable value $du_a/dt$ in FIG. 73B is set to be ⅕ of du/dt in FIG. 73A. In FIG. 73A, the observer visually recognizes the image where the parallax value drastically changes from γ1 to γ2. In FIG. 73B, however, the observer visually recognizes the image where the parallax value gradually changes from γ1 to γ2 in the time 5 times longer. Thus, a sense of discomfort felt at the time observing the image can be decreased.

The case where the parallax value of the image data changes drastically in accordance with a large change in the parallax allowable value at the time of switching the parallax adjustment mode is described above. However, there may also be a drastic change in the parallax value of the image data in accordance with a large change in the parallax allowable value when the shift speed of the relative position between the observer and the stereoscopic display panel is changed drastically. In such case, a limit may also be set on the chronical change in the parallax value in the same manner.

Figure 74:
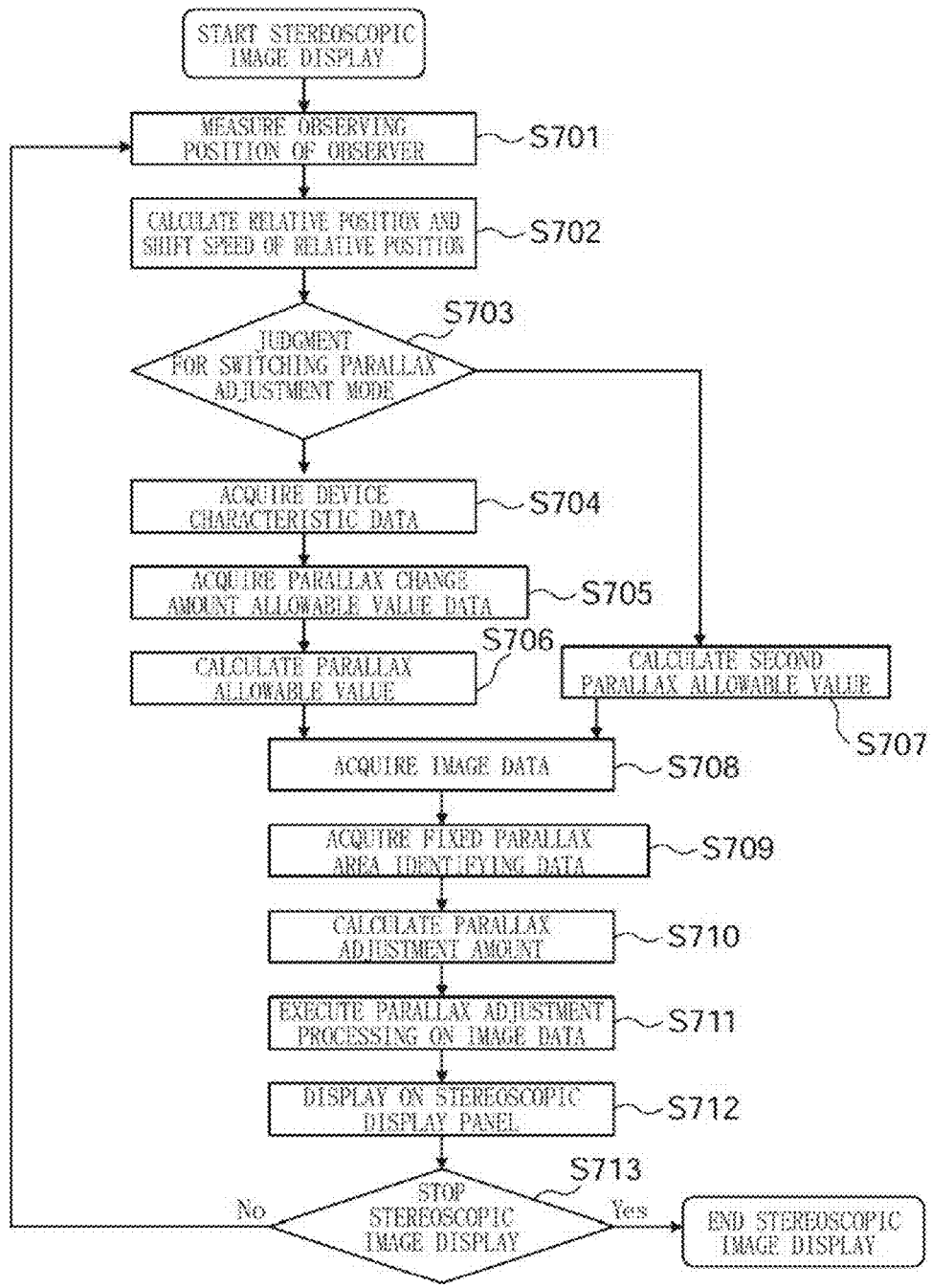
FIG. 74 is a flowchart of a stereoscopic image processing method.

A flowchart of the stereoscopic image processing method used in the stereoscopic image display device according to the seventh exemplary embodiment will be described by referring to FIG. 74. In step S701 to step S702 of the flowchart of FIG. 74, the same processing as that of the third exemplary embodiment is performed.

In step S703, it is judged by the function of the parallax adjustment mode switching unit 170 whether it is under an observing condition at a static and preferable position based on the relative position between the observer and the stereoscopic display panel and the shift speed of the relative position calculated in step S702. When judged that it is under the observing condition at a static and preferable position, the processing is advanced to step S707. When judged it is not under such condition, the processing is advanced to step S704.

In step S704 to step S706, the same processing as that of step S303 to step S305 of the third exemplary embodiment is performed (parallax adjustment mode B).

In step S707, in order to display a stereoscopic image with ambience, the second parallax allowable value which keeps the parallax value of the 3D content to the maximum (parallax adjustment mode A), which is different from the parallax allowable value calculated in step S704 to step S706, is calculated. As an example of the second parallax allowable value, the parallax allowable value may be kept to the maximum in a parallax angle range where a stereoscopic image can be recognized, such as the parallax allowable value shown in FIG. 70.

In step S708 to step S713, the same processing as that of step S306 to step S311 of the third exemplary embodiment is performed.

As described above, it is possible to provide the stereoscopic image display device which displays a stereoscopic image with ambience by keeping the parallax value held by the 3D content to the maximum when it is under an observing condition at a static and preferable position, through switching the parallax adjustment modes. As in the case of the first exemplary embodiment, the seventh exemplary embodiment can naturally be applied to various kinds of naked-eye type stereoscopic image display devices such as the multi-viewpoint type and the integral type.

Eighth Exemplary Embodiment

It is an exemplary object of an eighth exemplary embodiment to provide a stereoscopic image display device with which not only the influence of the CT-image by the 3D crosstalk is lightened but also motion parallax can be presented according to the shift of the relative position, through combining arbitrary viewpoint image generating processing executed according to the relative position between the observing position of the observer and the stereoscopic display panel with the parallax adjustment processing.

Figure 75:
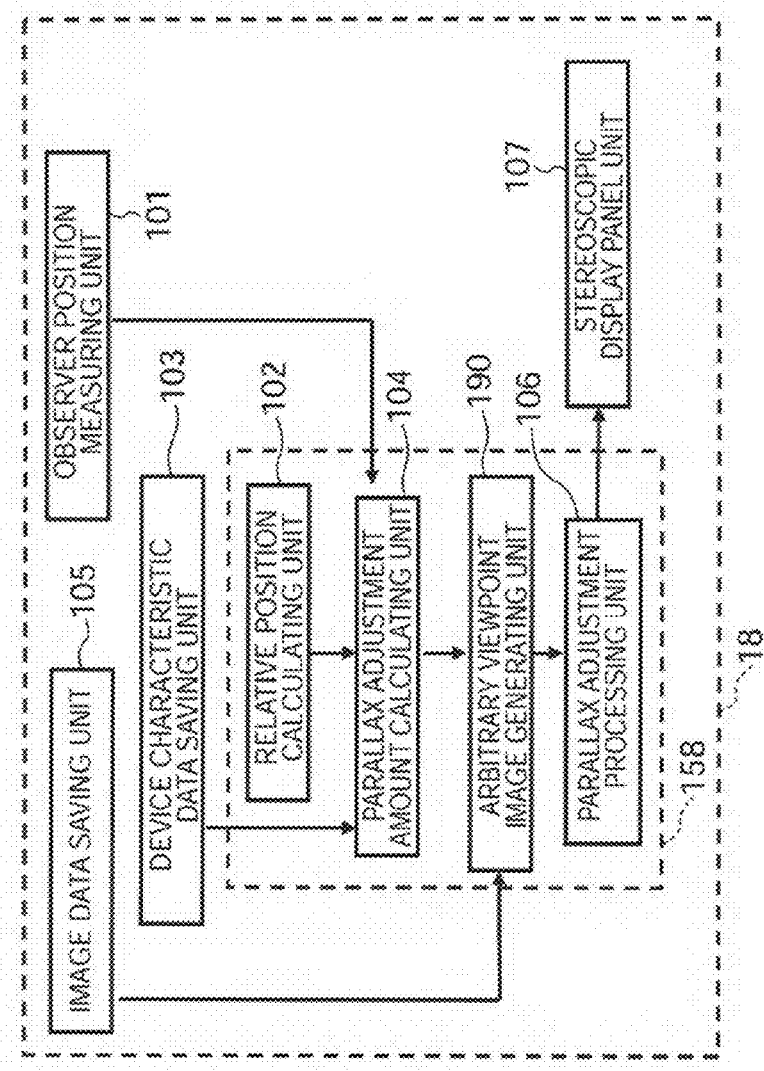
FIG. 75 is a block diagram showing a stereoscopic image display device according to an eighth exemplary embodiment.

FIG. 75 shows a block diagram of a stereoscopic image display device 18. The stereoscopic image display device 18 includes: an observer position measuring unit 101; a relative position calculating unit 102; a device characteristic data saving unit 103; a parallax adjustment amount calculating unit 104; an image data saving unit 105; a parallax adjustment processing unit 106; a stereoscopic display panel unit 107; and an arbitrary viewpoint image generating unit 190. Further, a processing unit that is an integration of the relative position calculating unit 102, the parallax adjustment amount calculating unit 104, the parallax adjustment processing unit 106; and the arbitrary viewpoint image generating unit 190 is referred to as an image processing unit 158.

Hereinafter, functions of each unit included in the stereoscopic image display device 18 will be described. The functions of the observer position measuring unit 101, the relative position calculating unit 102, the device characteristic data saving unit 103, the parallax adjustment amount calculating unit 104, the image data saving unit 105, the parallax adjustment processing unit 106, and the stereoscopic display panel unit 107 are the same as those of the first exemplary embodiment.

The arbitrary viewpoint image generating unit 190 has a function which calculates the viewpoint positions of the virtual cameras by referring to the relative position between the observing position of the observer and the stereoscopic display panel and the parallax adjustment amount calculated by the parallax adjustment amount calculating unit 104, and generates image data captured from the camera viewpoint positions for the stereoscopic image content acquired from the image data saving unit 105.

First, the relation regarding motion parallax and generation of the arbitrary viewpoint image will be described herein.

The motion parallax means that a stereoscopic object is visually recognized in a regularly changing manner in a specific direction when the observing position of the observer viewing the stereoscopic object is shifted. The change in the manner the stereoscopic object is viewed in accordance with the shift in the observing position is increased when the distance between the observer and the stereoscopic object is close, while the change in the manner the stereoscopic object is viewed in accordance with the shift in the observing position is decreased when the distance between the observer and the stereoscopic object is far. Thereby, the observer feels a sense of distance between the observer and the stereoscopic object from the change in the manner the object is viewed, which is caused in accordance with the shift in the observing position of the observer.

With the stereoscopic image display device in general, image data of different parallaxes is projected to the left and right eyes of the observer to present binocular parallax. In systems such as multi-viewpoint system and integral system which spatially project images of plural viewpoints, the motion parallax can be recognized when the observer shifts the position in addition to the binocular parallax. In the meantime, in a case where there is no binocular parallax, i.e., in a case where image data of same parallax is projected to the left and right eyes of the observer, it is also possible to present the motion parallax by displaying the image data in accordance with the movement of the observer.

Figure 76:
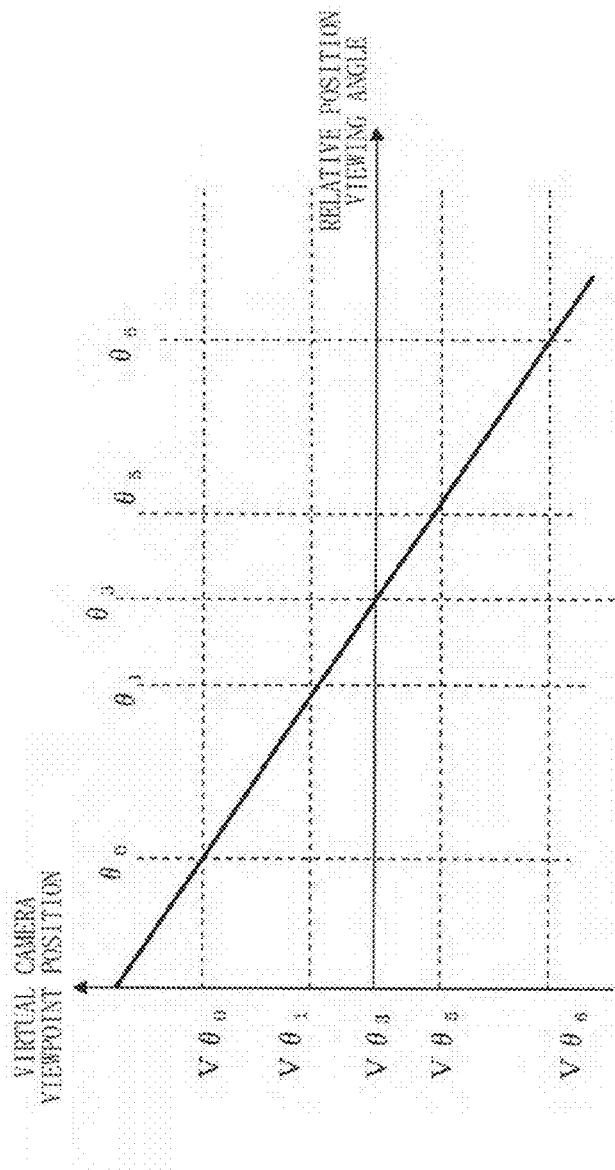
FIG. 76 is a chart showing virtual camera viewpoint positions with respect to the viewing angles.

FIG. 76 shows the relation between the viewpoint positions of the virtual cameras and the viewing angles in such case. The longitudinal axis of FIG. 76 shows the viewpoint positions of the virtual cameras set when acquiring the image data from the stereoscopic image content, and the lateral axis shows the viewing angles calculated from the relative positions between the observing positions of the observers and the stereoscopic display panel. $V\theta_0$ to $V\theta_6$ on the longitudinal axis and $\theta_0$ to $\theta_6$ on the lateral axis will be described later.

Figure 77:
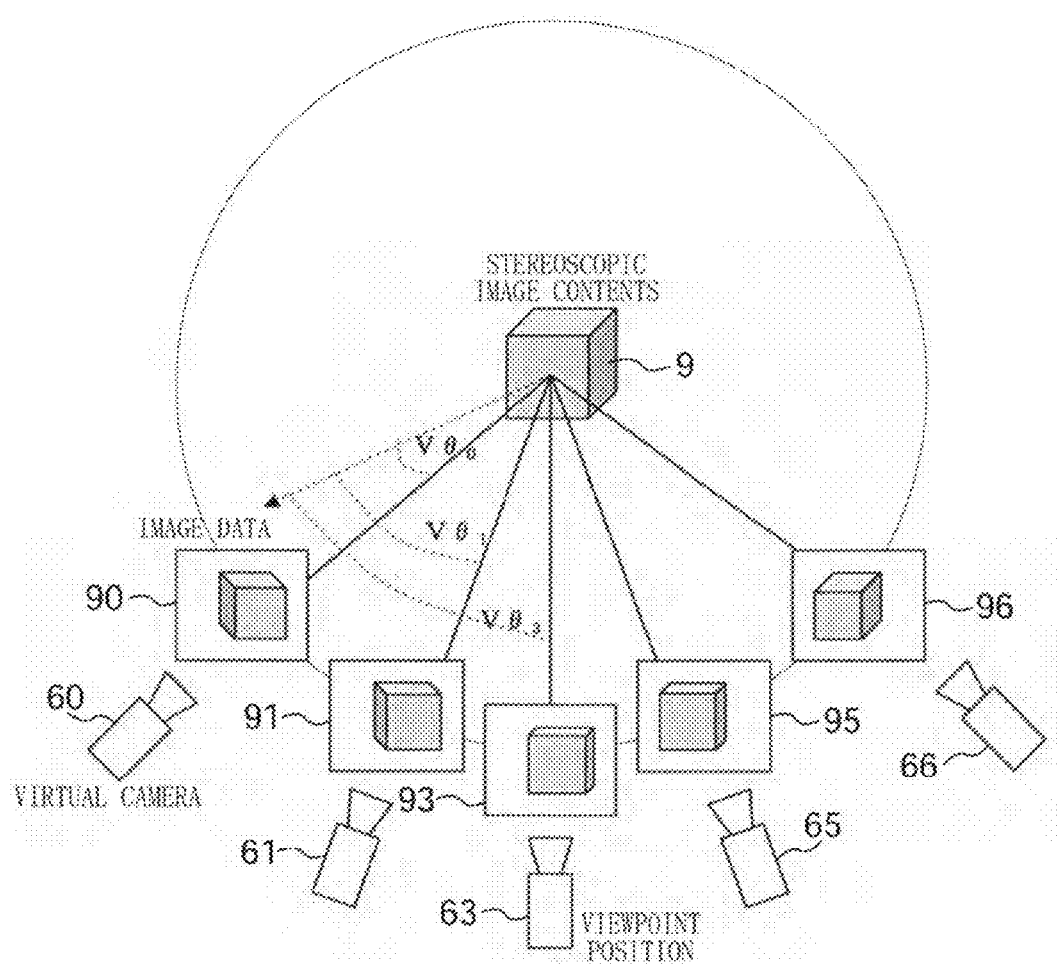
FIG. 77 is a conceptual diagram of a stereoscopic image content and the virtual camera viewpoint positions.

FIG. 77 shows a conceptual chart regarding the viewpoint positions of the virtual cameras. There is a stereoscopic image content 9 in the center part of FIG. 77 and virtual cameras 60, 61, 63, 65, and 66 are placed in the surroundings thereof. The image data 90, 91, 93, 95, and 96 at arbitrary viewpoint positions are acquired by capturing the stereoscopic image content 9 from the viewpoint positions ($V\theta_0$, $V\theta_1$, $V\theta_3$, $V\theta_5$, $V\theta_6$) where the virtual cameras 60, 61, 63, 65, and 66 are placed. The viewpoint position information of the virtual cameras 60, 61, 63, 65, and 66 may be added to the image data 90, 91, 93, 95, and 96 as the attribute information of the image data 90, 91, 93, 95, and 96, respectively.

While the case where the virtual cameras are placed in a circular form in the surroundings of the stereoscopic image content is shown in FIG. 77, the virtual cameras may be placed in a globular form or the distance between the stereoscopic image content and the virtual cameras may be changed arbitrarily. Through placing the virtual cameras in such manner, it is possible to acquire image data of the stereoscopic image content captured from arbitrary viewpoint positions on a three-dimensional space. The viewpoint positions of the virtual cameras of FIG. 77 are expressed as the angle $V\theta$ on a plane of the X-axis-Z-axis, the angle $Vq$ on a plane of the Y-axis-Z-axis, and the distance VR from the viewpoint positions of the virtual cameras to the center position of the stereoscopic display panel.

Figure 78:
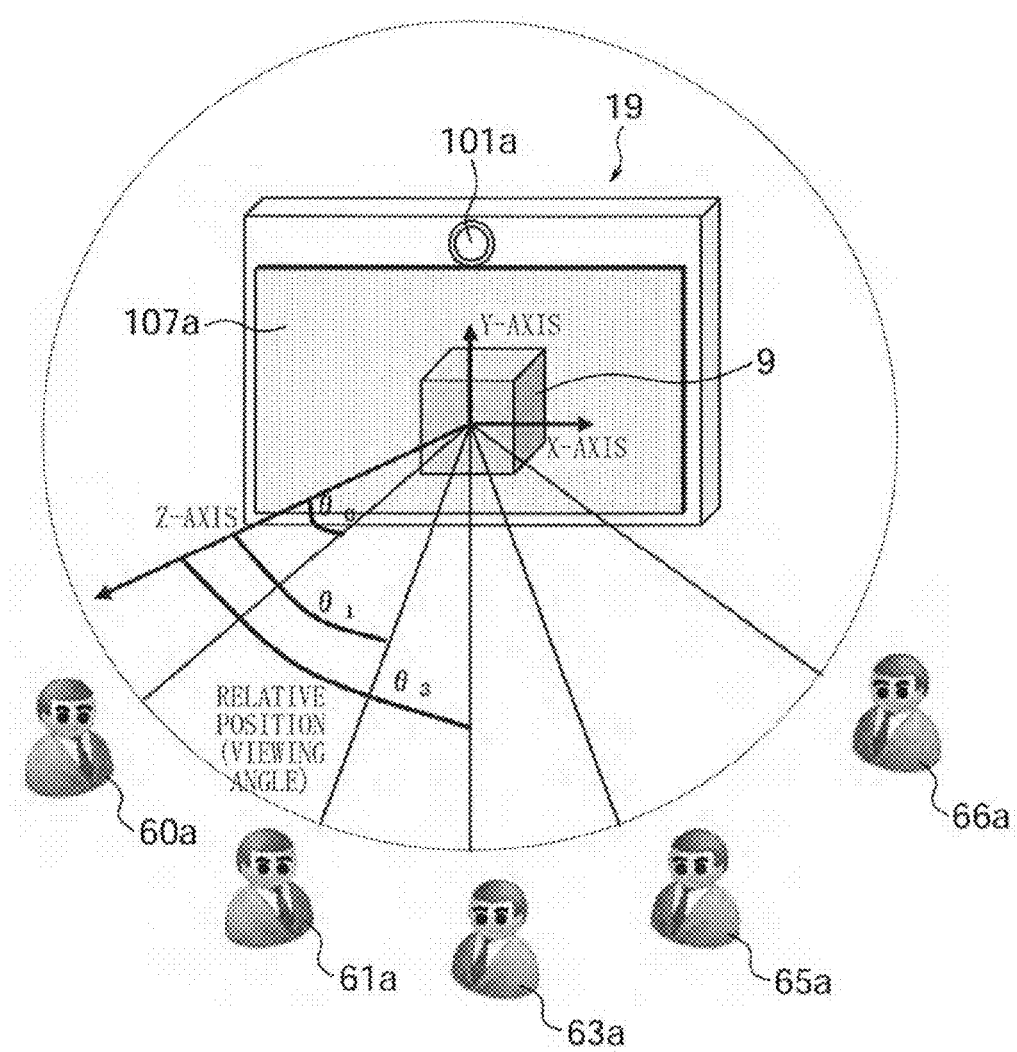
FIG. 78 is a conceptual diagram of the stereoscopic image display device and the viewing angles.

FIG. 78 shows a conceptual chart regarding relative positions between the observing positions of the observer and the stereoscopic image display panel of the stereoscopic image display device. The stereoscopic image content 9 of FIG. 77 is displayed on the plane of the stereoscopic display panel 107a of FIG. 78. As in the case of the first exemplary embodiment, regarding the relative positions, the angles of the relative positions on the plane of the X-axis-Z-axis are expressed as the viewing angles $\theta$. Further, the angles on the plane of the Y-axis-Z-axis are expressed as $\phi$, and the length from the observing positions of the observers 60a, 61a, 63a, 65a, and 66a to the center position of the stereoscopic display panel 107a is expressed as the distance R.

The coordinate axes of FIG. 77 and FIG. 78 are aligned from the positional relation between the stereoscopic image content 9 displayed on the plane of the stereoscopic display panel 107a and the position of the stereoscopic display panel 107a to associate the viewpoint positions ($V\theta_0$, $V\theta_1$, $V\theta_3$, $V\theta_5$, $V\theta_6$) of the virtual cameras 60, 61, 63, 65, and 66 in FIG. 77 with the relative positions ($\theta_0$, $\theta_1$, $\theta_3$, $\theta_5$, $\theta_6$) in FIG. 78.

FIG. 76 shows the relationship therebetween. While FIG. 76 shows the case of the angle $V\theta$ on the plane of the X-axis-Z-axis with respect to the viewing angles $\theta$ of the relative position, the angle $V\phi$ on the plane of the Y-axis-Z-axis with respect to the viewing angles $\phi$ of the relative position, and the distance VR from the viewpoint positions of the virtual cameras to the center position of the stereoscopic display panel with respect to the distance R of the relative position can also be shown with the similar relationship.

Thereby, the observer recognizes the image data that regenerates the change in the manner the stereoscopic object is actually viewed when the relative position is shifted, so that the observer senses the motion parallax. The method for presenting the motion parallax at the viewing angles $\phi$ on the plane of Y-Z axis is also same as the case of viewing angles $\theta$ on the plane of the X-Z-axis. Further, through changing the distance VR from the viewpoint positions of the virtual cameras to the center position of the stereoscopic display panel (may change the display magnification of the stereoscopic image content displayed in the image data) in accordance with the change in the distance R from the observing position of the observer to the center position of the stereoscopic display panel, it is possible to present the motion parallax in accordance with the change in the distance of the relative positions. While the method for presenting the motion parallax is shown from the relational chart of FIG. 76, the image data of the same parallax is displayed for the left and right eyes of the observer with the presenting method of FIG. 76. Thus, the binocular parallax cannot be presented.

The above is the explanation regarding the relation between the motion parallax and generation of the arbitrary viewpoint image.

The eighth exemplary embodiment shows the structure which presents the binocular parallax and the motion parallax to the observer. For presenting the binocular parallax in the stereoscopic image display device, the image data of different parallaxes are displayed for the left and right eyes of the observer by performing the parallax adjustment processing in the same manner as that of the first exemplary embodiment. Regarding the parallax values of the left and right image data, the parallax allowable values are calculated according to the device characteristic data of the stereoscopic image display device, and the parallax adjustment processing of the image data is performed so that the parallax values becomes equal to or less than the parallax allowable values.

Figure 79:
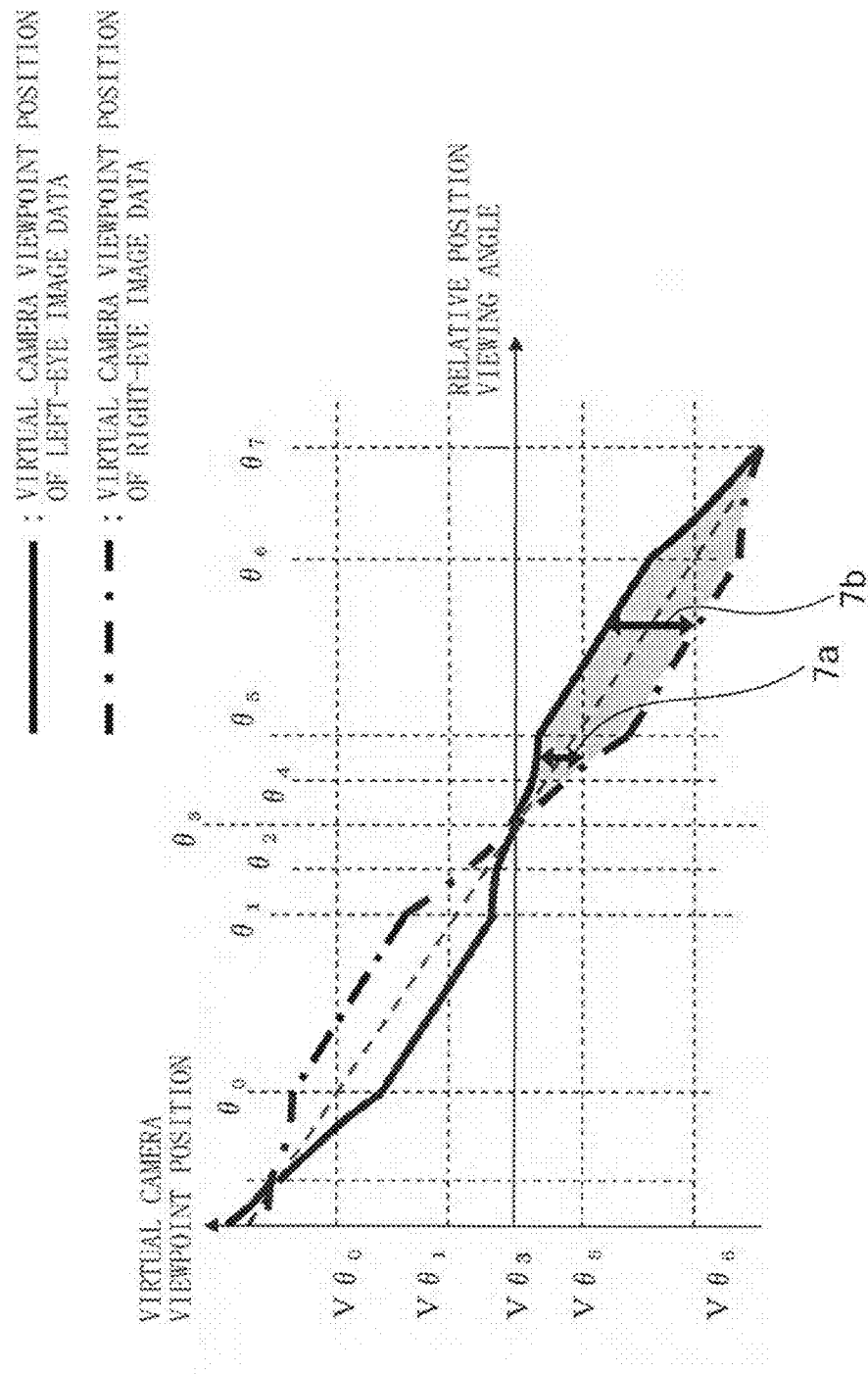
FIG. 79 is a chart showing virtual camera viewpoint positions with respect to the viewing angles.
Figure 80:
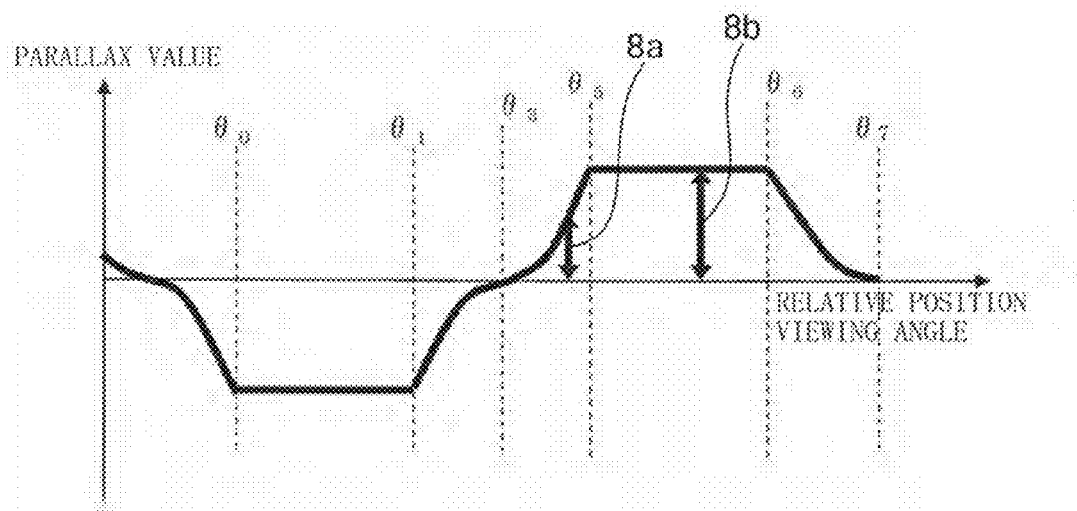
FIG. 80 is a chart showing parallax allowable values with respect to the viewing angles.

Specifically, when the relation of the parallax value of the image data with respect to the viewing angles shown in FIG. 80 and described in the first exemplary embodiment is merged to the relation of the viewpoint positions of the virtual cameras with respect to the viewing angles shown in FIG. 76, the relation of the virtual camera viewpoint positions with respect to the viewing angles considering the binocular parallax as shown in FIG. 79 can be acquired. The solid line in FIG. 79 shows the virtual camera viewpoint position at the time of capturing the left-eye image data of the observer, and the alternate long and short dash line shows the virtual camera viewpoint position at the time of capturing the right-eye image data of the observer. Note here that the difference between the viewpoint positions of the virtual cameras for the left eye and for the right eye (e.g., 7a, 7b) shown in FIG. 79 is adjusted to be equivalent to the parallax values (e.g., 8a, 8b) of the image data shown in FIG. 80.

As described in the first exemplary embodiment, regarding the parallax values of the image data with respect to the viewing angles shown in FIG. 80, the parallax value of the pseudoscopic viewing space is inverted from the parallax value of the stereoscopic viewing space by considering the pseudoscopic view of the stereoscopic display panel. Thus, in FIG. 79 where FIG. 76 and FIG. 80 are merged, the viewpoint positions of the virtual cameras for the left eye and for the right eye in the pseudoscopic viewing space are inverted from those of the virtual cameras for the left eye and for the right eye in the stereoscopic viewing space.

Figure 81:
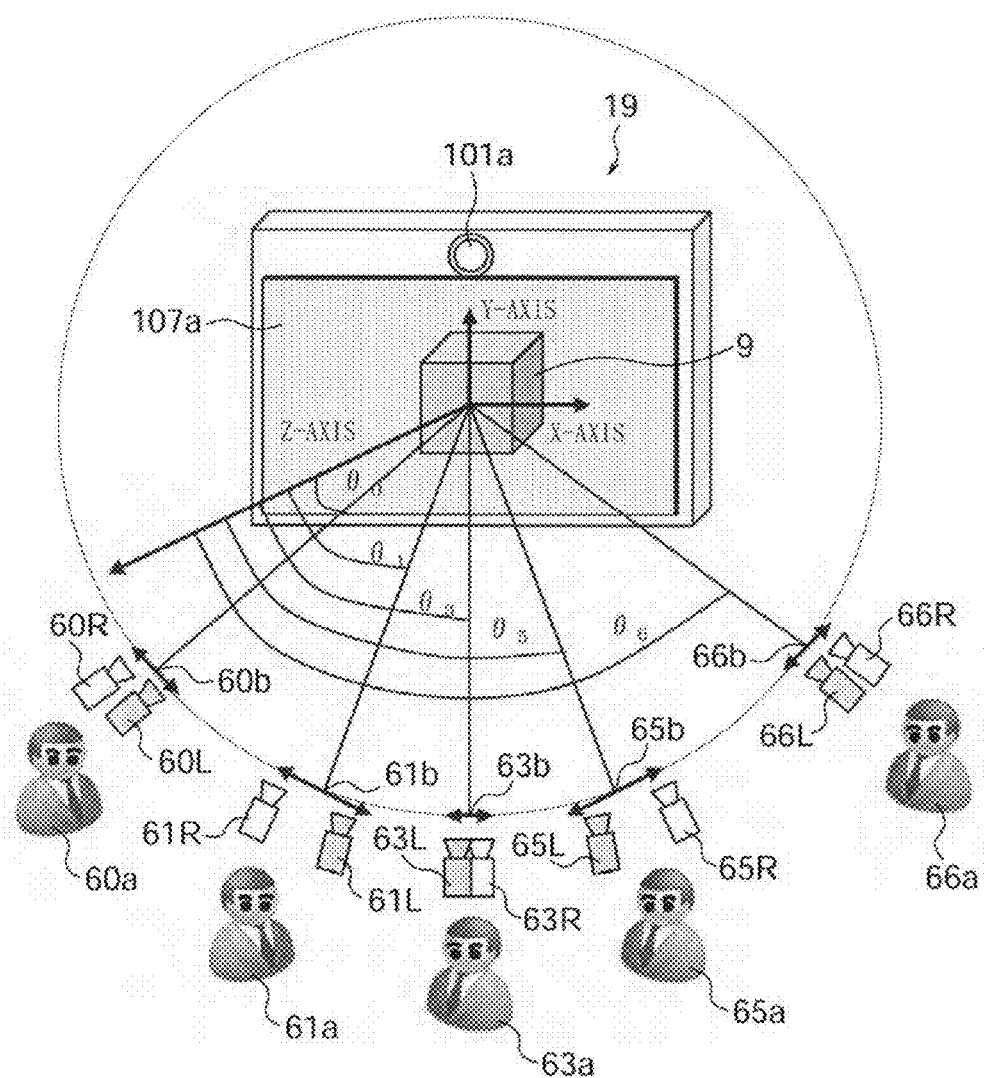
FIG. 81 is a conceptual diagram showing virtual camera viewpoint positions with respect to the viewing angles.

FIG. 81 shows a conceptual chart regarding the relation between the virtual camera viewpoint positions and the viewing angles. The gray cameras in FIG. 81 show the viewpoint positions of the virtual cameras 60L, 61L, 63L, 65L, and 66L at the time of capturing the image data for the left eye of the observers 60a, 61a, 63a, 65a, and 66a, and the white cameras show the viewpoint positions of the virtual cameras 60R, 61R, 63R, 65R, and 66R at the time of capturing the image data for the right eye of the observers 60a, 61a, 63a, 65a, and 66a. Note here that the virtual camera viewpoint positions for the left eye and for the right eye at the viewing angles $\theta_0$ and $\theta_1$ as the pseudoscopic viewing space are the positions inverted from those of the virtual cameras for the left eye and for the right eye at the viewing angles $\theta_5$ and $\theta_6$ as the stereoscopic viewing space.

Further, the differences between the viewpoint positions of the virtual cameras 60L, 61L, 63L, 65L, and 66L for the left eye and the viewpoint positions of the virtual cameras 60R, 61R, 63R, 65R, and 66R for the right eye are the parallax values 60b, 61b, 63b, 65b, and 66b of the image data. As described, the viewpoint positions of the image data displayed for the left and right eyes of the observer are adjusted by referring to the parallax values of the image data calculated in the first exemplary embodiment.

Figure 82:
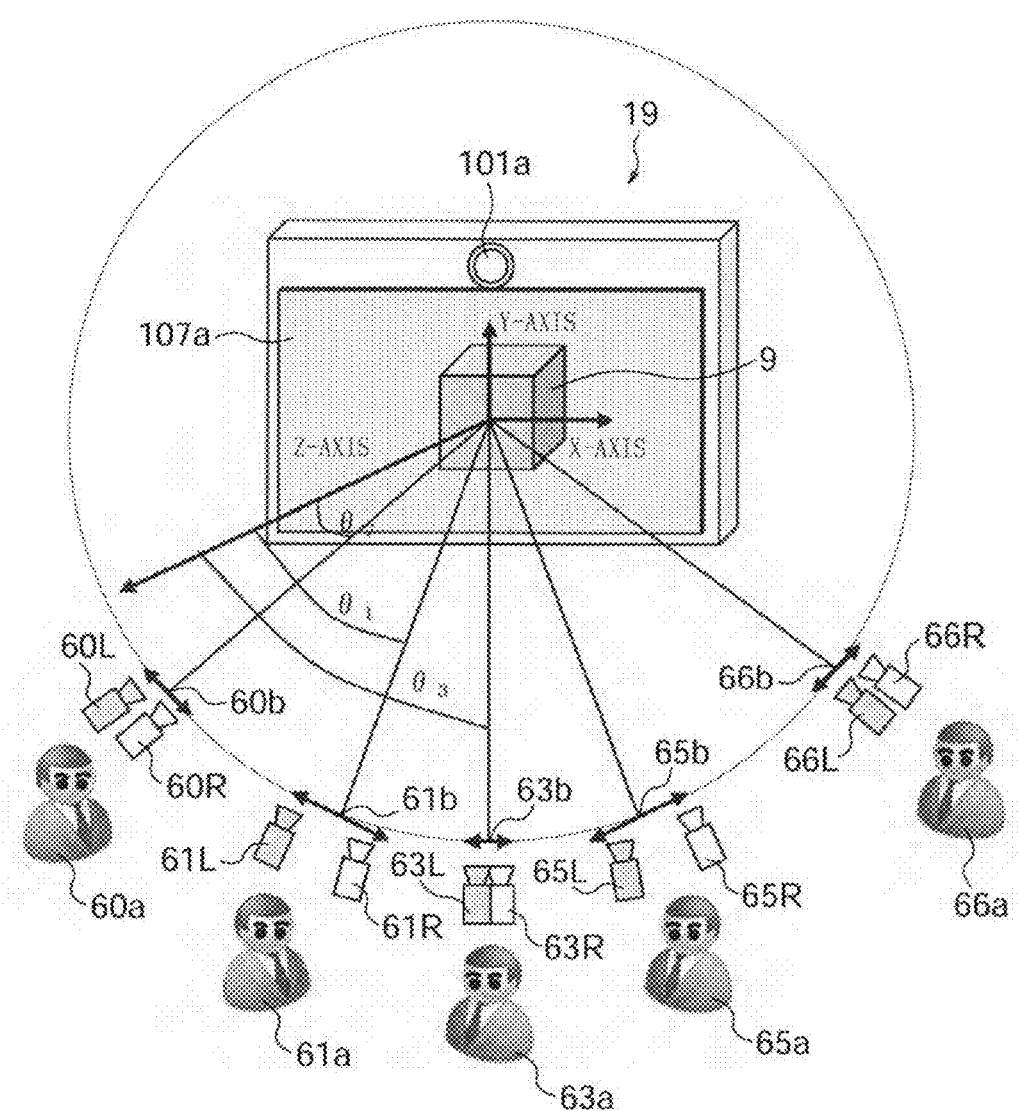
FIG. 82 is a conceptual diagram showing virtual camera viewpoint positions with respect to the viewing angles.

In FIG. 81, the viewpoint positions of the virtual cameras for the left eye and for the right eye are inverted in the viewing angle range to be the pseudoscopic viewing space of the stereoscopic display panel in the arbitrary viewpoint image generating unit 190 shown in FIG. 75 based on the relation of the parallax values of the image data with respect to the viewing angles shown in FIG. 80. However, it is not the only way. For example, it is possible to generate the image without inverting the viewpoint positions of the virtual cameras for the left eye and for the right eye as shown in FIG. 82. In that case, the parallax adjustment processing unit 106 shown in FIG. 75 may invert the left-eye image and the right-eye image in the viewing angle range of the pseudoscopic viewing space of the stereoscopic display panel.

In FIG. 79 showing the relation of the virtual camera viewpoint positions with respect to the viewing angles considering the binocular parallax, shown is the case of using two virtual cameras at each viewpoint. However, the number of the virtual cameras is not limited to that. The embodiment can be applied also to the case of using three or more virtual cameras.

The number of the virtual cameras corresponds to the number of viewpoint areas of the stereoscopic display panel. In general, a naked-eye type stereoscopic image display device projects images of different parallaxes to the left and right eyes of the observer through dividing the spatial areas for projecting the stereoscopic image by the stereoscopic display panel and projecting images of different parallaxes to each of the divided spatial areas. The spatial area divided by the stereoscopic display panel is referred to as a viewpoint area. In the first exemplary embodiment, there are two viewpoint areas in total, i.e., the left-eye area and the right-eye area, as described in FIG. 5 as the example of the two-viewpoint stereoscopic display panel. Further, a four-viewpoint stereoscopic display panel has four viewpoint areas in total, i.e., viewpoint areas for displaying the first, second, third, and fourth viewpoint images, as described in FIG. 27.

Figure 83:
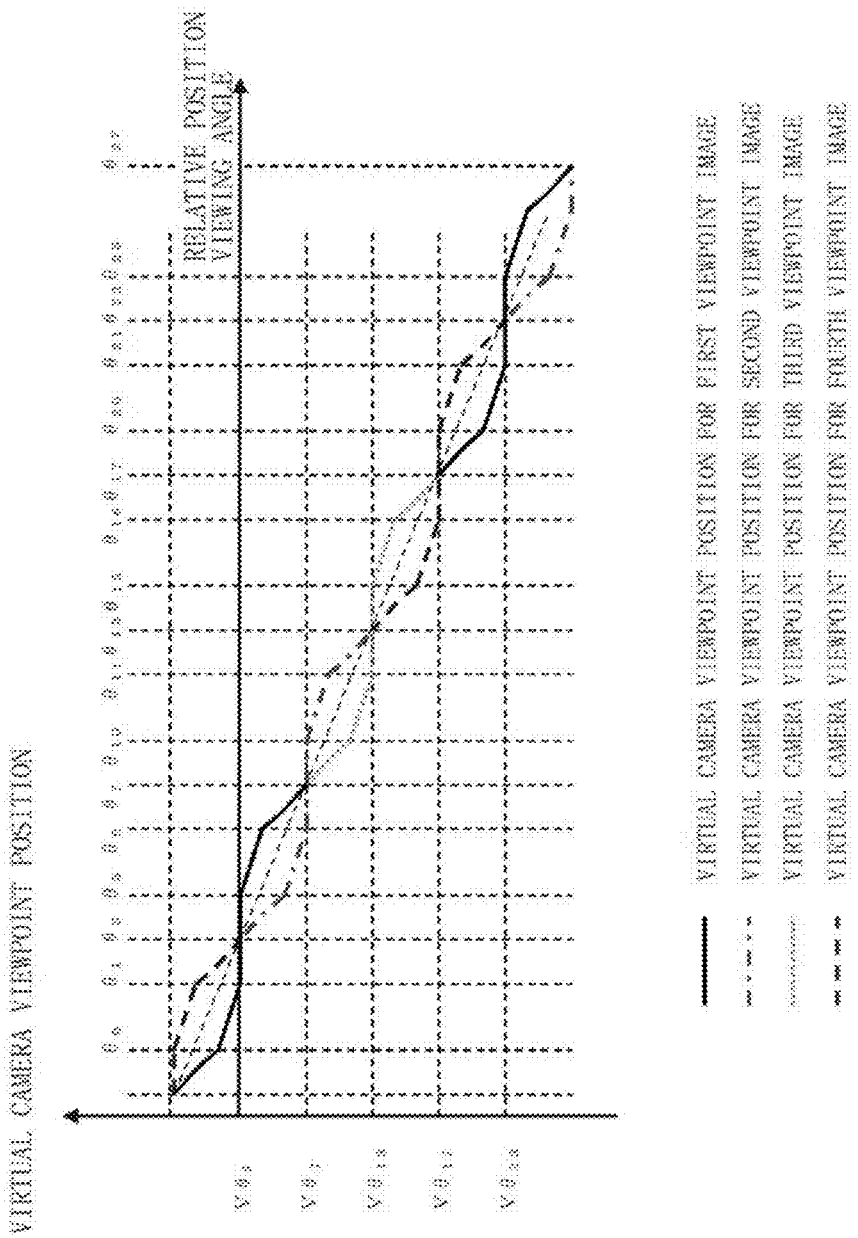
FIG. 83 is a chart showing virtual camera viewpoint positions of a four-viewpoint camera with respect to the viewing angles.

FIG. 83 shows the viewpoint positions of the virtual cameras with respect to the viewing angles when using four virtual cameras. In FIG. 83, the solid line shows the virtual camera viewpoint position for the first viewpoint image, the alternate long and short dash line shows the virtual camera viewpoint position for the second viewpoint image, the dotted line shows the virtual camera viewpoint position for the third viewpoint image, and the broken line shows the virtual camera viewpoint position for the fourth viewpoint image (this is also the same in FIG. 84 to FIG. 86). In order for the explanations to be comprehended easily, regarding the viewpoint positions of the cameras, it is assumed that the stereoscopic display panel and the observing positions are set in such a manner that only the image between the first neighboring viewpoints (e.g., the first viewpoint and the second viewpoint, the second viewpoint and the third viewpoint) is projected towards the observer and the image between the second neighboring viewpoints (e.g., the first viewpoint and the third viewpoint) and the image between the third neighboring viewpoints (e.g., the first viewpoint and the fourth viewpoint) are not projected to the observer.

FIG. 83 shows the idea of expanding the concept of the two virtual cameras shown in FIG. 72 to the case of four cameras by employing the setting described above, which shows a state where the image data captured by two virtual cameras selected from the four virtual cameras with respect to each viewing angle are always projected to the observer. Thereby, both the binocular parallax acquired by spatially projecting the images of two different viewpoints according to the viewing angles and the motion parallax acquired by generation of arbitrary viewpoint images can be presented to the observer.

The feature of this case considering the relation with the case of FIG. 75 is as follows. The arbitrary viewpoint image generating unit 190 detects the two viewpoint areas according to the relative position from each of the viewpoint areas of N-viewpoints projected to the observer side from the stereoscopic display panel by referring to the relative positions calculated by the relative position calculating unit 102 and the parallax adjustment amount calculated by the parallax adjustment calculating unit 104, calculates the viewpoint positions of the virtual cameras of two viewpoints corresponding to the viewpoint areas, and displays the image data captured by the cameras.

Figure 84:
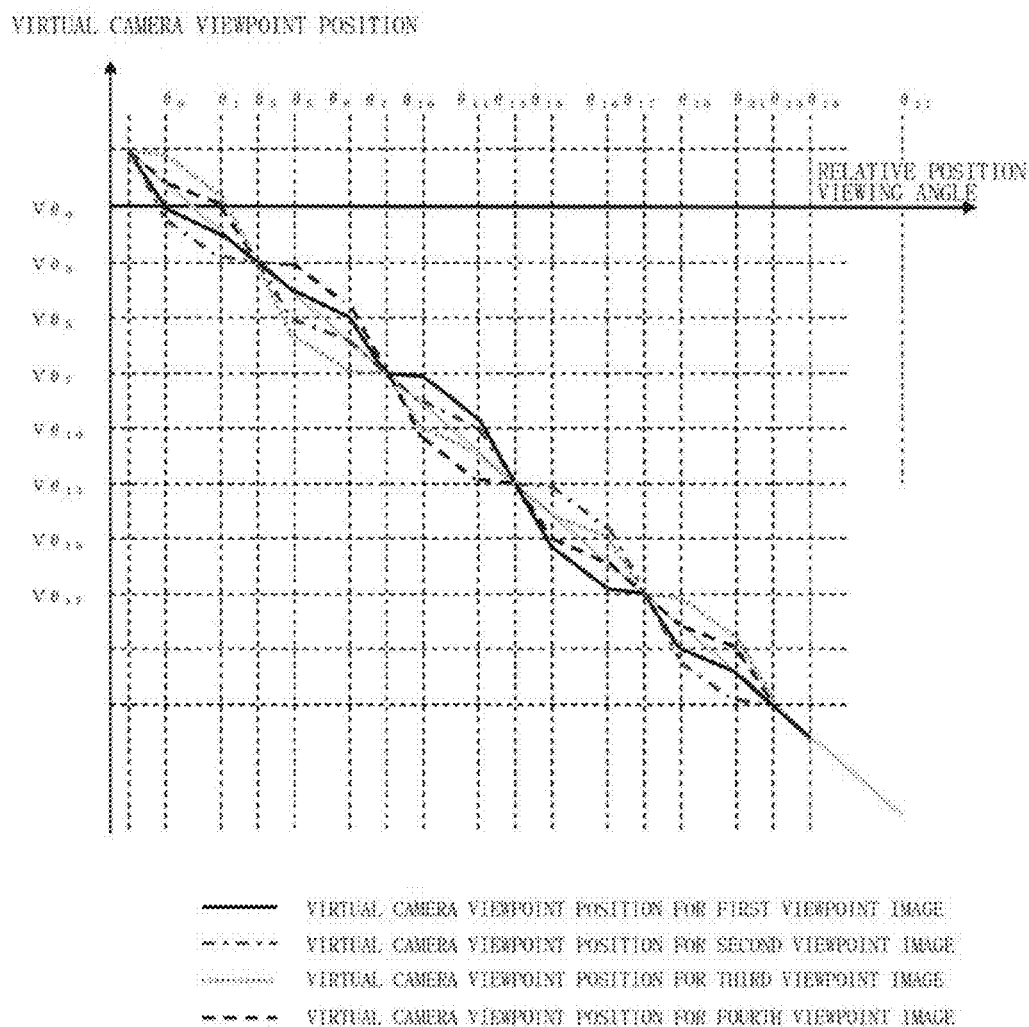
FIG. 84 is a chart showing virtual camera viewpoint positions of a four-viewpoint camera with respect to the viewing angles.

Next, FIG. 84 shows the viewpoint positions of the virtual cameras with respect to the viewing angles in a case where the stereoscopic display panel and the observing positions are set so that not only the image between the first neighboring viewpoints described in FIG. 83 but also a part of or the entire part of the images between the first, second, and third neighboring viewpoints can be projected towards the observer. Four virtual cameras are always selected for each of the viewing angles. Thereby, the binocular parallax acquired by spatially projecting the images of two or more different viewpoints according to the viewing angles and the motion parallax acquired by generation of arbitrary viewpoint images can be presented to the observer.

The feature of this case considering the relation with the case of FIG. 75 is as follows. The arbitrary viewpoint image generating unit 190 calculates the viewpoint positions of the virtual cameras of N-viewpoints corresponding to each of the viewpoint areas of the N-viewpoints projected to the observer side from the stereoscopic display panel by referring to the relative positions calculated by the relative position calculating unit 102 and the parallax adjustment amount calculated by the parallax adjustment calculating unit 104, and displays the image data captured by the cameras.

Figure 85:
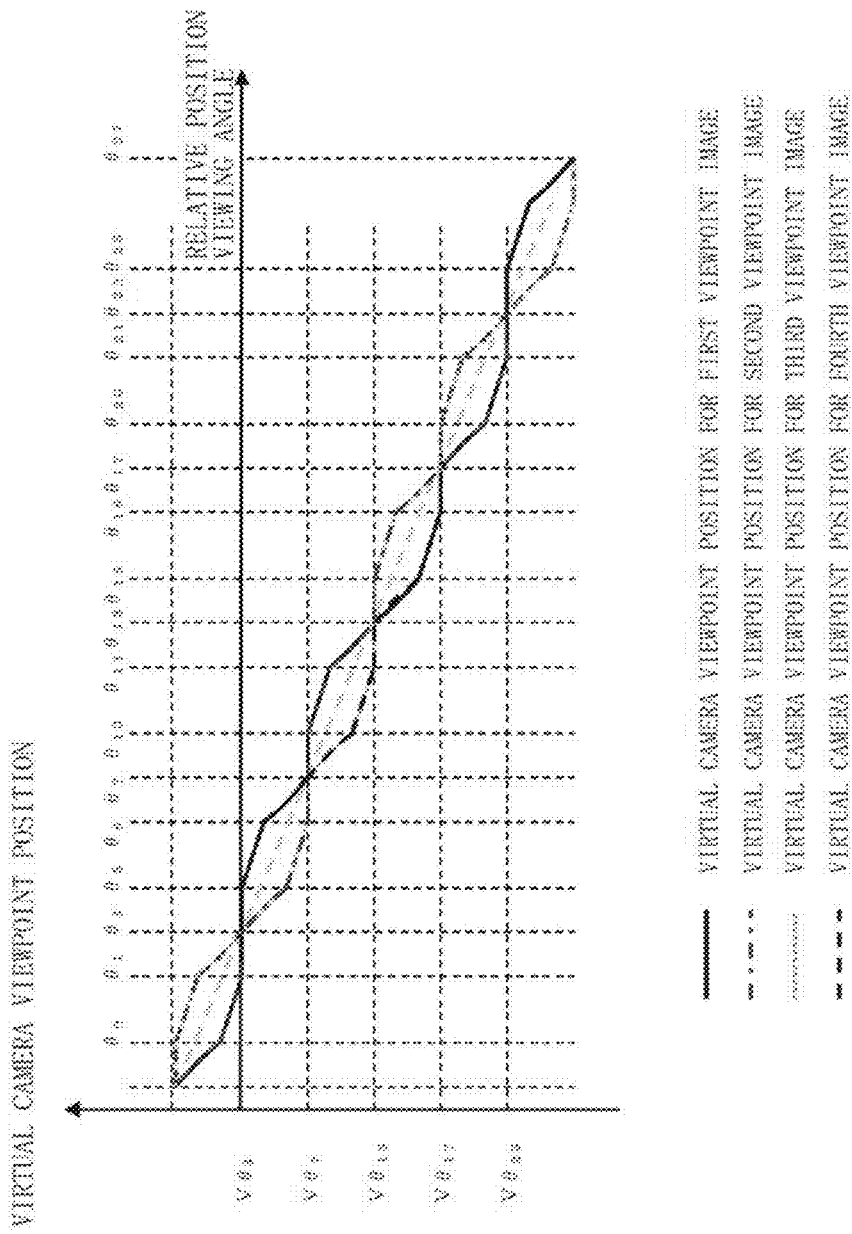
FIG. 85 is a chart showing virtual viewpoint positions of a four-viewpoint camera with respect to the viewing angles.

FIG. 84 shows the case where the viewpoint positions of the virtual cameras for the first viewpoint, second viewpoint, third viewpoint, and fourth viewpoint images are all different. However, it is not the only case. Even in the case where not only the image between the first neighboring viewpoints but also the images between the first, second, and third neighboring viewpoints are projected, the viewpoint positions of the virtual cameras for the first viewpoint and fourth viewpoint images may be set as the same for an arbitrary viewing angle range and the viewpoint positions of the virtual cameras for the second viewpoint and third viewpoint images may be set as the same, for example. FIG. 85 shows such case. The viewpoint positions of the virtual cameras in FIG. 85 are similar to those of FIG. 83.

Figure 86:
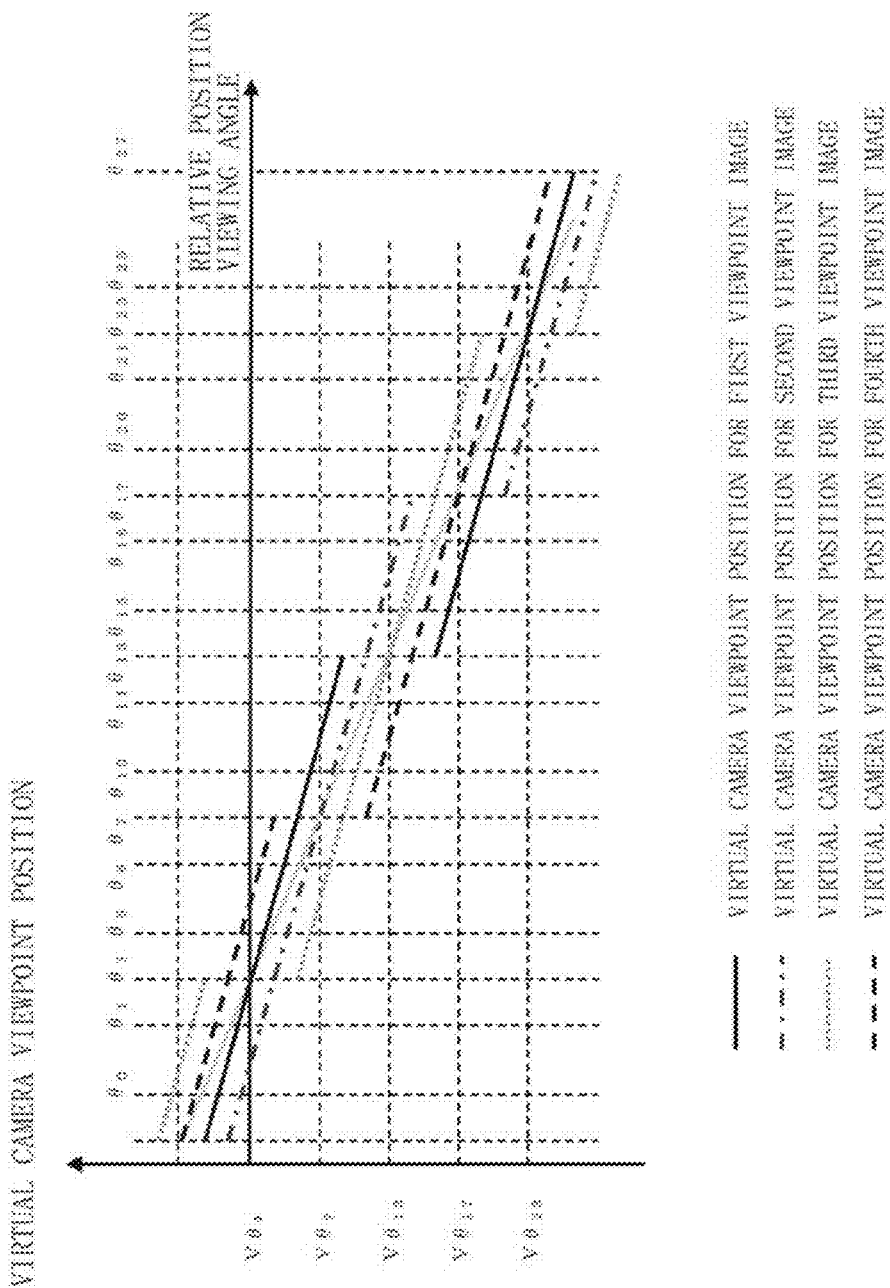
FIG. 86 is a chart showing virtual camera viewpoint positions of a four-viewpoint camera with respect to the viewing angles.

FIG. 86 shows the viewpoint positions of the virtual cameras in a case where the viewpoint positions of the virtual cameras between the neighboring viewpoints are close. In general, when the viewpoint positions of the virtual cameras are close, the parallax values between the images of neighboring viewpoints become small. Thus, even in the viewing angle range $\theta_1$ to $\theta_6$ where the 3D crosstalk value becomes large, the influence of the CT-image by the 3D crosstalk is small. Thus, it is not necessary to decrease the parallax values of the image between the neighboring viewpoints even in the viewing angle range $\theta_1$ to $\theta_6$ where the 3D crosstalk value becomes large. Therefore, the viewpoint positions of the virtual cameras may be set as the same positions as in the case of the viewing angle range $\theta_0$ to $\theta_1$ where the 3D crosstalk value becomes small.

Further, pseudoscopic view may be prevented by detecting the virtual camera which captures an image that is not projected to the observer from the virtual cameras of N-viewpoints by referring to the viewing angles showing the relative position between the observer and the stereoscopic display panel and uncontinuously shifting the viewpoint position of the detected virtual camera in the relative position. For example, at the viewing angle $\theta_{13}$ of FIG. 86, the image captured by the virtual camera for the first viewpoint image is not projected to the observer. Thus, the viewpoint position of the virtual camera for the first viewpoint image is changed at the viewing angle $\theta_{13}$ largely to shift the viewpoint position of the virtual camera uncontinuously. Through uncontinuously shifting the viewpoint position of the virtual camera as described above, it is possible to display the stereoscopic image without having pseudoscopic view not only between the first viewpoint and the second viewpoint, between the second and the third, between the third and fourth but also between the fourth and first viewpoints.

The feature of this case considering the relation with the case of FIG. 75 is as follows. The arbitrary viewpoint image generating unit 190 prevents projection of the pseudoscopic image to the observer through detecting the virtual camera which captures an image that is not projected to the observer from the virtual cameras of N-viewpoints by referring to the relative positions calculated by the relative position calculating unit 102 and the parallax adjustment amount calculated by the parallax adjustment calculating unit 104 and uncontinuously shifting the viewpoint position of the detected virtual camera at the relative position.

As described above, it is possible with the eighth exemplary embodiment to present the binocular parallax and the motion parallax through adjusting the parallax value of the image data according to the viewing angle of the relative position between the observing position of the observer and the stereoscopic display panel as in the case of the first exemplary embodiment and displaying the image data acquired by changing the virtual camera viewpoint positions according to the viewing angle of the relative position.

Figure 87:
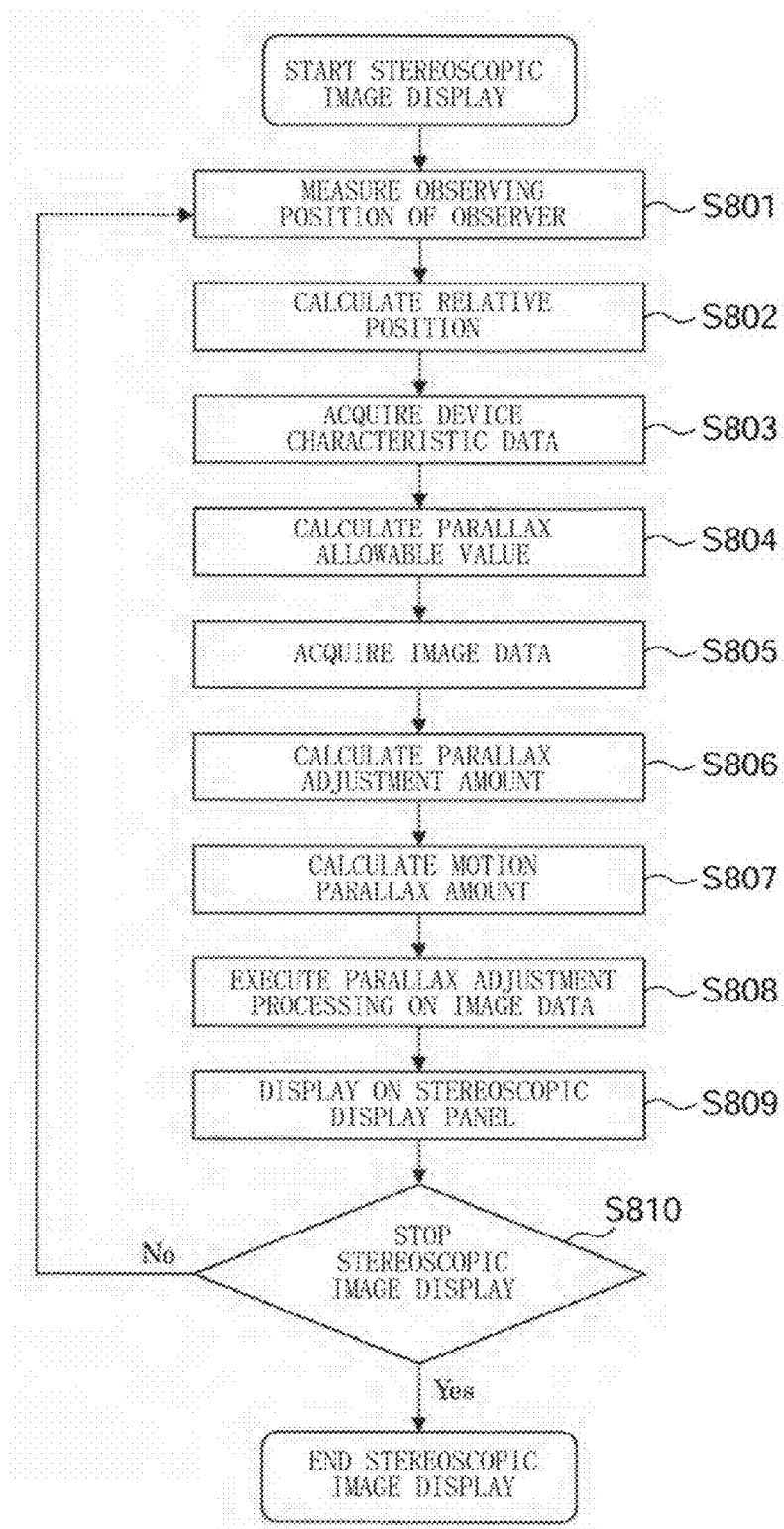
FIG. 87 is a flowchart of a stereoscopic image processing method.

A flowchart of the stereoscopic image processing method used in the stereoscopic image display device according to the eighth exemplary embodiment will be described by referring to FIG. 87. In step S801 to step S806 in the flowchart of FIG. 87, the same processing as that of the first exemplary embodiment is performed.

In step S807, the virtual camera viewpoint positions at the time of acquiring the image data from the stereoscopic image content is calculated as the motion parallax by using the arbitrary viewpoint image generating unit 190 through referring to the relative position calculated in step S802 and the parallax adjustment amount calculated in step S806.

In step S808 to step S810, the same processing as that of step S107 to step S109 of the first exemplary embodiment is performed.

While FIG. 79 shows the case of the angle VA on the plane of the X-axis-Z-axis with respect to the viewing angles $\theta$ of the relative position, the same applies also to the case of the angle $V\phi$ on the plane of the Y-axis-Z-axis with respect to the viewing angles $\phi$ of the relative position. In a case of a stereoscopic image display device only with horizontal parallax, the use of horizontal/vertical parallax image $V\phi$ makes it easy to achieve horizontal/vertical parallax.

As described above, it is possible to provide the stereoscopic image display device with which not only the influence of the CT-image by the 3D crosstalk is lightened but also the motion parallax and the binocular parallax of the stereoscopic image content according to the shift of the relative position can be presented through displaying the image data of arbitrary viewpoint positions according to the relative position between the observing position of the observer and the stereoscopic display panel.

The case of placing the virtual cameras in the surroundings of the stereoscopic image content and using the image data acquired by capturing the stereoscopic image content from arbitrary viewpoint positions is shown in the eighth exemplary embodiment described above. However, there may be cases where the image data of only two viewpoints in total, i.e., one viewpoint for the left-eye image and one viewpoint for the right-eye image, can be used depending on the environment for capturing the stereoscopic image content. In such case, it is possible to generate the image data captured from the viewpoint positions within the range between the two viewpoints by using the image data of the total of two viewpoints with the function of the parallax adjustment processing unit 106 of the first exemplary embodiment. However, it is difficult to generate the image data captured from the viewpoint positions outside the range between the two viewpoints. Therefore, in a case where only the image data of the two viewpoints in total can be used, it is necessary to present the motion parallax by using only the image data captured within the range between the two viewpoints.

Figure 88:
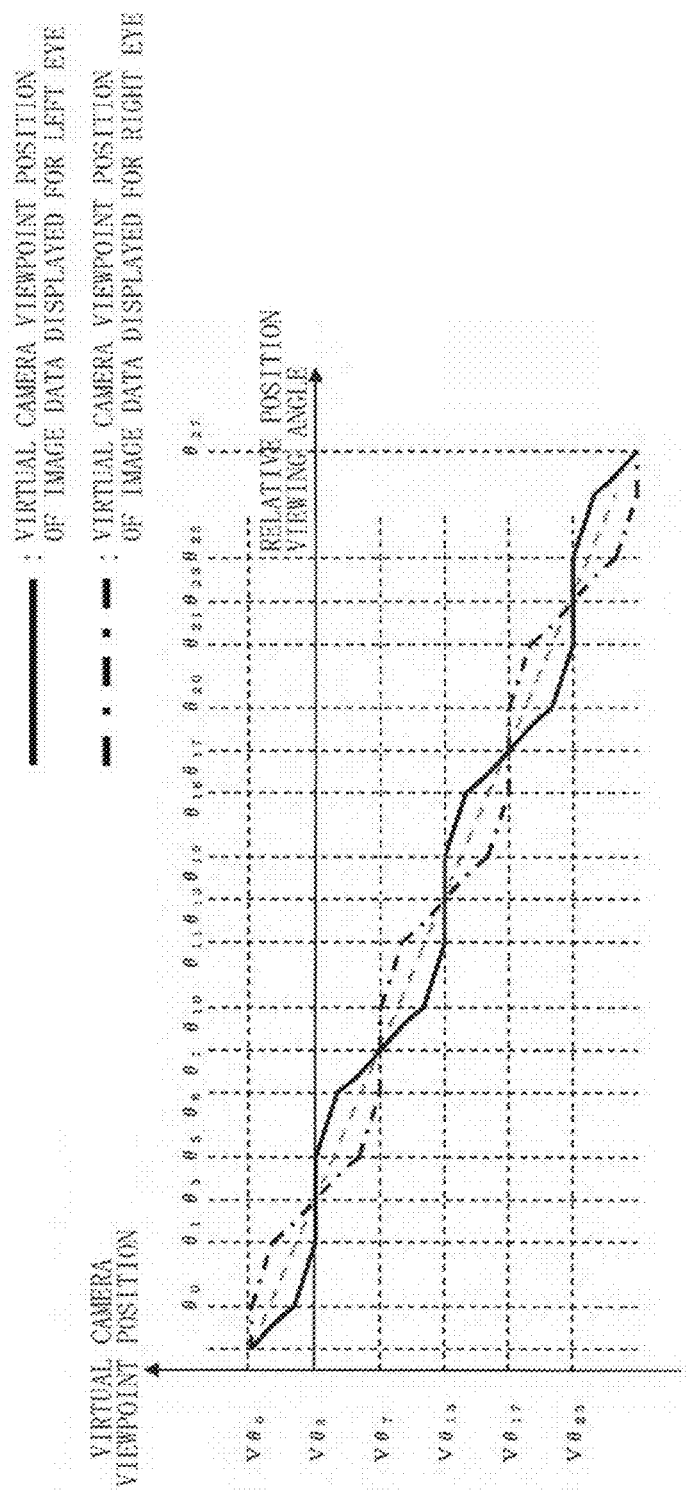
FIG. 88 is a chart showing virtual camera viewpoint positions with respect to the viewing angles.
Figure 89:
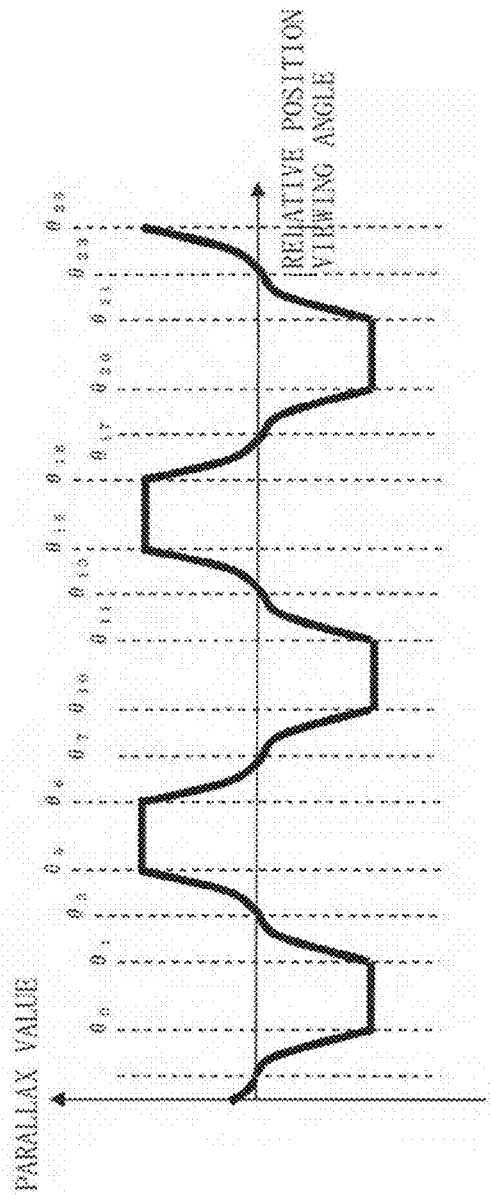
FIG. 89 is a chart showing parallax allowable values with respect to the viewing angles.

FIG. 88 shows the relation between the viewpoint positions of the virtual cameras and the viewing angles of a case where the image data of all the arbitrary viewpoint positions can be used, and FIG. 89 shows the relation between the parallax value of the image data and the viewing angle. In FIG. 88, the solid line shows the viewpoint position of the virtual camera capturing the image data displayed for the left eye, and the alternate long and short dash line shows the viewpoint position of the virtual camera capturing the image data displayed for the right eye. The relational charts in the range of viewing angles $\theta_0$ to $\theta_7$ in FIG. 88 and FIG. 89 are same as the relational charts of FIG. 79 and FIG. 80. The image data of the virtual camera viewpoint positions at the angles of $V\theta_0$ to $V\theta_7$ is displayed in the range of viewing angles $\theta_0$ to $\theta_7$ in FIG. 88, the image data of the virtual camera viewpoint positions at the angles of $V\theta_7$ to $V\theta_{17}$ is displayed in the range of viewing angles $\theta_7$ to $\theta_{17}$, and the image data of the virtual camera viewpoint positions at the angles of $V\theta_{17}$ to $V\theta_{27}$ is displayed in the range of viewing angles $\theta_{17}$ to $\theta_{27}$.

Figure 90:
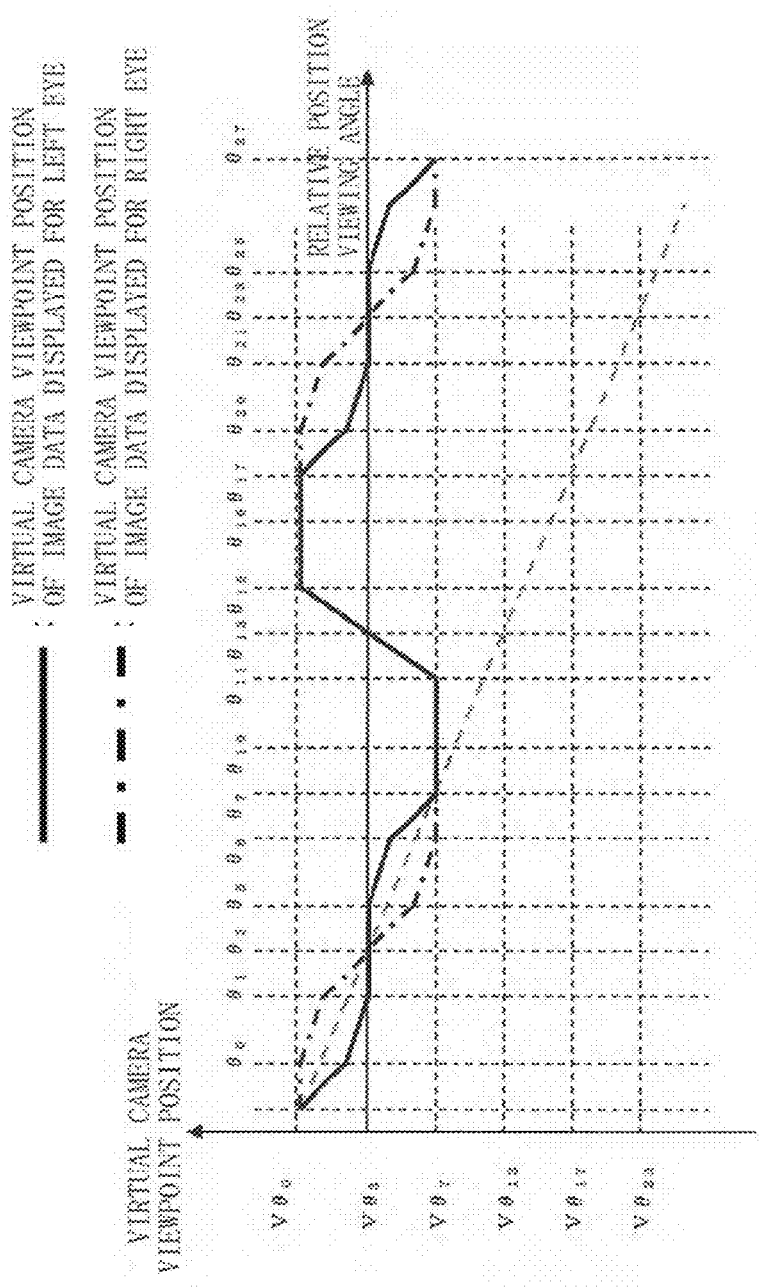
FIG. 90 is a chart showing virtual camera viewpoint positions with respect to the viewing angles.

Next, FIG. 90 shows the relation between the viewpoint positions of the virtual cameras and the viewing angles of a case where only the image data of two viewpoint positions in total can be used. In FIG. 88, the solid line shows viewpoint position of the virtual camera capturing the image data displayed for the left eye, the alternate long and short dash line shows the viewpoint position of the virtual camera capturing the image data displayed for the right eye, and the part where the solid line and the alternate long and short dash line intersect with each other shows the viewpoint position of the virtual cameras capturing the image data displayed for the right eye and the left eye (same in FIG. 91). Note here that the viewpoint positions of the virtual cameras for the image data of two viewpoints are defined as $V\theta_0$ and $V\theta_7$. The image data in the range of the virtual camera viewpoint positions $V\theta_0$ to $V\theta_7$ can be generated from the image data of the two viewpoints. Thus, the image data within the range between the viewpoints is used to present the motion parallax.

In the viewing angle range from $\theta_0$ to $\theta_7$ and the viewing angle range from $\theta_{17}$ to $\theta_{27}$ of FIG. 90, the image data in the range of the virtual camera viewpoint positions $V\theta_0$ to $V\theta_7$ is displayed. In the viewing angle range from $\theta_7$ to $\theta_{17}$, the viewpoint position of the virtual camera is shifted from $V\theta_7$ to the viewpoint position $V\theta_0$. The shift of the viewpoint position may be performed only in the viewing angle range $\theta_{11}$ to $\theta_{16}$ in the center part of the viewing angle range $\theta_7$ to $\theta_{17}$. In order for the parallax value to be equal to or less than the parallax change allowable value depicted in the second exemplary embodiment, the viewing angle range for shifting the viewpoint position may be expanded when the value exceeds the parallax change allowable value.

In the viewing angle range $\theta_{11}$ to $\theta_{16}$ where the viewpoint position is shifted, the motion parallax for the changes in the relative position becomes opposite. However, the motion parallax can be presented to the observer in the viewing angle range $\theta_0$ to $\theta_7$ and the viewing angle range $\theta_{17}$ to $\theta_{27}$. As described above, through repeatedly displaying the image data of arbitrary viewpoint images within the range of two viewpoints, it is possible to present the motion parallax to the observer in the range of many viewing angles even in the case where only the image data of two viewpoints in total can be used.

Figure 91:
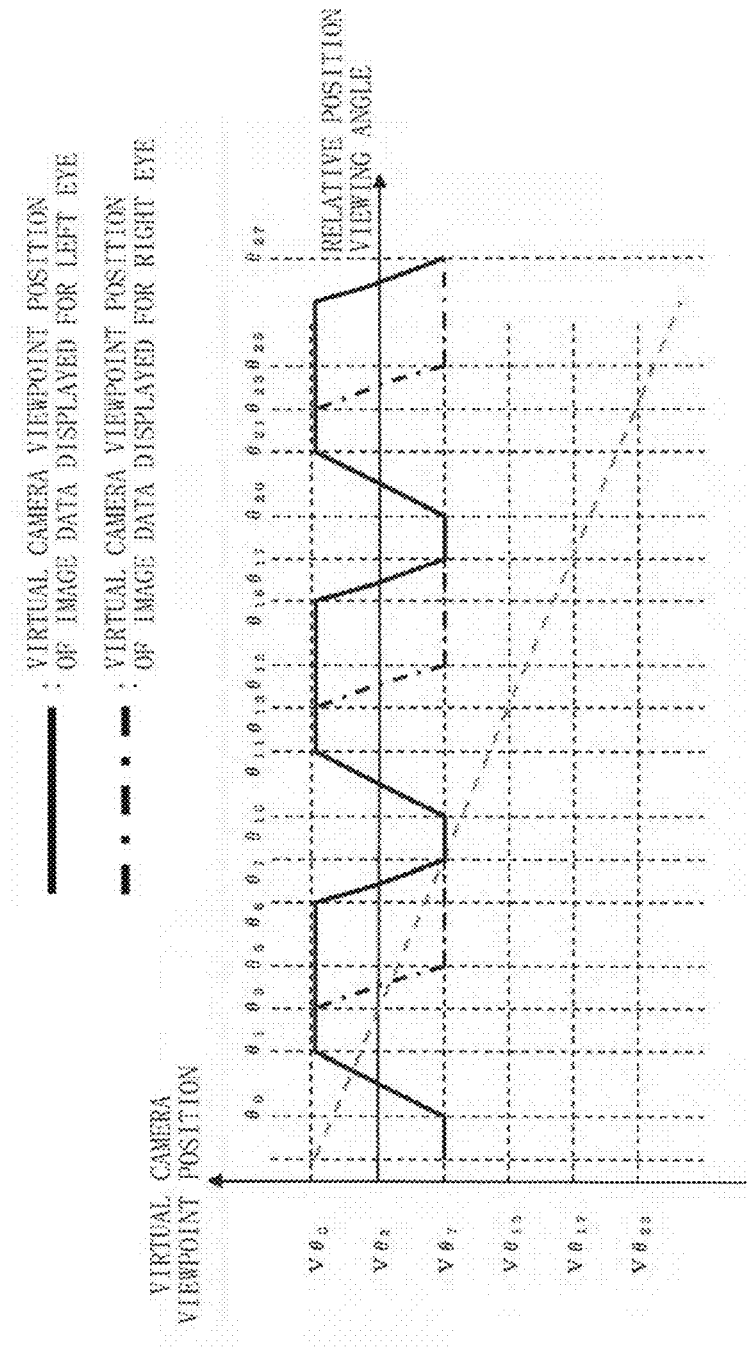
FIG. 91 is a chart showing virtual camera viewpoint positions with respect to the viewing angles.

Further, while FIG. 90 shows the case where the image data is repeatedly displayed in the viewing angle range $\theta_0$ to $\theta_7$ and the viewing angle range $\theta_{17}$ to $\theta_{27}$, the viewing angle range for the repeated display may be changed arbitrarily. FIG. 91 shows the relation between the viewpoint positions of the virtual cameras and the viewing angles when the viewing angle range for the repeated display is changed. In FIG. 91, the motion parallax is presented by repeatedly displaying the image data in the range of the virtual camera viewpoint positions $V\theta_0$ to $V\theta_7$ in the viewing angle range $\theta_3$ to $\theta_7$, the viewing angle range $\theta_{13}$ to $\theta_{17}$, and the viewing angle range $\theta_{23}$ to $\theta_{27}$, which are to be the stereoscopic viewing spaces of the stereoscopic display panel unit. The feature of this case considering the relation with the case of FIG. 75 can be summarized as follows. The arbitrary viewpoint image generating unit 190 detects the virtual camera viewpoint positions at the time of capturing each of the image data by referring to the left-eye image data and the right-eye image data saved in the image data saving unit 105, and generates the image data captured within the range between the viewpoint positions of the virtual cameras. Then, the motion parallax is presented to the observer through repeatedly displaying the generated image data by referring to the relative position calculated by the relative position calculating unit 102 and the parallax adjustment amount calculated by the parallax adjustment calculating unit 104 even in a case where only the left-eye image data and the right-eye image data can be used.

As described above, it is possible to provide the stereoscopic image display device which not only lightens the CT-image by the 3D crosstalk in the range of many viewing angles but also presents the motion parallax and the binocular parallax of the stereoscopic image content according to the shift in the relative positions through repeatedly displaying the image data of the arbitrary viewpoint positions within the region between the two viewpoints even in the case where only the image data of two viewpoints in total can be used.

Other Exemplary Embodiment

While the case where the parallax adjustment amount calculating unit 104 according to all the above-described exemplary embodiments calculates the parallax adjustment amount by using the device characteristic data saved in the device characteristic data saving unit 103 is depicted above, the parallax adjustment amount may be calculated without using the device characteristic data so that the parallax adjustment processing can be achieved even in a state where the device characteristic data cannot be acquired. In this case, the precision of the parallax adjustment amount is deteriorated compared to that of the parallax adjustment processing of the case where the device characteristic data is used. However, through the use of the stereoscopic display panel having such stereoscopic display characteristic that the 3D crosstalk amount is small and the stereoscopic viewing space width is large, it is possible to perform the parallax adjustment processing for lightening the influence of the CT-image by the 3D crosstalk in a practically useable level even when the observer shifts the position.

As an example of the case where the parallax adjustment amount is calculated without using the device characteristic data, there is a case where the observer oneself sets the parallax adjustment amount subjectively. As the first setting, the observer sets the stereoscopic viewing space, the 3D-crosstalk viewing space, and the pseudoscopic viewing space in accordance with the observing positions (the observing distance Z and the viewing angle θ) while observing the stereoscopic image projected from the stereoscopic display panel of the stereoscopic image display device. Note here that it is desirable to perform the setting at a plurality of observing positions in order to improve the precision of the parallax adjustment amount. Further, for the setting, it is possible to use input devices such as a keyboard and a touch panel provided to the stereoscopic image display device.

As the second setting, at the vicinity of the intermediate position between the center position and far end position of the 3D-crosstalk viewing space (the boundary position between the 3D-crosstalk viewing space and the stereoscopic viewing space), the parallax allowable values with which the observer can sight the stereoscopic image content optimally are set. The parallax adjustment amount calculating unit 104 uses the first and second setting values and smoothly connects the parallax allowable values in the vicinity of the intermediate position between the center position and the far end position of the 3D-crosstalk viewing space where the parallax allowable values are set by the observer to calculate the parallax allowable values for all the viewing angles. As the method for calculating the parallax adjustment amount from the parallax allowable values, the parallax maximum value and the parallax allowable value of the image data are compared to calculate the parallax adjustment amount as in the case of the first exemplary embodiment.

It is also possible to calculate the parallax allowable values for all the viewing angles by connecting the parallax allowable values of the stereoscopic viewing space, the 3D-crosstalk viewing space, and the pseudoscopic viewing space smoothly by using only the first setting described above. Further, the first and second setting values may be saved in the device characteristic data saving unit 103 or may be stored in the parallax adjustment amount calculating unit 104 by omitting the device characteristic data saving unit 103.

Another example for calculating the parallax adjustment amount is as follows. Even in a case where the device characteristic data of the stereoscopic display panel 107 of the stereoscopic image display device which displays the stereoscopic image content is unknown, the device characteristic data of a plurality of stereoscopic display panels are saved in the device characteristic data saving unit 103 by associating them with the specification data such as the screen size of the stereoscopic display panel and the optimum viewing distance in advance, and the parallax adjustment amount is calculated by acquiring the device characteristic data associated with the specification data similar to the specification data of the stereoscopic display panel used for display from the device characteristic data saving unit 103 when displaying the stereoscopic image content.

As described above, it is possible to provide the stereoscopic image display device and the stereoscopic image processing method with which the influence of the CT-image by the 3D crosstalk is lightened so that a sense of discomfort is not felt by the observer, through performing the parallax adjustment processing by calculating the parallax adjustment amount even when the device characteristic data of the stereoscopic display panel unit of the stereoscopic image display device is unknown.

While the present invention has been described above by referring to each of the exemplary embodiments, the present invention is not limited only to each of the exemplary embodiments described above. Various changes and modifications that occur to those skilled in the art can be added to the structures and details of the present invention. Further, proper combinations of a part or a whole part of the structures of each of the exemplary embodiments are also included in the present invention.

While a part of or a whole part of the exemplary embodiments can be summarized as follows, the present invention is not limited only to the followings.

(Supplementary Note 1)

A stereoscopic image display device which includes:

a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction;

an observer position measuring unit which measures an observing position of the observer;

a relative position calculating unit which calculates a relative position of the stereoscopic display panel unit with respect to the observing position of the observer;

a parallax adjustment amount calculating unit which calculates a parallax adjustment amount suited for stereoscopic image display according to the relative position; and a parallax adjustment processing unit which performs parallax adjustment processing on image data according to the parallax adjustment amount.

(Supplementary Note 2)

The stereoscopic image display device as claimed in Supplementary Note 1, wherein at least two or more stereoscopic viewing spaces are included between pseudoscopic viewing spaces existing in the first direction, and the 3D-crosstalk viewing space exists not only between the pseudoscopic viewing space and the stereoscopic viewing space but also between the stereoscopic viewing spaces.

(Supplementary Note 3)

The stereoscopic image display device as depicted in Supplementary Note 1, which further includes:

a device characteristic data saving unit which saves device characteristic data containing a display characteristic of the stereoscopic display panel unit for the relative position; and an image data saving unit which saves or receives the image data, wherein the parallax adjustment amount calculating unit calculates the parallax adjustment amount suited for stereoscopic image display for the relative position from the device characteristic data.

(Supplementary Note 4)

The stereoscopic image display device as depicted in Supplementary Note 3, wherein the relative position is a viewing angle between the observing position of the observer and a display plane of the stereoscopic display panel unit.

(Supplementary Note 5)

The stereoscopic image display device as depicted in Supplementary Note 3 or 4, wherein:

the device characteristic data is 3D crosstalk characteristic data; and the parallax adjustment amount is calculated based on the 3D crosstalk characteristic data.

(Supplementary Note 6)

The stereoscopic image display device as depicted in Supplementary Note 5, wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space.

(Supplementary Note 7)

The stereoscopic image display device as depicted in Supplementary Note 6, wherein the prescribed amount of the 3D crosstalk amount is 10%.

(Supplementary Note 8)

The stereoscopic image display device as depicted in any one of Supplementary Notes 1 to 7, wherein the parallax adjustment amount calculating unit classifies viewing angle ranges of the 3D-crosstalk viewing space at least into two or more viewing angle ranges by using at least two or more kinds of 3D crosstalk amount threshold values specified by a visual condition of a stereoscopic image, and calculates the parallax adjustment amount by having a various differential coefficient of the parallax adjustment amount with respect to the viewing angles for each of the classified viewing angle ranges.

(Supplementary Note 9)

The stereoscopic image display device as depicted in any one of Supplementary Notes 1 to 8, wherein:
  the stereoscopic image display device is of N-viewpoints (N is 3 or more); and
  the parallax adjustment processing unit performs the parallax adjustment processing only in the 3D-crosstalk viewing space that is an area changing from the stereoscopic viewing space to the pseudoscopic viewing space.

(Supplementary Note 10)

The stereoscopic image display device as depicted in any one of Supplementary Notes 1 to 8, wherein:
  the stereoscopic image display device is of N-viewpoints (N is 3 or more); and
  the parallax adjustment processing unit performs the parallax adjustment processing in the 3D-crosstalk viewing space that is an area between the stereoscopic viewing space and the neighboring stereoscopic viewing space and in the 3D-crosstalk viewing space that is an area changing from the stereoscopic viewing space to the pseudoscopic viewing space according to the relative position and a parallax value of the image data.

(Supplementary Note 11)

The stereoscopic image display device as depicted in any one of Supplementary Notes 1 to 10, which further includes a parallax change amount allowable value data saving unit which saves a parallax change amount allowable value that is an upper limit value of the parallax change amount with which a sense of discomfort is not felt by a change in the parallax of the stereoscopic image with respect to time, wherein
  the parallax adjustment amount calculating unit calculates the parallax adjustment amount with respect to the change amount of the viewing angle based on the differential coefficient of the relative position with respect to the time and the parallax change amount allowable value.

(Supplementary Note 12)

The stereoscopic image display device as depicted in any one of Supplementary Notes 1 to 11, which further includes a fixed parallax area identifying unit which identifies an area of equal to or more than a prescribed proportion within the no-3D-crosstalk viewing space, wherein
  the parallax adjustment processing unit decreases the parallax value of the image data entirely so that the parallax value of the image data after executing the parallax adjustment processing takes a constant value within the area specified by the fixed parallax area identifying unit.

(Supplementary Note 13)

The stereoscopic image display device as depicted in Supplementary Note 12, wherein
  the prescribed proportion within the no-3D-crosstalk viewing space is 50%.

(Supplementary Note 14)

The stereoscopic image display device as depicted in any one of Supplementary Notes 3 to 13, which further includes a 3D crosstalk image area calculating unit which calculates a 3D crosstalk image area based on the relative position and the device characteristic data, wherein
  the parallax adjustment processing unit performs the parallax adjustment processing on the 3D crosstalk image area among the image data according to the parallax adjustment amount.

(Supplementary Note 15)

The stereoscopic image display device as depicted in any one of Supplementary Notes 1 to 14, which further includes:
  an input operation detecting unit which detects an input operation of the observer;
  an input operation judging unit which judges the input operation that is detected; and
  an input operation processing unit which processes the input operation that is detected or judged, wherein:
  the input operation judging unit judges the parallax adjustment amount inputted by the input operation; and
  the parallax adjustment amount calculating unit calculates a proper parallax adjustment amount by using the parallax adjustment amount that is judged.

(Supplementary Note 16)

The stereoscopic image display device as depicted in any one of Supplementary Notes 1 to 15, which further includes:
  an input operation detecting unit which detects an input operation of the observer;
  an input operation judging unit which judges the input operation that is detected; and
  an input operation processing unit which processes the input operation that is detected or judged, wherein
  the input operation processing unit displays a notification screen for displaying a detection result of the input operation of the observer in an area outside the 3D crosstalk image area.

(Supplementary Note 17)

The stereoscopic image display device as depicted in any one of Supplementary Notes 3 to 16, which further includes a temperature measuring unit which measures environmental temperatures, wherein
  the parallax adjustment amount calculating unit calculates the parallax adjustment amount suited for stereoscopic image display with respect to the viewing angles based on the device characteristic data corresponding to a temperature measured by the temperature measuring unit.

(Supplementary Note 18)

The stereoscopic image display device as depicted in any one of Supplementary Notes 1 to 17, wherein
  the parallax adjustment amount calculating unit: classifies, according to the relative position, into a stereoscopic viewing space where a left-eye image is projected to the left eye and a right-eye image is projected to the right eye, a pseudoscopic viewing space where a right-eye image is projected to the left eye and a left-eye image is projected to the right eye, and a 3D-crosstalk viewing space where a right-eye image and a left-eye image are projected to the left eye or a left-eye image and a right-eye image are projected to the right eye; and calculates a smaller parallax value of the image data when the observer moves in the 3D-crosstalk viewing space than that of the image data when the observer moves in the stereoscopic viewing space or the pseudoscopic viewing space.

(Supplementary Note 19)

The stereoscopic image display device as depicted in any one of Supplementary Notes 1 to 18, wherein
the parallax adjustment amount calculating unit calculates the parallax adjustment amount by having a differential coefficient of the parallax amount with respect to the viewing angle corresponding to the relative position as a finite value according to the change in the relative position.

(Supplementary Note 20)

A stereoscopic image display device which includes:
a stereoscopic display panel unit which includes an optical module which distributes a light ray at least into two different viewpoint directions, and a stereoscopic viewing space where a stereoscopic image is displayed by projecting images of different viewpoints to both eyes of an observer, respectively;
an observer position measuring unit which measures an observing position of the observer;
a relative position calculating unit which calculates a relative position of the stereoscopic display panel unit with respect to the observing position of the observer;
a parallax adjustment amount calculating unit which calculates a parallax adjustment amount suited for stereoscopic image display according to the relative position and a parallax value of the image data; and
a parallax adjustment processing unit which performs parallax adjustment processing on the image data according to the parallax adjustment amount.

(Supplementary Note 21)

The stereoscopic image display device as depicted in Supplementary Note 20, wherein
the relative position is a viewing angle between the observing position of the observer and a display plane of the stereoscopic display panel unit.

(Supplementary Note 22)

The stereoscopic image display device as depicted in Supplementary Note 20 or 21, which further includes a parallax change amount allowable value data saving unit which saves a parallax change amount allowable value that is an upper limit value of the parallax change amount with which a sense of discomfort is not felt by a change in the parallax of the stereoscopic image with respect to time, wherein
the parallax adjustment amount calculating unit calculates the parallax adjustment amount with respect to the change amount of the viewing angle based on the differential coefficient of the relative position with respect to the time and the parallax change amount allowable value.

(Supplementary Note 23)

The stereoscopic image display device as depicted in any one of Supplementary Notes 20 to 22, which further includes:
an input operation detecting unit which detects an input operation of the observer;
an input operation judging unit which judges the input operation that is detected; and
an input operation processing unit which processes the input operation that is detected or judged, wherein:
the input operation judging unit judges the parallax adjustment amount inputted by the input operation; and
the parallax adjustment amount calculating unit calculates a proper parallax adjustment amount by using the parallax adjustment amount that is judged.

(Supplementary Note 24)

The stereoscopic image display device as depicted in any one of Supplementary Notes 20 to 23, which further includes a temperature measuring unit which measures environmental temperatures, wherein
the parallax adjustment amount calculating unit calculates the parallax adjustment amount suited for stereoscopic image display with respect to the viewing angles by corresponding to a temperature measured by the temperature measuring unit.

(Supplementary Note 25)

The stereoscopic image display device as depicted in any one of Supplementary Notes 20 to 24, wherein
the parallax adjustment amount calculating unit calculates the parallax adjustment amount by having a differential coefficient of the parallax amount with respect to the viewing angle corresponding to the relative position as a finite value according to the change in the relative position.

(Supplementary Note 26)

The stereoscopic image display device as depicted in any one of Supplementary Notes 1 to 19, which further includes a parallax adjustment mode switching unit which switches parallax adjustment modes in order to change the parallax adjustment processing of the image data, according to an observing condition including a positional relation between the observer and the stereoscopic display panel unit and a differential coefficient of the positional relation with respect to the time.

(Supplementary Note 27)

The stereoscopic image display device as depicted in Supplementary Note 26, wherein
the parallax adjustment mode switching unit includes a function which limits the differential coefficient of the parallax value with respect to time, when switching the parallax adjustment modes (Supplementary Note 28)

The stereoscopic image display device as depicted in any one of Supplementary Notes 1 to 19, 26, and 27, which further includes an arbitrary viewpoint image generating unit which calculates viewpoint positions of two or more virtual cameras by referring to the relative position calculated by the relative position calculating unit and the parallax adjustment amount calculated by the parallax adjustment amount calculating unit, and displays the arbitrary viewpoint images captured by the virtual cameras.

(Supplementary Note 29)

The stereoscopic image display device as depicted in Supplementary Note 28, wherein:
the stereoscopic image display device is of N-viewpoints (N is 3 or more); and
the arbitrary viewpoint image generating unit detects two viewpoint areas according to the relative position from each of viewpoint areas of N-viewpoints projected towards the observer side from the stereoscopic display panel unit by referring to the relative position calculated by the relative position calculating unit and the parallax adjustment amount calculated by the parallax adjustment amount calculating unit, calculates viewpoint positions of virtual cameras of two viewpoints corresponding to the viewpoint areas, and displays the arbitrary viewpoint images captured by the virtual cameras.

(Supplementary Note 30)

The stereoscopic image display device as depicted in Supplementary Note 28, wherein:
the stereoscopic image display device is of N-viewpoints (N is 3 or more); and the arbitrary viewpoint image generating unit calculates viewpoint positions of virtual cameras of N-viewpoints corresponding to each of viewpoint areas of N-viewpoints projected towards the observer side from the stereoscopic display panel unit by referring to the relative position calculated by the relative position calculating unit and the parallax adjustment amount calculated by the parallax adjustment amount calculating unit, and displays the arbitrary viewpoint images captured by the virtual cameras.

(Supplementary Note 31)

The stereoscopic image display device as depicted in Supplementary Note 30, wherein
the viewpoint positions of the virtual cameras of the N-viewpoints are all different viewpoint positions.

(Supplementary Note 32)

The stereoscopic image display device as depicted in Supplementary Note 30, wherein
the viewpoint positions of the virtual cameras of the N-viewpoints are same in an arbitrary range of the viewing angle.

(Supplementary Note 33)

The stereoscopic image display device as depicted in Supplementary Note 28, wherein:
the stereoscopic image display device is of N-viewpoints (N is 3 or more); and
the arbitrary viewpoint image generating unit detects a virtual camera which captures an image that is not projected to the observer from the stereoscopic image display device by referring to the relative position calculated by the relative position calculating unit and the parallax adjustment amount calculated by the parallax adjustment amount calculating unit, and non-continuously shifts the viewpoint position of the detected virtual camera at the relative position.

(Supplementary Note 34)

The stereoscopic image display device as depicted in Supplementary Note 28, wherein:
the arbitrary viewpoint image generating unit: identifies a range of arbitrary viewpoint positions between the viewpoint positions by referring to the viewpoint positions from a plurality of pieces of image data saved in the image data saving unit; and repeatedly displays the arbitrary viewpoint images between the viewpoint positions according to the relative position calculated by the relative position calculating unit.

(Supplementary Note 35)

The stereoscopic image display device as depicted in Supplementary Note 34, wherein:
the image data saved in the image data saving unit are the image data of two viewpoints in total, which are right-eye image data and left-eye image data;
the arbitrary viewpoint image generating unit: identifies a range of arbitrary viewpoint positions between the viewpoint positions of the right-eye image and left-eye image by referring to the right-eye image data and the left-eye image data: and repeatedly displays the arbitrary viewpoint images between the viewpoint positions of the right-eye image and left-eye image,
according to the relative position calculated by the relative position calculating unit.

(Supplementary Note 36)

The stereoscopic image display device as depicted in Supplementary Note 35, wherein:
the arbitrary viewpoint image generating unit repeatedly displays the arbitrary viewpoint images within the stereoscopic viewing space of the stereoscopic display panel unit, according to the relative position calculated by the relative position calculating unit.

(Supplementary Note 37)

An image processing device which outputs an image data to a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, and the image processing device includes:
a relative position calculating unit which calculates a relative position of the stereoscopic display panel unit with respect to a measured observing position of the observer;
a parallax adjustment amount calculating unit which calculates a parallax adjustment amount suited for stereoscopic image display according to the relative position; and
a parallax adjustment processing unit which performs parallax adjustment processing on image data according to the parallax adjustment amount.

(Supplementary Note 38)

The image processing device as depicted in Supplementary Note 37, which further includes:
an observer position measuring unit which measures the observing position of the observer;
an image data receiving unit which receives the image data before the parallax adjustment processing is performed; and
an image data transmitting unit which outputs the image data on which the parallax adjustment processing is performed.

(Supplementary Note 39)

The image processing device as depicted in Supplementary Note 37 or 38, which further includes:
a device characteristic data saving unit which saves device characteristic data containing a display characteristic of the stereoscopic display panel unit for the relative position, wherein
the parallax adjustment amount calculating unit calculates the parallax adjustment amount suited for stereoscopic image display for the relative position from the device characteristic data.

(Supplementary Note 40)

A stereoscopic image processing method using a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, and the method includes:

measuring an observing position of the observer;

calculating a relative position of the stereoscopic display panel unit with respect to the observing position of the observer;

calculating a parallax adjustment amount suited for stereoscopic image display according to the relative position;

performing parallax adjustment processing on image data according to the parallax adjustment amount; and outputting the image data on which the parallax adjustment processing is performed to the stereoscopic display panel unit.

(Supplementary Note 41)

A stereoscopic image processing method using a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, and the method includes:

measuring an observing position of the observer;

calculating a relative position of the stereoscopic display panel unit with respect to the observing position of the observer;

acquiring device characteristic data including a display characteristic of the stereoscopic display panel unit with respect to the relative position;

calculating a parallax adjustment amount suited for stereoscopic image display for the relative position from the device characteristic data;

performing parallax adjustment processing on the image data according to the parallax adjustment amount; and outputting the image data on which the parallax adjustment processing is performed to the stereoscopic display panel unit (Supplementary Note 42)

The stereoscopic image processing method as depicted in Supplementary Note 41, which includes:

calculating a 3D crosstalk image area based on the relative position and the device characteristic data; and performing the parallax adjustment processing on the 3D crosstalk image area among the image data according to the parallax adjustment amount.

INDUSTRIAL APPLICABILITY

The present invention can be applied to a stereoscopic image processing system having a function which displays stereoscopic image content on the stereoscopic image display device. Note that the present invention is not limited only to the above-described exemplary embodiments and that it is possible to apply changes and modifications as necessary within the scope of the present invention.

What is claimed is:

1. A stereoscopic image display device, comprising:
a stereoscopic display panel unit which includes:
    an optical module which distributes a light ray at least into two different viewpoint directions,
    assuming that the direction of distributing the light ray as a first direction, a stereoscopic viewing space where a stereoscopic image is displayed by projecting a right-eye image to the right eye of an observer and a left-eye image to the left eye of the observer, respectively,
    a pseudoscopic viewing space where the left-eye image is projected to the right eye and the right-eye image is projected to the left eye, respectively, which is at a position shifted from the stereoscopic viewing space in the first direction, and
    a 3D-crosstalk viewing space where the right-eye image and the left-eye image are projected to one of or both of the right eye and the left eye, which is between the stereoscopic viewing space and the pseudoscopic viewing space in the first direction;
an observer position measuring unit which measures an observing position of the observer;
a relative position calculating unit which calculates a relative position of the stereoscopic display panel unit with respect to the observing position of the observer;
a device characteristic data saving unit which saves 3D-crosstalk characteristic data containing a display characteristic of the stereoscopic display panel unit for the relative position;
an image data saving unit which saves or receives the image data;
a parallax adjustment amount calculating unit which calculates a parallax adjustment amount suited for stereoscopic image display according to the relative position from the 3D-crosstalk characteristic data; and
a parallax adjustment processing unit which performs parallax adjustment processing on the image data according to the parallax adjustment amount,
wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space.

2. The stereoscopic image display device as claimed in claim 1, wherein
at least two or more stereoscopic viewing spaces are included between pseudoscopic viewing spaces existing in the first direction, and the 3D-crosstalk viewing space exists not only between the pseudoscopic viewing space and the stereoscopic viewing space but also between the stereoscopic viewing spaces.

3. The stereoscopic image display device as claimed in claim 2, wherein:
the stereoscopic image display device is of N-viewpoints (N is 3 or more); and
the parallax adjustment processing unit performs the parallax adjustment processing in the 3D-crosstalk viewing space that is an area between the stereoscopic viewing space and the neighboring stereoscopic viewing space and in the 3D-crosstalk viewing space that is an area changing from the stereoscopic viewing space to the pseudoscopic viewing space according to the relative position and a parallax value of the image data.

4. The stereoscopic image display device as claimed in claim 1, wherein
the relative position is a viewing angle between the observing position of the observer and a display plane of the stereoscopic display panel unit.

5. The stereoscopic image display device as claimed in claim 1, wherein
the prescribed amount of the 3D crosstalk amount is 10%.

6. The stereoscopic image display device as claimed in claim 1, wherein
the parallax adjustment amount calculating unit classifies viewing angle ranges of the 3D-crosstalk viewing space at least into two or more viewing angle ranges by using at least two or more kinds of 3D crosstalk amount threshold values specified by a visual condition of a stereoscopic image, and calculates the parallax adjustment amount by having a various differential coefficient of the parallax adjustment amount with respect to the viewing angles for each of the classified viewing angle ranges.

7. The stereoscopic image display device as claimed in claim 1, wherein:
the stereoscopic image display device is of N-viewpoints (N is 3 or more); and
the parallax adjustment processing unit performs the parallax adjustment processing only in the 3D-crosstalk viewing space that is an area changing from the stereoscopic viewing space to the pseudoscopic viewing space.

8. The stereoscopic image display device as claimed in claim 1, further comprising a parallax change amount allowable value data saving unit which saves a parallax change amount allowable value that is an upper limit value of the parallax change amount with which a sense of discomfort is not felt by a change in the parallax of the stereoscopic image with respect to time, wherein
the parallax adjustment amount calculating unit calculates the parallax adjustment amount with respect to the change amount of a viewing angle based on the differential coefficient of the relative position with respect to the time and the parallax change amount allowable value.

9. The stereoscopic image display device as claimed in claim 1, further comprising a 3D crosstalk image area calculating unit which calculates a 3D crosstalk image area based on the relative position and the 3D-crosstalk characteristic data, wherein
the parallax adjustment processing unit performs the parallax adjustment processing on the 3D crosstalk image area among the image data according to the parallax adjustment amount.

10. The stereoscopic image display device as claimed in claim 9, further comprising:
an input operation detecting unit which detects an input operation of the observer;
an input operation judging unit which judges the input operation that is detected; and
an input operation processing unit which processes the input operation that is detected or judged, wherein
the input operation processing unit displays a notification screen for displaying a detection result of the input operation of the observer in an area outside the 3D crosstalk image area.

11. The stereoscopic image display device as claimed in claim 1, further comprising:
an input operation detecting unit which detects an input operation of the observer, the parallax adjustment amount being input by the input operation;
an input operation judging unit which judges the input operation that is detected; and
an input operation processing unit which processes the input operation that is detected or judged, wherein:
the input operation judging unit judges the parallax adjustment amount inputted by the input operation; and
the parallax adjustment amount calculating unit calculates a proper parallax adjustment amount by using the parallax adjustment amount that is judged.

12. The stereoscopic image display device as claimed in claim 1, further comprising a temperature measuring unit which measures environmental temperatures, wherein
the parallax adjustment amount calculating unit calculates the parallax adjustment amount suited for stereoscopic image display with respect to viewing angles based on the 3D-crosstalk characteristic data corresponding to a temperature measured by the temperature measuring unit.

13. The stereoscopic image display device as claimed in claim 1, wherein
the parallax adjustment amount calculating unit: classifies, according to the relative position, into a stereoscopic viewing space where a left-eye image is projected to the left eye and a right-eye image is projected to the right eye, a pseudoscopic viewing space where a right-eye image is projected to the left eye and a left-eye image is projected to the right eye, and a 3D-crosstalk viewing space where a right-eye image and a left-eye image are projected to the left eye or a left-eye image and a right-eye image are projected to the right eye; and calculates a smaller parallax value of the image data when the observer moves in the 3D-crosstalk viewing space than that of the image data when the observer moves in the stereoscopic viewing space or the pseudoscopic viewing space.

14. The stereoscopic image display device as claimed in claim 1, wherein
the parallax adjustment amount calculating unit calculates the parallax adjustment amount by having a differential coefficient of the parallax amount with respect to a viewing angle corresponding to the relative position as a finite value according to the change in the relative position.

15. The stereoscopic image display device as claimed in claim 1, further comprising a parallax adjustment mode switching unit which switches parallax adjustment modes in order to change the parallax adjustment processing of the image data, according to an observing condition including a positional relation between the observer and the stereoscopic display panel unit and a differential coefficient of the positional relation with respect to the time.

16. The stereoscopic image display device as claimed in claim 15, wherein
the parallax adjustment mode switching unit includes a function which limits the differential coefficient of the parallax value with respect to time, when switching the parallax adjustment modes.

17. The stereoscopic image display device as claimed in claim 1, further comprising an arbitrary viewpoint image generating unit which calculates viewpoint positions of two or more virtual cameras by referring to the relative position calculated by the relative position calculating unit and the parallax adjustment amount calculated by the parallax adjustment amount calculating unit, and displays the arbitrary viewpoint images captured by the virtual cameras.

18. The stereoscopic image display device as claimed in claim 17, wherein:

the stereoscopic image display device is of N-viewpoints (N is 3 or more); and the arbitrary viewpoint image generating unit detects two viewpoint areas according to a relative position from each of viewpoint areas of N-viewpoints projected towards the observer side from the stereoscopic display panel unit by referring to the relative position calculated by the relative position calculating unit and the parallax adjustment amount calculated by the parallax adjustment amount calculating unit, calculates viewpoint positions of virtual cameras of two viewpoints corresponding to the viewpoint areas, and displays the arbitrary viewpoint images captured by the virtual cameras.

19. The stereoscopic image display device as claimed in claim 17, wherein:

the stereoscopic image display device is of N-viewpoints (N is 3 or more); and the arbitrary viewpoint image generating unit calculates viewpoint positions of virtual cameras of N-viewpoints corresponding to each of viewpoint areas of N-viewpoints projected towards an observer side from the stereoscopic display panel unit by referring to the relative position calculated by the relative position calculating unit and the parallax adjustment amount calculated by the parallax adjustment amount calculating unit, and displays the arbitrary viewpoint images captured by the virtual cameras.

20. The stereoscopic image display device as claimed in claim 19, wherein the viewpoint positions of the virtual cameras of the N-viewpoints are all different viewpoint positions.

21. The stereoscopic image display device as claimed in claim 19, wherein the viewpoint positions of the virtual cameras of the N-viewpoints are same in an arbitrary range of a viewing angle.

22. The stereoscopic image display device as claimed in claim 17, wherein:

the stereoscopic image display device is of N-viewpoints (N is 3 or more); and the arbitrary viewpoint image generating unit detects a virtual camera which captures an image that is not projected to the observer from the stereoscopic image display device by referring to the relative position calculated by the relative position calculating unit and the parallax adjustment amount calculated by the parallax adjustment amount calculating unit, and non-continuously shifts the viewpoint position of the detected virtual camera at the relative position.

23. A stereoscopic image display device, comprising:

a stereoscopic display panel unit which includes:

an optical module which distributes a light ray at least into two different viewpoint directions, assuming that the direction of distributing the light ray as a first direction, a stereoscopic viewing space where a stereoscopic image is displayed by projecting a right-eye image to the right eye of an observer and a left-eye image to the left eye of the observer, respectively, a pseudoscopic viewing space where the left-eye image is projected to the right eye and the right-eye image is projected to the left eye, respectively, which is at a position shifted from the stereoscopic viewing space in the first direction, and a 3D-crosstalk viewing space where the right-eye image and the left-eye image are projected to one of or both of the right eye and the left eye, which is between the stereoscopic viewing space and the pseudoscopic viewing space in the first direction;

an observer position measuring unit which measures an observing position of the observer;

a relative position calculating unit which calculates a relative position of the stereoscopic display panel unit with respect to the observing position of the observer;

a device characteristic data saving unit which saves 3D-crosstalk characteristic data containing a display characteristic of the stereoscopic display panel unit for the relative position;

an image data saving unit which saves or receives the image data;

a parallax adjustment amount calculating unit which calculates a parallax adjustment amount suited for stereoscopic image display according to the relative position from the 3D-crosstalk characteristic data; and a parallax adjustment processing unit which performs parallax adjustment processing on the image data according to the parallax adjustment amount, wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space, wherein the stereoscopic image display device further comprises a fixed parallax area identifying unit which identifies an area of equal to or more than a prescribed proportion within the no-3D-crosstalk viewing space, and wherein the parallax adjustment processing unit decreases the parallax value of the image data entirely so that the parallax value of the image data after executing the parallax adjustment processing takes a constant value within the area specified by the fixed parallax area identifying unit.

24. The stereoscopic image display device as claimed in claim 23, wherein the prescribed proportion within the no-3D-crosstalk viewing space is 50%.

25. A stereoscopic image display device, comprising:

a stereoscopic display panel unit which includes an optical module which distributes a light ray at least into two different viewpoint directions, and a stereoscopic viewing space where a stereoscopic image is displayed by projecting images of different viewpoints to both eyes of an observer, respectively;

an observer position measuring unit which measures an observing position of the observer;

a relative position calculating unit which calculates a relative position of the stereoscopic display panel unit with respect to the observing position of the observer;

a device characteristic data saving unit which saves 3D-crosstalk characteristic data containing a display characteristic of the stereoscopic display panel unit for the relative position;

an image data saving unit which saves or receives the image data;

a parallax adjustment amount calculating unit which calculates a parallax adjustment amount suited for stereoscopic image display according to the relative position from the 3D-crosstalk characteristic data and a parallax value of the image data; and a parallax adjustment processing unit which performs parallax adjustment processing on the image data according to the parallax adjustment amount, wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space.

26. The stereoscopic image display device as claimed in claim 25, wherein the relative position is a viewing angle between the observing position of the observer and a display plane of the stereoscopic display panel unit.

27. The stereoscopic image display device as claimed in claim 25, further comprising a parallax change amount allowable value data saving unit which saves a parallax change amount allowable value that is an upper limit value of the parallax change amount with which a sense of discomfort is not felt by a change in the parallax of the stereoscopic image with respect to time, wherein the parallax adjustment amount calculating unit calculates the parallax adjustment amount with respect to the change amount of the viewing angle based on the differential coefficient of the relative position with respect to the time and the parallax change amount allowable value.

28. The stereoscopic image display device as claimed in claim 25, further comprising:

an input operation detecting unit which detects an input operation of the observer, the parallax adjustment amount being input by the input operation;

an input operation judging unit which judges the input operation that is detected; and an input operation processing unit which processes the input operation that is detected or judged, wherein:

the input operation judging unit judges the parallax adjustment amount inputted by the input operation; and the parallax adjustment amount calculating unit calculates a proper parallax adjustment amount by using the parallax adjustment amount that is judged.

29. The stereoscopic image display device as claimed in claim 25, further comprising a temperature measuring unit which measures environmental temperatures, wherein the parallax adjustment amount calculating unit calculates the parallax adjustment amount suited for stereoscopic image display with respect to viewing angles by corresponding to a temperature measured by the temperature measuring unit.

30. The stereoscopic image display device as claimed in claim 25, wherein the parallax adjustment amount calculating unit calculates the parallax adjustment amount by having a differential coefficient of the parallax amount with respect to the viewing angle corresponding to the relative position as a finite value according to the change in the relative position.

31. A stereoscopic image display device, comprising:

a stereoscopic display panel unit which includes:

an optical module which distributes a light ray at least into two different viewpoint directions, assuming that the direction of distributing the light ray as a first direction, a stereoscopic viewing space where a stereoscopic image is displayed by projecting a right-eye image to the right eye of an observer and a left-eye image to the left eye of the observer, respectively, a pseudoscopic viewing space where the left-eye image is projected to the right eye and the right-eye image is projected to the left eye, respectively, which is at a position shifted from the stereoscopic viewing space in the first direction, and a 3D-crosstalk viewing space where the right-eye image and the left-eye image are projected to one of or both of the right eye and the left eye, which is between the stereoscopic viewing space and the pseudoscopic viewing space in the first direction;

an observer position measuring unit which measures an observing position of the observer;

a relative position calculating unit which calculates a relative position of the stereoscopic display panel unit with respect to the observing position of the observer;

a device characteristic data saving unit which saves 3D-crosstalk characteristic data containing a display characteristic of the stereoscopic display panel unit for the relative position;

an image data saving unit which saves or receives the image data;

a parallax adjustment amount calculating unit which calculates a parallax adjustment amount suited for stereoscopic image display according to the relative position from the 3D-crosstalk characteristic data;

a parallax adjustment processing unit which performs parallax adjustment processing on the image data according to the parallax adjustment amount; and an arbitrary viewpoint image generating unit which calculates viewpoint positions of two or more virtual cameras by referring to the relative position calculated by the relative position calculating unit and the parallax adjustment amount calculated by the parallax adjustment amount calculating unit, and displays the arbitrary viewpoint images captured by the virtual cameras, wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space, and wherein the arbitrary viewpoint image generating unit: identifies a range of arbitrary viewpoint positions between the viewpoint positions by referring to the viewpoint positions from a plurality of pieces of image data saved in the image data saving unit; and repeatedly displays the arbitrary viewpoint images between the viewpoint positions according to the relative position calculated by the relative position calculating unit.

32. The stereoscopic image display device as claimed in claim 31, wherein:

the image data saved in the image data saving unit are the image data of two viewpoints in total, which are right-eye image data and left-eye image data;

the arbitrary viewpoint image generating unit: identifies a range of arbitrary viewpoint positions between the viewpoint positions of the right-eye image and left-eye image by referring to the right-eye image data and the left-eye image data: and repeatedly displays the arbitrary viewpoint images between the viewpoint positions of the right-eye image and left-eye image, according to the relative position calculated by the relative position calculating unit.

33. The stereoscopic image display device as claimed in claim 32, wherein:
the arbitrary viewpoint image generating unit repeatedly displays the arbitrary viewpoint images within the stereoscopic viewing space of the stereoscopic display panel unit, according to the relative position calculated by the relative position calculating unit.

34. An image processing device which outputs an image data to a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, the image processing device comprising:
an observer position measuring unit which measures the observing position of the observer;
a relative position calculating unit which calculates a relative position of the stereoscopic display panel unit with respect to a measured observing position of the observer;
a device characteristic data saving unit which saves 3D-crosstalk characteristic data containing a display characteristic of the stereoscopic display panel unit for the relative position;
a parallax adjustment amount calculating unit which calculates a parallax adjustment amount suited for stereoscopic image display according to the relative position from the 3D-crosstalk characteristic data;
a parallax adjustment processing unit which performs parallax adjustment processing on image data according to the parallax adjustment amount;
an image data receiving unit which receives the image data before the parallax adjustment processing is performed; and
an image data transmitting unit which outputs the image data on which the parallax adjustment processing is performed,
wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space.

35. A stereoscopic image processing method using a stereoscopic display panel unit which includes: an optical module which distributes a light ray at least into two different viewpoint directions; assuming that the direction of distributing the light ray as a first direction, a stereoscopic viewing space where a stereoscopic image is displayed by projecting a right-eye image to the right eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction, the method comprising:
measuring an observing position of the observer;
calculating a relative position of the stereoscopic display panel unit with respect to the observing position of the observer;
acquiring device characteristic data including a display characteristic of the stereoscopic display panel unit with respect to the relative position;
calculating a parallax adjustment amount suited for stereoscopic image display for the relative position from the 3D-crosstalk characteristic data;
performing parallax adjustment processing on the image data according to the parallax adjustment amount; and
outputting the image data on which the parallax adjustment processing is performed to the stereoscopic display panel unit,
wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk viewing space, the parallax adjustment amount of the 3D-crosstalk viewing space is smaller than the parallax adjustment amount of the no-3D-crosstalk viewing space.

36. The stereoscopic image processing method as claimed in claim 35, comprising:
calculating a 3D crosstalk image area based on the relative position and the 3D-crosstalk characteristic data; and
performing the parallax adjustment processing on the 3D crosstalk image area among the image data according to the parallax adjustment amount.

* * * * *